(12) United States Patent
Washisu et al.

(10) Patent No.: US 9,007,468 B2
(45) Date of Patent: Apr. 14, 2015

(54) IMAGE STABILIZATION CONTROL APPARATUS AND IMAGING APPARATUS WITH CORRECTION VALUE BASED ON OUTPUTS OF FIRST AND SECOND VIBRATION DETECTION UNITS

(71) Applicant: Canon Kabushiki Kaisha, Tokyo (JP)

(72) Inventors: Koichi Washisu, Tokyo (JP); Goro Noto, Tokyo (JP); Junichi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/196,185

(22) Filed: Mar. 4, 2014

(65) Prior Publication Data

US 2014/0176739 A1    Jun. 26, 2014

Related U.S. Application Data

(63) Continuation of application No. 12/992,021, filed as application No. PCT/JP2009/062935 on Jul. 10, 2009, now Pat. No. 8,792,011.

(30) Foreign Application Priority Data

Jul. 15, 2008    (JP) .................. 2008-183426

(51) Int. Cl.
*H04N 5/228*    (2006.01)
*H04N 5/232*    (2006.01)
*G03B 5/00*    (2006.01)

(52) U.S. Cl.
CPC .............. *H04N 5/23267* (2013.01); *G03B 5/00* (2013.01); *H04N 5/23248* (2013.01); *H04N 5/23264* (2013.01); *H04N 5/23258* (2013.01); *G03B 2217/005* (2013.01)

(58) Field of Classification Search
CPC .......... H04N 5/23248; H04N 5/23254; H04N 5/23258; H04N 5/23287; H04N 5/23264; H04N 5/23267; H04N 5/2328; H04N 5/23261; H04N 5/23251; H04N 5/23283; H04N 5/2329
See application file for complete search history.

(56) References Cited

U.S. PATENT DOCUMENTS 5,649,237 A    7/1997    Okazaki
5,701,522 A    12/1997    Terui
(Continued)

FOREIGN PATENT DOCUMENTS

CN    1991440 A    7/2007
EP    0 481 230 A2    4/1992
(Continued)

OTHER PUBLICATIONS

Oct. 6, 2009 International Search Report and Written Opinion in International Patent Appin. No. PCT/JP2009/062935.
(Continued)

*Primary Examiner* — Dennis Hogue
(74) *Attorney, Agent, or Firm* — Fitzpatrick, Cella, Harper & Scinto

(57) ABSTRACT

An image stabilization control apparatus including a mechanism which causes a vibration when the mechanism moves is disclosed. The apparatus comprises a vibration correction unit configured to correct image shake occurring due to vibration applied to the image stabilization control apparatus. A correction value of an angular velocity of the vibration is calculated based on signals based on the angular velocity and an acceleration of the vibration, frequency bands of the signals are narrowed. During the mechanism is moving, the image shake is corrected by driving the vibration correction unit based on the angular velocity of the vibration which is corrected by the corrected value calculated before the mechanism moves.

17 Claims, 67 Drawing Sheets

(56) References Cited

U.S. PATENT DOCUMENTS

| | | | |
|---|---|---|---|
| 5,794,078 A * | 8/1998 | Okazaki | 396/50 |
| 5,805,212 A | 9/1998 | Fujiwara | |
| 5,831,671 A * | 11/1998 | Chigira et al. | 348/208.8 |
| 5,946,503 A | 8/1999 | Washisu | |
| 5,974,268 A | 10/1999 | Washisu | |
| 6,009,279 A * | 12/1999 | Kai et al. | 396/55 |
| 6,091,448 A | 7/2000 | Washisu et al. | |
| 6,154,611 A | 11/2000 | Washisu | |
| 6,392,696 B1 | 5/2002 | Onuki | |
| 6,734,902 B1 | 5/2004 | Kawahara | |
| 7,432,953 B2 | 10/2008 | Washisu | |
| 7,634,178 B2 | 12/2009 | Washisu | |
| 8,023,809 B2 | 9/2011 | Washisu et al. | |
| 8,159,545 B2 | 4/2012 | Washisu et al. | |
| 8,305,455 B2 | 11/2012 | Washisu et al. | |
| 8,792,011 B2 * | 7/2014 | Washisu et al. | 348/208.2 |
| 2004/0056963 A1 | 3/2004 | Ishikawa | |
| 2004/0212713 A1 | 10/2004 | Takemoto et al. | |
| 2005/0276590 A1 * | 12/2005 | Ishikawa et al. | 396/55 |
| 2006/0008263 A1 | 1/2006 | Kakiuchi | |
| 2006/0098967 A1 | 5/2006 | Togawa | |
| 2006/0165398 A1 | 7/2006 | Imada | |
| 2006/0222353 A1 * | 10/2006 | Moriya | 396/55 |
| 2007/0147813 A1 | 6/2007 | Washisu | |
| 2007/0183762 A1 | 8/2007 | Washisu | |
| 2008/0069552 A1 | 3/2008 | Washisu | |
| 2008/0136924 A1 | 6/2008 | Washisu | |
| 2009/0245771 A1 | 10/2009 | Uenaka | |

FOREIGN PATENT DOCUMENTS

| | | |
|---|---|---|
| EP | 0 901 267 A2 | 3/1999 |
| EP | 1 659 435 A1 | 5/2006 |
| EP | 1 802 105 A1 | 6/2006 |
| EP | 1 686 792 A2 | 8/2006 |
| JP | 07-168236 A | 7/1995 |
| JP | 07-225405 A | 8/1995 |
| JP | 11-095275 A | 4/1999 |
| JP | 2002-359769 A | 12/2002 |
| JP | 2003-131281 A | 5/2003 |
| JP | 2004-287179 A | 10/2004 |
| JP | 2007-171786 A | 7/2007 |

OTHER PUBLICATIONS

Jun. 17, 2011 European Search Report in European Patent Appln. No. 09797985.0.

Nov. 30, 2012 European Search Report in European Patent Appln. No. 12182779.4.

Mar. 13, 2013 European Search Report in European Patent Appln. No. 12182779.4.

* cited by examiner

IMAGE STABILIZATION CONTROL APPARATUS AND IMAGING APPARATUS WITH CORRECTION VALUE BASED ON OUTPUTS OF FIRST AND SECOND VIBRATION DETECTION UNITS

This application is a continuation of application Ser. No. 12/992,021 filed Nov. 10, 2010, which was the National Stage of International Patent Application No. PCT/JP2009/062935 filed Jul. 10, 2009.

TECHNICAL FIELD

The present invention relates to an image stabilization control apparatus and an imaging apparatus configured to correct or prevent image shake or image degradation occurring due to vibration such as hand shake.

BACKGROUND ART

In recent years, all operations of a camera significant to image capture, such as operation for determining the exposure and a focusing operation, may be performed automatically. Accordingly, even a user who is not accustomed to using a camera may nearly always succeed in taking high quality pictures.

In addition, recently marketed cameras include an image stabilization control apparatus, which includes a vibration correction unit, a driving unit, and a vibration detection unit and are configured to prevent image shake occurring due to vibration. By using such recent cameras, a photographer may nearly always succeed in taking high quality pictures.

An image stabilization control apparatus configured to prevent image shake is briefly described below. The hand shake that may occur with a camera during capture is a vibration with a frequency of, generally 1 to 10 Hz. To take a photograph without any image shake even when such vibration is applied to a camera when the shutter release button is pressed, it is necessary to detect the vibration applied to the camera and displace a lens for correcting image shake (hereinafter simply referred to as a "correction lens") according to the detected value.

Therefore, in order to shoot an image without any image shake even when camera undergoes vibration, it is necessary to detect a precise level of the vibration on the camera and to correct the variation in the optical axis occurring due to the vibration. The vibration (on a camera) can be calculated, in principle, by using a vibration detection unit provided on the camera. More specifically, such a vibration detection unit detects the acceleration, the angular acceleration, the angular velocity, and the angular displacement and executes an operation on an output thereof to correct image shake.

Under general capture conditions, angular vibration (rotational vibration), which may occur according to the orientation of the camera, is the primary cause of the possible vibration. Therefore, a conventional camera includes an angular velocity meter only to detect vibration. In such a camera, it is intended that image shake be suppressed by driving a vibration correction unit (i.e., a correction lens), which displaces the optical axis according to a signal from the vibration detection unit, with a driving unit.

Meanwhile, when an image is taken at a close distance (under a capture condition in which a high imaging magnification is used), significant image degradation due to parallel vibration, which may otherwise cause little image degradation, may occur in addition to angular vibration, which may occur due to the orientation of the camera. Under capture conditions in which an object image is taken at such a close object distance as about 20 cm as in the case of macro photography, or if the focal length of an imaging optical system is very large (400 mm, for example) even when a sufficient object distance of 1 meter is secured, it becomes necessary to positively detect the parallel vibration and drive the vibration correction unit.

In this regard, in a method discussed in Japanese Patent Application Laid-Open No. 07-225405, an accelerometer configured to detect acceleration is provided to detect parallel vibration and drive a vibration correction unit according to the detected parallel vibration value and an output from an angular velocity meter, which is provided separately.

Furthermore, a method discussed in Japanese Patent Application Laid-Open No. 2002-359769 corrects image shake while changing the amount of correcting the vibration. In this method, an image sensor of a camera acquires motion information of a captured image while correcting the image shake. This method sets an optimum vibration correction amount by evaluating the accuracy of image shake correction according to to output from the image sensor.

In this regard, however, in the method discussed in Japanese Patent Application Laid-Open No. 07-225405, output signal from the accelerometer, which is used in detecting parallel vibration, may vary due to disturbance noise or environmental variation such as temperature change. Accordingly, it is difficult to correct parallel vibration with high accuracy.

Furthermore, in the method discussed in Japanese Patent Application Laid-Open No. 2002-359769, setting an optimum vibration characteristic requires a large amount of time. Accordingly, the user operability of the camera may be degraded. In addition, mechanical parts of the vibration correction unit become large to achieve a variable vibration correction amount.

DISCLOSURE OF INVENTION

The present invention provides a small-sized image stabilization control apparatus with high operability and high correction accuracy of image shake due to parallel vibration, and a control method therefor.

According to an aspect of the present invention, there is provided an image stabilization control apparatus having an instruction unit to allow a user to instruct the image stabilization control apparatus to execute image capture preparation operations and image capture operations, comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the outputs of the first and second vibration detection units; an output correction unit configured to correct the output of the first vibration detection unit using the correction value and to output the corrected output; and a driving unit configured to drive the vibration correction unit based on either the output of the first vibration detection unit or the output of the output correction unit, wherein, during the image capture operations, the output correction unit being configured to correct the output of the first vibration detection unit using the correction value calculated before an execution of the image capture operations is instructed by the instruction unit.

According to another aspect of the present invention, there is provided an image stabilization control apparatus including an imaging optical system whose imaging magnification is variable and an instruction unit to allow a user to instruct the image stabilization control apparatus to execute image capture preparation operations and image capture operations, the image stabilization control apparatus comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the outputs of the first and second vibration detection units; an output correction unit configured to correct the output of the first vibration detection unit using the correction value and to output the corrected output; and a driving unit configured to drive the vibration correction unit based on either the output of the first vibration detection unit or the output of the output correction unit, a principal point movement detection unit configured to detect and output a change of a principal point of the imaging optical system due to a change of the imaging magnification; and a correction value correction unit configured to correct the correction value based on an output of the principal point moving detection unit.

According to further aspect of the present invention, there is provided an image stabilization control apparatus having an instruction unit to allow a user to instruct the image stabilization control apparatus to execute image capture preparation operations and image capture operations, the image stabilization control apparatus comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the outputs of the first and second vibration detection units; an output correction unit configured to correct the output of the first vibration detection unit using the correction value and to output the corrected output; and a driving unit configured to drive the vibration correction unit based on either the output of the first vibration detection unit or the output of the output correction unit, a reliability determination unit configured to determine reliability of the correction value, wherein if it is determined by the reliability determination unit that the reliability is low, the output correction unit is configured to use a previously stored correction value to correct the output of the first vibration detection unit.

According to yet further aspect of the present invention, there is provided an imaging apparatus having an instruction unit to allow a user to instruct the image stabilization control apparatus to execute image capture preparation operations and image capture operations, the imaging apparatus comprising: an image sensor; a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on either the output of the first vibration detection unit or the outputs of the first and second vibration detection units; an output correction unit configured to correct the output of the first vibration detection unit using the correction value and to output the corrected output; and a driving unit configured to drive the vibration correction unit based on either the output of the first vibration detection unit or the output of the output correction unit.

According to still further aspect of the present invention, there is provided an imaging apparatus including an imaging unit, an imaging optical system whose imaging magnification is variable, and an instruction unit to allow a user to instruct the image stabilization control apparatus to execute image capture preparation operations and image capture operations, the imaging apparatus comprising: an image sensor; a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on the outputs of the first and second vibration detection units; an output correction unit configured to correct the output of the first vibration detection unit using the correction value and to output the corrected output; a driving unit configured to drive the vibration correction unit based on either the output of the first vibration detection unit or the output of the output correction unit; a principal point movement detection unit configured to detect and output a change of a principal point of the imaging optical system due to a change of the imaging magnification; and a correction value correction unit configured to correct the correction value based on an output of the principal point movement detection unit.

According to another aspect of the present invention, there is provided an imaging apparatus having an instruction unit to allow a user to instruct the image stabilization control apparatus to execute image capture preparation operations and image capture operations, the imaging apparatus comprising: an image sensor; a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on either the output of the first vibration detection unit or the outputs of the first and second vibration detection units; an output correction unit configured to correct the output of the first vibration detection unit using the correction value and to output the corrected output; a driving unit configured to drive the vibration correction unit based on either the output of the first vibration detection unit or the output of the output correction unit; and a reliability determination unit configured to determine reliability of the correction value, wherein if it is determined by the reliability determination unit that the reliability is low, the output correction unit is configured to use a previously stored correction value to correct the output of the first vibration detection unit.

According to another aspect of the present invention, there is provided an image stabilization control apparatus comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated; and a driving unit configured to drive the vibration correction unit based on the output of the first vibration detection unit corrected by the output correction unit.

According to another aspect of the present invention, there is provided an image stabilization control apparatus including an imaging optical system whose imaging magnification is variable and a mechanism which causes a vibration when the mechanism moves, the image stabilization control apparatus comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated before the mechanism starts to move during the mechanism is moving; a driving unit configured to drive the vibration correction unit based on the output of the first vibration detection unit corrected by the output correction unit; a principal point movement detection unit configured to detect and output a relative change of a principal point of the imaging optical system; and a correction value correction unit configured to correct the correction value based on an output of the principal point moving detection unit.

According to another aspect of the present invention, there is provided an image stabilization control apparatus including a mechanism which causes a vibration when the mechanism moves, the image stabilization control apparatus comprising: a vibration correction unit configured to correct image shake occurring due to vibration applied to the image stabilization control apparatus; a first vibration detection unit configured to detect and output an angular velocity of the vibration; a second vibration detection unit configured to detect and output an acceleration of the vibration; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated before the mechanism starts to move during the mechanism is moving; a driving unit configured to drive the vibration correction unit based on the output of the first vibration detection unit corrected by the output correction unit; and a reliability determination unit configured to determine reliability of the correction value, wherein if it is determined by the reliability determination unit that the reliability is low, the output correction unit is configured to use a previously stored correction value to correct the output of the first vibration detection unit.

According to another aspect of the present invention, there is provided an imaging apparatus including an imaging unit and a mechanism which causes a vibration when the mechanism moves, the imaging apparatus comprising: a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated before the mechanism starts to move during the mechanism is moving; and a driving unit configured to drive the vibration correction unit based on the output of the first vibration detection unit corrected by the output correction unit.

According to another aspect of the present invention, there is provided an imaging apparatus including an imaging unit, an imaging optical system whose imaging magnification is variable, and a mechanism which causes a vibration when the mechanism moves, the imaging apparatus comprising: a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated before the mechanism starts to move during the mechanism is moving; a driving unit configured to drive the vibration correction unit based on the output of the first vibration detection unit corrected by the output correction unit; a principal point movement detection unit configured to detect and output a relative change of a principal point of the imaging optical system; and a correction value correction unit configured to correct the correction value based on an output of the principal point movement detection unit.

According to another aspect of the present invention, there is provided an imaging apparatus including an imaging unit and a mechanism which causes a vibration when the mechanism moves, the imaging apparatus comprising: a vibration correction unit configured to correct image shake occurring due to vibration applied to the imaging apparatus; a first vibration detection unit configured to detect and output an angular velocity of the vibration; a second vibration detection unit configured to detect and output a displacement of the vibration based on a motion vector between two chronologically continuous images from the imaging unit; a calculation unit configured to calculate a correction value based on the output from the first vibration detection unit and the output from the second vibration detection unit; an output correction unit configured to correct the output of the first vibration detection unit, the output correction unit being configured to correct the output of the first vibration detection unit using the correction value calculated before the mechanism starts to move during the mechanism is moving; a driving unit configured to drive the vibration correction unit based on the output of the first vibration detection unit corrected by the output correction unit; and a reliability determination unit configured to determine reliability of the correction value, wherein if it is determined by the reliability determination unit that the reliability is low, the output correction unit is configured to use a previously stored correction value to correct the output of the first vibration detection unit.

According to another aspect of the present invention, there is provided an imaging apparatus comprising the image stabilization control apparatus according to the present invention.

Further features and aspects of the present invention will be apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and together with the description, serve to explain the principles of the present invention.

BEST MODE FOR CARRYING OUT THE INVENTION

Various exemplary embodiments, features, and aspects of the present invention are described in detail below with reference to the drawings. The relative arrangement of the components, the numerical expressions, and numerical values set forth in these embodiments are not intended to limit the scope of the present invention.

Figure 1:
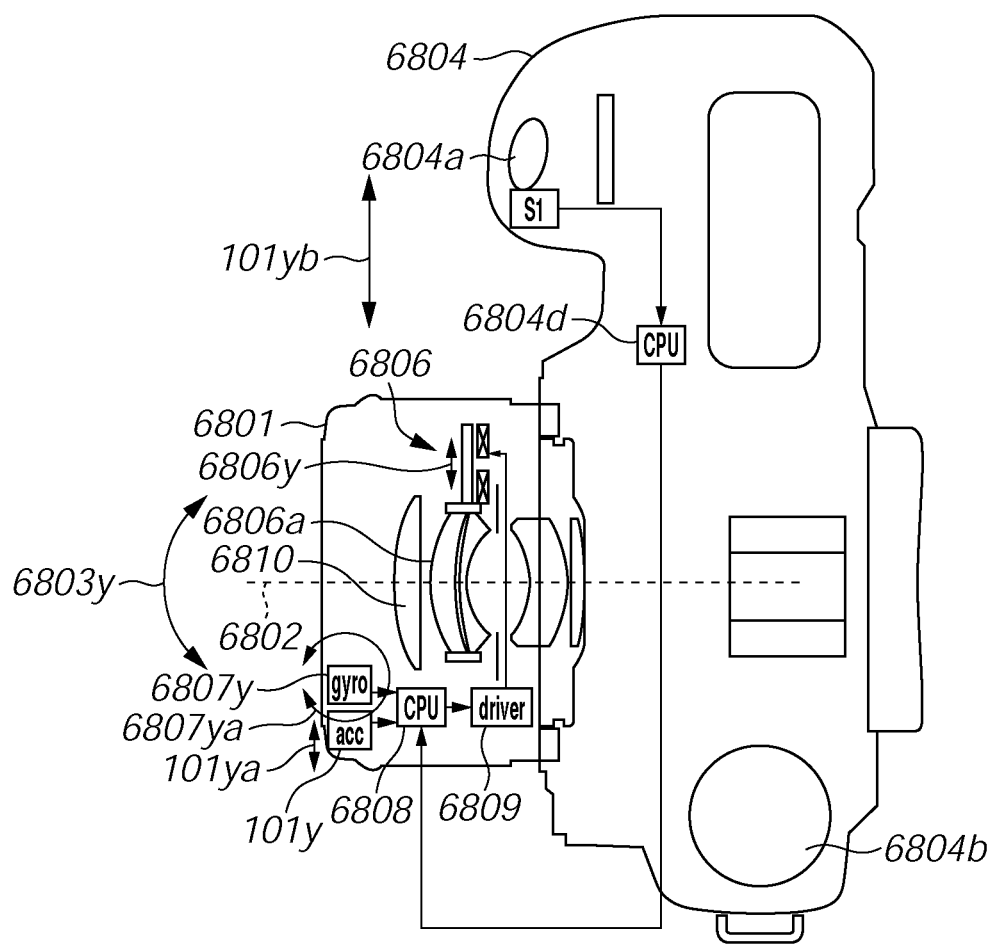
FIG. 1 is a plan view illustrating an example of a single-lens reflex camera according to a first exemplary embodiment of the present invention.
Figure 2:
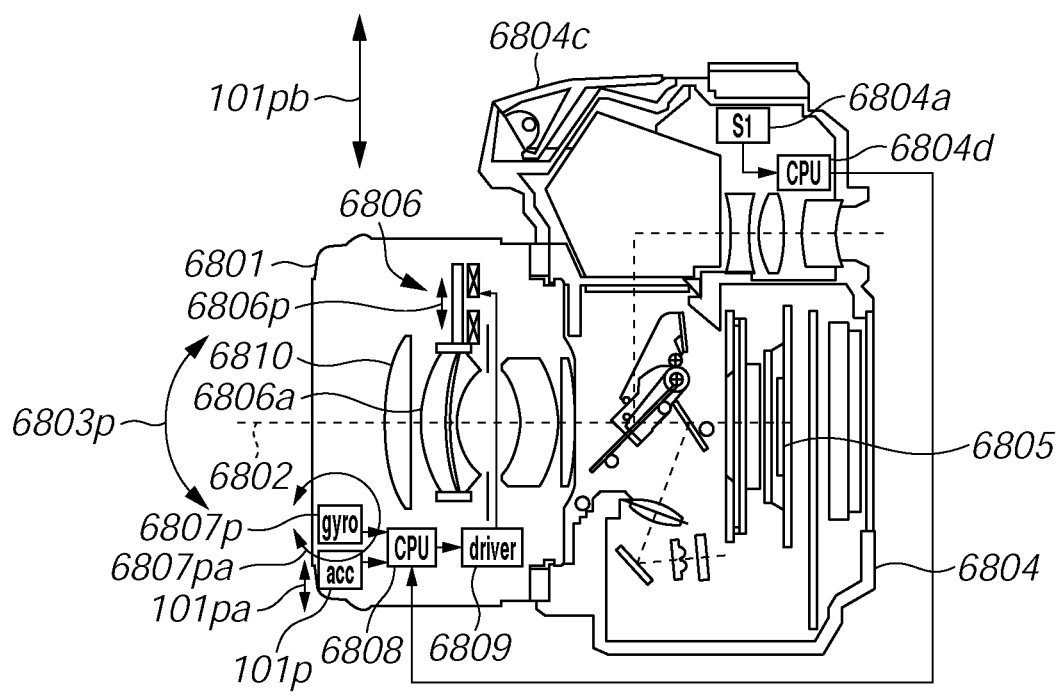
FIG. 2 is a side view illustrating an example of the single-lens reflex camera according to the first exemplary embodiment of the present invention.

A first exemplary embodiment of the present invention is described below. FIGS. 1 and 2 are a plan view and a side view illustrating an example of a single-lens reflex camera having an image stabilization control apparatus according to the present exemplary embodiment.

Referring to FIG. 1, an exchangeable photographic lens 6801 having a vibration correction unit is mounted on a camera body 6804. The vibration correction unit is described in detail below. To briefly describe the vibration correction unit, the vibration correction unit executes correction of image shake such as vibration occurring in a vertical or horizontal direction of an optical axis 6082. The vibration occurring in a vertical or horizontal direction of an optical axis is hereinafter simply and collectively referred to as "angular vibration". The angular vibration is indicated by arrows 6803p and 6803y in FIGS. 1 and 2.

In the present exemplary embodiment, reference symbol "p" is added to a reference number indicating vibration of the camera which may occur in a direction vertical to the camera body 6804 (in a pitch direction indicated by arrows 6806p and 101pb in FIGS. 1 and 2). On the other hand, reference symbol "y" is added to a reference number indicating vibration of the camera which may occur in a direction horizontal to the camera body 6804 (in a yaw direction indicated by arrows 6806y and 101yb in FIGS. 1 and 2).

In addition, the camera body 6804 includes a release button 6804a, a mode dial 6804b (including a main switch), a retractable flash unit 6804c, a camera central processing unit (CPU) 6804d, and an image sensor 6805. Furthermore, a vibration correction unit 6806 includes a correction lens 6806a, a coil, and a permanent magnet. A driving unit supplies current to the coil. The driving unit is described in detail below. A frontmost lens 6810, the correction lens 6806a, and non-specified lenses together construct an imaging optical system of which imaging magnification is variable. The correction lens 6806a can freely move in the direction indicated by the arrows 6806p and 6806y by the effect of the coil and the permanent magnet. Thus, image shake occurring in directions indicated by arrows 6803p and 6803y can be corrected.

Angular velocity meters (hereinafter referred to as "gyros") 6807p and 6807y each detect vibration occurring at portions around arrows 6803p and 6803y. The gyros 6807p and 6807y have detection sensitivity directions indicated by arrows 6807pa and 6807ya. An output of angular velocity detected by the gyros 6807p and 6807y is calculated by a lens CPU 6808. The lens CPU 6808 converts the input angular velocity output into a driving target value for the vibration correction unit 6806 (i.e., the correction lens 6806a).

When a user half-presses the release button 6804a provided on the camera body 6804 (i.e., when the user presses a switch S1 to execute capture preparation operations such as a photometry operation and a focusing operation), a driving target value is input to a driving unit (driver) 6809. Furthermore, the driving unit 6809 drives the coil of the vibration correction unit 6806. Accordingly, as described above, the correction lens 6806a can be moved in the direction of correcting image shake on a plane orthogonal to the optical axis by the effect of the coil and the permanent magnet (in the direction indicated by the arrows 6806p and 6806y in FIGS. 1 and 2). Thus, the correction of the image shake in the direction of the arrows 6803p and 6803y begins.

The image stabilization control apparatus includes the vibration correction unit 6806, the gyros 6807p and 6807y, the lens CPU 6808, and the driving unit 6809.

A conventional image stabilization control apparatus uses the gyros 6807p and 6807y to detect vibration such as hand shake. However, in addition to the angular vibration occurring around the arrows 6803p and 6803y, translational vibration (hereinafter simply referred to as "parallel vibration") is applied to the camera body 6804 as illustrated with arrows 101pb and 101yb. Accordingly, translational movement at a principal point of the lens may become one of the causes of image shake.

Under a general capture condition, angular vibration (rotational vibration) occurring around a portion indicated by the arrows 6803p and 6803y dominantly and primarily occurs while only a small level of image degradation may occur due to parallel vibration indicated by the arrows 101pb and 101yb. Accordingly, in this case, it is necessary to provide only the gyros 6807p and 6807y are sufficient to detect vibration.

On the other hand, the present exemplary embodiment includes, in addition to the gyros 6807p and 6807y, accelerometers (hereinafter referred to as "ACCs") 101p and 101y, which are configured to detect the acceleration, as a vibration detection unit configured to detect the parallel vibration applied to the camera (the image stabilization control apparatus), which is indicated by the arrows 101pb and 101yb in FIGS. 1 and 2.

Arrows 101pa and 101ya indicate the acceleration detection centers of the ACCs 101p and 101y, respectively. The outputs from the gyros 6807p and 6807y and the ACCs 101p and 101y are input to the lens CPU 6808. The driving unit 6809 drives the vibration correction unit 6806 according to the outputs.

Figure 3:
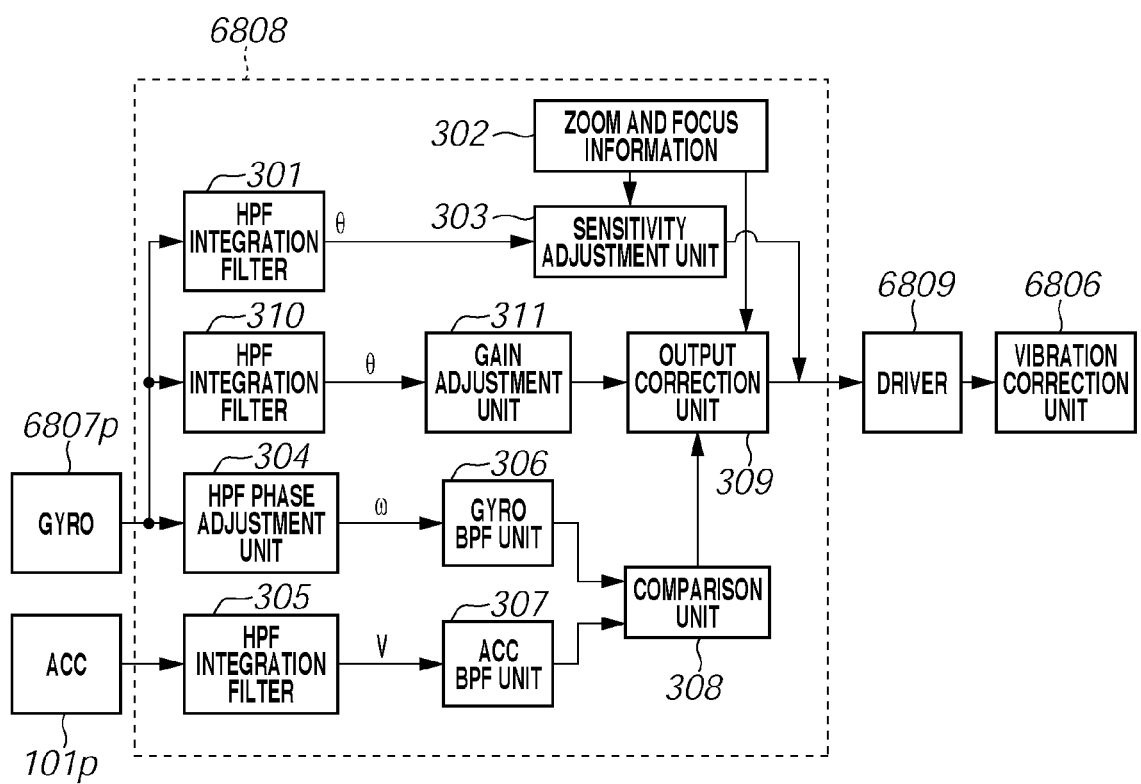
FIG. 3 illustrates an example of an image stabilization control apparatus included in the single-lens reflex camera according to the first exemplary embodiment of the present invention.

FIG. 3 is a block diagram illustrating an example of the image stabilization control apparatus according to the present exemplary embodiment. In the example illustrated in FIG. 3, the exemplary configuration in the pitch direction only is described, but a similar configuration is provided in the yaw direction of the camera. The configurations are essentially the same as each other. Accordingly, in the following description, the configuration is only described in the pitch direction.

The correction of the angular vibration is described in detail below with reference to FIG. 3. A signal of angular velocity from the gyro 6807p is input to the lens CPU 6808. Then, the angular velocity signal is input to a high-pass filter (HPF) integration filter 301. The HPF integration filter 301 filters out direct current (DC) components from the angular velocity signal and integrates the filtered signal to convert the angular velocity signal into an angular signal. The HPF processing and the integration can be implemented by executing an arithmetic operation within the lens CPU 6808. A publicly known difference equation can be used for the HPF processing and the integration. Alternatively, it is also useful if the HPF processing and the integration are implemented by an analog circuit by utilizing capacitors or resistors before the signal is input to the lens CPU 6808.

In the present exemplary embodiment, the frequency band of vibration ranges from 1 to 10 Hz. Accordingly, the HPF integration filter 301 has a first-order HPF characteristic for filtering out frequency components of 0.1 Hz or lower, which value is sufficiently different from the frequency band of vibration. This HPF characteristic of the HPF integration filter 301 is hereinafter simply referred to as "0.1 Hz-break frequency first-order HPF processing".

Figure 4:
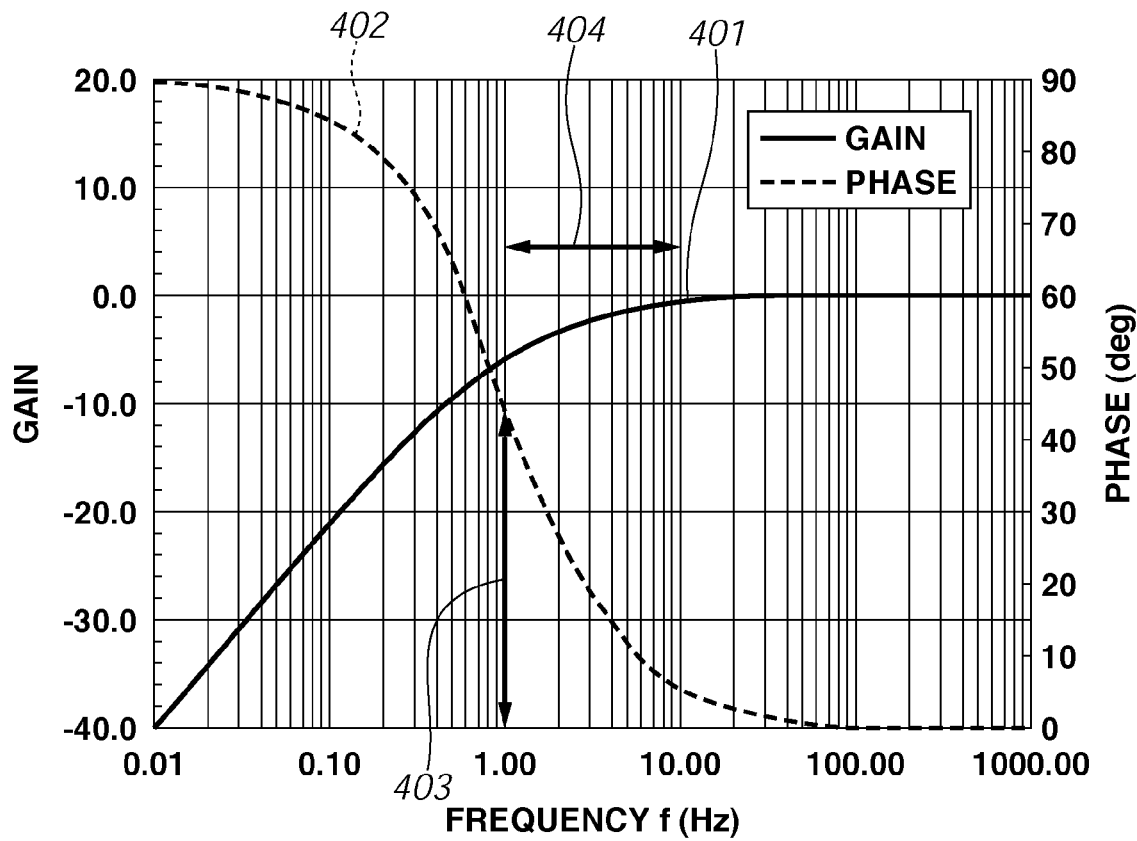
FIG. 4 illustrates an exemplary frequency characteristic of the image stabilization control apparatus according to the first exemplary embodiment of the present invention.
Figure 5:
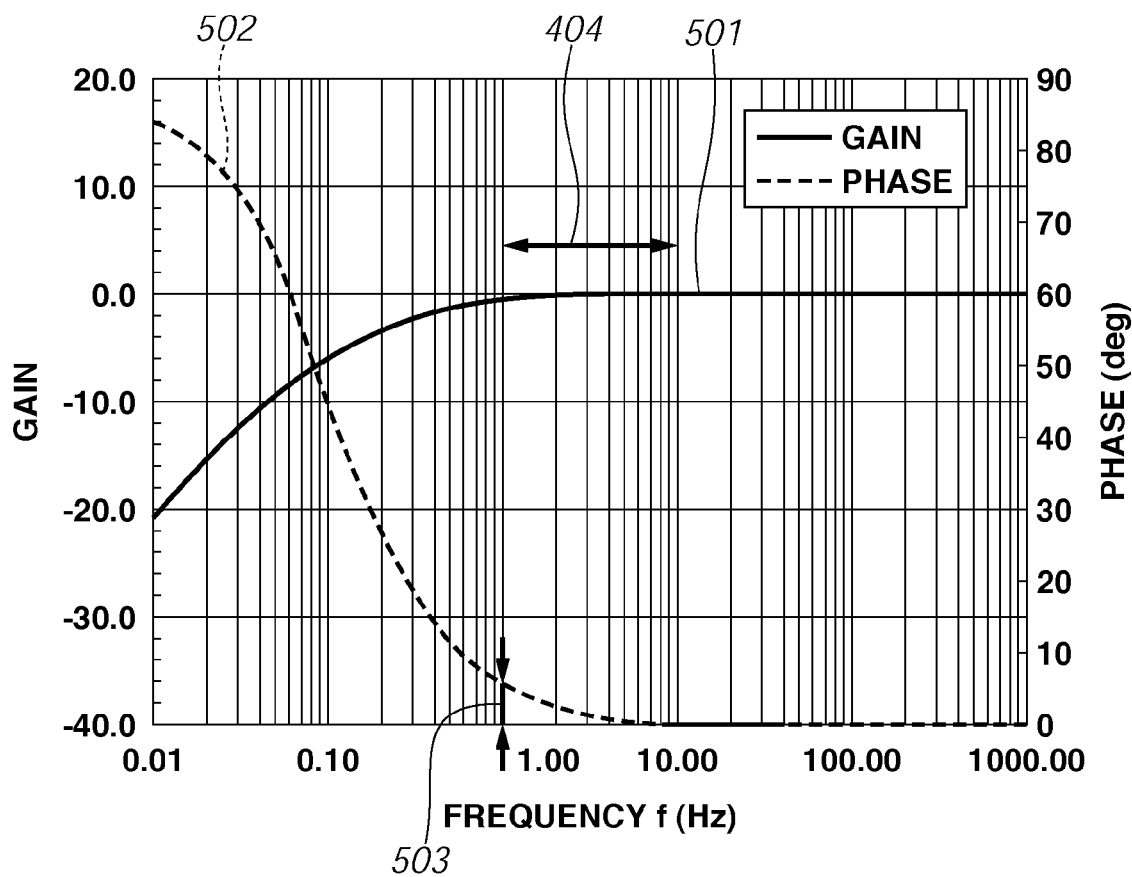
FIG. 5 illustrates an exemplary frequency characteristic of the image stabilization control apparatus according to the first exemplary embodiment of the present invention.

FIGS. 4 and 5 are Bode diagrams each illustrating the HPF characteristic that includes the "0.1 Hz-break frequency first-order HPF processing". In FIGS. 4 and 5, a frequency is shown on the horizontal axis while a gain and a phase are shown on the vertical axis. An arrow 404 indicates the vibration frequency band. With respect to the gain, an output ratio of the HPF integration filter 301 to the output from the gyro 6807p is indicated in units of decibels (db).

In the present exemplary embodiment, in "1 Hz break-frequency first-order HPF processing" illustrated in FIG. 4, the frequency of a gain 401 of 1 Hz or less is filtered out. However, the gain is attenuated by 6 db at a vibration lower limit frequency of 1 Hz. Furthermore, at 1 Hz, a phase 402 leads by 45 degrees as illustrated with an arrow 403. More specifically, vibration of 1 Hz cannot be detected with high accuracy. Accordingly, in this case, image shake may not be optimally corrected.

On the other hand, in the case of "0.1 Hz break-frequency first-order HPF processing" illustrated in FIG. 5, the gain 501 has been slightly attenuated at the vibration lower limit frequency of 1 Hz while a phase 502 leads as small an angle as 5 degrees at 1 Hz as illustrated with an arrow 503. Accordingly, in this case, image shake can be corrected for the vibration at 1 Hz with high accuracy.

The same applies to the integration. More specifically, in the present exemplary embodiment, the vibration frequency band ranges from 1 to 10 Hz. Accordingly, the HPF integration filter 301 has an integration characteristic of integrating a frequency component of 0.1 Hz or higher, which is sufficiently different from the vibration frequency band, in the first order. This integration characteristic of the HPF integration filter 301 is hereinafter simply referred to as "0.1 Hz-break frequency first-order integration processing".

Figure 6:
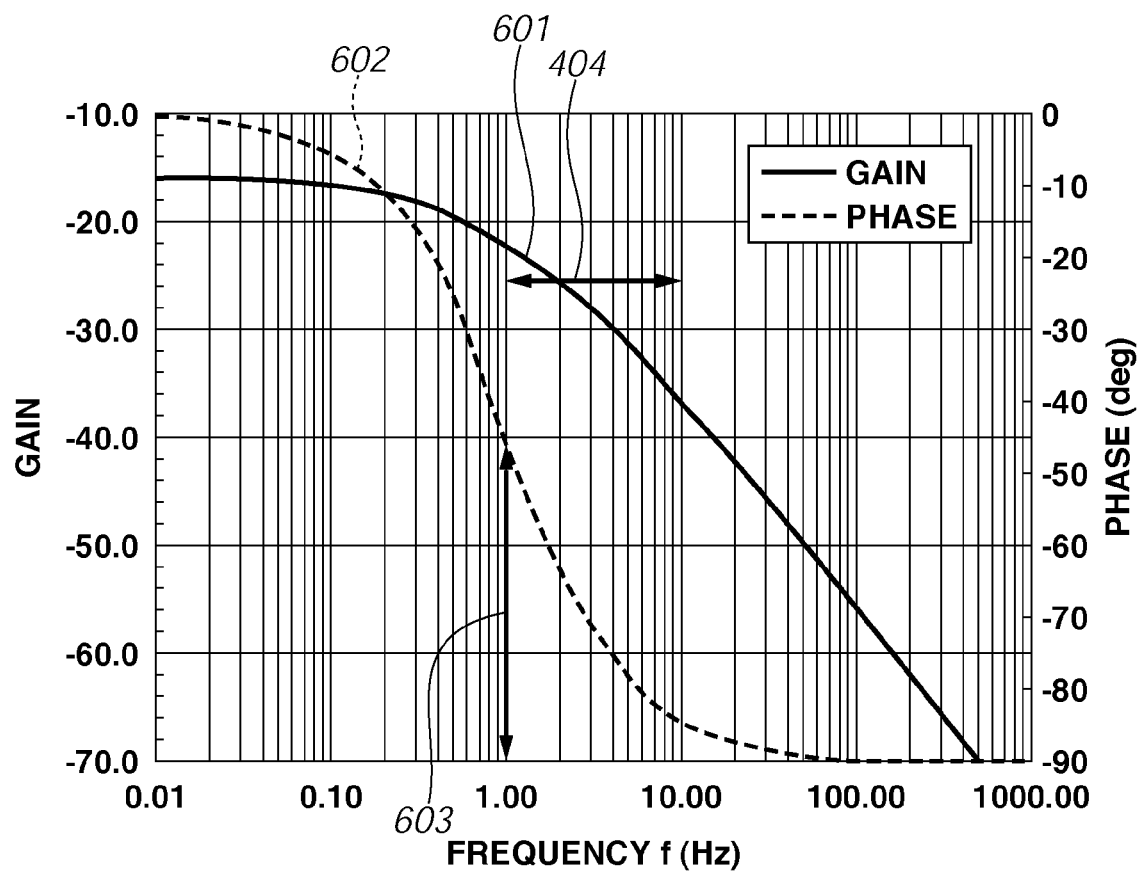
FIG. 6 illustrates an exemplary frequency characteristic of the image stabilization control apparatus according to the first exemplary embodiment of the present invention.
Figure 7:
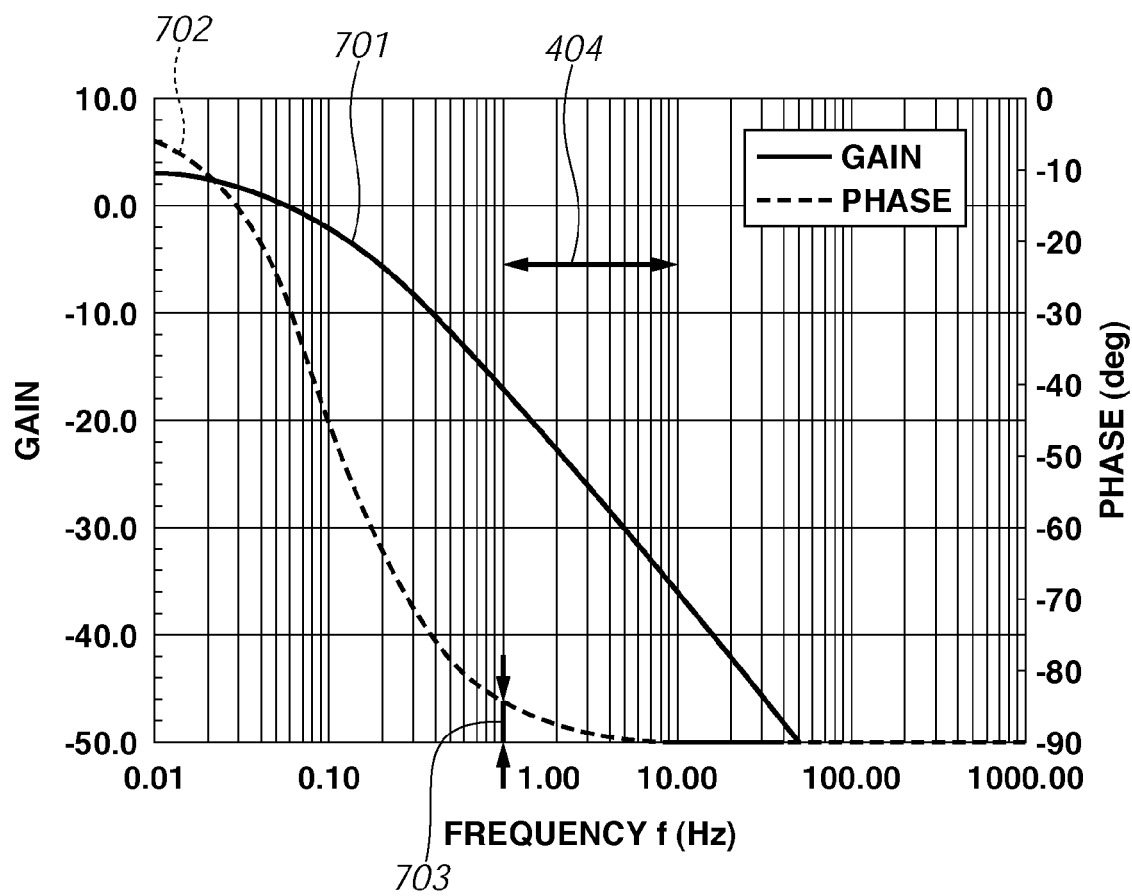
FIG. 7 illustrates an exemplary frequency characteristic of the image stabilization control apparatus according to the first exemplary embodiment of the present invention.

FIGS. 6 and 7 are Bode diagrams each illustrating the integration characteristic that includes the "0.1 Hz-break frequency first-order integration processing". In FIGS. 6 and 7, a frequency is shown on the horizontal axis while a gain and a phase are shown on the vertical axis. The arrow 404 indicates the vibration frequency band. With respect to the gain, an output ratio of the HPF integration filter 301 to the output from the gyro 6807p is indicated in units of decibels (db).

In the present exemplary embodiment, by executing "1 Hz break-frequency first-order integration processing" illustrated in FIG. 6, a first-order integration characteristic in which a gain 601 is attenuated in proportion to the frequency in the frequency range of 1 Hz or higher is acquired. However, the gain is attenuated by 6 db at a vibration lower limit frequency of 1 Hz.

Furthermore, at 1 Hz, a phase 602 leads by 45 degrees as illustrated with an arrow 603. More specifically, vibration of 1 Hz cannot be detected with high accuracy. Accordingly, in this case, image shake cannot be sufficiently corrected.

The cause of the attenuation of the gain by 6 db at 1 Hz is described more specifically. The gain is −16 db at a frequency not to be integrated, such as 0.01 Hz or 0.1 Hz. If the integration starts from the gain at 1 Hz, the amount of attenuation of gain should be 16 db at 1 Hz. However, the gain is actually −22 db at 1 Hz. That is, the gain is attenuated by additional 6 db at 1 Hz.

On the other hand, in "0.1 Hz break-frequency first-order integration processing" illustrated in FIG. 7, a gain 701 is attenuated by a small amount at the vibration lower limit frequency of 1 Hz. A phase 702 advances by 5 degrees only at 1 Hz as illustrated with an arrow 703. Accordingly, in this case, image shake can be corrected for the vibration at 1 Hz with high accuracy.

The above-described vibration correction processing is described in detail below with reference to waveforms of actual vibration, vibration detected by the gyro 6807p, and uncorrected vibration.

Figure 8:
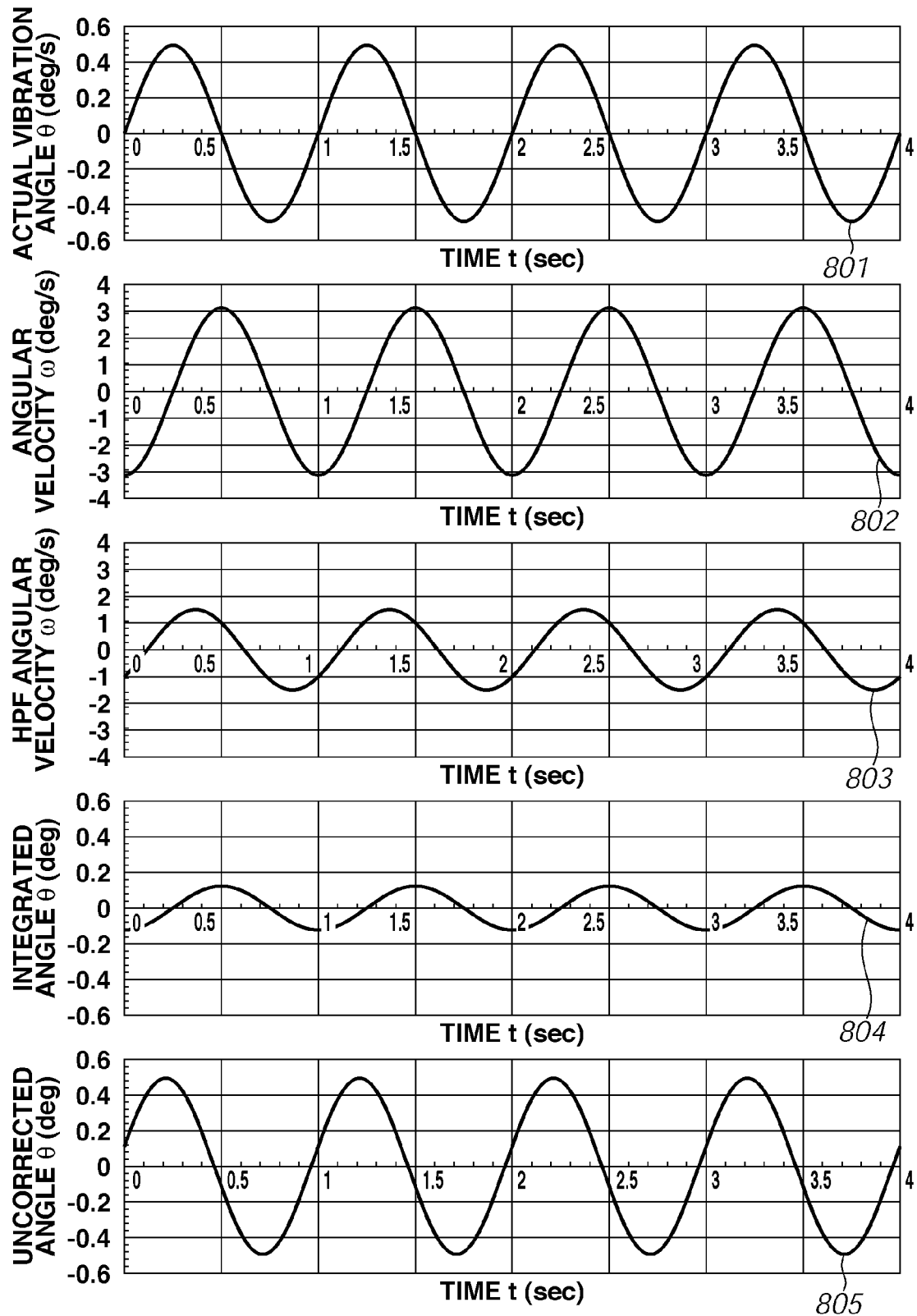
FIG. 8 illustrates exemplary waveforms in the image stabilization control apparatus according to the first exemplary embodiment of the present invention.

FIG. 8 illustrates the waveforms of vibration and results of executing the "1 Hz break-frequency first-order HPF processing" and the "1 Hz break-frequency first-order integration processing". In the example illustrated in FIG. 8, time is shown on the horizontal axis. An actual vibration angle, an angular velocity of the vibration detected by the gyro 6807p, an angular velocity of the vibration after HPF processing, an integration angle calculated by integrating an angular velocity output after HPF processing, and uncorrected vibration, which is the difference between the actual vibration angle and the integration angle, are respectively shown on a vertical axis of charts from top to bottom.

Referring to FIG. 8, a waveform 801 indicates a vibration angle of 1 Hz, which is a lower limit frequency for actual vibration. A waveform 802 indicates the angular velocity detected by the gyro 6807p when the vibration is input. In an actual output of the gyro 6807p, a DC bias component and a long-term drift component are superposed. Accordingly, a waveform 803 is acquired when the above-described noise component is attenuated by executing the "1 Hz break-frequency first-order HPF processing".

The amplitude of the waveform 803 is attenuated to a half of that of the waveform 802 and the phase of the waveform 803 advances by 45 degrees. This phenomenon occurs because the waveform at 1 Hz, which is the vibration lower limit frequency, has been subjected to the "1 Hz break-frequency first-order HPF processing".

A waveform 804 is acquired when the above-described waveform 803 is subjected to the "1 Hz break-frequency first-order integration processing". Due to a cause similar to the above-described cause, the amplitude is attenuated to one half the amplitude of the waveform 803 and the phase is displaced. Compared to the actual vibration angle waveform 801, the amplitude has been considerably attenuated and the phase leads by 90 degrees.

More specifically, the phase leads by 90 degrees as described above because the phase leads by 45 degrees by the first-order HPF and has further advanced by 45 degrees by the first-order integration, and accordingly, the phase leads by 90 degrees in total.

A waveform 805 refers to uncorrected vibration, which is the difference between the actual vibration and the integration angle, which is calculated by operating the actual vibration angle waveform 801. The amplitude of the waveform 805 does not greatly differ from that of the actual vibration angle waveform 801. Accordingly, image shake at this frequency may be corrected in a small amount.

Figure 9:
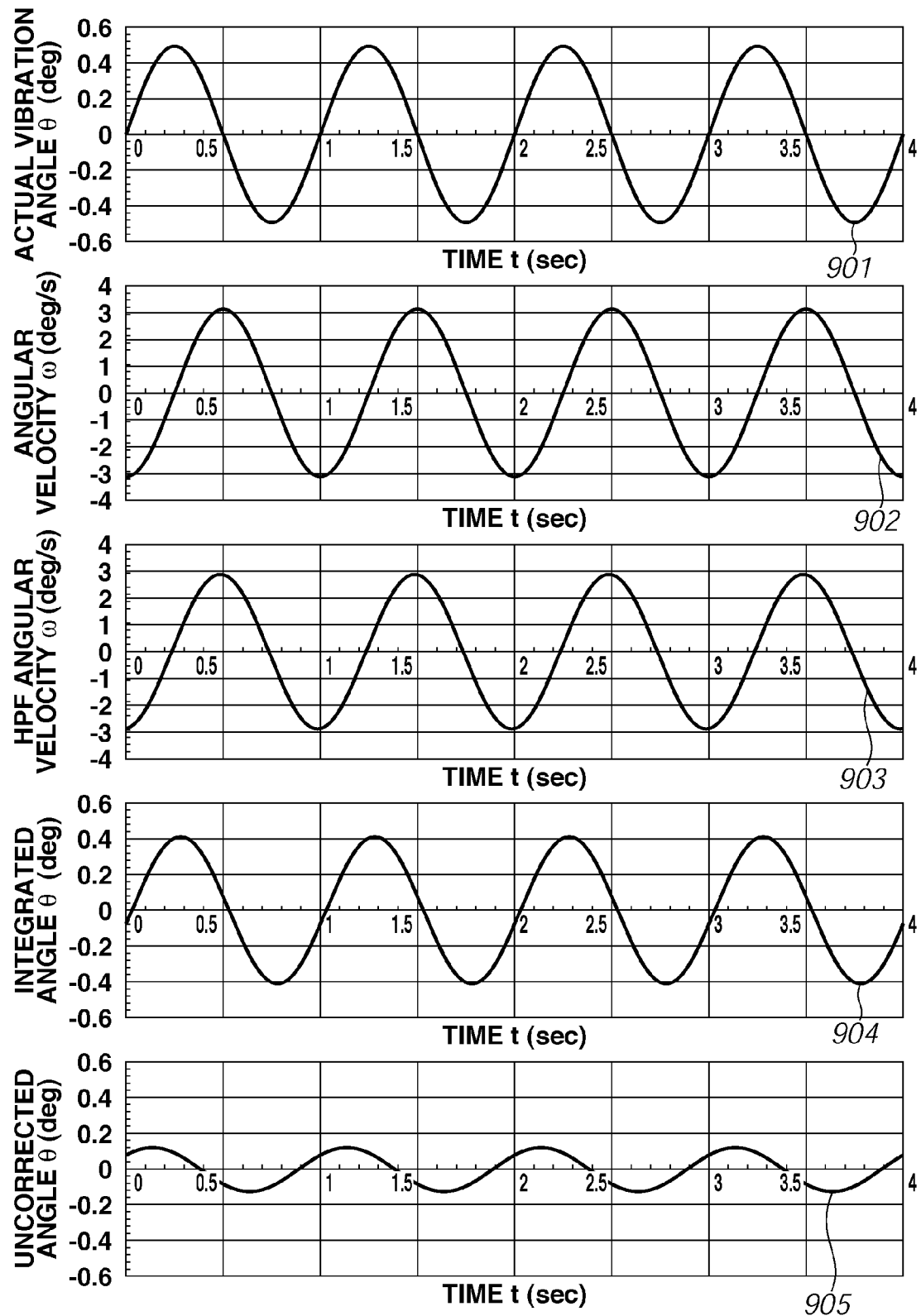
FIG. 9 illustrates exemplary waveforms in the image stabilization control apparatus according to the first exemplary embodiment of the present invention.

FIG. 9 illustrates exemplary waveforms acquired when the "0.1 Hz break-frequency first-order HPF processing" and the "0.1 Hz break-frequency first-order integration processing" are executed.

In the example illustrated in FIG. 9 also, time is shown on the horizontal axis. An actual vibration angle, an angular velocity of the vibration detected by the gyro 6807p, an angular velocity of the vibration after HPF processing, an integration angle calculated by integrating an angular velocity output after HPF processing, and uncorrected vibration, which is the difference between the actual vibration angle and the integration angle, are shown on the respective vertical axis of charts from top to bottom.

Referring to FIG. 9, a waveform 901 indicates a vibration angle at 1 Hz, which is a lower limit frequency of actual vibration. A waveform 902 indicates the angular velocity detected by the gyro 6907p when the vibration is input. In an actual output of the gyro 6907p, a DC bias component and a long-term drift component are superposed. Accordingly, a waveform 903 is acquired when the above-described noise component is attenuated by executing the "0.1 Hz break-frequency first-order HPF processing".

The amplitude of the waveform 903 does not differ greatly from that of the waveform 902. The phase has only advanced by 5 degrees from that of the waveform 902. This is because, as described above, the angular velocity signal has been processed by executing the "0.1 Hz break-frequency first-order HPF processing," whose frequency is sufficiently lower than the vibration lower limit frequency of 1 Hz.

A waveform 904 is acquired when the above-described waveform 903 is subjected to the "0.1 Hz break-frequency first-order integration processing." Due to a cause similar to the cause described above, the amplitude of the waveform 904 has been attenuated by only a small amount. Furthermore, the phase of the waveform 904 leads by only 10 degrees compared to the actual vibration angle waveform 901. The phase leads by 10 degrees in total because the phase advances by 5 degrees by executing the first-order HPF processing and further advances by 5 degrees when the integration is executed.

A waveform 905 refers to uncorrected vibration, which is the difference between the actual vibration and the integration angle, which is calculated by operating the actual vibration angle waveform 901. The amplitude of the waveform 905 has been attenuated approximately to a quarter of the amplitude of the actual vibration angle waveform 901. Accordingly, image shake can be effectively corrected by executing the HPF processing and the integration also in a frequency range sufficiently lower than the vibration lower limit frequency.

Returning to FIG. 3, an output from the HPF integration filter 301 (an angular signal θ) is input to a sensitivity adjustment unit 303. The sensitivity adjustment unit 303 amplifies the output from the HPF integration filter 301 according to zoom and focus information 302, which is input to the lens CPU 6808 from a focus encoder or a zoom encoder, and an imaging magnification that can be calculated according to the zoom and focus information 302. Furthermore, the sensitivity adjustment unit 303 sets the amplified output from the HPF integration filter 301 as an angular vibration correction target value.

The amplified output from the HPF integration filter 301 is used as an angular vibration correction target value as described above in order to correct a varied vibration correction sensitivity on an image plane of the camera to a vibration correction stroke of the vibration correction unit 6806, which has varied due to variation in an optical state such as a focusing state or a zoom state of the lens.

The lens CPU 6808 outputs the calculated angular vibration correction target value to the driving unit 6809 to drive the vibration correction unit 6806. Accordingly, image shake is corrected. The present exemplary embodiment corrects angular vibration in the above-described manner.

In the present exemplary embodiment, the vibration correction unit 6806 is driven by using a value calculated by adding a parallel vibration correction target value (to be described later below) to the angular vibration correction target value.

Figure 10:
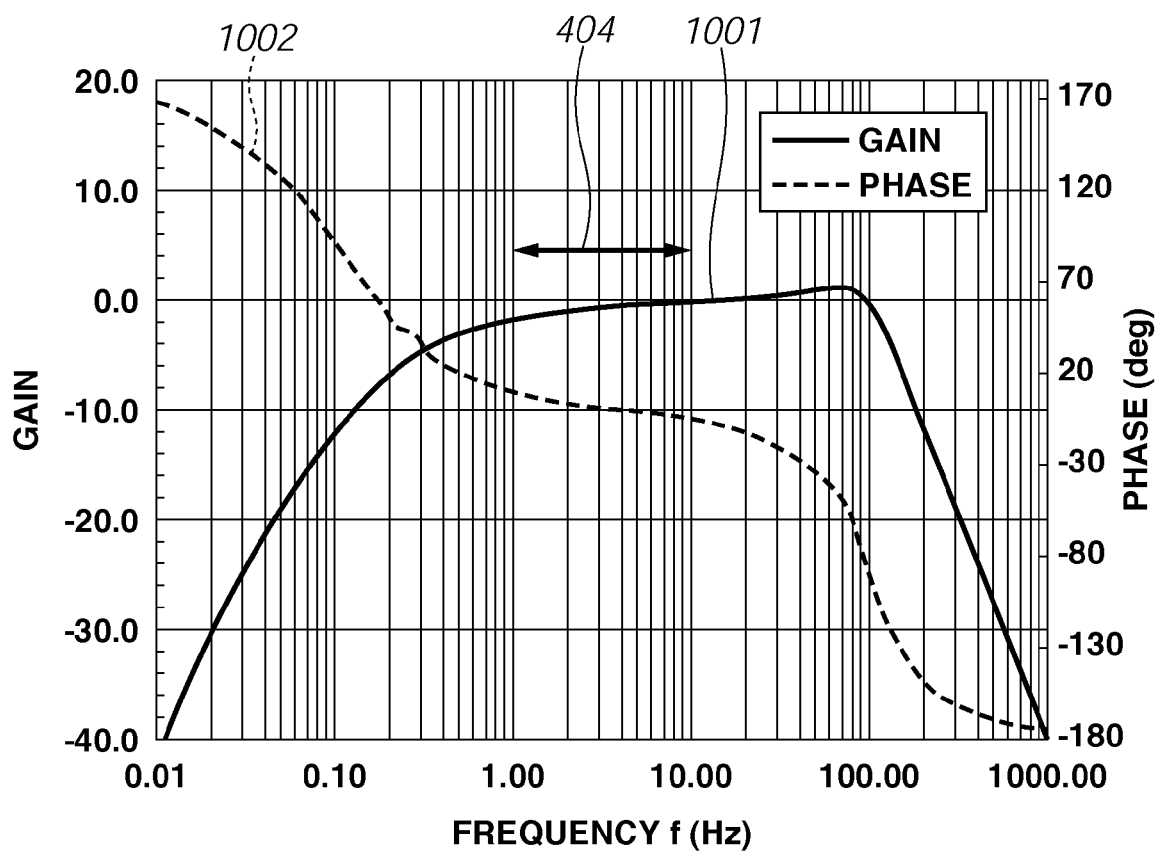
FIG. 10 illustrates an exemplary frequency characteristic of the image stabilization control apparatus according to the first exemplary embodiment of the present invention.

FIG. 10 illustrates an example of a frequency characteristic of the entire vibration correction processing. In the example illustrated in FIG. 10, time is shown on the horizontal axis. A gain 1001, which indicates a ratio of a correction operation by the vibration correction unit 6806 to the angle of vibration in units of db, and a phase 1002 thereof are shown on the vertical axis.

In the examples illustrated in FIGS. 6 and 7, a vibration angular velocity is compared with an integral value thereof and the frequency characteristic of the integral value is described. Accordingly, in the examples illustrated in FIGS. 6 and 7, the gains 601 and 701 are attenuated in proportion to the frequency and the phases 602 and 702 delay by 90 degrees within the vibration frequency band 404.

On the other hand, in the example illustrated in FIG. 10, a vibration angle is compared with an angular vibration correction target value and the frequency characteristic of the angular vibration correction target value (a vibration angle acquired by operating the vibration detected by the gyro 6807$p$) is described. That is, a result of the comparison of angles is described in the example illustrated in FIG. 10. Accordingly, the gain 1001 becomes roughly constant and the phase 1002 is roughly "0" in the vibration frequency band.

In the example illustrated in FIG. 10, the gain 1001 is attenuated in the low frequency area (in the range of frequencies lower than 0.1 Hz) in the gain 1001 due to the above-described "0.1 Hz break-frequency first-order HPF processing" and "0.1 Hz break-frequency first-order integration processing".

As described above, in the example illustrated in FIG. 10, the comparison target differs from that in FIGS. 6 and 7 (e.g., the vibration angular velocity and the integral value thereof are compared with each other in the examples illustrated in FIGS. 6 and 7 whereas in the example illustrated in FIG. 10, the angles are mutually compared in the example illustrated in FIG. 10). Accordingly, the waveform of the integration processing illustrated in FIG. 10 becomes similar to the waveform of the HPF processing, by which a frequency of 0.1 Hz or less may be attenuated.

In the example illustrated in FIG. 10, a high-frequency area of the waveform 1001 (a frequency band as high as or exceeding 100 Hz) is attenuated due to a mechanical response characteristic of the vibration correction unit 6806.

As described above, the vibration correction band is set by executing the HPF processing, the integration processing, and the mechanical response. Thus, the image shake in the vibration band indicated by the arrow 404 is corrected.

As described above, the image shake may not be corrected with high accuracy when the mechanical response characteristic is high (i.e., if the vibration correction unit does not respond to the frequency band of 10 Hz or higher) as well as when the break frequency in the integration processing is close to the vibration frequency band. In this regard, in the present exemplary embodiment, the HPF processing, the integration operation, and the mechanical response characteristic are executed and set at high accuracy according to the vibration band.

Returning to FIG. 3, a configuration for correcting the parallel vibration is described in detail below.

The output of the gyro 6807$p$ is input to the lens CPU 6808. Furthermore, the output is then input to an HPF integration filter 310. Then, the HPF integration filter 310 filters out DC components from the output. Furthermore, the HPF integration filter 310 executes integration on the output to convert an angular velocity output ω into the angle output θ.

The integration break frequency of the HPF integration filter 310 is different from that of the HPF integration filter 301 because of a cause to be described in detail below.

The output of the HPF integration filter 310 is input to a gain adjustment filter (hereinafter referred to as a "gain adjustment unit") 311. The operation and the effect of the gain adjustment unit 311 is described in detail below.

The output of the gain adjustment unit 311 is corrected by an output correction unit 309, which is also described in detail below. Furthermore, the output of the gain adjustment unit 311 is used as a parallel vibration correction target value and is added to the above-described angular vibration correction target value.

Furthermore, an output of the gyro 6807$p$, simultaneously to the above-described processing, is input to an HPF phase adjustment filter (hereinafter simply referred to as an "HPF phase adjustment unit") 304. The HPF phase adjustment unit 304 filters out DC components that overlap the output of the gyro 6807$p$. In addition, the HPF phase adjustment unit 304 adjusts the phase of the signal. The HPF break frequency and the phase adjustment is described in detail below.

An output of the HPF phase adjustment unit 304 is filtered out by a gyro band pass filter (BPF) unit (band pass unit) 306 for a frequency component in a predetermined band.

The output of the ACC 101$p$ is input to an HPF integration filter 305. The HPF integration filter 305 filters out a DC component that is superposed on the ACC 101$p$. Furthermore, the HPF integration filter 305 executes first-order integration on the output of the ACC 101$p$ to convert the output into a velocity V. The HPF break frequency and the integration break frequency is described in detail below.

The output of the HPF integration filter 305 is input to an ACC BPF unit (band pass filter) 307. The ACC BPF unit 307 extracts a frequency component of a predetermined band only. A comparison unit 308 compares the outputs of the gyro BPF unit 306 and the ACC BPF unit 307 to calculate a correction value for correcting the output of the gain adjustment unit 311.

The zoom and focus information 302 is also input to the output correction unit 309. The output correction unit 309 calculates an imaging magnification based on the zoom and focus information 302. Furthermore, the output correction unit 309 corrects the output of the gain adjustment unit 311 by using the calculated imaging magnification and the above-described correction value. In addition, the output correction unit 309 sets the corrected output as the parallel vibration correction target value.

The calculated parallel vibration correction target value is added to the above-described angular vibration correction target value. Then, the angular vibration correction target value added with the parallel vibration correction target value is output to the driving unit 6809. In the above-described manner, the vibration correction unit 6806 is driven by the driving unit 6809 and both image shakes, namely, the angular vibration and the parallel vibration, are corrected.

With respect to the above-described configuration, at first, a correction value output from the comparison unit 308 is described below.

Figure 11:
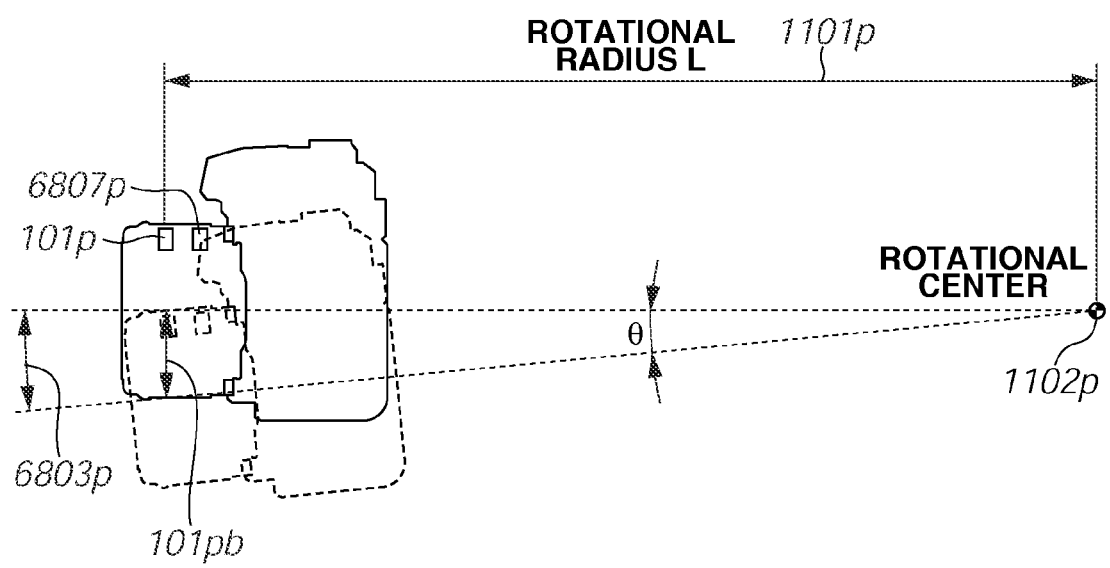
FIG. 11 illustrates exemplary vibration of a camera according to the first exemplary embodiment of the present invention.

FIG. 11 illustrates the angular vibration 6803p and the parallel vibration 101pb, which are applied to the camera. Referring to FIG. 11, parallel vibration (Y) 101pb and angular vibration (θ) 6803p at the principal point of the imaging optical system of the photographic lens 6801 and a rotational radius (L) 1101p around a rotational center (O) 1102p can satisfy the following expressions (1) and (2):

$$Y = L\theta \quad (1)$$

$$V = L\omega \quad (2)$$

where the rotational radius L 1101p denotes a distance between the rotational center 1102p and the ACC 101p.

In the present exemplary embodiment, the expression (1) is an expression for calculating a rotational radius L when a displacement Y is calculated by second-order integrating the output of the ACC 101p, and the output of the gyro 6807p is first-order integrated to calculate the angle θ. The expression (2) is an expression for calculating a rotational radius L when the velocity V is calculated by first-order integrating the output of the ACC 101p and when an angular velocity ω is calculated based on the output of the gyro 6807p. Both the expressions (1) and (2) can be used to calculate the rotational radius L.

Vibration δ, which may occur on the image plane, can be calculated by the following expression (3):

$$\delta = (1+\beta)f\theta + \beta Y \quad (3)$$

where "Y" denotes the parallel vibration at the principal point of the imaging optical system, "θ" denotes the vibration angle of the imaging optical system, "f" denotes a focal length of the imaging optical system, and "β" denotes an imaging magnification.

The symbols "f" and "β" of the first term of the right side of the expression (3) can be calculated based on information regarding the zoom and focus of the imaging optical system, the imaging magnification 13, and the focal length information f. The vibration angle θ can be calculated based on a result of integration by the gyro 6807p. Accordingly, the angular vibration can be corrected by using the above-described information as described above with reference to FIG. 3.

The second term of the right side of the expression (3) can be calculated based on the second-order integral value Y of the ACC 101p and the imaging magnification β, which can be calculated by the second-order integral value Y of the ACC 101p, the zoom and focus information 302, and the imaging magnification β, which can be calculated based on the zoom and focus information 302. Accordingly, the parallel vibration can be corrected by using the above-described information as described above with reference to FIG. 3.

However, in the present exemplary embodiment, correction of image shake is executed with respect to vibration δ, which can be acquired by the following expression (4), which is a modification of the expression (3):

$$\delta = (1+\beta)f\theta + \beta L\theta \quad (4).$$

More specifically, with respect to the parallel vibration, the present exemplary embodiment does not use the displacement Y, which can be calculated directly based on a result of detection by the ACC 101p.

In the present exemplary embodiment, image shake is corrected based on the rotational radius L, which can be calculated according to the expression (1) or (2), and also based on a result of integrating the output of the gyro 6807p, information regarding zoom and focus, and imaging magnification β, which can be calculated based on the zoom and focus information. With respect to the expression (4), the first term of the right side is an angular vibration correction target value and the second term of the right side is the parallel vibration correction target value.

In the present exemplary embodiment, the ACC 101p is provided at the principal point of the lens of the imaging optical system. The rotational radius L 1101p is equivalent to the distance between the rotational center 1102p and the principal point of the lens of the imaging optical system.

The above-described value Y can be calculated by second-order integrating the output of the ACC 101p. Accordingly, parallel vibration can be corrected according to the expression (3). However, for the following reasons, the present exemplary embodiment uses the expression (4) to correct parallel vibration.

Figure 12:
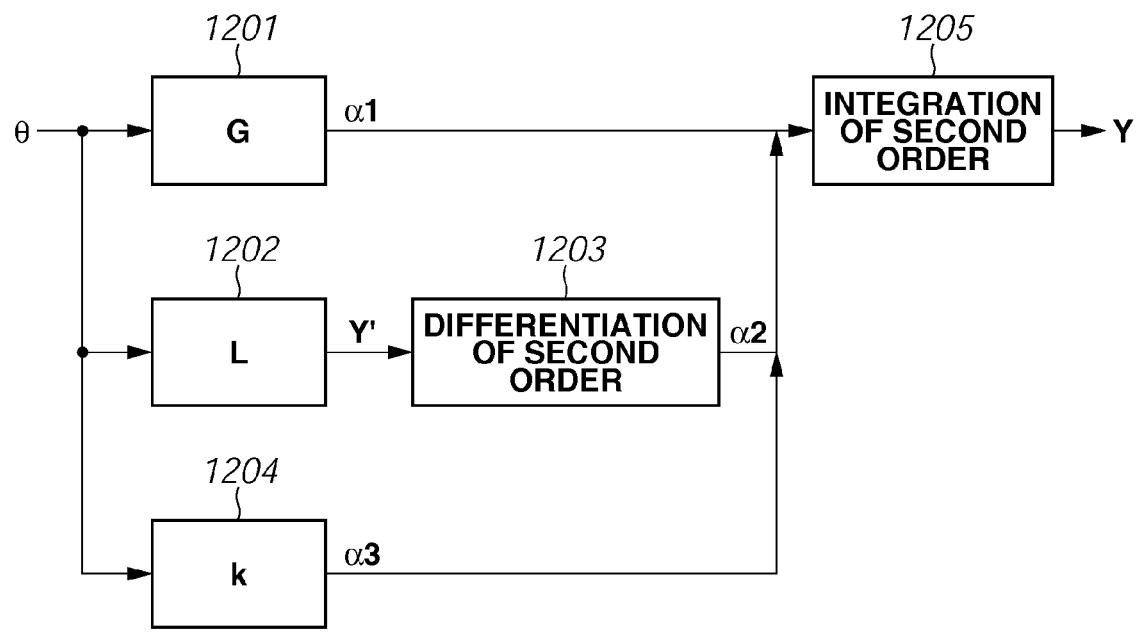
FIG. 12 illustrates an example of an accelerometer according to the first exemplary embodiment of the present invention.

FIG. 12 is a block diagram illustrating an example of a signal detection system of the ACC 101p according to the present exemplary embodiment. More specifically, FIG. 12 illustrates the relationship between the vibration angle θ around the rotational center 1102p (FIG. 11) and the displacement Y 101pb, of the parallel vibration at the lens principal point, which may occur when the vibration angle θ is input.

When vibration of a vibration angle of θ is input to the ACC 101p, the ACC 101p detects a variation of the component of gravity applied due to the tilting of the camera caused by the vibration. In a range in which the vibration angle θ is not large, a gravitational acceleration α1 (an output of a circuit unit 1201) output according to the variation of applied gravity is proportional to the vibration angle θ.

A parallel vibration displacement Y' (an output of a circuit unit 1202) can be acquired by multiplying the vibration angle θ by the rotational radius L 1101p (FIG. 11). The ACC 101p outputs a parallel vibration acceleration α2, which can be acquired by second-order differentiating the parallel vibration displacement Y' with the circuit unit 1203.

Furthermore, the output of the ACC 101p may include noise superposed thereupon. The noise includes noise that is constant regardless of the frequency and noise that varies according to the frequency in actual cases. In the present exemplary embodiment, it is supposed that noise is independent from the frequency and varies in proportion to the vibration angle θ.

In the present exemplary embodiment, a noise-processing circuit unit 1204 outputs a noise acceleration α3. The sum of the accelerations α1, α2, and α3 is output from the ACC 101p. The output of the ACC 101p is second-order integrated by a circuit unit 1205. Thus, the parallel vibration displacement Y can be acquired.

The signal detection system illustrated in FIG. 12 can be expressed by the following expression (5):

$$Y = \left\{ \left( L - \frac{G}{\omega^2} \right) \sin(\omega t + \phi) + \frac{k}{\omega^2} \sin(\omega t + \varphi) \right\} \theta \quad (5)$$

where "G" denotes a gravitational acceleration-proportional item, "L" denotes the rotational radius, "k" denotes a noise-proportional term, and "ω" denotes the angular frequency.

The first term of the right side of the expression (5) includes a term of the acceleration output (a component of the acceleration α1 output from the circuit unit 1201) and the gravitational acceleration output (a component of the acceleration α2 output from the circuit unit 1202). The second term of the right side of the expression (5) includes a term of noise (a component of the acceleration α3 output from the circuit unit 1204).

In the present exemplary embodiment, both the acceleration output and the gravitational acceleration output are related to the phase of the vibration angle θ while the noise is not. Accordingly, the right side of the expression (5) includes two independent terms. If the phase of each of the two terms is ignored for simple description, the following expressions (6) and (7) can hold:

$$Y = \left(L - \frac{G-k}{\omega^2}\right) \sin \omega t \quad (6)$$

$$L = \frac{G-k}{\omega^2}. \quad (7)$$

More specifically, with respect to the displacement of the parallel vibration, the gravitational acceleration and the noise dominantly affect in the low-frequency band at each frequency at which the equation of the expression (7) holds (each frequency at which a result of the expression (6) is "0"). Accordingly, the displacement of the parallel vibration can be detected with high accuracy in only the high-frequency band.

Figure 13:
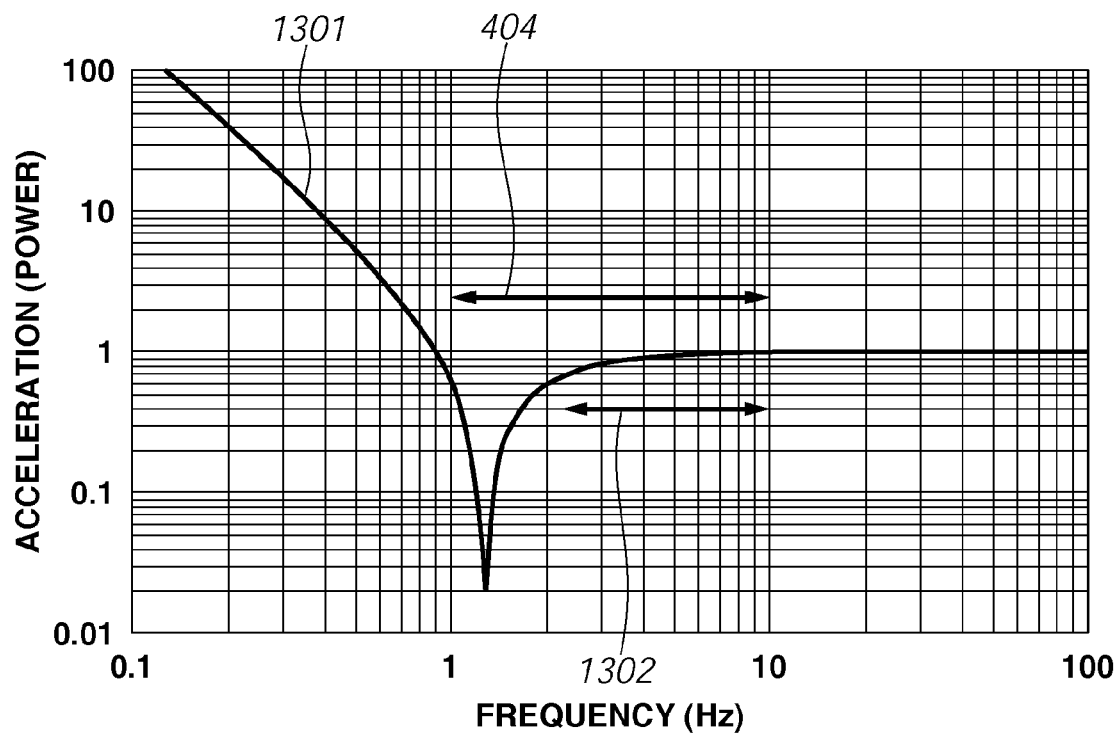
FIG. 13 illustrates an exemplary frequency characteristic of the accelerometer according to the first exemplary embodiment of the present invention.

FIG. 13 is a Bode diagram of a case when values of rotational radius L and the like are applied to the expression (6) according to actual results of vibration detection. Referring to FIG. 13, a frequency is shown on the horizontal axis while a gain of parallel vibration displacement Y relative to the input vibration angle θ, which is detected by the ACC 101p, is shown on the vertical axis. The scaling unit of scaling the gain is "power".

If the scale of the gain is the power at one instant, it is indicated that the parallel vibration Y is accurately calculated with respect to the input vibration angle θ. In the example illustrated in FIG. 13, the detection has been started at a very low level of gain 1301 of 1.3 Hz because the parallel vibration acceleration detected by the ACC 101p is set off by the gravitational acceleration and the noise.

Furthermore, in the example illustrated in FIG. 13, in a frequency band below 1.3 Hz, the output of the ACC 101p increases as the frequency becomes lower because the gravitational acceleration and noise dominates in the frequency band below 1.3 Hz. On the other hand, as indicated by an arrow 1302, the accuracy of the output detected by the ACC 101p is high above 1.3 Hz.

As is indicated by the arrow 404 in the example illustrated in FIG. 13, the band of vibration ranges from 1 to 10 Hz, in which the gravitational acceleration and the noise affect. Accordingly, the parallel vibration is not detected with the ACC 101p. In this regard, in order to detect the parallel vibration by using the band (indicated by an arrow 1302) of accurate frequency of the ACC 101p, the present exemplary embodiment uses the expression (4) instead of the expression (3).

More specifically, the present exemplary embodiment calculates the rotational radius L by comparing the acceleration output first-order integral value and the angular velocity output or by comparing the acceleration output second-order integral value and the angular velocity output first-order integral value. Furthermore, the present exemplary embodiment uses the expression for calculating a parallel vibration component based on the calculated rotational radius L and the angular velocity output.

The present exemplary embodiment compares the output of the ACC 101p and the output of the gyro 6807p (divides the acceleration output by the angular velocity output) to calculate the rotational radius L. In this regard, the present exemplary embodiment suppresses or reduces the above-described influence from the gravitational acceleration and the noise by extracting and comparing the acceleration output and the angular velocity output in only the band indicated by the arrow 1302 (FIG. 13).

Figure 14:
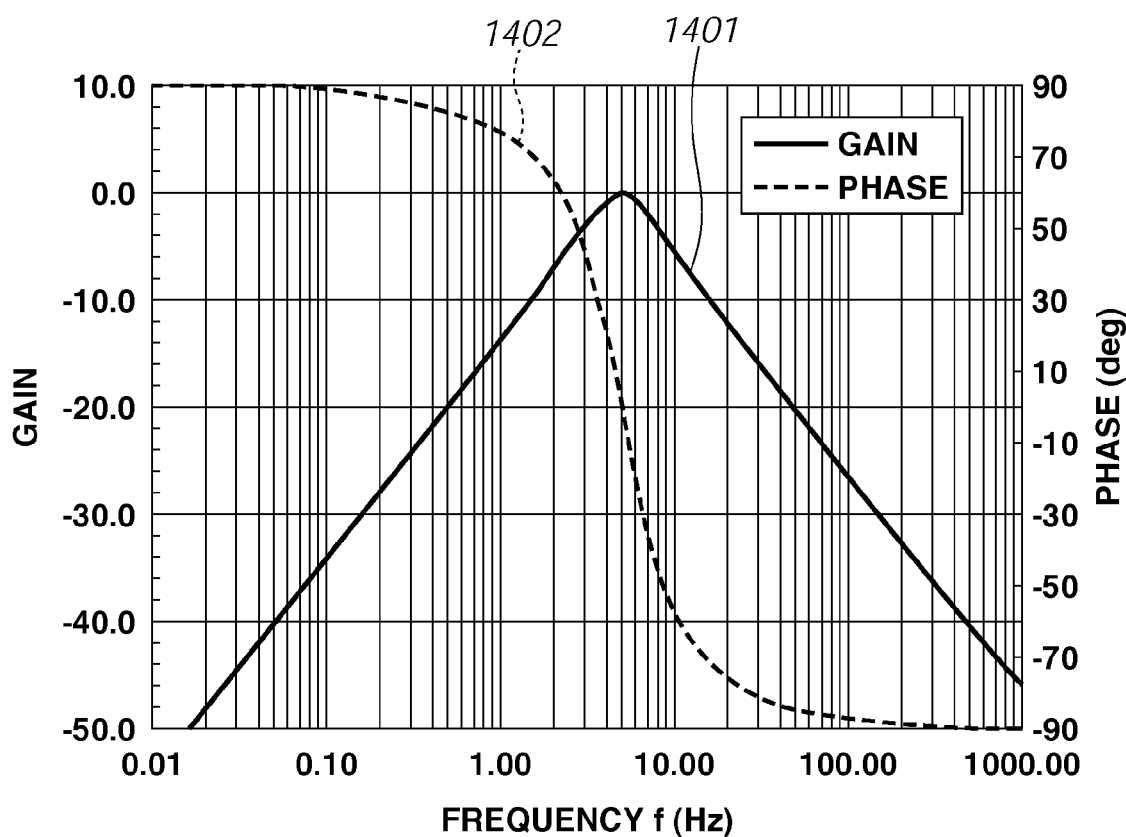
FIG. 14 illustrates an exemplary frequency characteristic of the image stabilization control apparatus according to the first exemplary embodiment of the present invention.

In the present exemplary embodiment, both the gyro BPF unit 306 and the ACC BPF unit 307 illustrated in FIG. 3 are the same band pass filters (BPFs) that extract the output in the band of 5 Hz only. FIG. 14 illustrates characteristics of the gyro BPF unit 306 and the ACC BPF unit 307.

In the example illustrated in FIG. 14, the frequency is shown on the horizontal axis. On the vertical axis, a gain 1401 representing an output ratio of the output of HPF phase adjustment unit 304 or HPF integration filter 305 to the output of the gyro BPF unit 306 or the ACC BPF unit 307, and a phase 1402 are shown. Note that the unit of the gain 1401 is db.

With respect to the filter characteristic, a 5 Hz signal passes through the filter but a 0.5 Hz signal or a 50 Hz signal is attenuated. More specifically, the 5 Hz signal passes through the filter and is output from the filter unmodified because the gain of the 5 Hz signal is 0 db. On the other hand, the 0.5 Hz signal or the 50 Hz signal is attenuated by the filter to one tenth because the gain of the 0.5 Hz signal or the 50 Hz signal is −20 db.

It is also useful if a higher-order filter is used to more efficiently specify the frequency to be extracted. More specifically, it is also useful if a second-order BPF filter is provided having a characteristic in which a 5 Hz signal passes through the filter (the input signal is output from the filter unmodified because the gain of the 5 Hz signal is 0 db) but a 0.5 Hz or 50 Hz signal is attenuated by the filter (attenuated to one hundredth as the gain of the signal is −40 db), as indicated with a gain 1501 in FIG. 15.

With respect to the phase 1502, in the case of the 5 Hz signal, the phase of the output in relation to the input signal is "0" but may greatly vary across the frequency of 5 Hz. However, the variation in the phase would not cause a problem if the variation of the phases of the outputs from the gyro BPF unit 306 and the ACC BPF unit 307 are the same, because it is intended merely to compare the outputs of the gyro BPF unit 306 and the ACC BPF unit 307.

With regard to the break frequency of the HPF phase adjustment unit 304 and the HPF integration filter 305, it is not necessary to use the same break frequency as that of the HPF integration filter 301 in order merely to compare the angular velocity output and the velocity output. Accordingly, it is useful if the HPF break frequency is set at a high frequency of 1 Hz, for example, to increase the capacity to filter out DC components. Accordingly, it is useful if the integration break frequency is set at a high frequency of 1 Hz, for example.

In general, in executing HPF processing and integration, the time taken to achieve a stable state becomes longer if the break frequency becomes lower. In this regard, the time taken to achieve a stable state can be reduced by setting the break frequency to a high frequency. In this case, to improve the comparison accuracy, it is also useful if the variation in the phase occurring in the HPF phase adjustment unit 304 and that occurring in the HPF integration filter 305 are the same.

Figure 16:
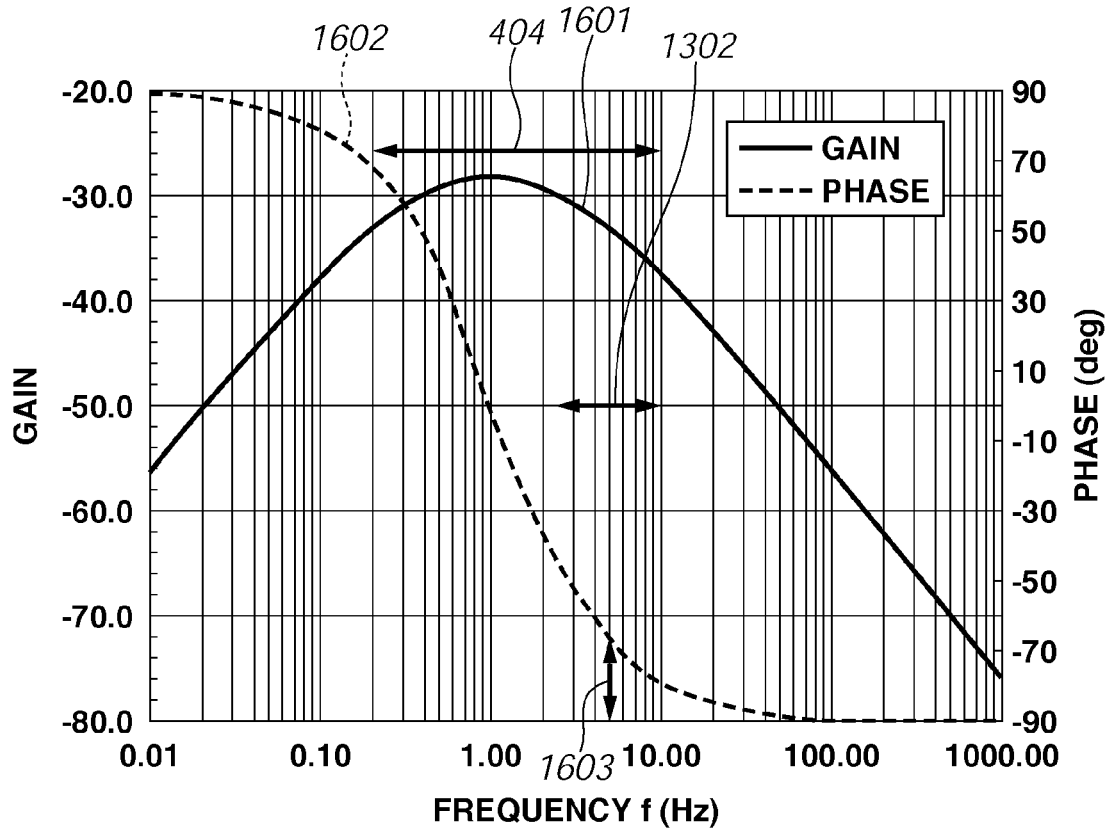
FIG. 16 illustrates an exemplary frequency characteristic of the image stabilization control apparatus according to the first exemplary embodiment of the present invention.

FIG. 16 is a Bode diagram illustrating an example of a characteristic of the HPF integration filter 305. The DC components of the output of the ACC 101*p* (hereinafter may also be simply referred to as an "ACC output") is filtered out by the HPF processing. Then, the output is subjected to integration. Then, the integrated output is converted into velocity. In the example illustrated in FIG. 16, the frequency is shown on the horizontal axis. The gain of the ratio of the output of the HPF integration filter 305 to the acceleration output is shown on the vertical axis in units of db.

Referring to FIG. 16, with respect to a gain 1601, a low frequency of 1 Hz or lower is attenuated and a high frequency higher than 1 Hz is integrated (the gain is reduced in proportional to the frequency) as its characteristic. Now, to direct attention to and particularly describe only the case of a frequency of 5 Hz, which is to be extracted by the ACC BPF unit 307, a phase 1602 leads 23 degrees with respect to the phase of −90 degrees, which is an ideal phase after integration, as indicated by an arrow 1603. Accordingly, it may be useful for comparison if the same lead (i.e., 23 degrees) occurs at the frequency of 5 Hz with respect to the HPF phase adjustment unit 304.

Figure 17:
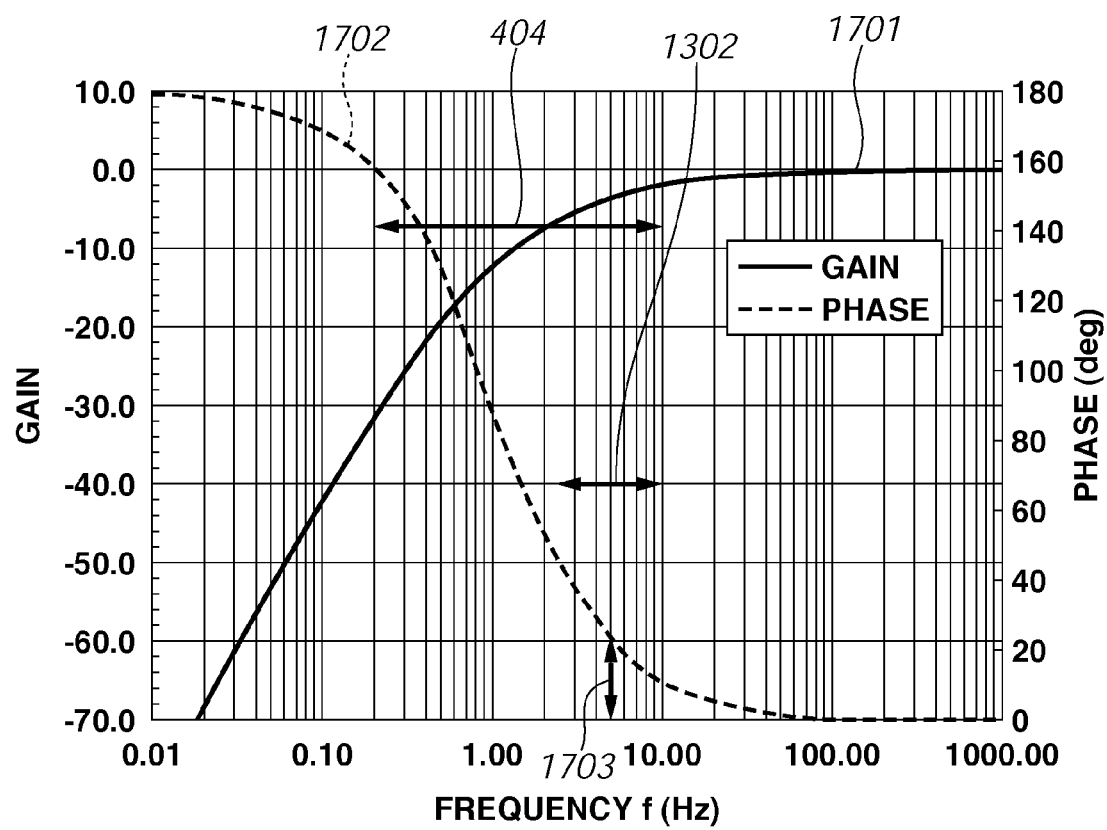
FIG. 17 illustrates an exemplary frequency characteristic of the image stabilization control apparatus according to the first exemplary embodiment of the present invention.

FIG. 17 is a Bode diagram illustrating an exemplary characteristic of the HPF phase adjustment unit 304 according to the present exemplary embodiment. The DC components of the output of the gyro 6807*p* (hereinafter may also be simply referred to as a "gyro output") are filtered out by the HPF processing.

In the example illustrated in FIG. 17, the frequency is shown on the horizontal axis. The gain of the ratio of the output of the HPF phase adjustment unit 304 to the gyro output is shown on the vertical axis in units of db.

Referring to FIG. 17, with respect to a gain 1701, a low frequency as low as 1 Hz or lower is attenuated as the characteristic. Now, to direct attention to and particularly describe only the case of the frequency of 5 Hz, which is to be extracted by the gyro BPF unit 306, a phase 1702 leads 23 degrees with respect to the phase of 0 degrees (an ideal phase after integration), as indicated by an arrow 1703, which is the same as the variation of phase occurring in the HPF integration filter 305. This is because a second-order HPF additionally including the above-described HPF is used as a phase adjustment unit in the present exemplary embodiment.

Figure 18:
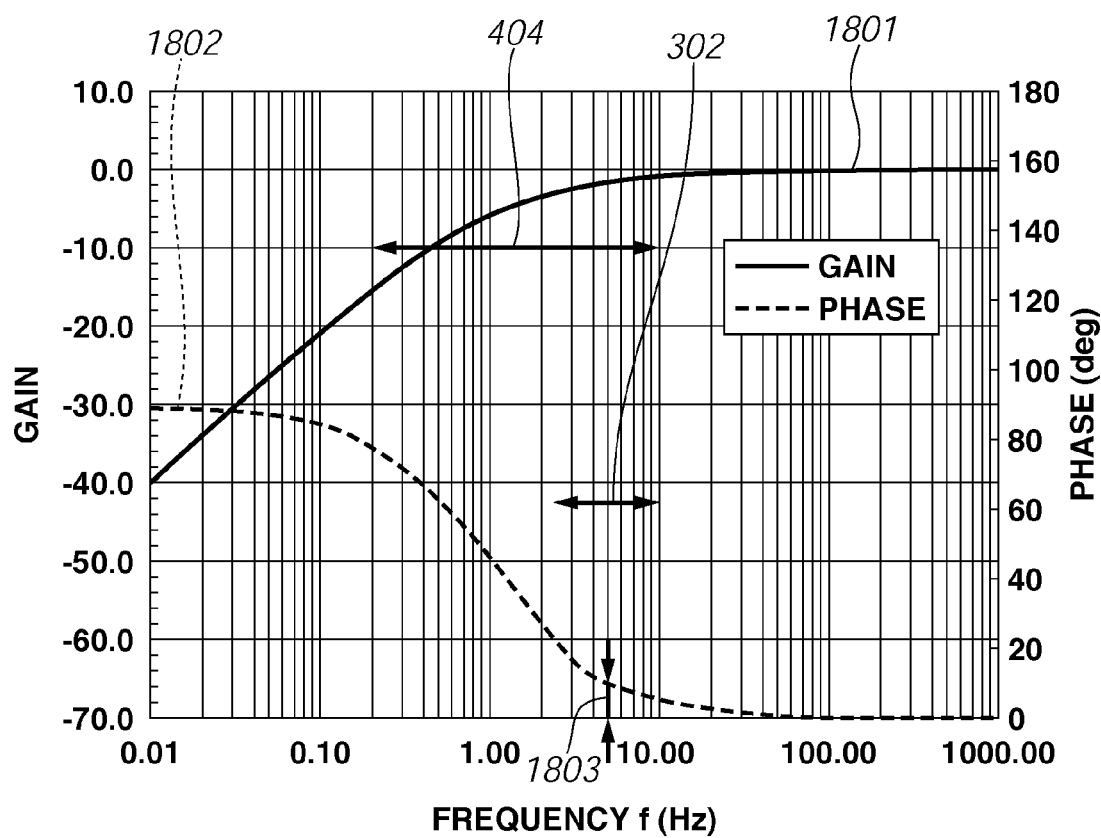
FIG. 18 illustrates an exemplary frequency characteristic of the image stabilization control apparatus according to the first exemplary embodiment of the present invention.

Suppose here that the phase adjustment unit is omitted and a first-order HPF similar to the HPF by the HPF integration filter 305 is used. In this case, as illustrated in FIG. 18, even a variation of the gain 1801 at 5 Hz is small, but a phase 1802 of 5 Hz leads by 11 degrees, as indicated by an arrow 1803 in FIG. 18. That is, the displacement of the HPF integration filter 305 is not 23 degrees.

Accordingly, the present exemplary embodiment uses the additionally provided HPF unit as the phase adjustment unit to adjust the displacement of the phase of the acceleration output in the HPF integration filter 305 and the phase of the angular velocity output in the HPF phase adjustment unit 304 to the same level.

Figure 15:
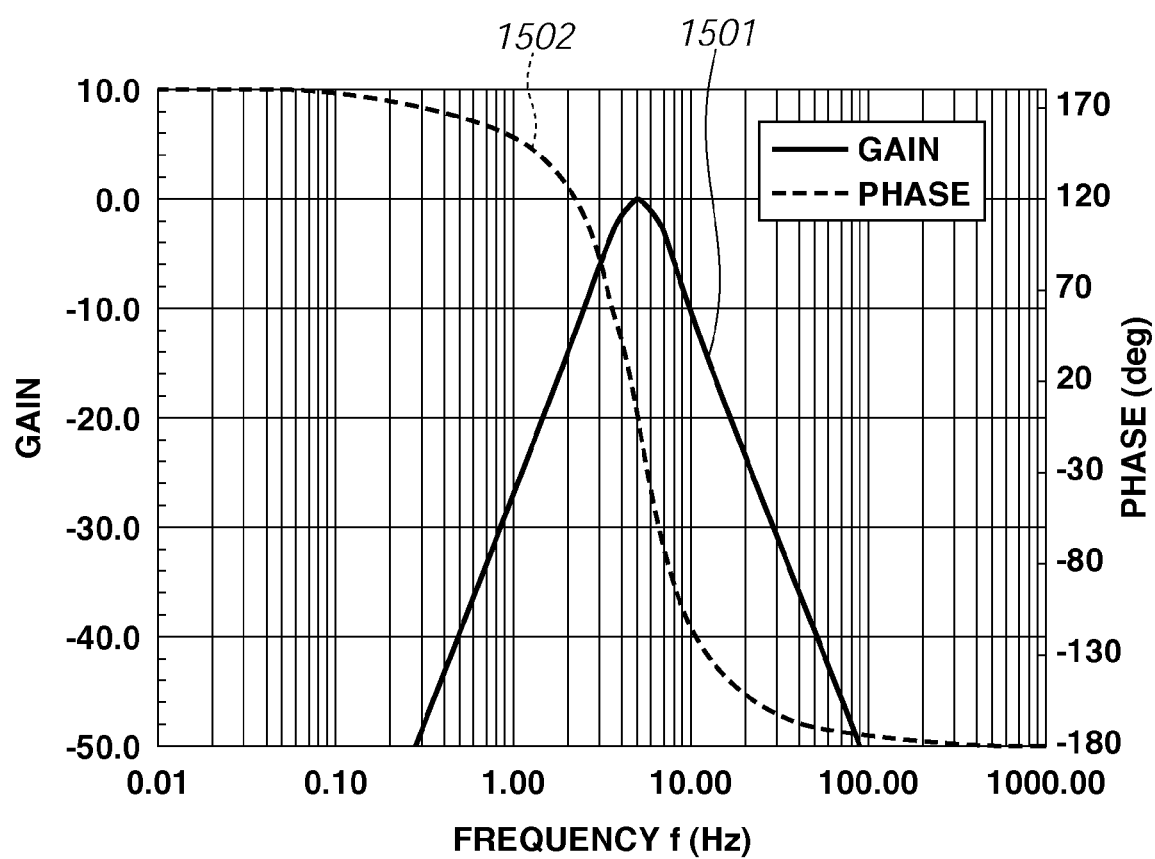
FIG. 15 illustrates an exemplary frequency characteristic of the image stabilization control apparatus according to the first exemplary embodiment of the present invention.

As described above, the present exemplary embodiment compares the outputs of the gyro 6807*p* and the ACC 101*p* in the frequency band illustrated in FIGS. 14 and 15 (hereinafter also referred to as a "first frequency band"), which is narrower than the frequency band illustrated in FIG. 10 (hereinafter also referred to as a "second frequency band"). With the above-described configuration, the present exemplary embodiment can execute the comparison of the acceleration output and the angular velocity output after attenuating the gravitational components and noise superposed on the acceleration output with high accuracy.

Returning to FIG. 3, the comparison unit 308 calculates the rotational radius L by the following expression (8) by comparing the output ω of the gyro BPF unit 306 and the output V of the ACC BPF unit 307:

$$L = V/\omega \qquad (8).$$

Furthermore, by using the calculated rotational radius L, the present exemplary embodiment corrects image shake according to the above-described expression (4). Moreover, the present exemplary embodiment multiplies the rotational radius L calculated by the comparison unit 308 by the output of the gain adjustment unit 311. Then, the output correction unit 309 sets the resulting value as the parallel vibration correction target value.

Figure 19:
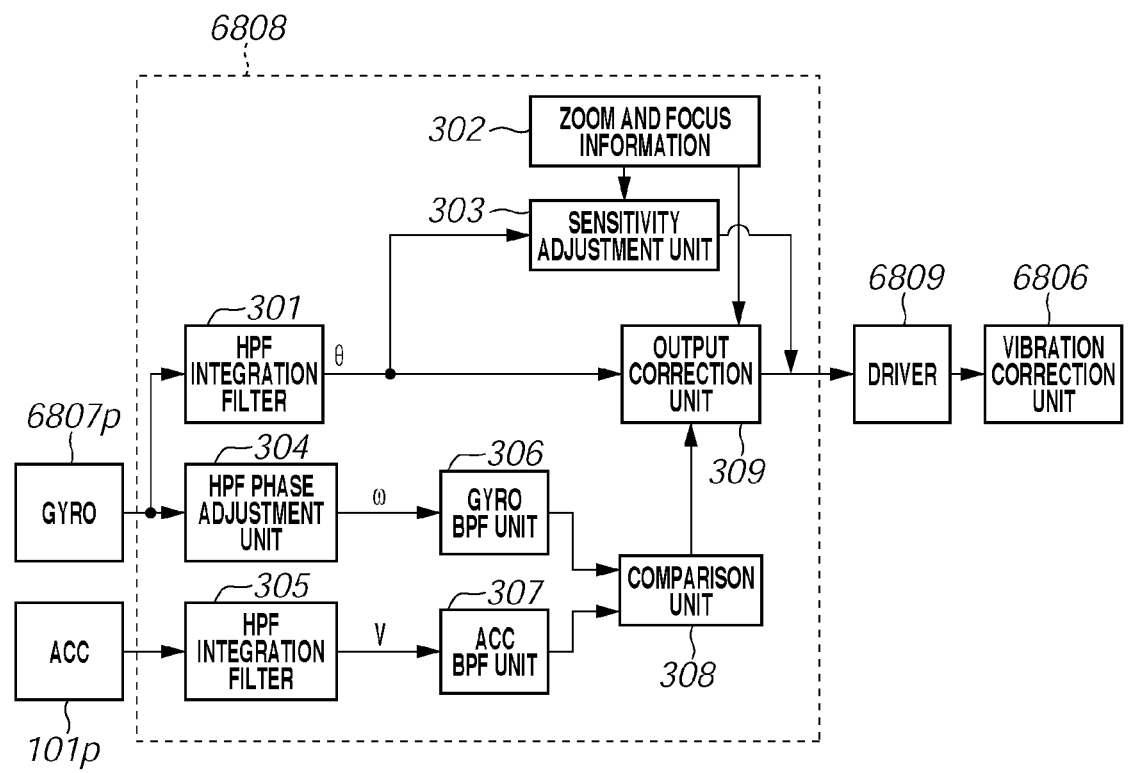
FIG. 19 illustrates another exemplary configuration of the image stabilization control apparatus according to the first exemplary embodiment of the present invention.

In light of expression (4), which includes terms such as the rotational radius L, the vibration angle output (the vibration angle θ), and the imaging magnification β (the imaging magnification β can be calculated based on the zoom and focus information 302), it may seem useful if the output of the HPF integration filter 301 is directly multiplied by the rotational radius L (a correction value) as illustrated in FIG. 19.

However, for the following reasons, the present exemplary embodiment does not use the output of the HPF integration filter 301 as the correction value, but includes the HPF integration filter 310 and the gain adjustment unit 311 as dedicated parallel vibration correction units as illustrated in FIG. 3.

The function of the gain adjustment unit 311 illustrated in FIG. 3 is described in detail below. As described above, the rotational radius L can be calculated by using the expression (8). However, strictly speaking, the rotational radius L can differ with respect to each frequency to be extracted.

Figure 20:
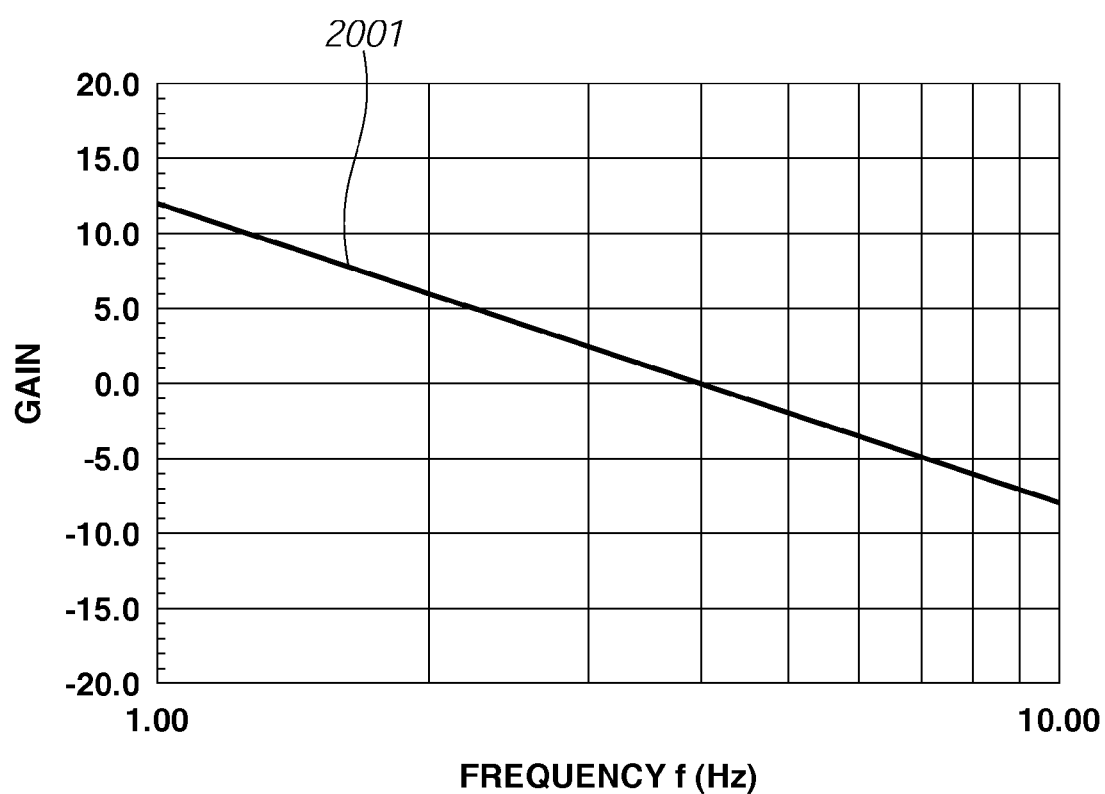
FIG. 20 illustrates an exemplary frequency characteristic for a rotational radius in the image stabilization control apparatus according to the first exemplary embodiment of the present invention.

FIG. 20 illustrates exemplary variation of the rotational radius L when the frequency to be extracted by the gyro BPF unit 306 and the ACC BPF unit 307 illustrated in FIG. 3 has varied in the range of 1 to 10 Hz.

In the example illustrated in FIG. 20, the frequency is shown on the horizontal axis. The ratio of the rotational radius L of each frequency to the rotational radius L at the frequency of 5 Hz is shown on the vertical axis in units of db.

Referring to FIG. 20, variation of rotational radius L 2001 decreases in proportion to the frequency. The decrease of the rotational radius L 2001 specifically indicates that the high-frequency vibration has occurred around a point of contact between the camera and the photographer (the face of the photographer, for example). The lower the frequency becomes, the more distant from the camera the rotational radius L becomes (from the face to the elbow of the photographer, for example). Accordingly, it is necessary to calculate a different rotational radius L for each frequency.

However, it is not possible to provide a plurality of correction values that the output correction unit 309 can use to scale the angular velocity integral output (vibration angle θ). Accordingly, the gain adjustment unit 311 provides different characteristics to the angular velocity integral output of the HPF integration filter 310 (the vibration angle θ). Thus, the present exemplary embodiment can acquire an optimum parallel vibration correction target value for each frequency even when multiplication by a specific correction value is executed. Thus, the gain adjustment unit 311 adjusts the variation of the rotational radius L, which is used as a correction value in the multiplication, by adjusting the characteristic of the integral output from the gyro 6807*p*, which is the target of multiplying the correction value.

Figure 21:
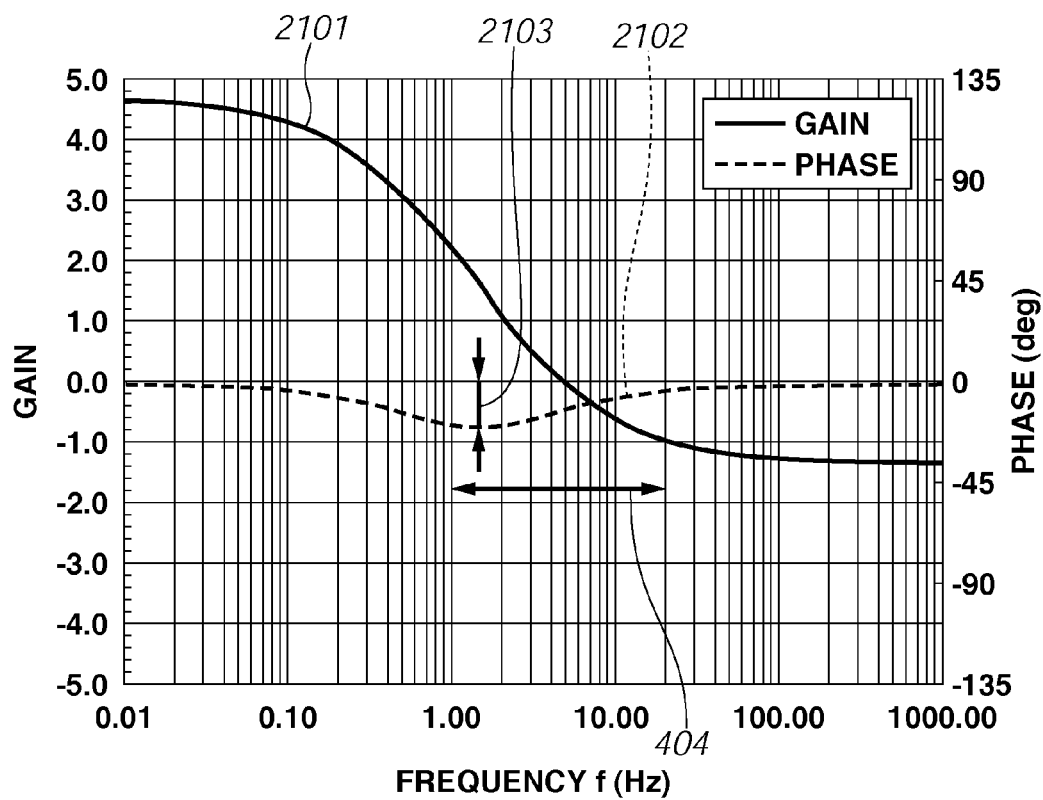
FIG. 21 illustrates an exemplary frequency characteristic of the image stabilization control apparatus according to the first exemplary embodiment of the present invention.

FIG. 21 is a Bode diagram illustrating an example of operation of the gain adjustment unit 311 according to the present exemplary embodiment. In the example illustrated in FIG. 21, the frequency is shown on the horizontal axis. The ratio of the output of the gain adjustment unit 311 to the output of the HPF integration filter 310 is shown on the vertical axis in units of db. The phase of the output is also shown on the vertical axis.

In the example illustrated in FIG. 21, the higher the frequency of a gain 2101 becomes, the more the output is attenuated in substantial proportion to the rise of the frequency. In this regard, for example, when the output correction unit 309 multiplies the output of the gain adjustment unit 311 by the rotational radius L as a specific correction value in the case of extraction at the frequency of 5 Hz, a result can be acquired which is similar to that in the case of multiplying the output of the HPF integration filter 310 by the different rotational radiuses L (FIG. 20) for each frequency.

However, in the example illustrated in FIG. 21, a phase 2102 is greatly displaced in the vibration band 404. In this regard, at the frequency of 1 Hz, the phase is delayed by 18 degrees. In this regard, in the present exemplary embodiment, to set off the delay of the phase, the characteristic of the HPF integration filter 310 is different from the characteristic of the HPF integration filter 301 in order.

As described above, the break frequency of the HPF integration filter 301 is set to a frequency of 0.1 Hz for both HPF and integration. Thus, the present exemplary embodiment reduces the phase displacement at the vibration lower limit frequency of 1 Hz to be small. On the other hand, in the present exemplary embodiment, the integration break frequency of the HPF integration filter 310 is set to 0.5 Hz.

Figure 22:
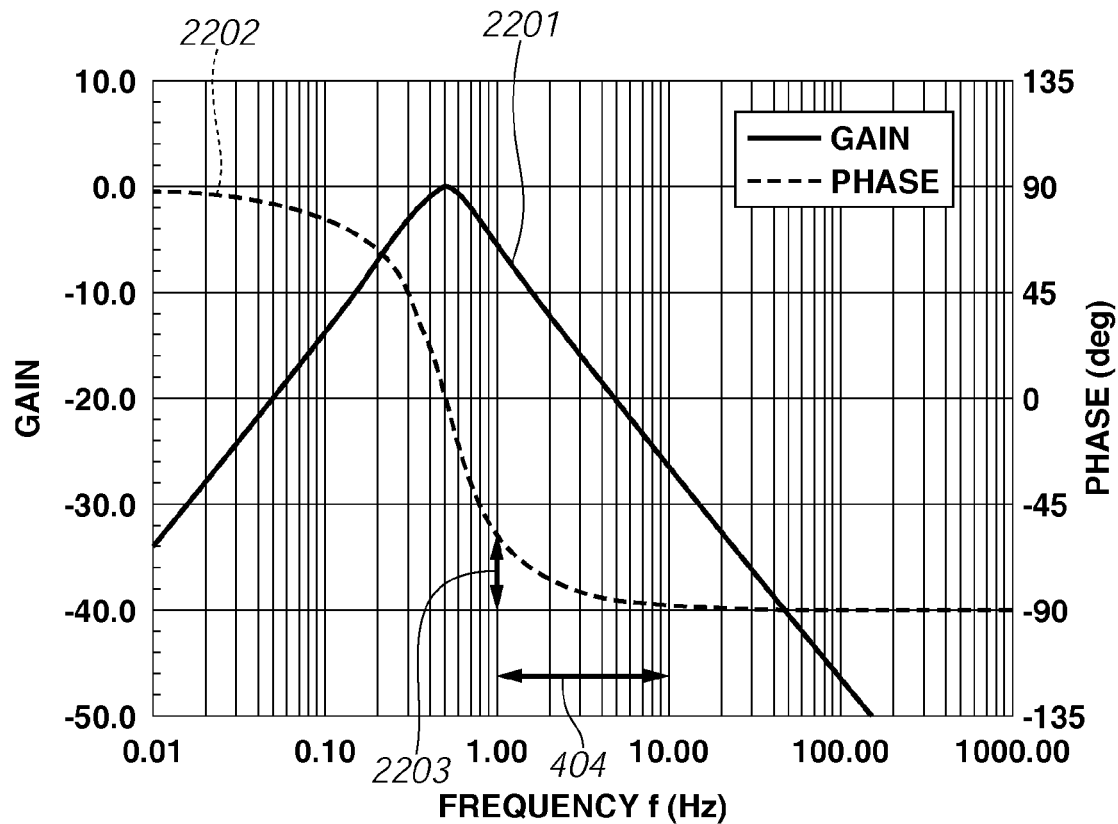
FIG. 22 illustrates an exemplary frequency characteristic of the image stabilization control apparatus according to the first exemplary embodiment of the present invention.

FIG. 22 is a Bode diagram illustrating operation of the HPF integration filter 310 according to the present exemplary embodiment. In the example illustrated in FIG. 22, the frequency is shown on the horizontal axis. The ratio of the output of the HPF integration filter 310 to the output of the gyro is shown on the vertical axis in units of db. The phase of the output is also shown on the vertical axis.

Referring to FIG. 22, a gain 2201 has a sufficient integration characteristic in the vibration band 404. For example, in the vibration band 404, the output decreases in proportion to the frequency. However, the phase delay of a phase 2202 is short by 34 degrees at the vibration lower limit frequency as indicated by an arrow 2203. More specifically, a phase delay of only 56 degrees has actually occurred while a phase delay of 90 degrees is required.

However, with respect to the signal from the gyro that has passed through both the HPF integration filter 310 and the gain adjustment unit 311, the phase delay after the gain adjustment can set off the shortage in the phase delay in the HPF integration filter 310.

Figure 23:
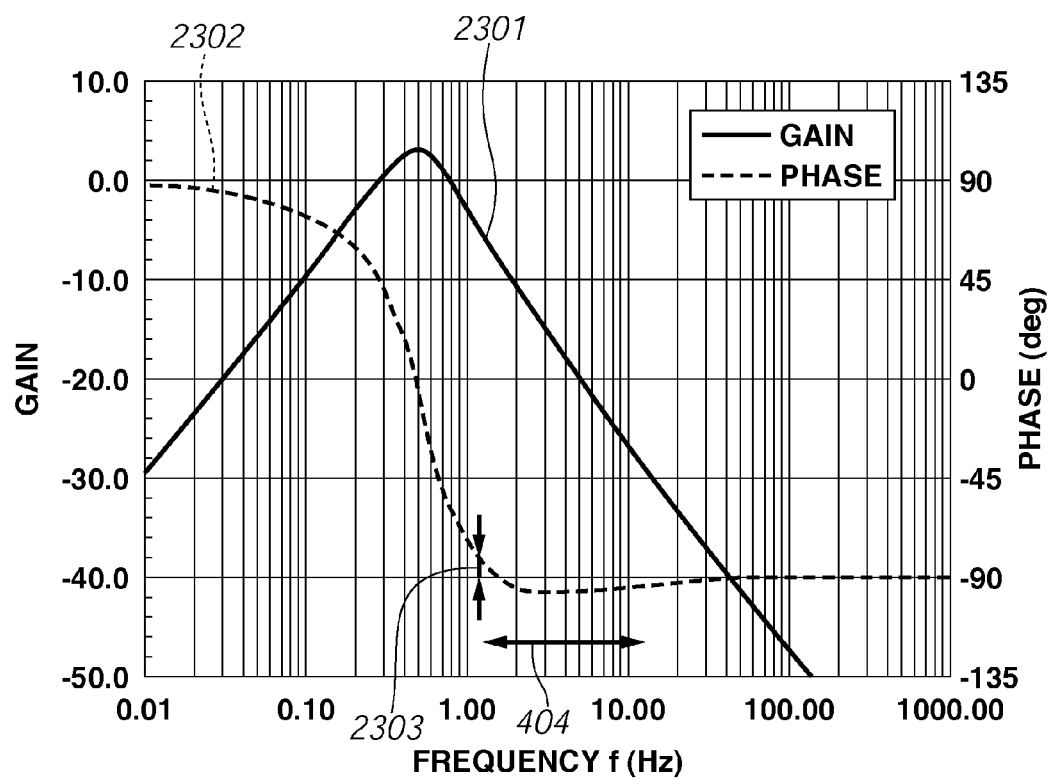
FIG. 23 illustrates an exemplary frequency characteristic of the image stabilization control apparatus according to the first exemplary embodiment of the present invention.

FIG. 23 is a Bode diagram illustrating an exemplary characteristic of a signal output from the gyro having passed through both the HPF integration filter 310 and the gain adjustment unit 311 according to the present exemplary embodiment. In the example illustrated in FIG. 23, the frequency is shown on the horizontal axis. The ratio of the output of the HPF integration filter 310 to the gyro output is shown on the vertical axis in units of db. The phase of the output is also shown on the vertical axis.

Referring to FIG. 23, with respect to a gain 2301, a sufficient integration characteristic (e.g., the output reduces in proportion to the frequency) and a characteristic for correcting the dependency of the rotational radius on the frequency are acquired in the vibration band 404. With respect to a phase 2302, a relatively small phase shortage of only 16 degrees has occurred at the vibration lower limit frequency in the vibration band 404 as indicated by an arrow 2303.

As described above, if the output correction unit 309 multiplies the output of the gain adjustment unit 311 by the rotational radius L at a frequency of 5 Hz as a specific correction value, then a result can be acquired that is roughly similar to the result of multiplying the output of the HPF integration filter 310 by different rotational radiuses L (FIG. 20) for each frequency.

As described above with reference to FIG. 3, the present exemplary embodiment includes the gyro BPF unit 306 and the ACC BPF unit 307. Furthermore, the present exemplary embodiment compares the outputs of the gyro 6807p and the ACC 101p in the frequency band illustrated in FIGS. 14 and 15 (the first frequency band), which is narrower than the frequency band illustrated in FIG. 10 (the second frequency band). Accordingly, the present exemplary embodiment can execute the comparison of the acceleration output and the angular velocity output after attenuating the gravitational components and noise superposed on the acceleration output with high accuracy.

Furthermore, the present exemplary embodiment calculates an angular vibration correction target value and a parallel vibration correction target value according to the output of the gyro 6807p. In this regard, as illustrated in FIG. 3, the present exemplary embodiment calculates the angular vibration correction target value with the HPF integration filter 301 and the parallel vibration correction target value with the HPF integration filter 310.

More specifically, the frequency band of the angular vibration and that of the parallel vibration differ from each other in the present exemplary embodiment. Furthermore, the present exemplary embodiment sets a frequency characteristic different from that used in the calculation for the angular vibration correction target value by using the gain adjustment unit 311.

With the above-described configuration, the present exemplary embodiment can correct each of the angular vibration and the parallel vibration with high accuracy. The above-described method for extracting the angular velocity output and the acceleration output in the narrow frequency band (the first frequency band) is not limited to the BPF processing.

Figure 24:
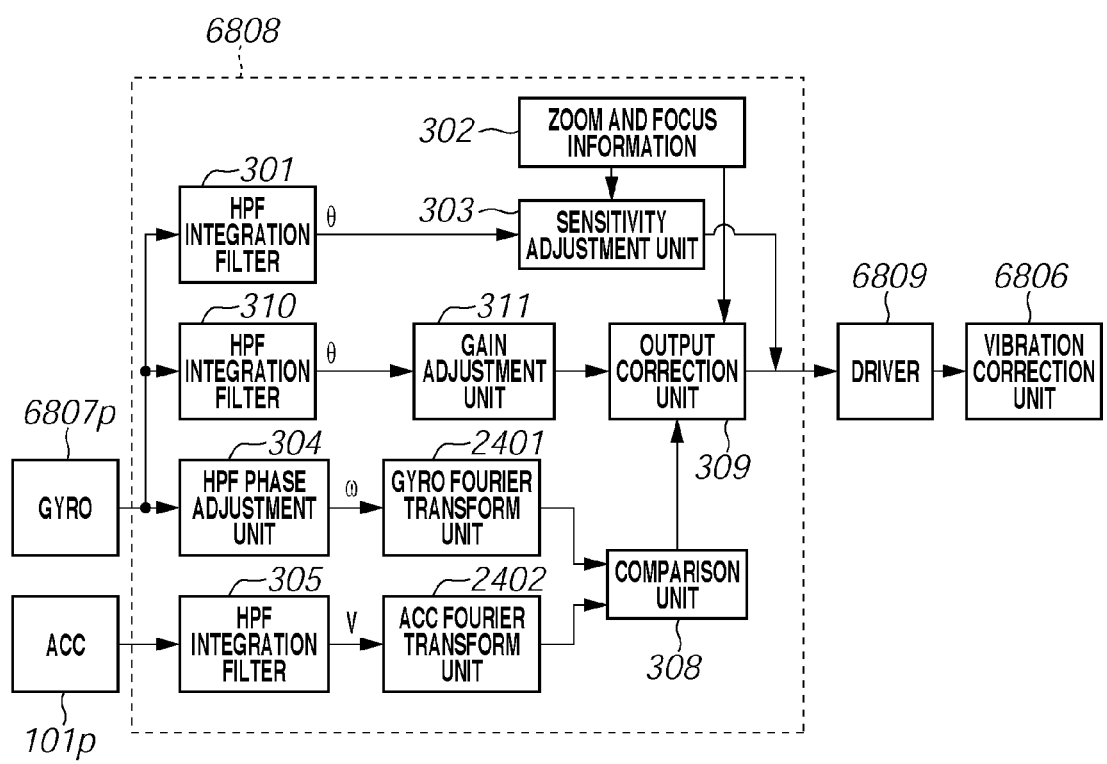
FIG. 24 illustrates a further exemplary configuration of the image stabilization control apparatus according to the first exemplary embodiment of the present invention.

FIG. 24 illustrates another exemplary configuration of the image stabilization control apparatus according to the present embodiment configured to calculate a spectrum of the gyro 6807p and the ACC 101p at a frequency at which the comparison is desired to be executed with the publicly known Fourier transform and configured to compare the results with the comparison unit 308.

Referring to FIG. 24, a gyro Fourier transform unit 2401 and an ACC Fourier transform unit 2402 each calculate a spectrum by multiplying the gyro output and the ACC output by a frequency component to be extracted and integrating the multiplication result.

The spectrum of the ACC 101p can be expressed by the following expression (9) while that of the gyro can be expressed by the following expression (10). Note here that with respect to the description of the phase to be described further below, the expressions (9) and (10) will not be expressed using a complex sinusoidal wave.

$$V_F = \sqrt{\left(\sum_{i=0}^{n/f} G(t)\sin 2\pi ft\right)^2 + \left(\sum_{i=0}^{n/f} G(t)\cos 2\pi ft\right)^2} \quad (9)$$

$$\omega_F = \sqrt{\left(\sum_{i=0}^{\frac{n}{f}} H(t)\sin 2\pi ft\right)^2 + \left(\sum_{i=0}^{\frac{n}{f}} H(t)\cos 2\pi ft\right)^2} \quad (10)$$

In the expressions (9) and (10), "f" denotes a frequency to be extracted (e.g., f=5 Hz), "n" denotes an integer (e.g., n=1), "G(t)" denotes an output at each sampling timing of the velocity at the frequency to be extracted, and "H(t)" denotes an output at each sampling timing of the angular velocity at the frequency to be extracted.

The expressions (9) and (10) respectively express the synthesis of the definite integral value of the sine wave and the cosine wave of a periodic integral multiple of the frequency to be extracted. After calculating the velocity and the angular velocity by using a result of a calculation using the expressions (9) and (10), the rotational radius L can be calculated using the expression (8).

In the example illustrated in FIG. 3, the magnitude of the velocity of the frequency component to be extracted is calculated using the BPF that passes the frequency component of the integral output of the ACC 101p (velocity). Furthermore, the magnitude of the velocity of the frequency component to be extracted is calculated using the BPF that passes the frequency component of the output of the gyro 6807p. Moreover, the rotational radius L is calculated by comparing the resulting magnitudes of the frequency components.

In the example illustrated in FIG. 24, the present exemplary embodiment calculates the spectrum of the frequency component to be extracted of the integral outputs of the ACC 101p (the velocity) by Fourier transform. Similarly, the present exemplary embodiment calculates the spectrum of the frequency component of the outputs of the gyro 6807p by Fourier transform. Furthermore, the present exemplary embodiment compares the spectra to calculate the rotational radius L.

Figure 25:
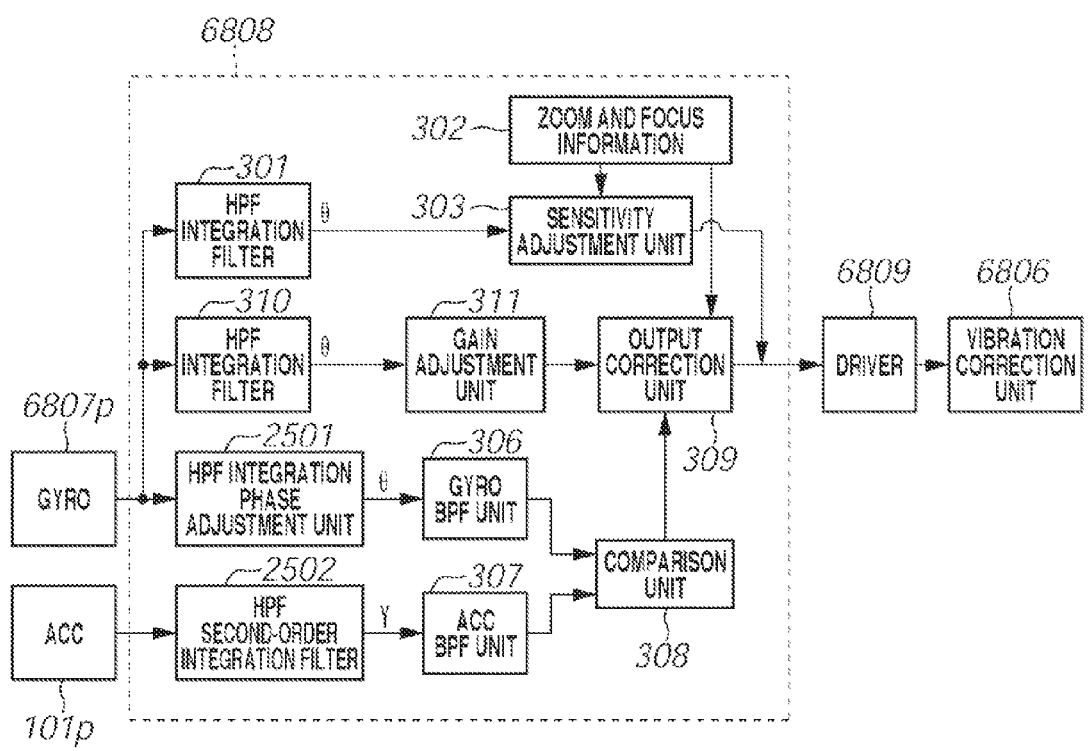
FIG. 25 is a block diagram illustrating a further exemplary configuration of the image stabilization control apparatus according to the first exemplary embodiment of the present invention.
Figure 26:
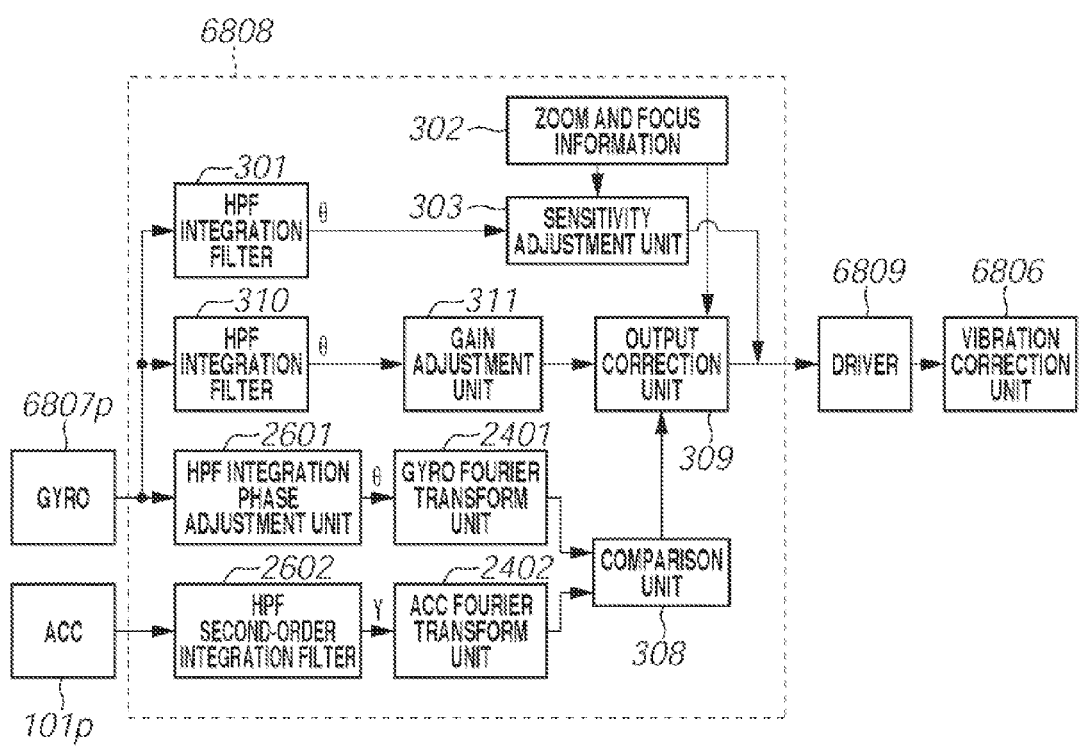
FIG. 26 illustrates a further exemplary configuration of the image stabilization control apparatus according to the first exemplary embodiment of the present invention.

In the present exemplary embodiment, instead of the HPF phase adjustment unit 304 and the HPF integration filter 305 illustrated in FIG. 24, HPF integration phase adjustment units 2501 and 2601 and HPF second-order integration filters 2502 and 2602 are provided as illustrated in FIGS. 25 and 26.

It is also useful if the rotational radius L is calculated using the following expression (11) including terms such as an angle θ, which is an integral of the output ω of the gyro 6807p, and a displacement Y, which is calculated by second-order integrating the output α of the ACC 101p.

$$L = Y/\theta \quad (11)$$

In the above-described manner, the influence from the noise of the high-frequency component can be reduced by integrating the angular velocity output and second-order integrating the acceleration. Accordingly, the present exemplary embodiment can constantly and securely calculate the rotational radius L.

A method for actually calculating the rotational radius L, which is the result of applying the expression (8) or the expression (11), is described in detail below. In the method that uses the expression (11), in which the angle θ and the displacement Y are compared to calculate Y, processing is executed which is similar to that in the case of using the expression (8). Accordingly, the description of the method using the expression (11) will be omitted and the method using the expression (8), in which the angular velocity ω and the velocity V are compared to calculate the rotational radius L, will be described.

Figure 27:
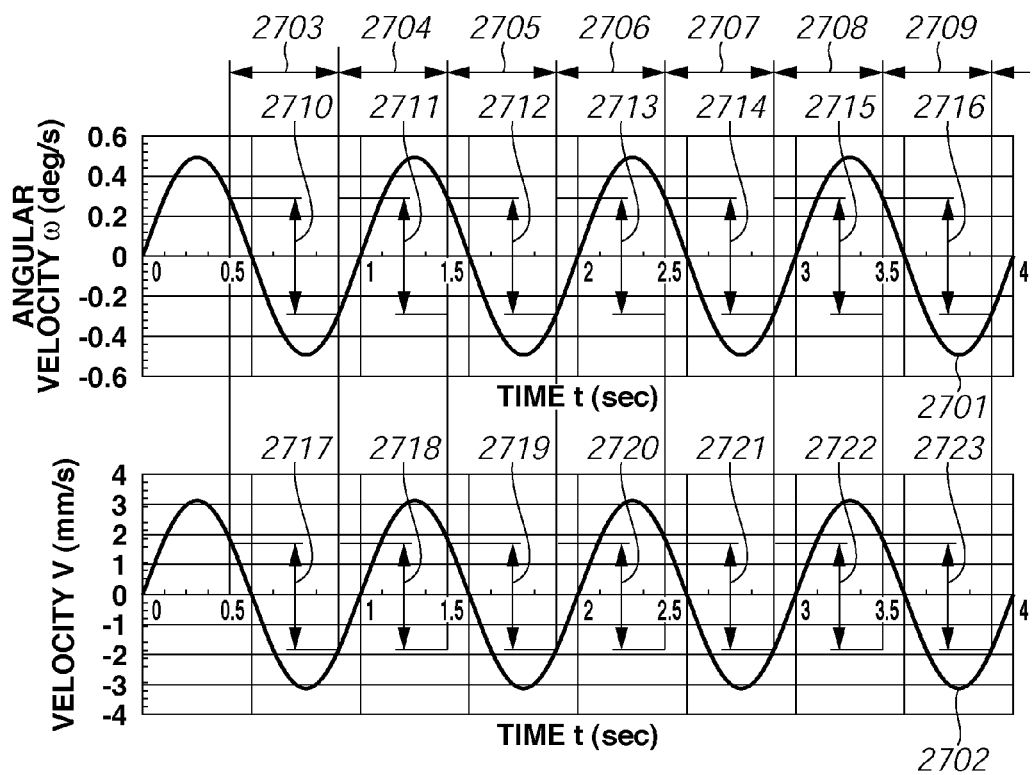
FIG. 27 illustrates exemplary waveforms in the image stabilization control apparatus according to the first exemplary embodiment of the present invention.

When the BPF is used, an output waveform 2701 of the HPF phase adjustment unit 304 and an output waveform 2702 of the HPF integration filter 305 are sampled at intervals of a predetermined time period as illustrated in FIG. 27. The result of sampling the output waveform 2701 is set as an angular velocity ω1 while that of the output waveform 2702 is set as a velocity V1. In the example illustrated in FIG. 27, time is shown on the horizontal axis while the angular velocity and the acceleration after BPF are shown on the vertical axis.

Referring to FIG. 27, arrows 2703 through 2709 indicate sampling periods. Arrows 2710 (ω1), 2711 (ω2), 2712 (ω3), 2713 (ω4), 2714 (ω5), 2715 (ω6), and 2716 (ω7) each indicate the difference ωn between the angular velocities in the above-described sampling periods. Arrows 2717 (V1), 2718 (V2), 2719 (V3), 2720 (V4), 2721 (V5), 2722 (V6), and 2723 (V7) each indicate the difference Vn between the velocities in the above-described sampling periods.

As the sampling period, a half of the period of the extracted frequency is set. In this regard, for example, if the frequency of 5 Hz is extracted, the sampling period of 0.1 second is set.

In the present exemplary embodiment, a rotational radius L1 is calculated based on the angular velocity difference ω1 and the velocity difference V1 calculated in the period 2703 using the expression (8). Similarly, a rotational radius L2 is calculated based on the angular velocity difference ω2 and the velocity difference V2 using the expression (8) from a subsequent sample.

By serially calculating rotational radiuses L and averaging the calculated rotational radiuses L in the above-described manner, a stable rotational radius L is calculated. The average value is calculated by the following expression (12):

$$L = \frac{\sum_{i=1}^{n} L_1}{n} \quad (12)$$

where "n" denotes the number of times of sampling operations.

The present exemplary embodiment uses the rotational radius L calculated in the above-described manner and further calculates the amount of vibration occurring on the image plane using the above-described expression (4) to correct image shake. More specifically, the present exemplary embodiment outputs the rotational radius L calculated using the expression (12) to the output correction unit 309 (FIG. 3) as a correction value.

In the present exemplary embodiment, instead of correcting image shake occurring at a specific moment by calculating the amount of vibration on the image plane at a specific moment by using both a rotational radius Li (e.g., the rotational radius L1) in each sampling period and the expression (4), an average value of the rotational radiuses L calculated for the sampling periods is calculated and the amount of vibration occurring on the image plane is calculated based on the calculated average value by using the expression (4). In this regard, the reason for employing this configuration is as follows.

An angular velocity output and an acceleration output naturally includes a large amount of noise components. Accordingly, the reliability of the rotational radius L calculated for one period only is low. In this regard, the present exemplary embodiment uses an average value of the rotational radiuses L to calculate a stable rotational radius L.

As described above, the present exemplary embodiment calculates the rotational radius L based on the result of the sampling in each period. However, the present exemplary embodiment is not limited to this. For example, a method that utilizes a peak of a waveform or a method that utilizes the area of a waveform can be used.

Figure 28:
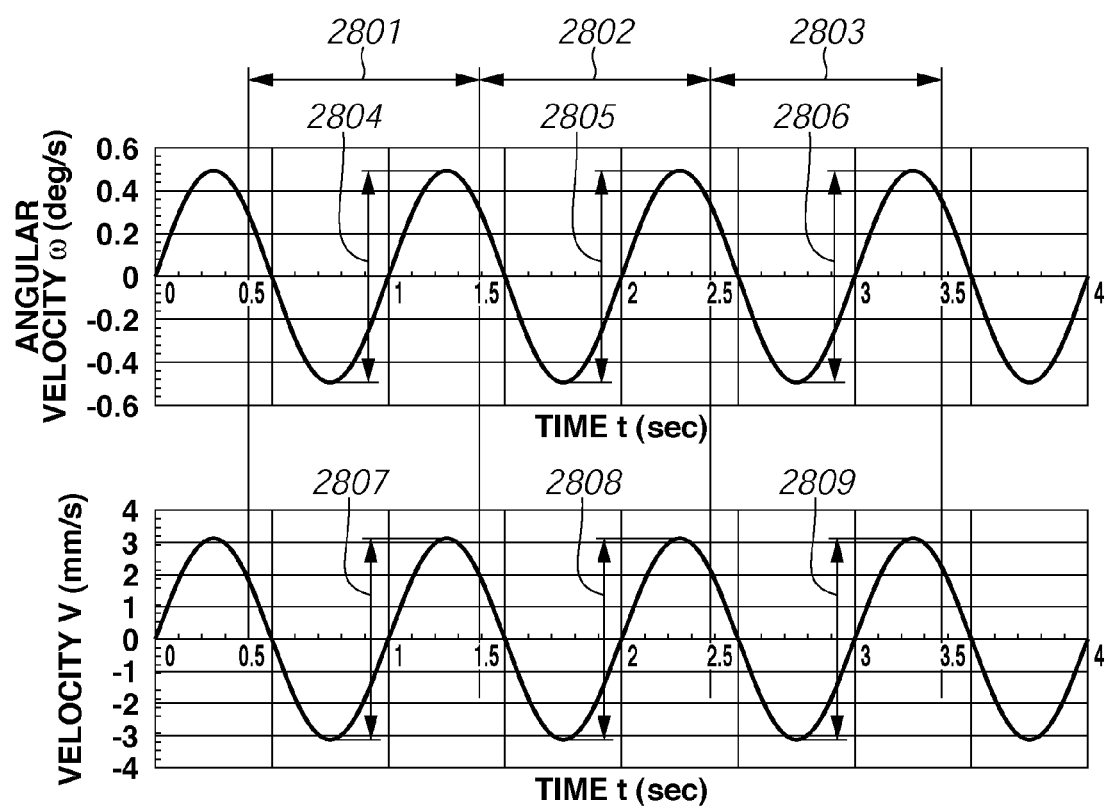
FIG. 28 illustrates exemplary waveforms in the image stabilization control apparatus according to the first exemplary embodiment of the present invention.

FIG. 28 illustrates an example of the method that utilizes a peak of a waveform. In the example illustrated in FIG. 28, the time is shown on the horizontal axis while the angular velocity and the acceleration after BPF are shown on the vertical axis.

Referring to FIG. 28, arrows 2801, 2802, and 2803 are sampling periods. Arrows 2804 (ω1), 2805 (ω2), and 2806 (ω3) each indicate an angular velocity difference on between a maximum value and a minimum value during the sampling period. Arrows 2807 (V1), 2808 (V2), and 2809 (V3) each indicate a velocity difference Vn during the sampling period.

As the sampling period, one period of the extracted frequency is set. In this regard, for example, if a frequency of 5 Hz is extracted, a sampling period of 0.2 seconds is set.

In the present exemplary embodiment, a rotational radius L1 is calculated based on the angular velocity difference ω1 and the velocity difference V1 calculated in the period 2801 as well as by using the expression (8). Similarly, a rotational radius L2 is calculated based on the angular velocity difference ω2 and the velocity difference V2 and by using the expression (8) from a subsequent sample.

By serially calculating rotational radiuses L and averaging the calculated rotational radiuses L in the above-described manner, a stable rotational radius L is calculated using the following expression (12).

Figure 29:
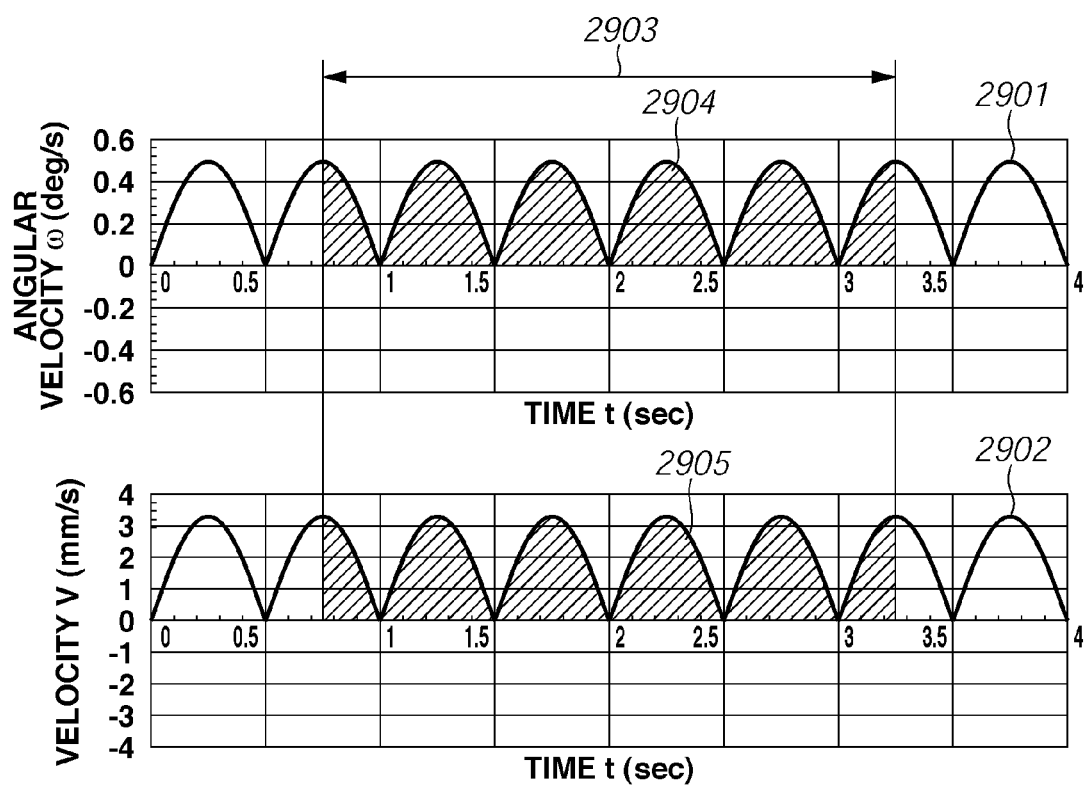
FIG. 29 illustrates exemplary waveforms in the image stabilization control apparatus according to the first exemplary embodiment of the present invention.

FIG. 29 illustrates an example of the method that utilizes the area of a waveform. In the example illustrated in FIG. 29, time is shown on the horizontal axis while the angular velocity after BPF and the velocity calculated by integrating the acceleration are shown on the vertical axis.

Referring to FIG. 29, a waveform 2901 indicates a waveform of an absolute value of the angular velocity output (the output of the HPF phase adjustment unit 304). A waveform 2902 indicates a waveform of an absolute value of the velocity output (the output of the HPF integration filter 305).

An arrow 2903 indicates a sampling period, which is a time period from pressing of a main power switch of the camera to the start of capture, for example. The sampling period can also be a time period from the half-press of the release button 6804a of the camera to the start of capture or from a timing at which the orientation of the camera has become stable to the completion of focus on an object or to a timing at which an object distance is detected. The present exemplary embodiment calculates an area 2904 of the waveform 2901 and an area 2905 of the waveform 2902 during the sampling period 2903, which are indicated with dashed lines.

The area 2904 (Sω) and the area 2905 (Sv) can satisfy the following conditions (13) and (14):

$$S_\omega = \sum_{t=0}^{T} t|\omega_t| \quad (13)$$

$$S_V = \sum_{t=0}^{T} t|V_t| \quad (14)$$

where "T" denotes the sampling period 2903.

Accordingly, the rotational radius L can be calculated by the following expression (15) for calculating an average value of the rotational radiuses L:

$$L \frac{S_V}{S_\omega} = \frac{\sum_{t=0}^{T} |V_t|}{\sum_{t=0}^{T} |\omega_t|}. \quad (15)$$

As described above, by using the area during a sampling period, a stable rotational radius L can be calculated that is not affected by noise or momentary disturbance.

A method is described in detail below for calculating a rotational radius L based on a result of calculating the spectrum by executing Fourier transform, as illustrated in FIG. 24, instead of executing the BPF.

In this method, at first, a spectrum VF of the velocity calculated by integrating the acceleration output and a spectrum ωF are calculated using the expressions (9) and (10). Then, a rotational radius LF is calculated using the following expression (16):

$$LF = \frac{VF}{\omega F}. \quad (16)$$

In this case, "n" in the expressions (9) and (10) is substituted with "f" and the value of "f" is set as one period of the frequency to be extracted. More specifically, the present exemplary embodiment calculates the rotational radius LF based on the spectra VF and ωF for each of the sampling periods 2801, 2802, and 2803 illustrated in FIG. 28. Furthermore, the present exemplary embodiment averages the rotational radiuses LF calculated for each period and outputs the resulting average value to the output correction unit 309 (FIG. 24) as a correction value.

Alternatively, it is also useful if the spectra VF and ωF during the sampling period 2903 (FIG. 29), are calculated using the expressions (9) and (10). In this case, the present exemplary embodiment can calculate the rotational radius LF using the expression (16) based on the result of calculating the spectra. Furthermore, in this case, although the present exemplary embodiment does not average the rotational radiuses LF, the spectra VF and ωF are averaged as a result of a long time period taken for calculating the spectra VF and ωF. Thus, the present exemplary embodiment can calculate a stable rotational radius L.

Figure 30:
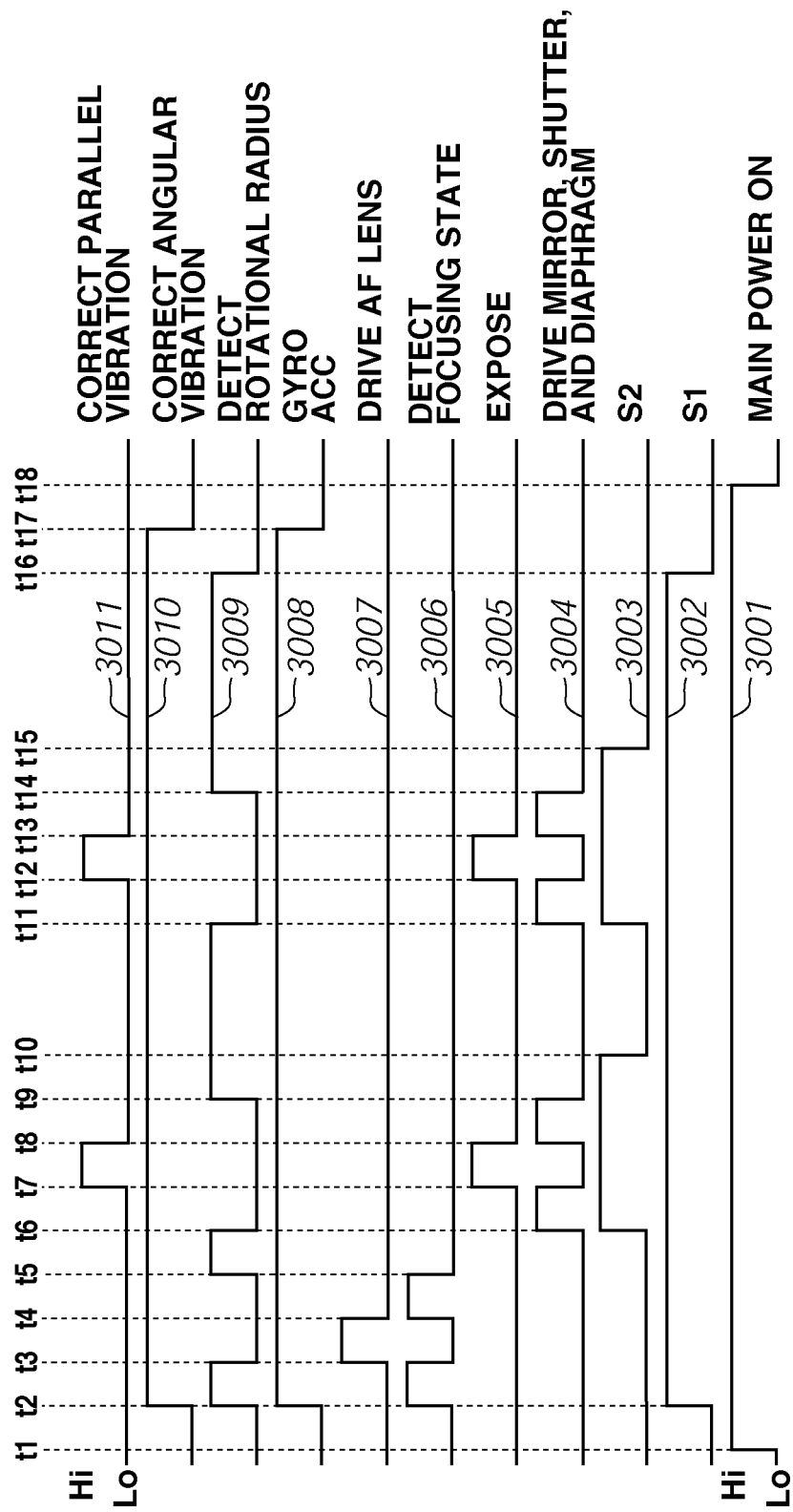
FIG. 30 is a timing chart illustrating an exemplary operation of the image stabilization control apparatus according to the first exemplary embodiment of the present invention.

FIG. 30 is a timing chart illustrating processing for correcting the above-described angular vibration and parallel vibration according to the present exemplary embodiment. In the example illustrated in FIG. 30, time is shown on the horizontal axis. The upper portion of each vertical axis indicates a high (Hi) state while the lower portion thereof indicates a low (Lo) state.

Referring to FIG. 30, a state 3001 indicates the state of a main power switch of the camera 6804 (the state of main power). The "Hi" state indicates that the main power switch is on while the "Lo" state indicates an "off" state. A state 3002 indicates the state of a switch S1, which is set "on" by half-press of the release button 6804a. "Hi" indicates that the switch S2 is set "on" (half-pressed state) while "Lo" indicates an "off" state (half-press-released state). A state 3003 indicates the state of a switch S2, which is set "on" by fully pressing the release button 6804a. "Hi" indicates that the switch S2 is set "on" (fully pressed state) while "Lo" (half-pressed state) indicates an "off" state.

An operation 3004 indicates an operation for driving a quick-return mirror, a shutter, or a diaphragm. More specifically, the operation 3004 indicates an operation for securing a capture optical path that is optimal for storing object information on the image sensor 6805. "Hi" indicates an "in operation" state. "Lo" indicates an operation suspension state.

A state 3005 indicates a state of an exposure operation for storing object information on the image sensor 6805. "Hi" indicates an "in operation" state. "Lo" indicates resetting of the storage of object information. In an actual operation, an operation is executed, in addition to the exposure operation, for storing object information on the image sensor 6805 and displaying an image of the object on a monitor provided on a camera body back surface. However, this operation is not illustrated in FIG. 30 because it is not essential to the present invention.

A state 3006 indicates a state of a focus detection operation for detecting the state of focusing of a light flux of the object that has passed through the imaging optical system of the lens 6801 with an auto-focus (AF) sensor (not illustrated). "Hi" indicates a "focus detection in operation" state. "Lo" indicates a "focus detection non-operating" state.

A state 3007 indicates the state of an operation for driving an AF lens, which is configured to adjust the focusing state by moving a part of or all lens units of the imaging optical system of the exchangeable lens 6801 towards the object side after receiving a signal from the AF sensor (not illustrated). "Hi" indicates a "lens adjustment in operation" state. "Lo" indicates a "lens adjustment non-operating" state.

A state 3008 indicates a state of an operation for detecting the gyro 6807$p$ and the ACC 101$p$. "Hi" indicates a "gyro (or ACC) detection in operation" state. "Lo" indicates a "gyro (or ACC) detection non-operating" state.

A state 3009 indicates a state of a rotational radius detection operation for detecting the rotational radius L based on the angular velocity output and the acceleration output. "Hi" indicates a "calculation in operation" state. "Lo" indicates a "calculation non-operating" state.

A state 3010 indicates a state of an angular vibration correction operation for correcting the angular vibration with the vibration correction unit 6806. "Hi" indicates an "angular vibration correction in operation" state. "Lo" indicates an "angular vibration correction non-operating" state.

A state 3011 indicates a state of a parallel vibration correction operation for correcting the parallel vibration with the vibration correction unit 6806. "Hi" indicates a "parallel vibration correction in operation" state. "Lo" indicates a "parallel vibration correction non-operating" state.

The above operation of each components of the camera 6804 executed when the main power switch is pressed at time t1 is described in detail below with reference to the timing chart of FIG. 30.

Referring to FIG. 30, at time t2, the photographer half-presses the release button 6804$a$ (switch S1 is in an "on" state) (the state 3002 shifts from the "Lo" state to the "Hi" state). In synchronization with the half-press of the release button 6804$a$, the AF sensor (not illustrated) starts detecting the focusing state (the state 3006 shifts from the "Lo" state to the "Hi" state). In addition, the gyro 6807$p$ and the ACC 101$p$ start their operation (the state 3008 shifts from the "Lo" state to the "Hi" state).

If the photographer has half-pressed the release button 6804$a$, the camera is in a stable state for capture of the object (in a state in which no great vibration is applied on the camera). Accordingly, in this state, the present exemplary embodiment can execute a stable calculation for the ACC 101$p$ and the gyro 6807$p$.

In this state, the calculation of a rotational radius L is started based on the outputs of the ACC 101$p$ and the gyro 6807$p$ (the state 3009 shifts from the "Lo" state to the "Hi" state). In addition, the correction of the angular vibration starts (the state 3010 shifts from the "Lo" state to the "Hi" state).

At time t3, after the state of focusing of the imaging optical system is calculated based on the signal from the AF sensor (not illustrated), then the focusing state is adjusted by moving a part of or all of the imaging optical system towards the object side (the state 3007 shifts from the "Lo" state to the "Hi" state). At the same time, the calculation of the rotational radius L is suspended (the state 3009 shifts from the "Hi" state to the "Lo" state) because the vibration cannot be accurately detected at that time due to vibration applied to the ACC 101$p$ caused by driving of the imaging optical system.

The calculation of the rotational radius L is suspended at the time t3 for the following reasons.

As described above with reference to FIG. 3, the present exemplary embodiment extracts a specific frequency (e.g., 5 Hz) only with respect to the output of the ACC 101$p$. Accordingly, although the above-described driving noise is typically attenuated to a non-affecting level, the output of the ACC 101$p$ may in actual cases become saturated if there is excessive, for example, vibration from the driving of the lens under adverse operating conditions.

If the acceleration output is saturated, the vibration cannot be detected in all frequency bands. In this case, the ACC 101$p$ outputs an error signal only. If the rotational radius L is calculated by using the error signal, the parallel vibration may be inappropriately and insufficiently corrected.

In order to prevent this, the present exemplary embodiment suspends the calculation of the rotational radius L during the lens (focus lens) driving operation for focusing.

The saturation that may occur due to vibration from the driving of the lens may be suppressed by using an ACC having a wide acceleration detection range (an ACC capable of detecting a very high acceleration). However, such an ACC having a wide detection range also has a low accuracy for detection of microacceleration such as vibration. Accordingly, if an ACC of this type is used, a stable rotational radius cannot be detected.

In this regard, the present exemplary embodiment uses an ACC having a high vibration detection accuracy although the acceleration detection range of the ACC is relatively narrow. Accordingly, the present exemplary embodiment prevents the use of an ACC signal that is output when vibration from disturbance is input for calculating the rotational radius.

At time t4, the lens reaches a target position and the driving of the lens is stopped (the state 3007 shifts from the "Hi" state to the "Lo" state). In synchronization with the suspension of the driving of the lens, the AF sensor (not illustrated) detects the focusing state again to determine whether a desired focusing state has been achieved (the state 3006 shifts from the "Lo" state to the "Hi" state).

At time t5, since it has been determined that the desired focusing state of the AF has been achieved, the detection of focusing state ends (the state 3006 shifts from the "Hi" state to the "Lo" state). On the other hand, if it is determined that the desired focusing state has not been achieved, the lens is driven again to repeatedly adjust the focusing state until the desired focusing state is achieved.

In addition, if it is determined that the desired focusing state has been achieved, the operation for calculating the rotational radius is resumed (the state 3006 shifts from the "Lo" state to the "Hi" state) because there is no possibility of disturbance vibration occurring due to the driving of the lens applied on the ACC at and after the time t5.

When the driving of the lens is stopped at time t5, the present exemplary embodiment calculates the object distance based on the amount of driving of the lens unit. Furthermore, the present exemplary embodiment calculates the imaging magnification based on the zoom information and uses the calculated imaging magnification in setting the parallel vibration correction target value.

At time t6, when the photographer fully presses the release button 6804a, the switch S2 is in an "on" state (the state 3003 shifts from the "Lo" state to the "Hi" state). In synchronization with the full press of the release button 6804a, the present exemplary embodiment causes the diaphragm of the exchangeable lens 6801 to operate, executes a mirror-up operation of a quick return mirror of the camera 6804, and opens the shutter (the state 3004 shifts from the "Lo" state to the "Hi" state).

In addition, the present exemplary embodiment stops the calculation of the rotational radius L (the state 3009 shifts from the "Hi" state to the "Lo" state) in order to prevent degradation of the accuracy of calculating the rotational radius L due to the saturation of the ACC 101p because of the vibration occurring due to the operation such as the reduction of the aperture of the diaphragm, the mirror-up operation of the quick return mirror, or opening the shutter.

At time t7, the present exemplary embodiment starts an exposure operation (the state 3005 shifts from the "Lo" state to the "Hi" state). In synchronization with the start of the exposure operation, the correction of the parallel vibration is started (the state 3011 shifts from the "Lo" state to the "Hi" state).

The present exemplary embodiment uses an average of the average values of the rotational radiuses L, which are calculated during the time period from the time t2 to the time t3, and the average values of the rotational radiuses L, which are calculated during the time period from the time t5 to the time t6 as the rotational radius L in correcting the parallel vibration.

At time t8, the exposure ends (the state 3005 shifts from the "Hi" state to the "Lo" state). Furthermore, the correction of the parallel vibration also ends (the state 3011 shifts from the "Hi" state to the "Lo" state).

As described above, the present exemplary embodiment executes the correction of the parallel vibration only during the time period of the exposure. This is because if the correction of the parallel vibration is executed in addition to the correction of the angular vibration, a large amount of stroke for the correction by the vibration correction unit 6806 becomes necessary, resulting in needing a large-size vibration correction unit 6806, which also results in degrading the operability of the exchangeable lens 6801.

Accordingly, the present exemplary embodiment executes the correction of the parallel vibration during a short time period of exposure period and returns to a mode for executing the correction of the angular vibration only after the exposure period.

During time t8 and time t9, the present exemplary embodiment closes the shutter, opens the aperture of the diaphragm, and executes a mirror-down operation of the quick return mirror (the state 3004 is in the "Hi" state). In addition, the present exemplary embodiment suspends the calculation of the rotational radius L until the time t9 comes (the state 3009 is in the "Lo" state) in order to prevent the degradation of the accuracy of calculating the rotational radius L, which may otherwise occur due to the saturation of the ACC because of the vibration occurring when the aperture of the diaphragm is increased, the mirror-down operation of the quick return mirror is executed, or the shutter is closed as described above.

At time t9, the calculation of the rotational radius L is resumed (the state 3009 shifts from the "Lo" state to the "Hi" state). At time t10, the user releases the full press of the release button 6804a (the switch S2 is in an "on" state) and the switch S2 shifts to the half-pressed state (the state 3003 shifts from the "Hi" state to the "Lo" state).

At time t11, after a full press of the release button 6804a the switch S2 is in an "on" state again (the state 3003 shifts from the "Lo" state to the "Hi" state). In synchronization with the full press of the release button 6804a, before time t12, the present exemplary embodiment increases the aperture of the diaphragm of the exchangeable lens 6801, executes the mirror-up operation of the quick return mirror of the camera 6804, and opens the shutter (the state 3004 shifts from the "Lo" state to the "Hi" state). Furthermore, the present exemplary embodiment suspends the calculation of the rotational radius L (the state 3009 shifts from the "Hi" state to the "Lo" state).

At time t12, the present exemplary embodiment starts the exposure (the state 3005 shifts from the "Lo" state to the "Hi" state). In synchronization with the start of the exposure, the correction of the parallel vibration is started (the state 3011 shifts from the "Lo" state to the "Hi" state).

The present exemplary embodiment uses an average of the average values of the rotational radiuses L, which are calculated during the time period from the time t2 to the time t3, the average values of the rotational radiuses L, which are calculated during the time period from the time t5 to the time t6, and the average values of the rotational radiuses L, which are calculated during the time period from the time t9 to the time t11, as the rotational radius L in correcting the parallel vibration.

As described above, the rotational radius L is not reset during the time period in which the release button 6804a is being half-pressed (the switch S1 is in an "on" state) and the average of the cumulative rotational radiuses L is calculated.

At time t13, the exposure ends (the state 3005 shifts from the "Hi" state to the "Lo" state). Furthermore, the correction of the parallel vibration also ends (the state 3011 shifts from the "Hi" state to the "Lo" state). During time t13 and time t14, the present exemplary embodiment closes the shutter, releases the reduced aperture of the diaphragm, and executes the mirror-down operation of the quick return mirror of the camera 6804 (the state 3004 is in the "Hi" state).

Furthermore, during the time period from time t11 to time t14, the calculation of the rotational radius L is suspended (the state 3009 is in the "Lo" state). At time t14, the calculation of the rotational radius L is resumed (the state 3009 shifts from the "Lo" state to the "Hi" state).

At time t15, the full press of the release button 6804a (the switch S2 is in an "on" state) is released. The release button 6804a shifts to the half-pressed state (the switch S1 is in an "on" state) (the state 3003 shifts from the "Lo" state to the "Hi" state).

At time t16, the half-press of the release button 6804a (the switch S1 is in an "on" state) is released (the state 3002 shifts from the "Hi" state to the "Lo" state). In synchronization with the release of the half-press of the release button 6804a, the present exemplary embodiment suspends the calculation of the rotational radius L (the state 3009 shifts from the "Hi" state to the "Lo" state).

Furthermore, the accumulated values of the rotational radiuses L, which have been used for calculating the average thereof, are reset because it is not verified whether the accumulated and calculated rotational radius L can be used as they are for correcting the parallel vibration due to the possible change in the method of holding the camera body 6804 at the time when the photographer half-presses the release button 6804a (when the switch S1 is in an "on" state). Accordingly, when the photographer half-presses the release button 6804a again, the present exemplary embodiment newly calculates a rotational radius L.

At time t17, which is the time after the time t16 by a predetermined length of time (e.g., four seconds), the operation of the gyro 6807p and the ACC 101p is suspended (the state 3008 shifts from the "Hi" state to the "Lo" state). Furthermore, the correction of the angular vibration is also suspended (the state 3010 shifts from the "Hi" state to the "Lo" state).

At the time t15, as described above, the operation of the gyro 6807p and the ACC 101p and the correction of the angular vibration are not suspended, to immediately execute the correction of the angular vibration when the photographer half-presses the release button 6804a again (the switch S1 is in an "on" state).

At time t18, the camera is powered off (the state 3001 shifts from the "Hi" state to the "Lo" state).

Although not illustrated in the timing chart of FIG. 30, the present exemplary embodiment suspends the calculation of the rotational radius L when the orientation of the camera has been greatly changed so as not to use the rotational radiuses L detected during the time period after the orientation of the camera has been greatly changed as inputs to the calculation of the average of the rotational radiuses L. This is because if the camera is panned or if any operation which greatly changes the orientation of the camera is executed, the rotational radius may be changed from the rotational radius at the time the photographer holds the camera to shoot an object, so that the calculated the rotational radius L may degrade the accuracy in correcting the parallel vibration.

In this regard, the present exemplary embodiment resets the thus-accumulated rotational radiuses L if the output of the gyro 6807p has exceeded a predetermined value (e.g., 3 deg/s) for a predetermined length of time (e.g., 0.5 seconds) and newly calculates the rotational radius L when the output of the gyro 6807p becomes low. Similarly, the present exemplary embodiment determines that the orientation of the camera has been greatly changed if the output of the ACC 101p exceeds a predetermined level of variation (e.g., 0.2 G) for a predetermined length of time (e.g., 0.5 seconds). Furthermore, the present exemplary embodiment resets the thus-calculated rotational radiuses L and newly calculates the rotational radius L when the variation of the output of the ACC 101p becomes small.

If the photographer fully presses the release button 6804a at the time t6 immediately after the detection of the rotational radius L has started at the time t2, then the calculation of the rotational radius L may not be appropriately executed. In this case, the present exemplary embodiment corrects the parallel vibration by using a predetermined rotational radius L.

As described above, the rotational center of vibration differs with each frequency. In this regard, the rotational center of vibration lies at the eyepiece unit of the camera at the high frequency, while at the low frequency, the rotational center of vibration lies around the waist of the photographer. The present exemplary embodiment utilizes the gain adjustment unit 311 having the characteristic illustrated in FIG. 21 in order to acquire and calculate different rotational radius for different frequency levels.

Figure 31:
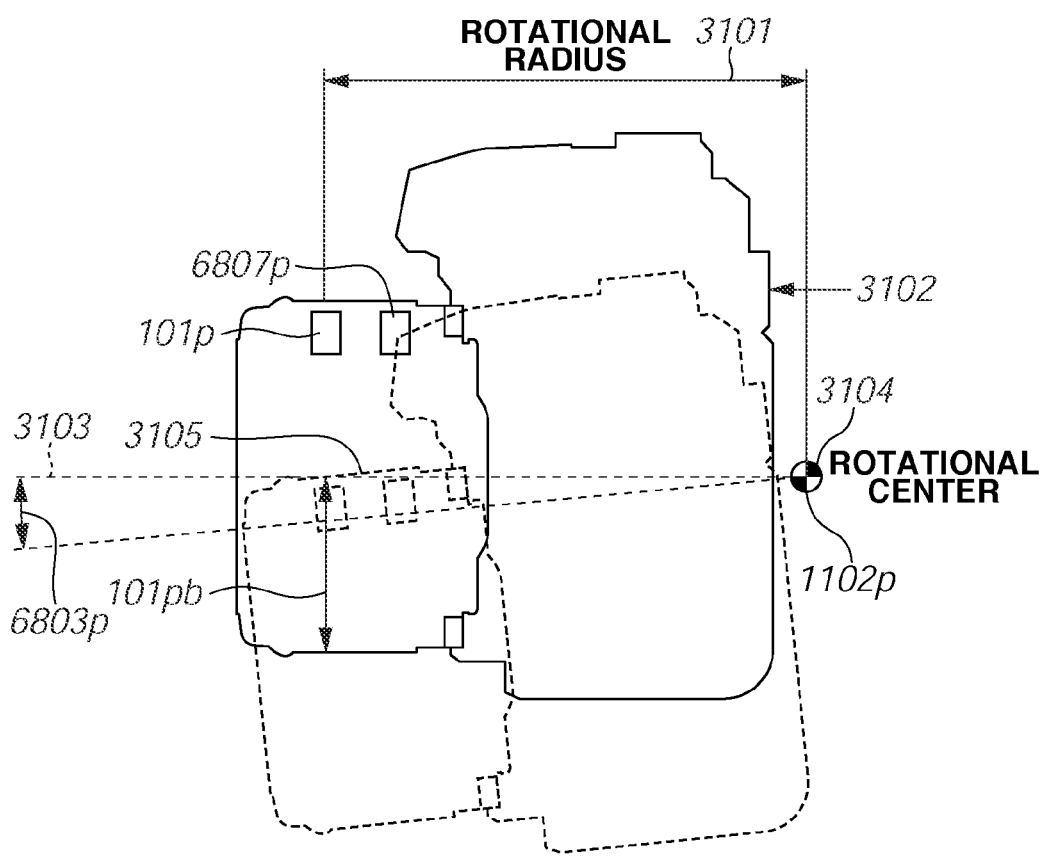
FIG. 31 illustrates exemplary vibration of a camera according to the first exemplary embodiment of the present invention.

Because the rotational center of vibration around the frequency of 5 Hz lies around the eyepiece unit of the camera, if no rotational radius L is available, the present exemplary embodiment sets the distance from the eyepiece unit of the camera to the principal position of the imaging optical system as an initial value of a rotational radius 3101 as illustrated in FIG. 31.

Referring to FIG. 31, the eyepiece unit of the camera is provided at the position indicated by an arrow 3102. The present exemplary embodiment sets the distance from a rotation center 3104, which is positioned at an intersection of the position indicated by the arrow 3102 and an optical axis 3103, and a principal point 3105 of the imaging optical system as the rotational radius 3101. This is because since the direction of correction by the vibration correction unit is oriented in the direction orthogonal to the optical axis 3103, only the parallel vibration components in this direction are to be corrected.

If the photographer has fully pressed the release button 6804a at the time t6 immediately after half-press of the release button 6804a at the time t2, then the present exemplary embodiment corrects the parallel vibration by using the initial value. On the other hand, if it takes sufficient time for the photographer to fully press the release button 6804a at the time t6 after half-press of the release button 6804a at the time t2, the present exemplary embodiment uses the calculated rotational radius L.

Furthermore, the calculated rotational radius L may greatly vary due to the influence from the state of holding the camera body. In this regard, if the photographer holds the camera in a state in which almost no vibration occurs, then the output of the gyro may become very small because almost no vibration occurs.

In this case, if a DC bias component is superposed on the velocity output calculated by integrating the output of the ACC 101p and thus a predetermined level of output is input, the rotational radius L calculated by the expression (8) may have a very large value. In such a case, the present exemplary embodiment does not use the calculated rotational radius L, but corrects the parallel vibration by using the initial value of the rotational radius L. More specifically, if the angular velocity output is extremely small or the calculated rotational radius is or exceeds a predetermined value (if the calculated rotational radius is or exceeds the distance from the principal point of the imaging optical system to the waist of the photographer), then the present exemplary embodiment corrects the parallel vibration by using the initial value of the rotational radius L.

Figure 32:
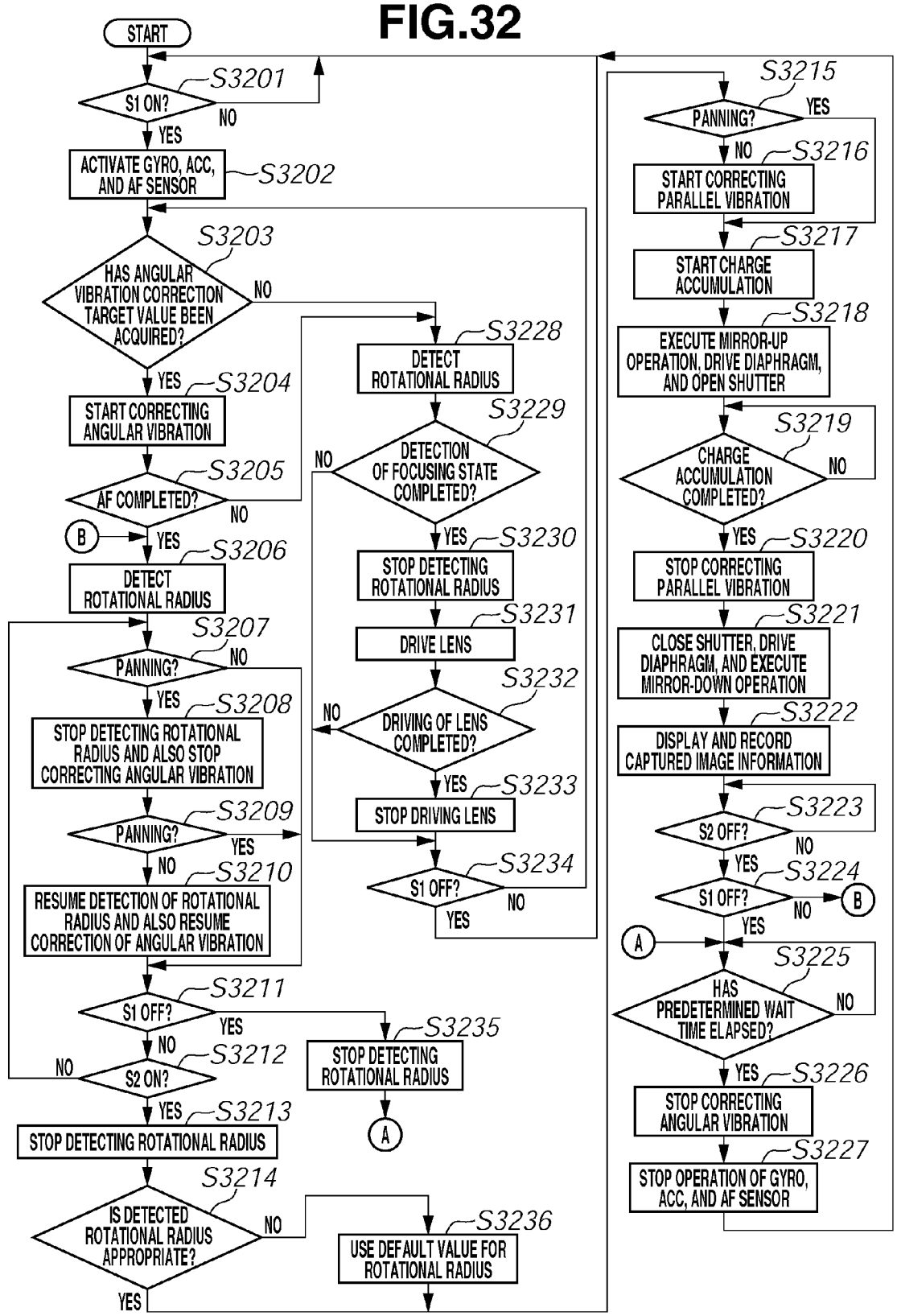
FIG. 32 is a flow chart illustrating an exemplary operation of main components of the image stabilization control apparatus according to the first exemplary embodiment of the present invention.

FIG. 32 is a flow chart illustrating an example of the above-described configuration. The processing according to the flow of FIG. 32 starts when the camera is powered on. In the example illustrated in FIG. 32, various control operations executed by the camera, such as a battery checking operation, a photometry operation, a focus detection operation, the driving of the lens for AF, an operation for charging the flash unit, or an operation for capture, are omitted for easier understanding of the primary configuration of the present invention.

In the following exemplary flow, the angular vibration 6803p of the camera is detected by the gyro 6807p and the parallel vibration 101pb of the camera is detected by the ACC 101p. In this regard, the same flow is executed if the angular vibration 6803y of the camera is detected by the gyro 6807y and the parallel vibration 101yb of the camera is detected by the ACC 101y. Furthermore, if the camera is powered off during any step of the flow chart of FIG. 32, then the processing in the flow chart ends.

Referring to FIG. 32, in step S3201, the lens CPU 6808 determines whether the photographer has half-pressed the release button 6804a (the switch S1 is in an "on" state). If it is determined that the photographer has half-pressed the release button 6804a (the switch S1 is in an "on" state) (YES in step S3201), then the processing advances to step S3202.

In step S3202, the lens CPU 6808 activates the gyro 6807P and the ACC 101p and starts detecting vibration. At the same time, the lens CPU 6808 activates the AF sensor (not illustrated) and starts detecting the focusing state. In the present exemplary embodiment, the lens CPU 6808 activates the gyro 6807P, the ACC 101p, and the AF sensor (not illustrated) after the photographer has half-pressed the release button 6804a because the photographer orients the camera toward the object and thus the camera is in a stably-held state until the photographer half-presses the release button 6804a.

In step S3203, the lens CPU 6808 determines whether an angular vibration correction target value for the gyro 6807p has been substantially acquired. If it is determined that an angular vibration correction target value for the gyro 6807p has been substantially acquired (YES in step S3203), then the processing advances to step S3204. On the other hand, if it is determined that an angular vibration correction target value for the gyro 6807p has not been substantially acquired (NO in step S3203), then the processing advances to step S3228. This is intended so as to not correct the angular vibration until the integral output of the gyro 6807p (the output of the HPF integration filter 301 (FIG. 3)) becomes stable because it takes a specific amount of time (e.g., 0.5 seconds) before the stability of the integral output of the gyro 6807p is achieved.

In step S3204, the lens CPU 6808 drives the vibration correction unit 6806 and starts the correction of the angular vibration but does not correct the parallel vibration at this time. In step S3205, the lens CPU 6808 determines whether AF has been completed. If it is determined that AF has been completed (YES in step S3205), then the processing advances to step S3206. On the other hand, if it is determined that AF has not been completed (NO in step S3205), then the processing advances to step S3228.

Processing executed when it is determined in step S3205 that the AF has not been completed is described in detail.

In the step after it is determined in step S3205 that the AF has not been completed, (i.e., in step S3228), the present exemplary embodiment extracts desired frequency components from the output of the gyro 6807p and the ACC 101p and compares the extracted frequency components to calculate the rotational radius as described above. Furthermore, the present exemplary embodiment cumulatively stores the rotational radiuses L that have been periodically calculated.

In step S3229, the lens CPU 6808 determines whether the detection of the focusing state has been completed. If it is determined that the detection of the focusing state has been completed (YES in step S3229), then the processing advances to step S3230. On the other hand, if it is determined that the detection of the focusing state has not been completed (NO in step S3229), then the processing advances to step S3234.

In step S3234, the lens CPU 6808 determines whether the half-press of the release button 6804a has been released (the switch S1 is in an "off" state). If it is determined that the half-press of the release button 6804a has been released (YES in step S3234), then the processing returns to step S3201. In step S3201, the lens CPU 6808 waits until the photographer half-presses the release button 6804a. On the other hand, if it is determined that the half-press of the release button 6804a has not been released (NO in step S3234), then the processing returns to step S3203. In step S3203, the lens CPU 6808 determines whether an angular vibration correction target value for the gyro 6807p has been substantially acquired (whether the angular vibration can be corrected).

If it is determined again in step S3203 that the angular vibration cannot be corrected (NO in step S3203), then the processing advances to step S3228. In step S3229, the lens CPU 6808 determines again whether the detection of the focusing state has been completed.

Furthermore, if the correction of the angular vibration is ready, then the processing advances from step S3203 to step S3204. In step S3204, the lens CPU 6808 starts the correction of the angular vibration. In step S3205, the lens CPU 6808 determines whether the AF has been completed. If the flow advances in the above-described manner, AF has not been completed. Accordingly, the processing advances to step S3228. In step S3229, the lens CPU 6808 determines again whether the detection of the focusing state has been completed.

If it is determined that the detection of the focusing state has been completed (YES in step S3229), then the processing advances to step S3230. In step S3230, the lens CPU 6808 suspends the detection of the rotational radius L in order to prevent acquiring an inappropriate rotational radius L due to superposition, on the ACC output, of noise that may occur due to the driving of the lens for focusing, which is to be executed in the subsequent steps.

In step S3231, the lens CPU 6808 drives the lens for focusing. In step S3232, the lens CPU 6808 determines whether the driving of the lens has been completed. If it is determined that the driving of the lens has been completed (YES in step S3232), then the processing advances to step S3233. In step S3233, the lens CPU 6808 stops the driving of the lens.

On the other hand, if it is determined that the driving of the lens has not been completed (NO in step S3232), then the processing advances from step S3232 to steps S3234 and S3203, and then returns to step S3228 or advances from step S3232 to steps S3234, S3203, S3204, and S3205, and then returns to step S3228. Thus, the lens CPU 6808 executes the above-described steps as loop processing and waits until the driving of the lens is completed unless the half-press of the release button 6804a is released.

In step S3234, the lens CPU 6808 determines whether the half-press of the release button 6804a has been released after stopping the driving of the lens in step S3233. If it is determined that the half-press of the release button 6804a has not been released (NO in step S3234), then the processing returns to step S3203. In this case, the processing advances from step S3203 to steps S3204 and S3205. In step S3205, the lens CPU 6808 determines whether AF has been completed. If it is determined that AF has been completed (YES in step S3205), then the processing advances to step S3206. On the other hand, if it is determined that AF has not been completed (NO in step S3205), then the processing returns to step S3228, in which the lens CPU 6808 executes the focusing operation again.

In step S3206, the lens CPU 6808 cumulatively detects and stores the periodically calculated rotational radius L as in step S3228 in the above-described manner. If the processing has advanced from step S3228 to step S3206, the processing in step S3206 is not particularly executed because the detection of the rotational radius L has already been started in step S3228.

In step S3207, the lens CPU 6808 determines whether the camera is being panned. More specifically, with respect to the method of determining the panning status of the camera, the lens CPU 6808 determines that the camera is being panned (vibrated in a specific direction) if the output of the gyro 6807p has an angular velocity of a predetermined level (e.g., 3 deg/s) or larger for a predetermined time period (e.g., 0.5 seconds) or longer. Alternatively, the lens CPU 6808 can determine that the camera is being panned if the integral value of the gyro 6807p (the output of the HPF integration filter 301) has a predetermined angle (e.g., 1.5 deg) or larger for a predetermined amount time period (e.g., 0.2 seconds) or longer.

If it is determined that the camera is being panned (YES in step S3207), then the processing advances to step S3208. On the other hand, if it is determined that the camera is not being panned (NO in step S3207), then the processing advances to step S3211.

In step S3208, the lens CPU 6808 suspends the detection of the rotational radius L and the correction of the angular vibration in a direction indicated by the arrow 6803p (FIG. 2). This is because when the camera is being panned, the rotational radius L cannot be detected with high accuracy since vibration is not constant during panning. In addition, this is because the vibration angle is large during panning and thus the correction lens may reach the mechanical end if the correction of the angular vibration is executed, resulting in a degradation of accuracy in correcting image shake in the direction indicated by the arrow 6803y (FIG. 1) due to the mechanical restriction.

In step S3209, the lens CPU 6808 determines again whether the camera is being panned. If it is determined that the camera is being panned (YES in step S3209), then the processing advances to step S3211.

On the other hand, if it is determined that the panning has ended (NO in step S3209), then the processing advances to step S3210. In step S3210, the lens CPU 6808 resumes the detection of the rotational radius L and also resumes the correction of the angular vibration since the camera is being stably held by the photographer.

In step S3211, the lens CPU 6808 determines whether the half-press of the release button 6804a has been released (the switch S1 is in an "off" state). If it is determined that the half-press of the release button 6804a has been released, then the processing advances to step S3235. On the other hand, if it is determined that the half-press of the release button 6804a has not been released (NO in step S3211), then the processing advances to step S3212.

In step S3235, the lens CPU 6808 suspends the detection of the rotational radius L and resets the rotational radiuses L that have been cumulatively stored. Then, the processing advances to step S3225. This is because it is predicted that the capture condition is to be changed by shifting to capture of a different object or that the capture is to end since the half-press of the release button 6804a has been released. However, it is also useful if the lens CPU 6808 does not reset the stored rotational radius L if the photographer half-presses the release button 6804a again immediately after the release thereof (if the photographer half-presses the release button 6804a again within one second from the release thereof, for example).

In step S3225, the lens CPU 6808 waits for a predetermined length of time (e.g., four seconds). During the waiting period, the correction of the angular vibration is continued and both the gyro 6807p and the ACC 101p continue to operate. The lens CPU 6808 continues the correction of the angular vibration for a specific time period after the release of the release button 6804a in order to prepare to immediately respond when the photographer half-presses the release button 6804a again.

After the predetermined length of time has elapsed, the processing advances to step S3226. In step S3226, the lens CPU 6808 stops correcting the angular vibration. In step S3227, the lens CPU 6808 suspends the operation of the gyro 6807p and the ACC 101p. Then, the processing returns to step S3201.

If it is determined in step S3211 that the release button 6804a has been continuously half-pressed (YES in step S3211), then the processing advances to step S3212. In step S3212, the lens CPU 6808 determines whether the release button 6804a has been fully pressed (the switch S2 is in an "on" state). If it is determined that the release button 6804a has not been fully pressed (NO in step S3212), then the processing returns to step S3207 and repeats the above-described processing in step S3207 and beyond. More specifically, the lens CPU 6808 waits until the capture starts while correcting the angular vibration, detecting the rotational radius L, and determining whether the camera is being panned.

On the other hand, if it is determined that the release button 6804a has been fully pressed to start capture (YES in step S3212), then the processing advances to step S3213. In step S3213, the lens CPU 6808 suspends the operation for averaging the detected rotational radiuses L in order to prevent otherwise possible degradation of the accuracy of detecting the rotational radius L, which may occur due to disturbance applied on the ACC 101p during a vibration generating operation such as a mirror-up (or down) operation of the quick return mirror, increasing or decreasing of the aperture of the diaphragm, or the shutter opening/closing operation. In addition, the lens CPU 6808 averages the rotational radiuses L that have been detected during each period (the periods 2703 and 2704 (FIG. 27)).

In step S3214, the lens CPU 6808 determines whether the calculated rotational radius L is appropriate. If it is determined that the calculated rotational radius L is appropriate (YES in step S3214), then the processing advances to step S3215. On the other hand, if it is determined that the calculated rotational radius L is not appropriate (NO in step S3214), then the processing advances to step S3236.

The determination in step S3214 as to whether the calculated rotational radius L is appropriate is executed as to the following three points:

i) whether the length of the time period for detecting the rotational radius L is short, ii) whether the calculated rotational radius L is greater than a predetermined value, iii) whether the state in which the angular velocity is less than or equal to a predetermined level has continued for a specific long period of time.

With respect to the point (i), the lens CPU 6808 determines that the result of calculating the rotational radius L is not appropriate if the length of time for calculating the rotational radius L is not long enough because the length of the time period is short from the time at which it is determined that the release button 6804a has been half-pressed in step S3201 to the time at which it is determined that the release button 6804a has been fully pressed in step S3212.

With respect to the point (ii), the lens CPU 6808 determines that the result of calculating the rotational radius L is not appropriate if the detected rotational radius L exceeds a predictable upper limit value (e.g., an estimate of the distance from the principal point of the photographic lens to the waist of a typical photographer) due to a cause such as disturbance.

With respect to the point (iii), the lens CPU 6808 determines that the result of calculating the rotational radius L is not appropriate if the angular velocity output (or the angle output calculated by integrating the angular velocity output) is smaller than a predetermined value because the camera is in a stable state on a tripod. This is because if the rotational radius L is calculated by using the expression (8) in this state, an extremely great rotational radius L may be acquired due to a calculation error.

The rotational radius L of the initial value is not limited to the distance from the eyepiece unit of the camera to the principal point of the imaging optical system. That is, a value "0" can be used, for example. In this case, the parallel vibration is not corrected.

In the present exemplary embodiment, the rotational radius L is calculated before starting capture. Furthermore, the method is primarily described in which the output correction unit 309 corrects the output of the gyro based on the averaged rotational radius L. However, if the real time correction method, in which the rotational radius L is calculated and the output correction unit 309 corrects the output of the gyro, is used, and if any of the above-described conditions 1) through 3) is satisfied, it is useful to calculate an initial value as the rotational radius L.

Furthermore, if the method in which the rotational radius L is previously calculated is used or if the above-described real time correction method is used, the present exemplary embodiment does not calculate a rotational radius L with the comparison unit 308 if a drive mechanism such as a lens driving unit, a diaphragm, a mirror, or a shutter is driven.

However, if the calculation of the rotational radius L is continued while the drive mechanism is currently operated and if the above-described condition 2) is satisfied (if the rotational radius L is greater than a predetermined value), or if the drive mechanism is being operated, then the correction reliability determination unit determines that the output of the comparison unit is not appropriate. In this case, it is useful if the initial value is used as the rotational radius L.

If it is determined that the calculated rotational radius L is not appropriate in step S3214 (NO in step S3214), then the processing advances to step S3236. In step S3236, the lens CPU 6808 uses a rotational radius provided as an initial value for the rotational radius L if the camera is in the above-described state. Here, the rotational radius L provided as the initial value refers to the distance from the eyepiece unit of the camera to the principal point of the imaging optical system as illustrated in FIG. 31.

In step S3215, the lens CPU 6808 determines whether the camera is being panned as in step S3207. If it is determined that the camera is being panned (YES in step S3215), then the processing advances to step S3217. On the other hand, if it is determined that the camera is not being panned (NO in step S3215), then the processing advances to step S3216.

If it is determined that the camera is being panned in step S3215, the lens CPU 6808 has already suspended the correction of the angular vibration in step S3208. Accordingly, the correction of the angular vibration is not currently executed.

In step S3217, the lens CPU 6808 starts a charge accumulation operation with the image sensor 6805. However, because the shutter is not opened at this time, the light flux of the actual object has not been incident to the image sensor 6805 yet.

In step S3218, the lens CPU 6808 executes the mirror-up operation of the quick return mirror, drives the diaphragm of the lens, and opens the shutter. As described above, the lens CPU 6808 starts the accumulation of the light flux of the object to be formed on the image sensor 6805.

In step S3219, the lens CPU 6808 waits until a capture time period appropriate for exposure comes. In step S3220, the lens CPU 6808 suspends the correction of the parallel vibration after the exposure is completed.

In this case, the suspension of the correction of parallel vibration is not executed since the processing in step S3216, (which is to be described in detail below), is skipped because it is determined that the camera is being panned in step S3215 (in this case, the correction of the parallel vibration has not been executed in this case). In step S3221, the lens CPU 6808 closes the shutter, drives the diaphragm of the lens to the initial state, and executes the mirror-down operation of the quick return mirror.

As described above, if it is determined that the camera is being panned in step S3215, the lens CPU 6808 executes control for capture without correcting the angular vibration or the parallel vibration.

On the other hand, if it is determined that the camera is not being panned (NO in step S3215), then the processing advances to step S3216. In step S3216, the lens CPU 6808 starts the correction of the parallel vibration according to the rotational radius L calculated in step S3213. In step S3217, the lens CPU 6808 starts the charge accumulation on the image sensor 6805 and repeats the processing from step S3218 to step S3221.

As described above, if it is determined that the camera is not being panned in step S3215, it is determined that the correction of the angular vibration has been executed in step S3204 or that the correction of the angular vibration has been resumed in step S3210. Accordingly, during the exposure (during the accumulation of the light flux from the object), the lens CPU 6808 executes both the correction of the angular vibration and the correction of the parallel vibration.

In step S3222, the lens CPU 6808 displays information acquired by the image sensor 6805 on a liquid crystal display (LCD) monitor provided on the back side of the camera and records the information on a recording medium. In step S3223, the lens CPU 6808 determines whether the full press of the release button 6804a is released (i.e., waits until the full press of the release button 6804a is released).

If it is determined that the full press of the release button 6804a is released (YES in step S3223), then the processing advances to step S3224. In step S3224, the lens CPU 6808 determines whether the half-press of the release button 6804a has been released. If it is determined that the half-press of the release button 6804a has not been released (NO in step S3224), then the processing returns to step S3206, in which the lens CPU 6808 repeats the above-described processing in step S3206 and beyond. More specifically, in this case, the lens CPU 6808 detects the rotational radius L until the half-press of the release button 6804a is released while waiting for the release button 6804a to be fully pressed. In steps S3225 and beyond, the lens CPU 6808 executes the above-described processing.

An operation executed for starting the correction of the angular vibration in step S3204 and the correction of parallel vibration in step S3216 is described in detail below.

Figure 33:
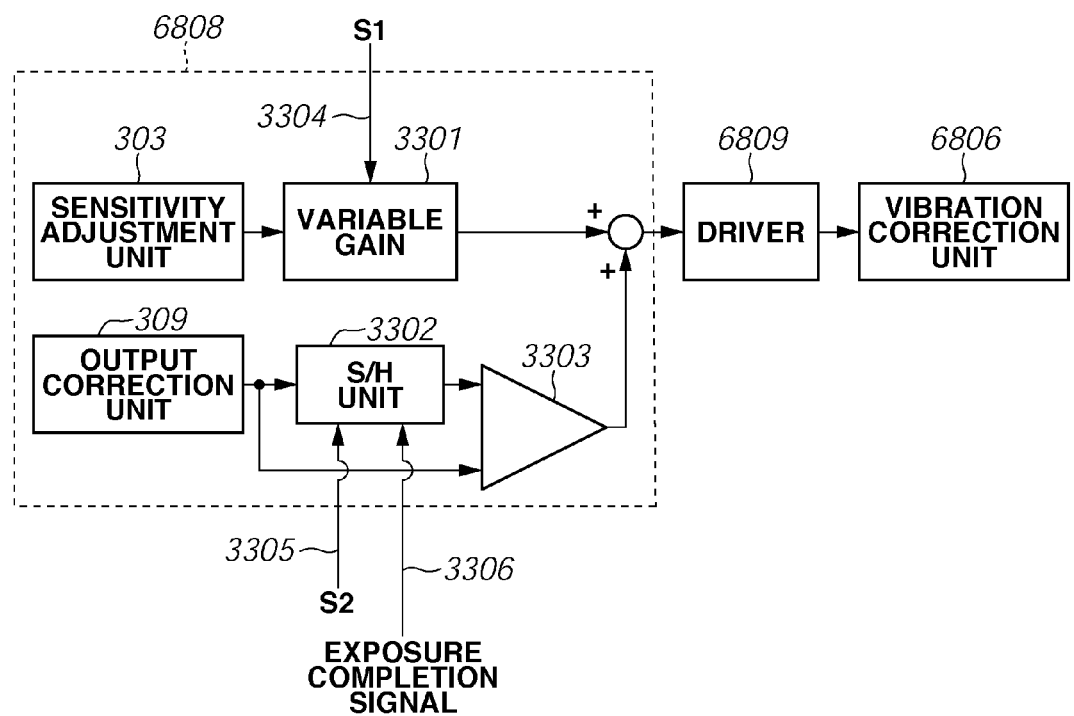
FIG. 33 illustrates an example of a signal processing system that drives a vibration correction unit according to the first exemplary embodiment of the present invention.

FIG. 33 is a block diagram illustrating an example of a signal processing system. Details of an exemplary operation for inputting the angular vibration correction target value and the parallel vibration correction target value to the driving unit 6809, which drives the vibration correction unit 6806, are described below with reference to FIG. 33.

In the example illustrated in FIG. 33, blocks provided upstream of the sensitivity adjustment unit 303, which is configured to output an angular vibration correction target value, and the output correction unit 309, which is configured to output the parallel vibration correction target value, are omitted. In the example illustrated in FIG. 33, a sample holding (S/H) unit 3302 and a differential unit 3303 are illustrated as analog blocks for easier illustration and understanding although the entire operation to be described here is executed by calculation using software.

The angular vibration correction target value output from the sensitivity adjustment unit 303 is input to a variable gain unit 3301. The variable gain unit (variable gain amplifier)

3301 changes the gain of the angular vibration correction target value from "0" to "1" in 0.5 seconds when a "switch S1 on" signal 3304 is input by the half-press of the release button 6804a.

Thus, the accuracy of correcting the angular vibration can increase after 0.5 seconds of the half-press of the release button 6804a. In the present exemplary embodiment, the gain is minutely and gradually changed in order to prevent the photographer from perceiving a large anomaly on the screen of the finder according to the current state of the hand shake if the correction of the image shake rapidly starts immediately after the half-press of the release button 6804a. The operation for changing the gain is described in detail below with reference to FIG. 34.

To prevent a rapid variation of the screen of the finder that may otherwise occur due to rapid suspension of the correction of the image shake, the variable gain amplifier 3301 changes the gain of the angular vibration correction target value from "1" to "0" in 0.5 seconds after the elapse of a predetermined time period (e.g., four seconds) after the release of the half-press of the release button 6804a.

In the present exemplary embodiment, the lens CPU 6808 suspends the correction of the image shake after elapse of a predetermined time period from the half-press of the release button 6804a, as described above, in order to prepare for continuing the correction of the image shake if the release button 6804a is half-pressed again, as described above in step S3225 (FIG. 32).

The parallel vibration correction target value output from the output correction unit 309 is input to both the S/H unit 3302 and the differential unit 3303. The differential unit 3303 outputs a differential value between the output of the S/H unit 3302 and the parallel vibration correction target value.

More specifically, the output from the S/H unit 3302 is "0" because during sampling, the two signals input to the differential unit 3303 are equivalent to each other. A "switch S2 on" signal 3305, which is output when the release button 6804a is fully pressed, is also input to the S/H unit 3302. When the "switch S2 on" signal 3305 is input, the S/H unit 3302 sample-holds the parallel vibration correction target value.

Accordingly, at this point in time, the output of the S/H unit 3302 is fixed. Furthermore, in this case, the output of the differential unit 3303 is output serially and continuously from "0" in synchronization with the full press of the release button 6804a (the input of the "switch S2 on" signal 3305). The output of the differential unit 3303 is described in detail below with reference to the waveform illustrated in FIG. 34.

Furthermore, an exposure completion signal 3306 is also input to the S/H unit 3302. When the exposure completion signal 3306 is input to the S/H unit 3302, the S/H unit 3302 sample-holds the parallel vibration correction target value again. Accordingly, the output of the differential unit 3303 becomes "0" in synchronization with the completion of the exposure.

Figure 34:
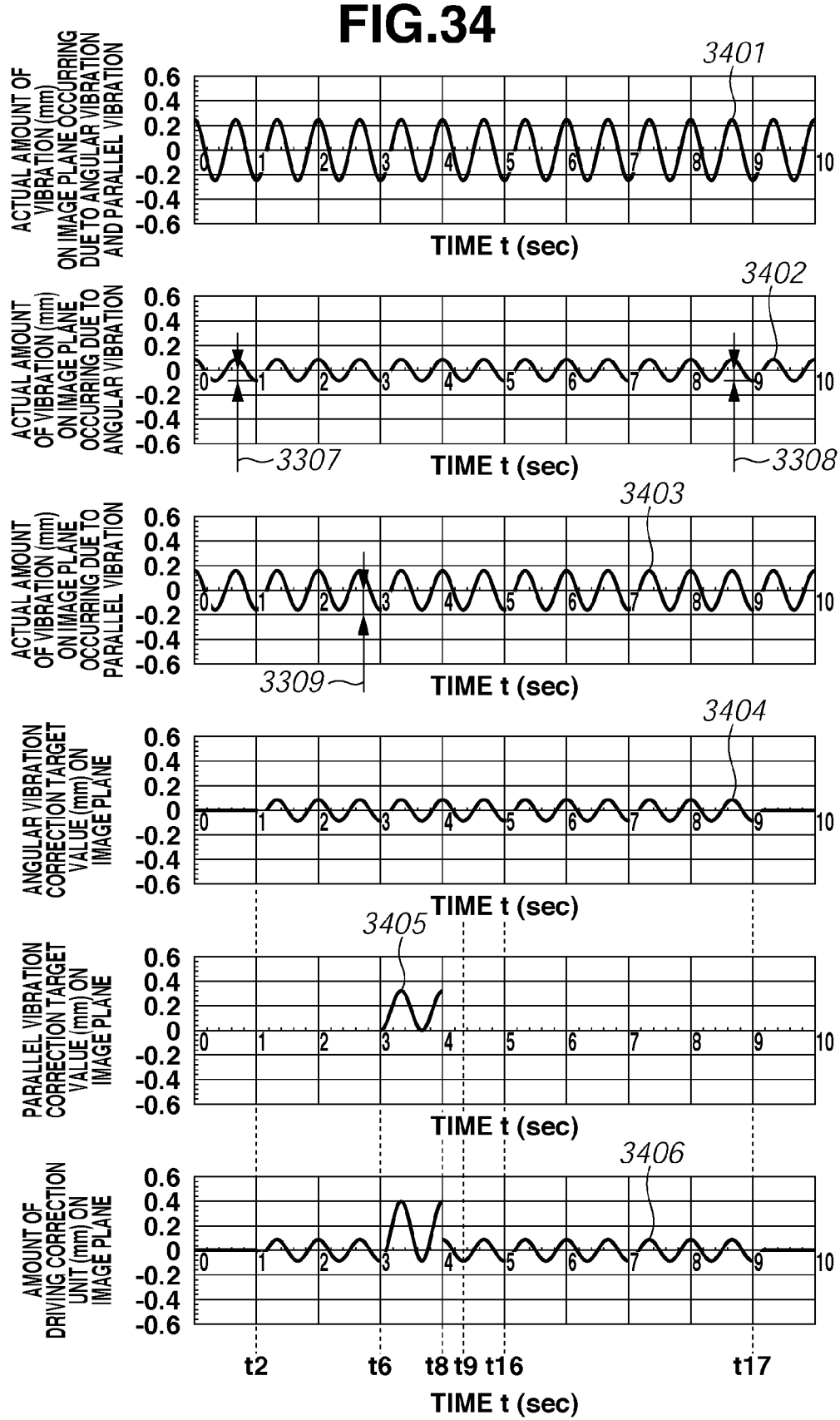
FIG. 34 illustrates an exemplary waveform for driving the vibration correction unit according to the first exemplary embodiment of the present invention.

FIG. 34 illustrates the above-described processing with a vibration waveform. In the example illustrated in FIG. 34, the elapsed time is shown on the horizontal axis. The amount of vibration on the image plane calculated by converting the amount of vibration or the correction amount thereof is shown on the vertical axis.

In the example illustrated in FIG. 34, timings t2, t6, t8, t9, t16, t17 are similar to those illustrated in FIG. 30.

Referring to FIG. 34, a waveform 3401 indicates the amount of vibration on the image plane that may occur due to the angular vibration and the parallel vibration, which is indicated as a cosine wave for easier understanding. A waveform 3402 indicates a component, of the waveform 3401, of the amount of vibration on the image plane that may occur due to the angular vibration. A waveform 3403 indicates a component, of the waveform 3401, of the amount of vibration on the image plane that may occur due to the parallel vibration.

A waveform 3404 indicates a conversion value of the angular vibration correction target value output from the variable gain amplifier 3301 (FIG. 33) on the image plane, which is the target value of correcting the vibration indicated with the waveform 3402. As can be seen from the waveform 3404, the present exemplary embodiment acquires an appropriate gain of the angular vibration correction target value in a predetermined time (e.g., 0.5 seconds) from the half-press of the release button 6804a (the time t2).

On the waveform 3402, a predetermined vibration amount 3307 is acquired at time t2. If the correction of the image shake is started in this state, then the vibration correction unit 6806 is rapidly driven from the "0" position. In this case, the finder screen may be greatly vibrated. To prevent this, the present exemplary embodiment gradually sets the gain of the angular vibration correction target value to an appropriate value at time t2 as illustrated with the waveform 3404.

Furthermore, when the half-press of the release button 6804a is released at time t16 and four seconds passes after that, namely, at time t17, the present exemplary embodiment gradually reduces the gain of the angular vibration correction target value to finally cause the gain to converge at "0".

On the waveform 3402, a predetermined vibration amount 3308 is acquired at time t17. If the correction of the image shake is rapidly suspended, then the vibration correction unit 6806 is rapidly driven from the correction position to the "0" position. In this case, the finder screen may be greatly vibrated. In this regard, the present exemplary embodiment prevents the rapid variation on the screen by gradually reducing the gain from time t17.

A waveform 3405 indicates a value acquired by converting the parallel vibration correction target value output from the differential unit 3303 (FIG. 33) on the image plane. The waveform 3405 is a target value for correcting the vibration indicated with the waveform 3403.

As described above, the output of the differential unit 3303 is serially and continuously output from "0". That is, the waveform 3405 is different from an output 3309 at time t6 on the waveform 3403. Accordingly, the present exemplary embodiment can prevent failure of appropriately correcting the parallel vibration when the vibration correction unit 6806 cannot respond before the start of the exposure if the correction of the vibration rapidly starts as illustrated with the output 3309 at time t6.

As described above with reference to FIG. 33, when the exposure ends, the lens CPU 6808 causes the S/H unit 3302 to start sample-holding again. In this case, the output of the differential unit 3303 becomes "0". Accordingly, the output of the parallel vibration correction target value becomes "0" when the exposure ends at time t8.

In this regard, although the vibration correction unit 6806 suspends the correction of the parallel vibration, the image is not affected because the exposure has already been completed. Furthermore, because the mirror-up operation is currently being executed, the rapid suspension of the correction of the parallel vibration cannot be perceived by the photographer on the screen.

To prevent the photographer from perceiving unnatural vibration on the screen, it is useful if the start and the suspension of the correction of the image shake are continuously executed. In this regard, particularly when the screen cannot be viewed by the photographer as described above, the present exemplary embodiment quickly prepares for a subsequent operation by rapidly suspending the correction of the parallel vibration.

At time t9, the mirror-up operation of the quick return mirror is completed (the shutter has already been completed at time t8). At this point in time, a predetermined time (e.g., 100 ms) has already elapsed since the suspension of the correction of the parallel vibration. Accordingly, a anomaly on the screen occurring due to the suspension of the correction of the parallel vibration cannot be recognized by the photographer.

A waveform 3406 indicates a value of the amount of driving of the vibration correction unit 6806 converted on the image plane. The waveform 3406 is roughly equivalent to a combined waveform of the waveform 3404 and the waveform 3405.

With respect to the driving amount of the vibration correction unit 6806, the correction of the angular vibration gradually starts at time t2. In addition, the correction of the angular vibration and the correction of the parallel vibration serially start at time t6.

At time t8, the lens CPU 6808 suspends the correction of the parallel vibration. At time t9, the lens CPU 6808 executes the mirror-down operation of the quick return mirror. At time t16, the half-press of the release button 6804a is released. At time t17, which is a time four seconds after the time t16, the lens CPU 6808 starts the suspension of the correction of the angular vibration.

As described above, the lens CPU 6808 executes control to serially start the correction of the angular vibration and the correction of the parallel vibration. Accordingly, the vibration correction unit 6806 can always securely execute the correction of image shake.

As described above, the lens CPU 6808 suspends the operation for averaging the detected rotational radiuses L in step S 3213, to prevent otherwise possible degradation of the accuracy of detecting the rotational radius L, which may occur due to disturbance applied on the ACC 101p during a vibration generating operation such as a mirror-up (or down) operation of the quick return mirror, increasing or decreasing of the aperture of the diaphragm, or the shutter opening/closing operation. This phenomenon is described in detail below with reference to FIG. 35.

Figure 35:
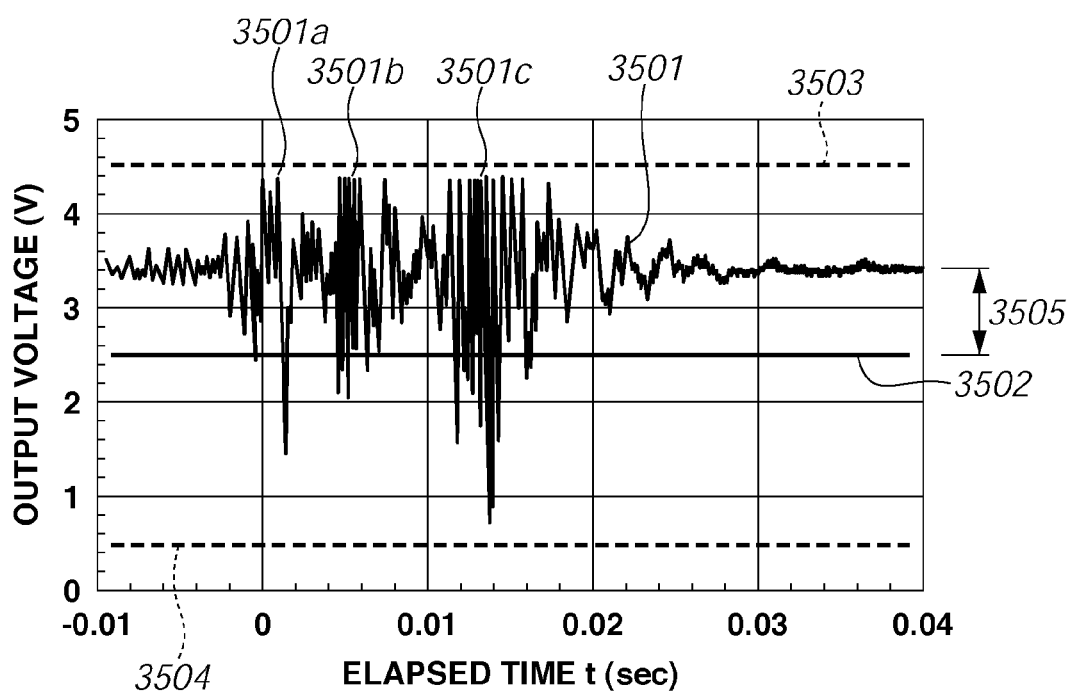
FIG. 35 illustrates an exemplary waveform of an output from the accelerometer according to the first exemplary embodiment of the present invention.

FIG. 35 illustrates an example of a waveform of the ACC 101p when the quick return mirror is operated and the shutter is driven. In the example illustrated in FIG. 35, the elapsed time is shown on the horizontal axis. The output voltage of the ACC 101p is placed on the vertical axis.

Referring to FIG. 35, the ACC 101p is driven at a voltage of 5 V. An output waveform 3501 is superposed with a bias voltage 3505 compared with a reference voltage 3502. The bias voltage 3505 indicates that the ACC 101p is subjected to gravity of 1 G.

The 1 G gravity is always applied on the ACC 101p (FIG. 31) to detect the parallel vibration (or the rotational radius L). Accordingly, the acceleration output equivalent to 1 G gravity is output as the bias voltage 3505. The acceleration outputable voltage of the ACC 101p ranges from 0.5 to 4.5 V as represented in FIG. 35 by broken lines 3503 and 3054. The output may be saturated outside the range.

With respect to the waveform 3501 of the ACC 101p, the acceleration detectable range of the ACC 101p has become narrow due to the bias voltage 3505, which is equivalent to the 1 G gravity. Furthermore, a large vibration acceleration is applied to the ACC 101p due to the driving of the quick return mirror, the shutter, or the diaphragm. Accordingly, in waveform segments 3501a, 3501b, and 3501c, the output is saturated at the timing of driving of the mirror and the shutter.

This problem can be solved by using an ACC having a wide detection range. However, if such an ACC is used, parallel vibration acceleration cannot be detected with high accuracy because the accuracy of detecting a microacceleration of such an ACC is low. Accordingly, instead of using an ACC having a wide detection range but whose micro-acceleration detection accuracy is low, in the present embodiment the rotational radiuses L acquired during time periods other than the time periods in which the quick return mirror, the shutter, or the lens is driven are averaged and the average of such the rotational radiuses L is used. The present embodiment is believed to provide an accuracy of correcting the parallel vibration that is higher than that in the case of using an ACC having a wide detection range.

In this regard, the present exemplary embodiment uses an ACC, as the ACC 101p, which is capable of detecting the parallel vibration with high accuracy although whose detection range is restricted due to possible saturation of the acceleration output (i.e., as described above, the acceleration output in the time period of the saturation is not to be used as described above), which may occur when the quick return mirror, the shutter, the diaphragm, or the lens is driven.

As described above with reference to FIG. 11, the rotational radius L refers to the distance from the rotational center 1102p to the ACC 101p. The distance is equivalent to the distance from the rotational center 1102p to the principal point of the imaging optical system because the ACC 101p is disposed at the principal point of the imaging optical system.

A parallel vibration may occur due to the displacement of the principal point of the imaging optical system. Accordingly, the displacement of the principal point of the imaging optical system can be calculated by multiplying the rotational radius L by the angle output, which is calculated by integrating the output of the gyro 6807p. Thus, the present exemplary embodiment can calculate the parallel vibration correction target value.

Meanwhile, although not described above, the position of the lens on the optical axis actually changes due to the operation for focusing on the object. Due to the change of the lens position on the optical axis, the principal point of the imaging optical system may be displaced from the location of installation of the ACC 101p. Accordingly, in order to calculate the displacement of the principal point of the imaging optical system, it is necessary to correct the rotational radius L according to the displacement between the principal point of the imaging optical system and the installation location of the ACC 101p.

Figure 36:
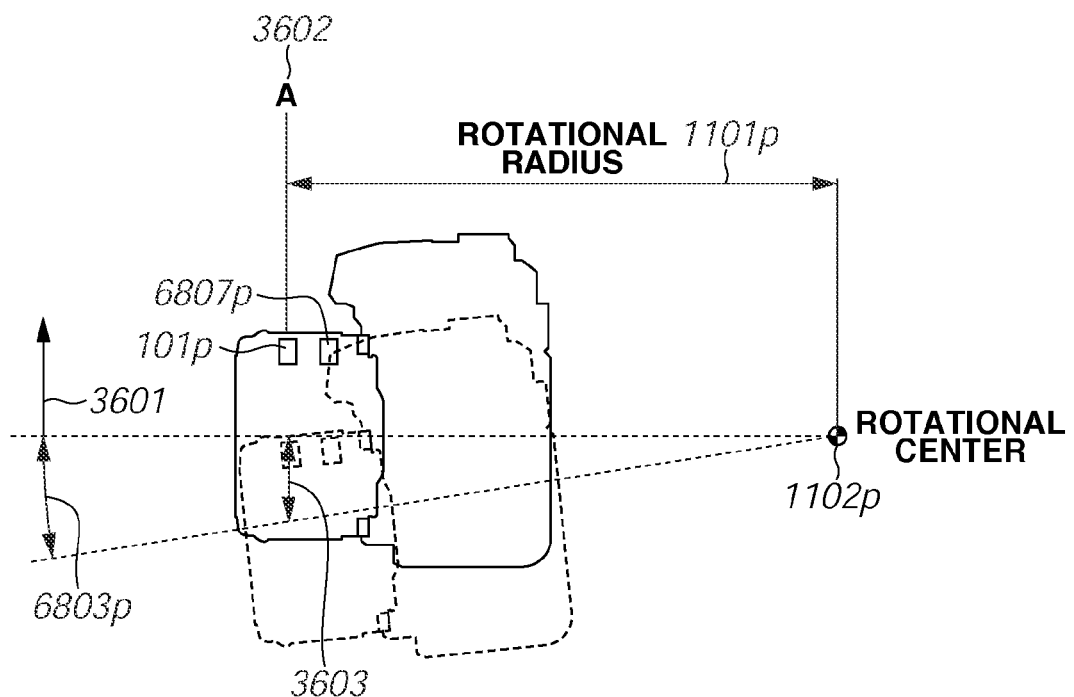
FIG. 36 illustrates exemplary vibration of a camera according to the first exemplary embodiment of the present invention.
Figure 37:
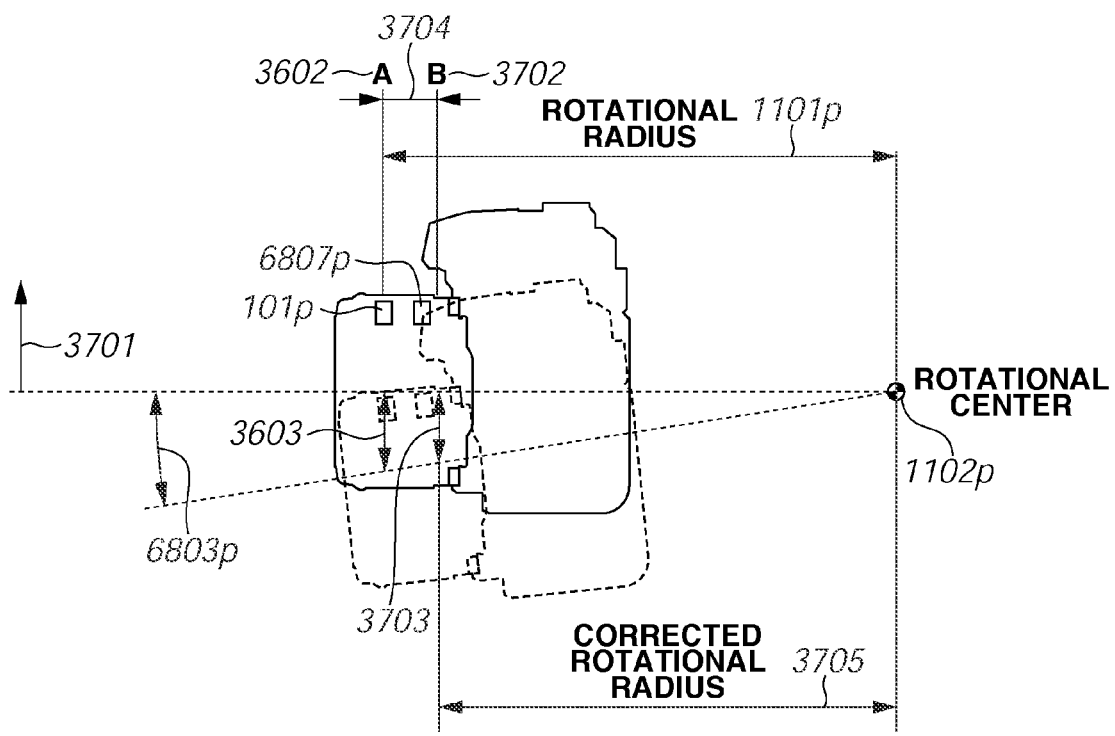
FIG. 37 illustrates exemplary vibration of a camera according to the first exemplary embodiment of the present invention.

FIGS. 36 and 37 each illustrate the state of the camera that is vibrated in the above-described case. In the examples illustrated in FIGS. 36 and 37, the distance between the lens and the object 3601 is different from the distance between the lens and the object 3701.

Referring to FIG. 36, when the photographer desires to photograph an object 3601, a principal point A 3602 of the entire imaging optical system exists at the same position as that of the ACC 101p on the optical axis when the imaging optical system is driven and adjusted to the focusing position. Accordingly, the lens CPU 6808 calculates the rotational radius L 1101p according to the output of the ACC 101p and the output of the gyro 6807p. Furthermore, the lens CPU 6808 calculates a parallel vibration amount 3603 using the rotational radius L 1101p and the output of the gyro 6807p by calculation with the second term of the right side of the expression (4).

Referring to FIG. 37, the object 3701 is more distant from the lens compared with the object 3601 (FIG. 36). A principal point B 3702 of the entire imaging optical system is displaced from the installation location of the ACC 101p by a displacement amount 3704 when the imaging optical system is driven and adjusted to the focusing position. Accordingly, in this case, if the rotational radius L 1101p were to be calculated based on the output of the ACC 101p and the output of the gyro 6807p, the parallel vibration amount 3703 at the lens principal point in FIG. 37 could not be calculated.

In this regard, the lens CPU 6808 calculates a modified rotational radius 3705 by subtracting a displacement amount 3704 from the rotational radius L 1101p, which is calculated based on the output of the ACC 101p and the output of the gyro 6807p. Furthermore, the lens CPU 6808 calculates the parallel vibration amount 3703 at the lens principal point B 3702 by a calculation using the second term of the right side of the expression (4) based on the modified rotational radius L 3705 and the output of the gyro 6807p. Thus, the lens CPU 6808 corrects the rotational radius L according to the object distance.

To calculate the parallel vibration at the principal point of the photographic lens, it is beneficial to dispose the ACC 101p at the principal point. Accordingly, it becomes unnecessary to execute the above-described correction processing if the installation location of the ACC 101p can be changed even if the principal point of the photographic lens is changed due to the focusing operation.

In this regard, for example, if the ACC 101p is mounted on the lens, which is to be moved towards the object side during focusing, the amount of movement of the principal point and that of the ACC can be made identical to each other. However, in this case, the configuration of the imaging optical system may become complicated. In addition, the size of the entire lens unit may become large.

In this regard, by executing the correction described with reference to FIG. 37, the parallel vibration amount at the principal point, which may change, can be calculated when the ACC 101p is fixedly mounted on the camera. The correction can be executed by detecting the position of the focusing lens with a focus encoder, calculating the principal point of the imaging optical system based on the detection result, and calculating the displacement with the installation location of the ACC 101p.

The output correction unit 309 (FIG. 3) calculates the parallel vibration correction target value by multiplying the angle output whose gain has been adjusted by the rotational radius L and the imaging magnification. In addition, the output correction unit 309 also corrects the rotational radius L in the above-described manner.

Figure 38:
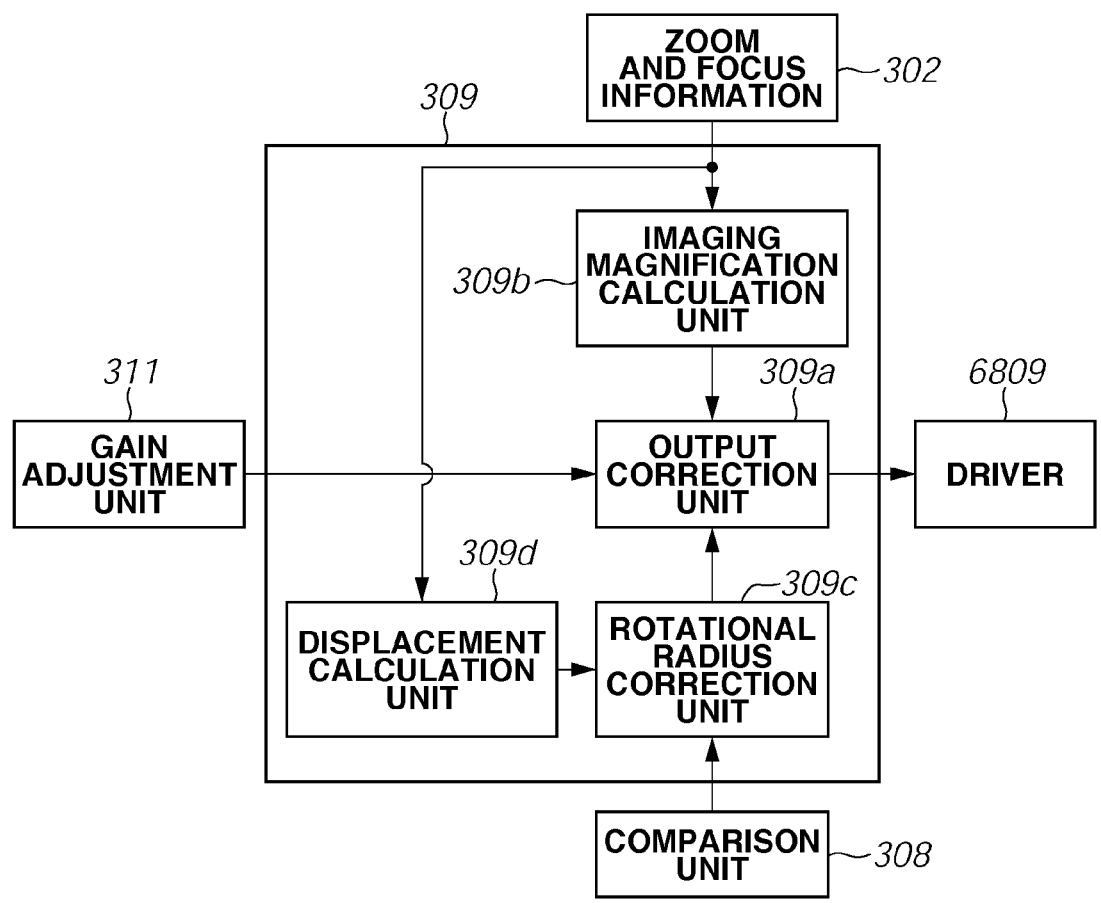
FIG. 38 illustrates an exemplary inner configuration of an output correction unit according to the first exemplary embodiment of the present invention.

FIG. 38 is a block diagram illustrating an exemplary inner configuration of the output correction unit 309 according to the present exemplary embodiment. Referring to FIG. 38, an imaging magnification calculation unit 309b calculates the imaging magnification based on information about the lens zoom position and the lens focusing position from a lens encoder included in the zoom and focus information 302.

A displacement calculation unit 309d calculates the displacement between the principal point of the imaging optical system and the installation location of the ACC based on the zoom and focus information 302 at the same time. Information about the rotational radius L calculated by the comparison unit 308 is corrected within the output correction unit 309 by using a rotational radius correction unit 309c based on the output from the displacement calculation unit 309d. Accordingly, the rotational radius L is corrected to the rotational radius L from the principal point of the imaging optical system to the rotational center at the current time, instead of the rotational radius L from the installation location of the ACC 101p to the rotational center.

An output correction unit 309a multiplies the output of the gain adjustment unit 311 by the corrected rotational radius L and the imaging magnification to calculate the parallel vibration correction target value. The rotational radius L is corrected at the timing of executing the processing in step S3213 (FIG. 32).

In step S3213, the lens CPU 6808 calculates the corrected rotational radius L from the principal point of the imaging optical system to the rotational center by subtracting the average value of the rotational radius L from the installation location of the ACC 101p to the rotational center from the distance between the installation location of the ACC 101p to the principal point of the imaging optical system under the capture condition. In step S3214, the lens CPU 6808 determines whether the calculated corrected rotational radius L is accurate. In step S3216, the lens CPU 6808 uses the corrected rotational radius L to correct the parallel vibration.

With the configuration illustrated in FIG. 38, the installation location of the ACC 101p can be freely determined and the ACC 101p can be installed at a position different from the position in the vicinity of the principal point of the imaging optical system. In addition, with the above-described configuration, the present exemplary embodiment can execute simple correction to correct the vibration even if the principal point of the imaging optical system is changed.

Furthermore, the present exemplary embodiment having the above-described configuration can suppress or at least reduce the influence from the gravitational error superposed on the ACC and the influence from drifting of the camera by using the frequency band used for comparison of the output of the gyro and the ACC that is narrower than the band used for correcting the vibration. Accordingly, the present exemplary embodiment can implement a small-sized image stabilization system having a high mobility and operability, which stably operates in the case of macro capture by a camera or a video camera and capable of correcting the parallel vibration with high accuracy.

A second exemplary embodiment of the present invention is described below. In the above-described first exemplary embodiment, the gain of the output of the gyro (integral angle output) used for correcting the parallel vibration is adjusted by the gain adjustment unit 311 for each frequency in order to suppress the influence from the change of rotational radiuses L occurring in relation to the vibration frequency as illustrated in FIG. 20.

In this regard, the rotational radius L does not always depend on the frequency as illustrated in FIG. 20 in all cases. For example, if the photographer holds the camera while crouching himself or if the photographer executes capture while fixing his elbow (on a desk, for example), the gain of the rotational radius L does not increase (the rotational radius L does not become long) as the frequency becomes lower as illustrated in FIG. 20.

If the gain adjustment unit 311 is used in this case, the parallel vibration in the low frequency is over-corrected. As a result, in this case, the amount of vibration may increase in the frequency band.

In this regard, in the present exemplary embodiment, the change of the rotational radius L is detected for each frequency and the lens CPU 6808 determines whether the gain adjustment unit 311 is to be used according to a result of the detection.

Figure 39:
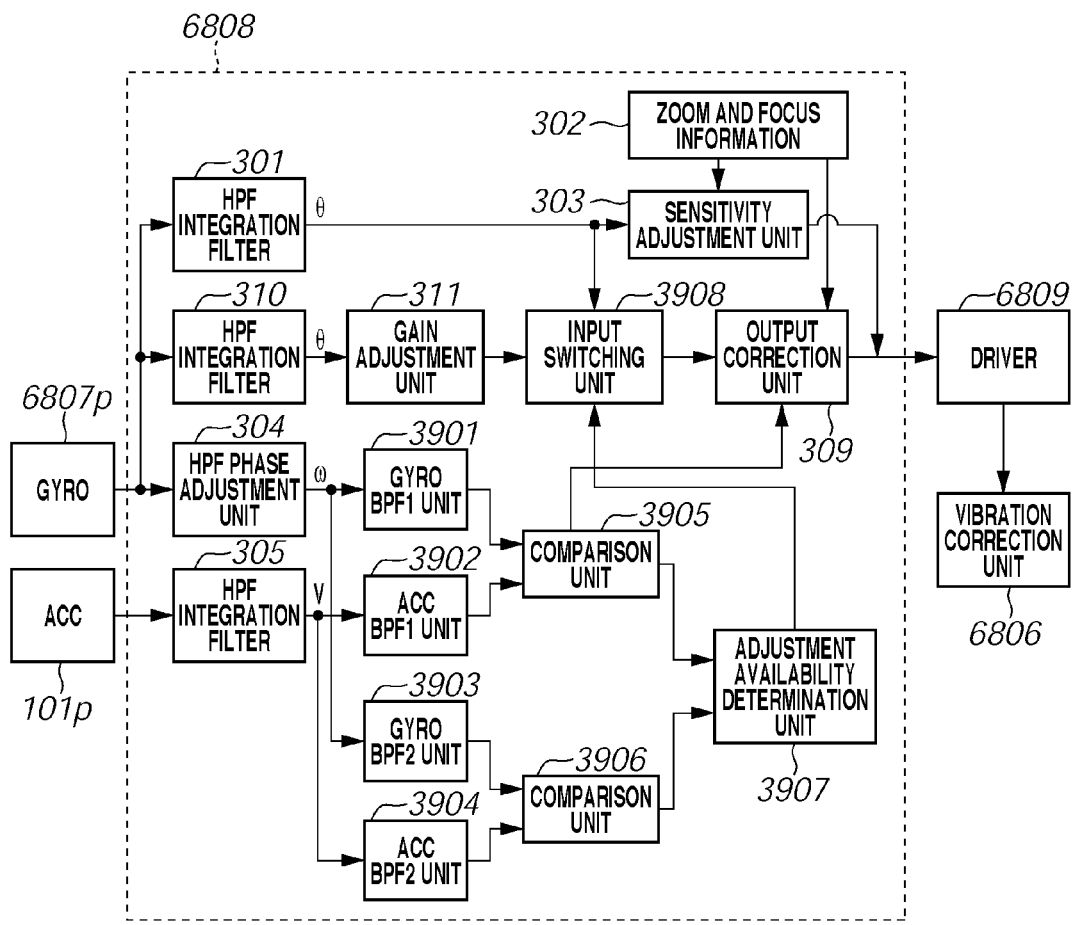
FIG. 39 illustrates an exemplary configuration of an image stabilization control apparatus according to a second exemplary embodiment of the present invention.

FIG. 39 is a block diagram illustrating an exemplary configuration of an image stabilization control apparatus included in a single-lens reflex camera according to the present exemplary embodiment. The external appearance of the camera is similar to that illustrated in FIGS. 1 and 2.

The image stabilization control apparatus according to the present exemplary embodiment includes a BPF unit(s) for the gyro 6807$p$, a BPF unit(s) for the ACC 101$p$, and a unit configured to determine whether to adjust the rotational radius L for each frequency in addition to the configuration of the image stabilization control apparatus (FIG. 3) according to the first exemplary embodiment, to recognize the tendency of the variation of the rotational radius L for each frequency. In addition, the image stabilization control apparatus according to the present exemplary embodiment includes an input switching unit. The input switching unit is configured to control the execution of adjustment of the rotational radius L for each frequency after determining whether the rotational radius L is to be adjusted for each frequency.

Referring to FIG. 39, a gyro BPF 1 unit 3901 is a filter for extracting an angular velocity output at the frequency of 5 Hz as the gyro BPF unit 306 (FIG. 3). An ACC BPF 1 unit 3902 is a filter for extracting a velocity output at the frequency of 5 Hz as the ACC BPF unit 307 (FIG. 3).

A comparison unit 3905 calculates a rotational radius L at 5 Hz based on the angular velocity output and the velocity output. A gyro BPF 2 unit 3903 is a filter for extracting an angular velocity output at 1 Hz. An ACC BPF 2 unit 3904 is a filter for extracting a velocity output at 1 Hz.

A comparison unit 3906 calculates a rotational radius L at 1 Hz based on the angular velocity output and the velocity output. An adjustment availability determination unit 3907 compares the outputs of the comparison unit 3905 and the comparison unit 3906.

As described above in the first exemplary embodiment, generally, the rotational radius L in a high frequency is smaller than that in a low frequency. Accordingly, if the rotational radius L at 5 Hz, which is the output of the comparison unit 3905, is smaller than the rotational radius L at 1 Hz, which is the output of the comparison unit 3906, the adjustment availability determination unit 3907 determines that the camera is in the state described above in the first exemplary embodiment.

In this case, the adjustment availability determination unit 3907 outputs the result to the input switching unit 3908. The input switching unit 3908 outputs the output of the gain adjustment unit 311 to the output correction unit 309. In the above-described manner, the adjustment availability determination unit 3907 generates a parallel vibration correction target value, which is equivalent to the rotational radius L that changes frequency to frequency.

If the rotational radius L at 1 Hz, which is the output of the comparison unit 3906, and the rotational radius L at 5 Hz, which is the output of the comparison unit 3905, are the same or if the rotational radius L at 5 Hz is greater than the rotational radius L at 1 Hz, then the adjustment availability determination unit 3907 determines that the camera is in a state different from the state described above in the first exemplary embodiment.

The adjustment availability determination unit 3907 outputs the result to the input switching unit 3908. The input switching unit 3908 outputs the output of the HPF integration filter 301 to the output correction unit 309. More specifically, the adjustment availability determination unit 3907 generates a parallel vibration correction target value that bypasses the gain adjustment unit 311.

As described above with reference to FIG. 22, the output of the HPF integration filter 310 has a characteristic different from that of a normal HPF integration filter 301 to correct the characteristic of the gain adjustment unit 311. Accordingly, the present exemplary embodiment does not use the output of the HPF integration filter 310. With the above-described configuration, the present exemplary embodiment can optimally correct the parallel vibration according to the condition of the capture by the photographer.

In the first exemplary embodiment, the lens CPU 6808 calculates the parallel vibration correction target value using the average value of the rotational radiuses L that has been calculated before the start of the capture. In this regard, however, if the time period for calculating the rotational radius L is long as in the case where the time of observing the object is long, then the state of the vibration at the time immediately before starting capture may become different from the state of vibration at the start of the object observation.

In this regard, for example, the magnitude of the rotational radius L itself may vary due to the change in the manner of holding the camera. In addition, the relationship between the frequency and the rotational radius L at the time immediately before starting capture may become different from that at the time of start of object observation.

Considering these cases, it is useful if an average value of the rotational radiuses L is updated for each predetermined time period instead of using the average value of the rotational radiuses L calculated by the time immediately before the capture.

In the example illustrated in FIG. 27, the lens CPU 6808 compares the velocity outputs V 2717 through 2723 with respect to each of angular velocity outputs ω 2710 through 2716, each of which is detected during a predetermined period. Furthermore, the lens CPU 6808 calculates the rotational radius L by calculating an angular velocity output ω and a velocity output V for each time period.

In the example illustrated in FIG. 28, the lens CPU 6808 compares the velocity peak outputs V 2807 through 2809 with respect to each of angular velocity peak outputs ω 2804 through 2806, each of which is detected during a predetermined period. Furthermore, the lens CPU 6808 calculates the rotational radius L by calculating an angular velocity output ω and a velocity output V for each time period. In addition, in the first exemplary embodiment, the lens CPU 6808 calculates an average of the rotational radiuses L in step S3213 (FIG. 32) and uses the average value for correcting the parallel vibration that may occur during capture.

In the present exemplary embodiment, the lens CPU 6808 uses a moving average method as the method for calculating the average of the rotational radiuses L. The present exemplary embodiment successively updates the average value.

Figure 40:
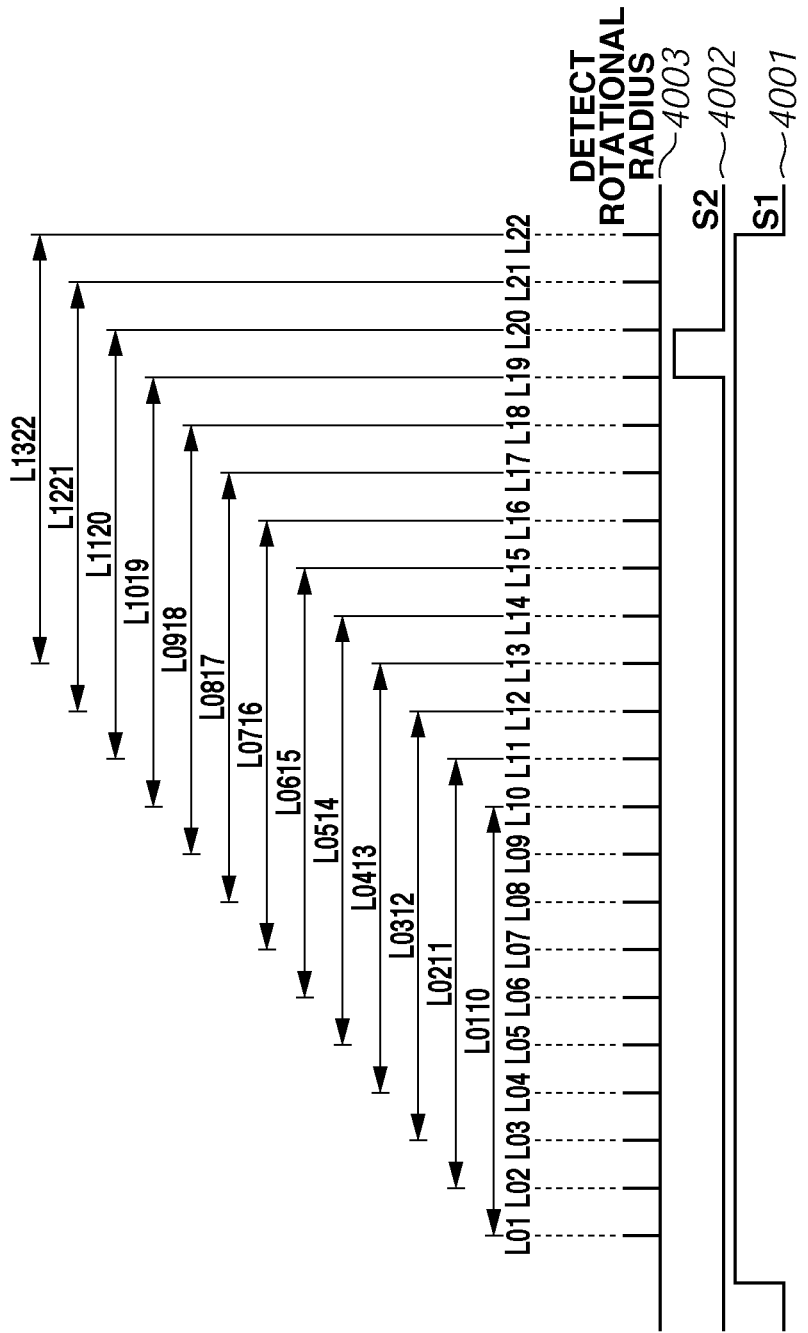
FIG. 40 is a timing chart illustrating a moving average of a rotational radius of the image stabilization control apparatus according to the second exemplary embodiment of the present invention.

FIG. 40 is a timing chart that illustrates an example of operation in accordance with the above-described configuration. In the example illustrated in FIG. 40, the elapsed time is shown on the horizontal axis, while timing is shown on the vertical axis.

Referring to FIG. 40, after the photographer half-presses the release button 6804$a$ at timing 4001 (the switch S1 is in an "on" state), then the lens CPU 6808 starts the detection of the rotational radius L at timing 4003. Rotational radiuses L01 through L22 each indicate a rotational radius L to be calculated for each time period.

In the first exemplary embodiment, the lens CPU 6808 calculates the rotational radius L to be used for correcting the parallel vibration by averaging all of the rotational radiuses L01 through L19, which are detected during the time period before the photographer fully presses the release button 6804$a$ (the switch S2 is in an "on" state) at timing 4002. In this regard, the present exemplary embodiment updates the rotational radius L for each predetermined time period.

As illustrated in FIG. 40, when the rotational radiuses L01 through L10 are calculated, then the lens CPU 6808 calculates an average rotational radius L 0110 of the rotational radiuses L01 through L10. Then, the lens CPU 6808 calculates a moving average of rotational radius L every time a rotational radius L is calculated. Thus, the present exemplary embodiment updates the rotational radius for correcting the parallel vibration.

In the example illustrated in FIG. 40, the capture starts when the rotational radius L19 is calculated. Accordingly, the lens CPU 6808 corrects the parallel vibration using the moving average value L1019 at the time the rotational radius L19 is calculated. More specifically, the lens CPU 6808 continues updating the moving average value of the rotational radius L. When the capture starts, the lens CPU 6808 corrects the parallel vibration using a latest moving average value when the capture starts.

As described above with reference to FIG. 39, with respect to the rotational radius L 1019, the lens CPU 6808 calculates two types of rotational radiuses L, namely, the rotational radius L at 5 Hz and the rotational radius L at 1 Hz. The lens CPU 6808 determines whether to adjust the rotational radius L for each frequency according to the comparison result.

By updating the rotational radius L in the above-described manner, the present exemplary embodiment can correct the parallel vibration with high accuracy using the rotational radius L suitable for the current capture condition. If the method using the area described above with reference to FIG. 29 is employed, it is useful to employ the following configuration. More specifically, in this case, the lens CPU 6808 continues updating the rotational radius L that has been calculated for each period by the moving average method illustrated in FIG. 40. When the capture starts, the lens CPU 6808 corrects the parallel vibration using the latest moving average value.

If the rotational radius L is calculated using the moving average method, the time period for averaging becomes shorter than that in the first exemplary embodiment. Accordingly, if the rotational radius L is not calculated during vibration from the driving of the camera or the lens, the vibration cannot be appropriately corrected in the capture starting immediately after the vibration due to driving of the camera or the lens has occurred.

In this regard, in the present exemplary embodiment, the rotational radius L is calculated when the lens is driven for AF. However, as described above in the first exemplary embodiment, if the output of the ACC 101*p* or the ACC 101*y* is saturated due to the vibration from the driving, the rotational radius L cannot be accurately calculated.

In the present exemplary embodiment, the sensitivity of the ACC 101*p* is reduced to a level at which no saturation occurs. Then, the lens CPU 6808 detects the vibration acceleration in this state and compares the detected vibration acceleration with the angular velocity output.

However, if the acceleration sensitivity is lowered, the acceleration detection output may be degraded. In this regard, the present exemplary embodiment reduces the sensitivity of the ACC 101*p* only at the timing at which vibration from the driving occurs.

In the present exemplary embodiment, in a normal operation state, the vibration acceleration can be detected with high accuracy. The lens CPU 6808 lowers the acceleration sensitivity only during a short time period in which vibration from driving occurs. Thus, while the accuracy of detecting the vibration acceleration during the driving vibration occurring time period may degrade, the degradation of the accuracy can be reduced by the moving average of the rotational radiuses L before and after the driving vibration.

Figure 41:
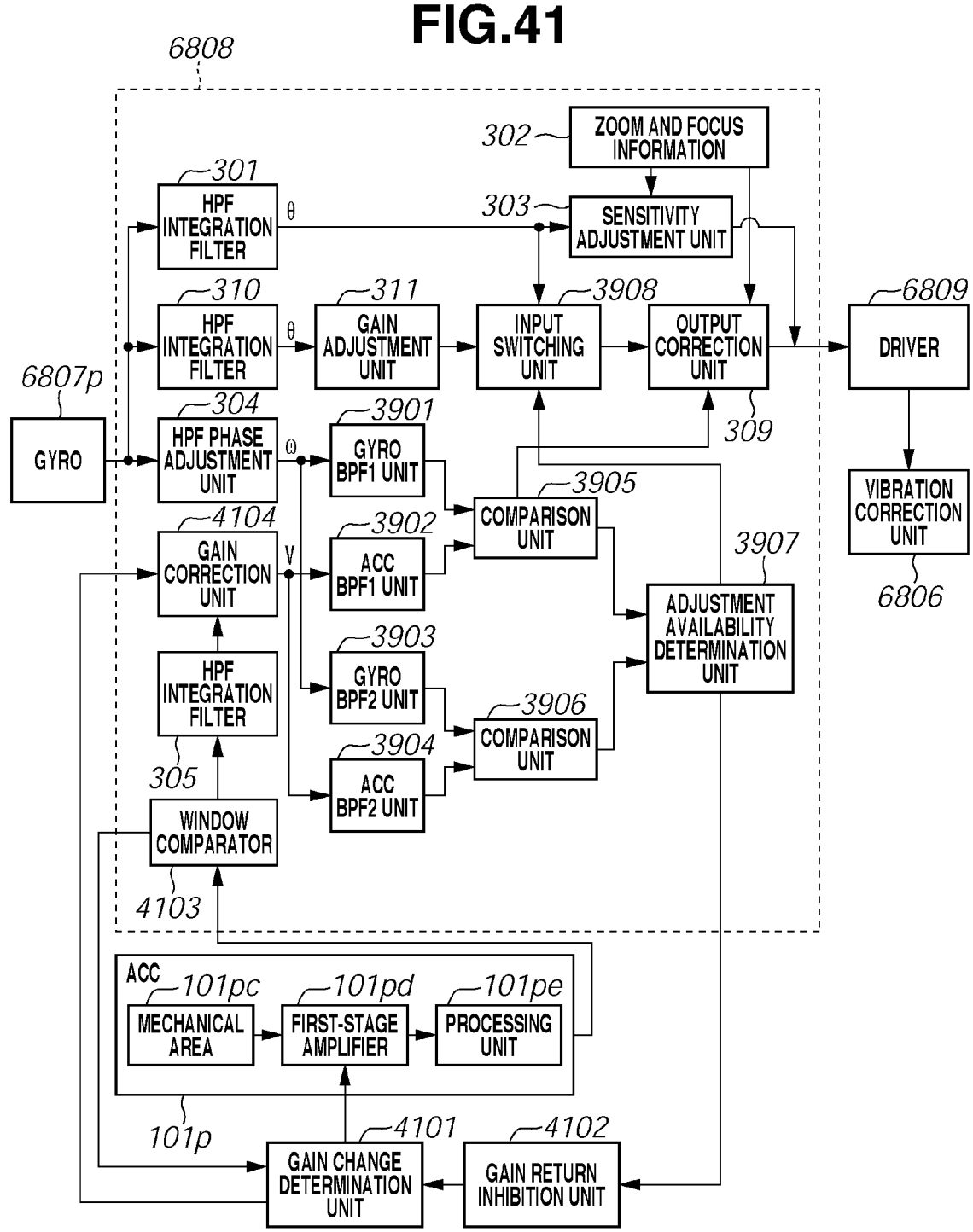
FIG. 41 illustrates another exemplary configuration of the image stabilization control apparatus according to the second exemplary embodiment of the present invention.

FIG. 41 is a block diagram illustrating additional blocks for controlling the sensitivity of the ACC 101*p* in the configuration illustrated in FIG. 39. In the example illustrated in FIG. 41, the ACC 101*p* includes a mechanical portion 101*pc*, which includes micro electro mechanical systems (MEMS), a first-stage amplifier 101*pd*, and a processing circuit 101*pe*.

The gain of the first-stage amplifier 101*pd* is variable when a signal is input from a gain change determination unit 4101. The output of the ACC 101*p* is input to the HPF integration filter 305 via a window comparator 4103. The output of the HPF integration filter 305 is input to the ACC BPF 1 unit 3902 and the ACC BPF 2 unit 3904 via a gain correction unit 4104.

The output of the window comparator 4103 is also input to the gain change determination unit 4101. When the output of the ACC 101*p* is outside the level of a first area, the window comparator 4103 outputs a gain reducing signal. After receiving the gain reducing signal, the gain change determination unit 4101 reduces the gain of the first-stage amplifier 101*pd*. The first area is set at a level of about 80% of the saturation level of the output of the ACC.

If the output of the ACC is within the level of a second range for a predetermined length of time (e.g., 0.1 second), the window comparator 4103 outputs a gain returning signal. After receiving the gain returning signal, the gain change determination unit 4101 returns the gain of the first-stage amplifier 101*pd* to its original value. The second range is set to the level one-third of the first area because the gain of the first-stage amplifier 101*pd* is reduced to one-third after the gain is changed and thus the lens CPU 6808 uses the same level as the level of the first area in this state.

A rotational radius L calculation non-completion signal from the adjustment availability determination unit 3907 is input to a gain return inhibition unit 4102. During this period, the gain return inhibition unit 4102 outputs a gain return inhibition signal to the gain change determination unit 4101.

Accordingly, during the time period in which the comparison units 3905 and 3906 calculate the rotational radius L, the gain of the first-stage amplifier 101*pd* is not returned to its original value in order to prevent possible degradation of the accuracy of detecting the rotational radius L that may occur when the gain of the first-stage amplifier 101*pd* is changed during the calculation of the rotational radius L.

The gain correction unit 4104 returns the gain to the original value if the gain of the first-stage amplifier 101*pd* is small. In the present exemplary embodiment, the gain correction unit 4104 is provided at a later stage of the HPF integration filter 305.

When vibration from driving occurs, a high-frequency noise is superposed on the output of the ACC 101*p*. Accordingly, the output of the ACC 101*p* may be saturated in this case. However, because the output of the HPF integration filter 305 is calculated by integrating the ACC output, the high-frequency signal can be sufficiently attenuated.

Accordingly, the output is not saturated even if the gain of the output of units provided downstream of the HPF integration filter 305 is increased. More specifically, the present exemplary embodiment corrects the error of the rotational radius L occurring due to the change of the gain of the first-stage amplifier 101*pd* by preventing the saturation of the output of the ACC 101*p* by reducing the gain of the first-stage amplifier 101*pd* and thus correcting the gain after integrating the output of the ACC 101*p*.

Figure 42:
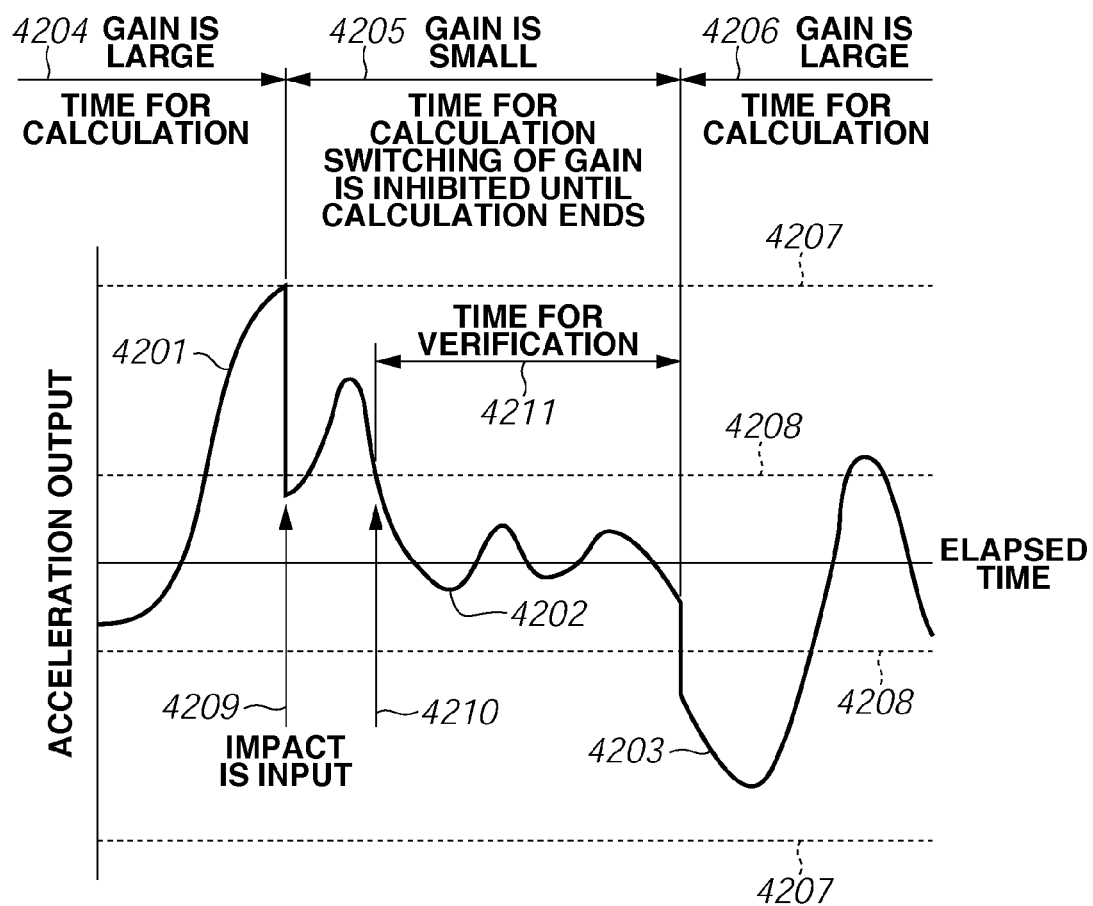
FIG. 42 illustrates an exemplary waveform for an output of acceleration according to the second exemplary embodiment of the present invention.

FIG. 42 illustrates the above-described configuration with an output waveform of the ACC according to the present exemplary embodiment. In the example illustrated in FIG. 42, the elapsed time is shown on the horizontal axis, while the ACC output is shown on the vertical axis.

Referring to FIG. 42, waveforms 4201 and 4203 indicate outputs of the ACC 101p (in periods 4204 and 4206) when the gain of the first-stage amplifier 101pd is normal. A waveform 4202 indicates the output of the ACC 101p (in a period 4205) when the gain of the first-stage amplifier 101pd is reduced to one-third.

In the example illustrated in FIG. 42, with respect to the waveform 4201, when an impact indicated by an arrow 4209 is input, the output of the impact has exceeded a determination level (first area) 4207. Accordingly, the window comparator 4103 outputs a gain reducing signal to reduce the gain of the first-stage amplifier 101pd and acquire a waveform 4202.

When another impact, which is indicated by an arrow 4210, is input, the waveform 4202 does not exceed a determination level 4208 (second range). At this time, the gain of the first-stage amplifier 101pd has been reduced to one-third. Accordingly, the lens CPU 6808 sets the determination level, which is the second range, at the level equivalent to one-third of the first area determination level to execute the determination at the same level.

As described above, the lens CPU 6808 executes control for returning the gain of the first-stage amplifier 101pd to its original value after a predetermined time period (a verification time 4211) has elapsed after the waveform 4202 has fallen within the second range determination level 4208.

However, with respect to the verification time period 4211, the separation between time periods for calculating the rotational radius L is considered as well as timing a predetermined time period (e.g., 0.1 second). More specifically, if a result of calculation of the rotational radius L is acquired after 0.04 seconds from the predetermined time period (e.g., 0.1 second), then the verification time period 4211 becomes 0.14 seconds. The lens CPU 6808 calculates a next rotational radius L after returning the gain of the first-stage amplifier 101pd to its original value.

Figure 43:
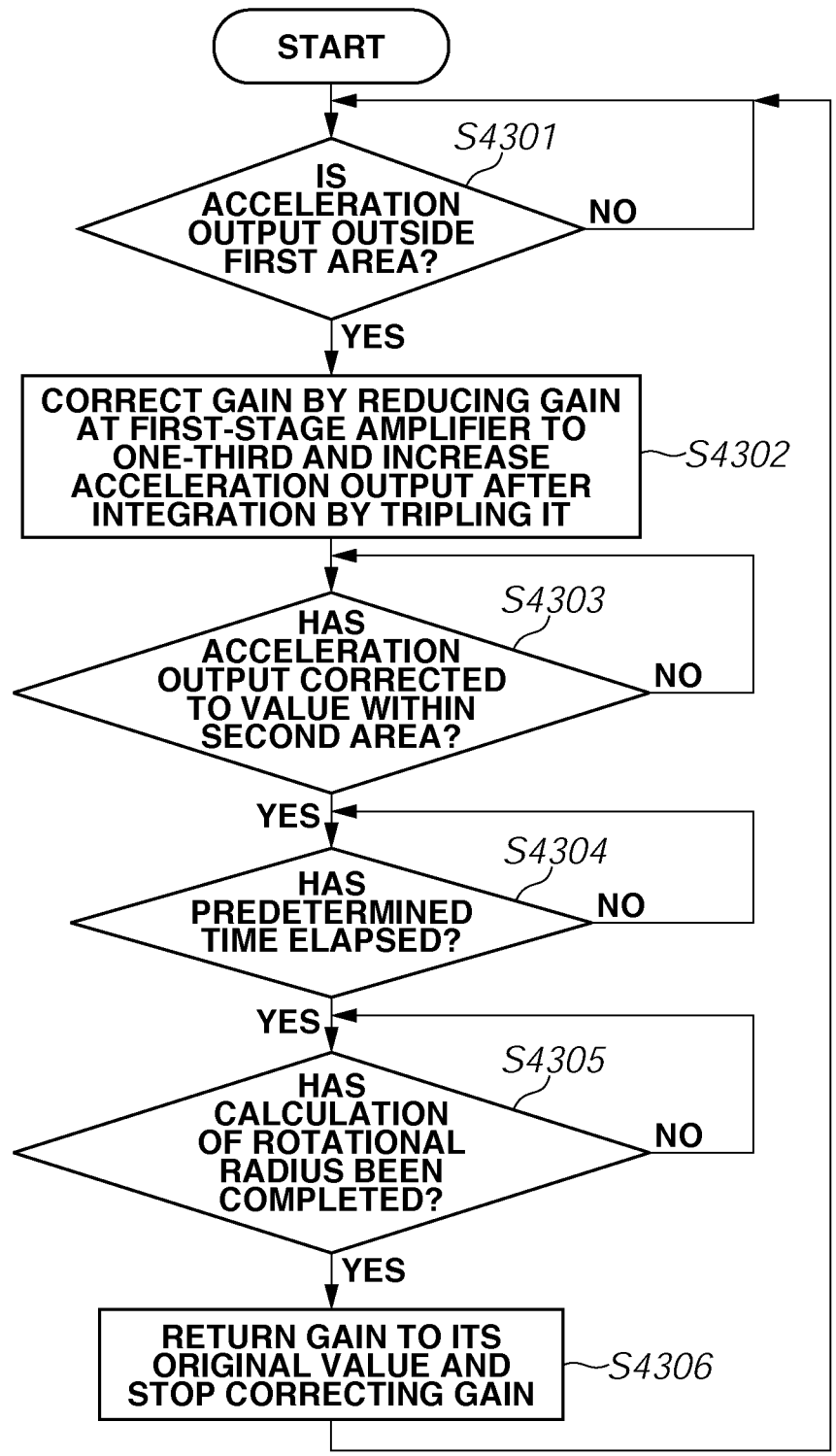
FIG. 43 is a flow chart illustrating exemplary processing for controlling the accelerometer according to the second exemplary embodiment of the present invention.

FIG. 43 is a flow chart illustrating an exemplary operation for changing (switching) the gain of the ACC 101p and the gain of the first-stage amplifier 101pd. The flow starts when the ACC is activated and the flow is repeatedly executed as a loop until the operation of the ACC is stopped.

Referring to FIG. 43, in step S4301, the window comparator 4103 determines whether the ACC output is outside the first area 4207. If it is determined that the ACC output is outside the first area 4207 (YES in step S4301), then the processing advances to step S4302. On the other hand, if it is determined that that the ACC output is not outside the first area 4207 (NO in step S4301), then the lens CPU 6808 repeats the processing in step S4301 and waits until the ACC output becomes outside the first area 4207.

In step S4302, the gain change determination unit 4101 reduces the gain of the first-stage amplifier 101pd to one-third of the current level. Furthermore, the gain correction unit 4104 corrects the gain by multiplying the acceleration output three-fold.

In step S4303, the window comparator 4103 determines whether the ACC output has returned to the level within the second range determination level 4208. If it is determined that the ACC output has returned to the level within the second range determination level 4208 (YES in step S4303), then the processing advances to step S4304. On the other hand, if it is determined that the ACC output has not returned to the level within the second range determination level 4208 (NO in step S4303), then the processing repeats the processing in step S4303 to wait until the gain of the first-stage amplifier 101pd returns to the level within the second range determination level 4208.

In step S4304, the lens CPU 6808 waits for a predetermined length of time (e.g., 0.1 second). In step S4305, the lens CPU 6808 waits until the calculation of rotational radius L in the current time period is completed.

In step S4306, the gain change determination unit 4101 returns the gain of the first-stage amplifier 101pd to its original value. Furthermore, the gain correction unit 4104 returns the acceleration output after integration to one power. Then, the processing returns to step S4301.

As described above, the lens CPU 6808 reduces the gain before the output of the ACC 101p becomes saturated. Thus, the present exemplary embodiment prevents saturation of the ACC 101p and corrects the shortage of gain with the acceleration output after integration. Accordingly, the saturation of correction value can be prevented.

Figure 44:
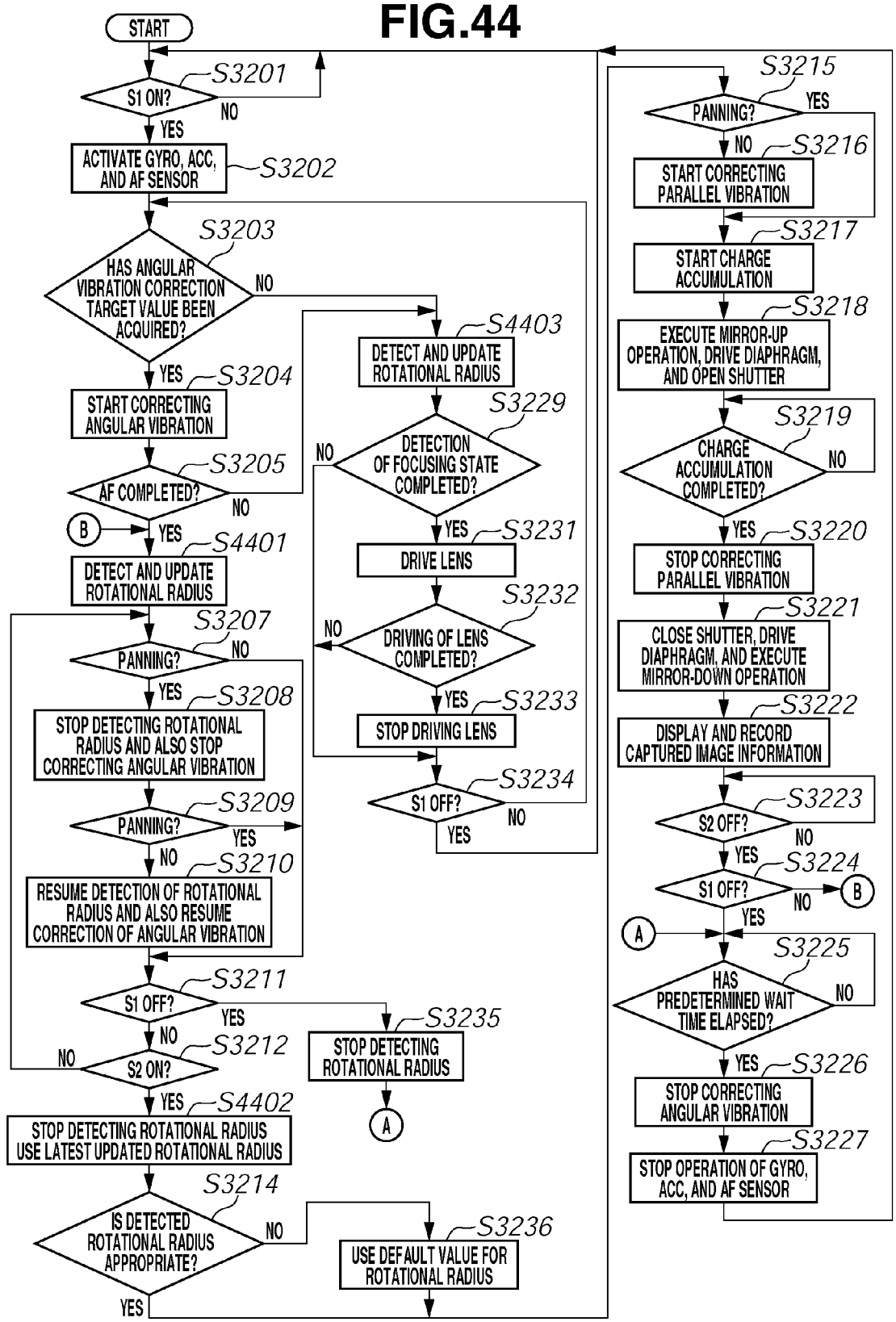
FIG. 44 is a flow chart illustrating an exemplary operation of the image stabilization control apparatus according to the second exemplary embodiment of the present invention.

FIG. 44 is a flow chart illustrating an exemplary operation of main components according to the second exemplary embodiment of the present invention. The processing in the flow chart of FIG. 44 is roughly equivalent to that illustrated in FIG. 32 in the first exemplary embodiment.

The processing in the flow chart of FIG. 44 is different from that illustrated in FIG. 32 in the following points. More specifically, in the present exemplary embodiment, the lens CPU 6808 calculates the moving average of the calculated rotational radiuses as well as detecting the rotational radius in steps S4401 and S4403 instead of executing the calculation of the rotational radius L in steps S3206 and S3228. In addition, in the present exemplary embodiment, the suspension of detection of the rotational radius in step S3230 is omitted. This is because after the gain of the first-stage amplifier 101pd of the ACC 101p has been reduced, the saturation of the ACC output, which may otherwise occur due to vibration from the driving of lens for focusing, does not occur and thus the rotational radius L can be calculated during the time period.

Figure 45:
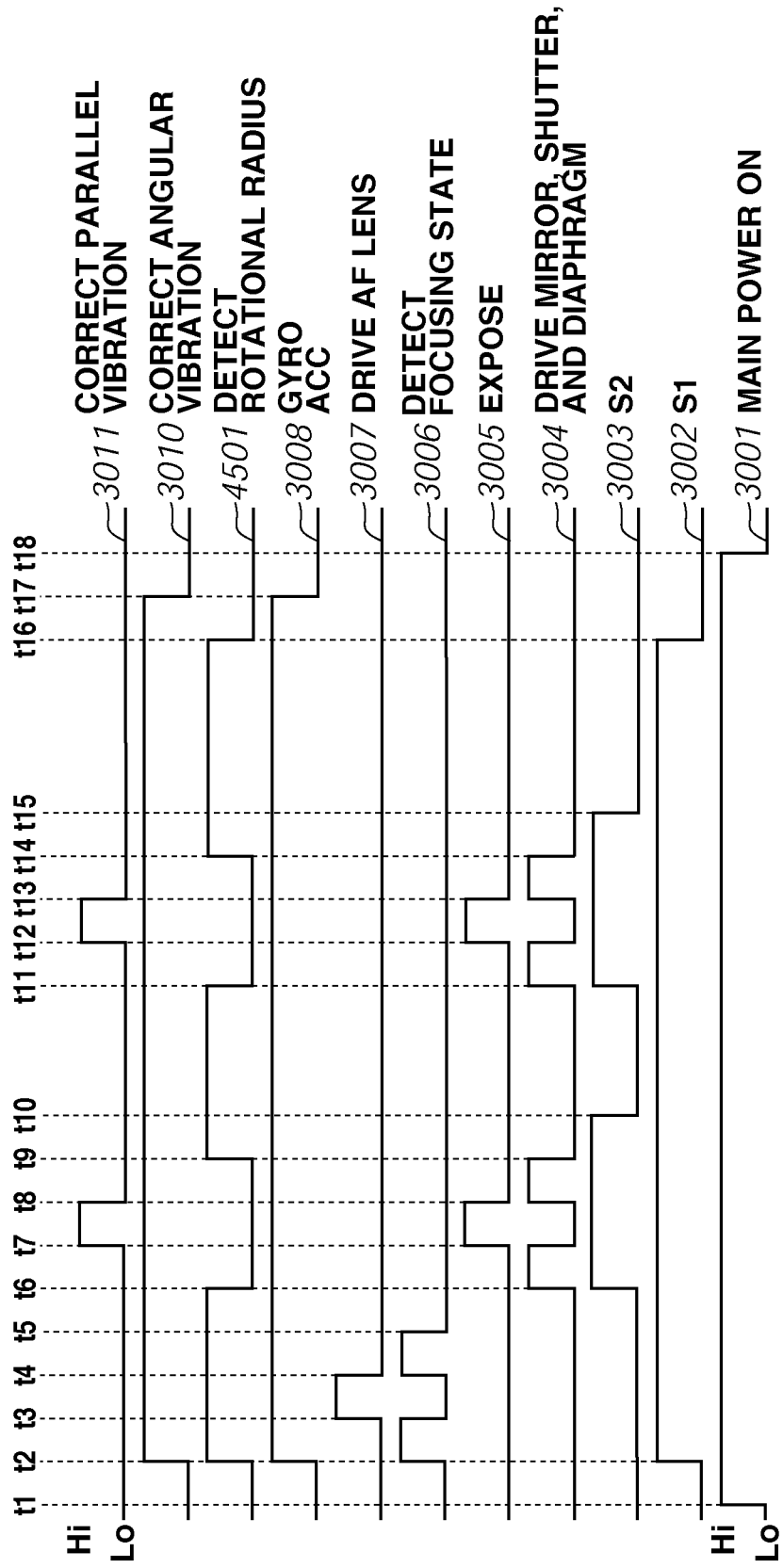
FIG. 45 is a timing chart illustrating an example of an operation of the image stabilization control apparatus according to the second exemplary embodiment of the present invention.

FIG. 45 is a timing chart according to the present exemplary embodiment. The timing chart illustrated in FIG. 45 is roughly equivalent to that illustrated in FIG. 30 in the first exemplary embodiment. The timing chart illustrated in FIG. 45 is roughly similar to that illustrated in FIG. 30 except that in the exemplary timing chart illustrated in FIG. 45, a rotational radius detection timing 4501 is set instead of the rotational radius detection timing 3009.

At the rotational radius detection timing 4501, the lens CPU 6808 calculates the rotational radius based on the outputs from the gyro and the ACC. A "Hi" state indicates that the rotational radius is calculated while a "Lo" state indicates that the calculation of the rotational radius is suspended. The rotational radius detection timing 4501 is different from the rotational radius detection timing 3009 in the point that in the present exemplary embodiment, the lens CPU 6808 calculates the rotational radius L even during the time period from time t3 to time t5.

Returning to FIG. 44, the processing illustrated in the flow chart of FIG. 44 is different from that illustrated in FIG. 32 in the following point. More specifically, in the present exemplary embodiment, in step S4402, the lens CPU 6808 suspends the detection of the rotational radius and uses a latest updated rotational radius to correct the parallel vibration instead of suspending the detection of the rotational radius and averaging the rotational radius in step S3213. The other processing is similar to that described above in FIG. 32. Accordingly, the description thereof will not be repeated here.

As can be seen from the flow illustrated in FIG. 44, the lens CPU 6808 suspends the detection of the rotational radius L while the shutter, the quick return mirror, or the diaphragm is driven as the lens CPU 6808 does in the first exemplary embodiment. Note here the detection of the rotational radius L may be executed in a time period for driving the shutter, the quick return mirror, or the diaphragm.

However, if the detection of the rotational radius L is continued during the above-described time period, the camera is subjected to extremely great vibration occurring due to the driving. In this case, it is necessary to reduce the gain of the first-stage amplifier 101pd of the ACC 101p to prevent the saturation of the ACC output that may occur due to the driving vibration. Accordingly, in this case, the ACC output may become instable due to the great reduction of the gain. Accordingly, the accuracy of detecting the rotational radius calculated during the above-described time period becomes extremely low. Therefore, the lens CPU 6808 suspends the detection of the rotational radius L.

As is described above with reference to FIG. 38, the lens CPU 6808 corrects the rotational radius L based on the information about the installation location of the ACC 101p and the displacement of the principal point of the imaging optical system. However, the influence from the parallel vibration can be reduced or suppressed if the ACC 101p is disposed at the same position as the principal point of the imaging optical system when the greatest imaging magnification is set and if the current imaging magnification is below the greatest imaging magnification.

Accordingly, in this case, the parallel vibration can be corrected with a sufficiently high accuracy without correcting the rotational radius L. Therefore, the entire system can be simplified.

Figure 46:
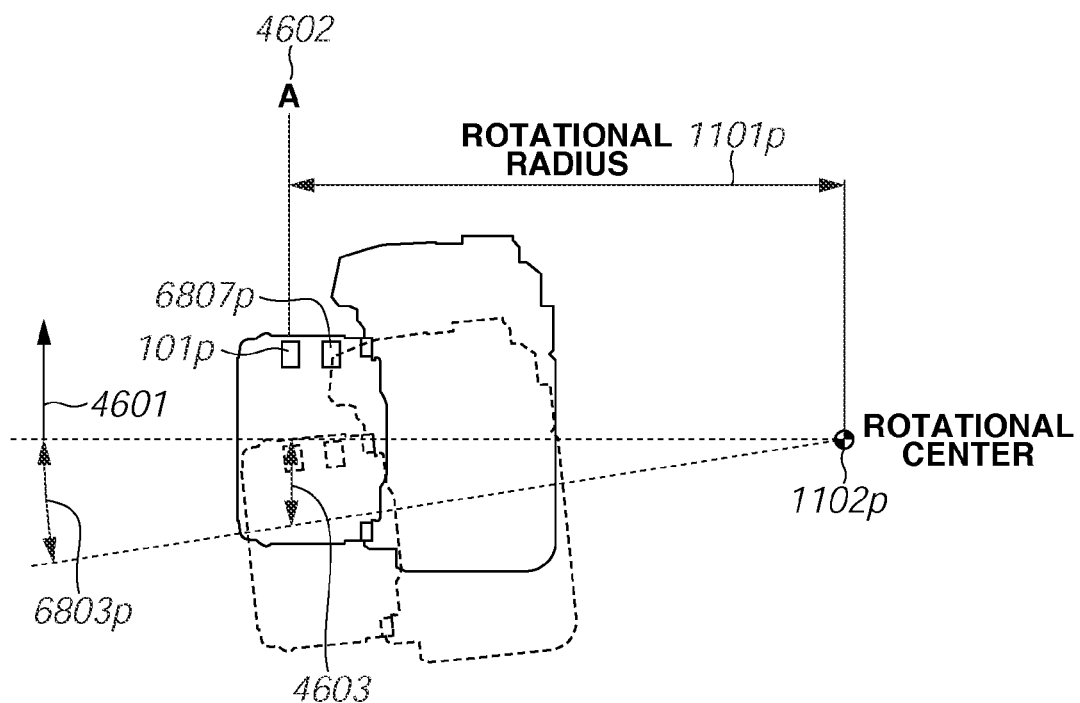
FIG. 46 illustrates an example of vibration of a camera according to the second exemplary embodiment of the present invention.

In an example illustrated in FIG. 46, the ACC 101p is disposed at the same position as a principal point A 4602 of the imaging optical system in a state in which the imaging magnification is highest within the capacity of the photographic lens (at a closest object distance position 4601). Accordingly, the rotational radius L 1101p, which is calculated based on the output of the ACC 101p and the output of the gyro 6807p, is equal to the rotational radius from the rotational center to the principal point of the imaging optical system. Thus, the parallel vibration can be corrected with high accuracy with this configuration. An amount of vibration 4603 at the principal point A 4602 of the imaging optical system is equal to the amount of vibration 4603 at the installation location of the ACC 101p.

Figure 47:
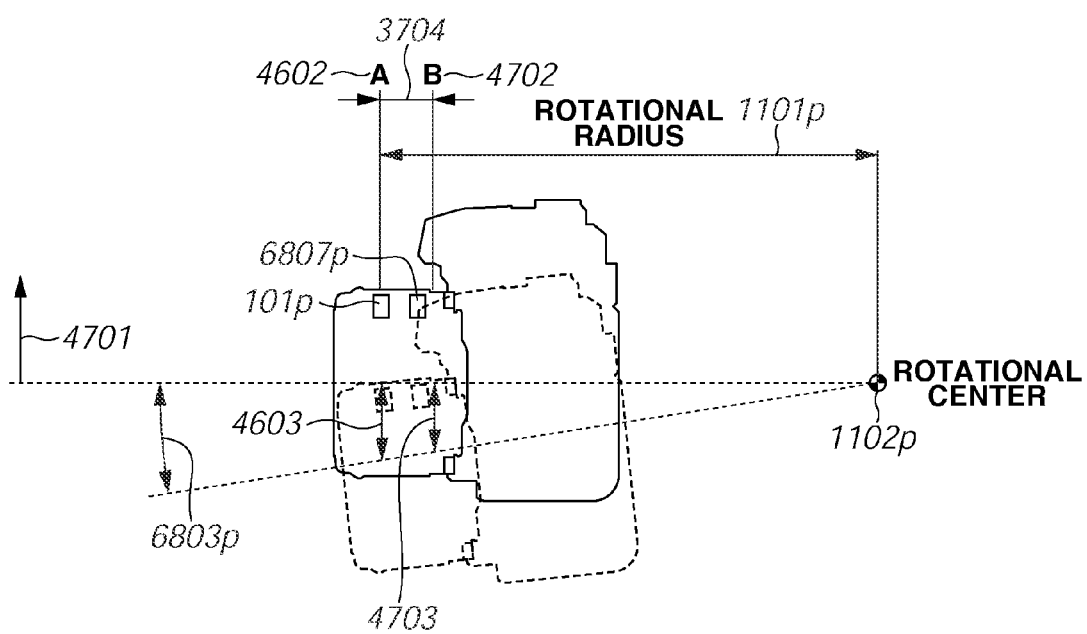
FIG. 47 illustrates an example of vibration of a camera according to the second exemplary embodiment of the present invention.

FIG. 47 illustrates a case where an object 4701 is distant from the imaging optical system. In this case, a principal point B 4702 of the imaging optical system when focusing on the object 4701 is displaced from the installation location 4602 of the ACC 101p.

An amount of vibration 4703 at the principal point B 4702 of the imaging optical system is different from the vibration amount 4603 at the installation location of the ACC 101p. However, in this case, the imaging magnification is low. Accordingly, the influence from the parallel vibration that may cause image degradation is small. Accordingly, the parallel vibration can be corrected with a tolerably high accuracy without strictly setting a rotational radius L.

It is significant to dispose the ACC 101p at the same position as the principal point of the lens when the imaging magnification of the imaging optical system becomes greatest. If the ACC 101p can be disposed at the same position as the principal point of the lens, the calculation can be more simplified compared with the calculation in the above-described first exemplary embodiment.

It is not always necessary to dispose the ACC 101p on the principal point of the imaging optical system. That is, if the installation location of the ACC 101p is deviated from the principal point of the imaging optical system, the rotational radius correction unit 309c (FIG. 38) can correct the deviation.

That is, instead of simplifying the configuration of the system by omitting the deviation amount calculation unit 309d (FIG. 38), the deviation between the principal point of the imaging optical system and the ACC when the maximum capture magnification is used is set as a fixed value as the correction value for correcting the rotational radius L.

If the method described above with reference to FIG. 38 is used, the flexibility in determining the installation location of the ACC becomes very high. As described above with reference to FIG. 36, because the rotational center exists on the back side of the camera, the detection accuracy increases since the more distant the installation location of the ACC is from the rotational center, the greater the acceleration arising due to vibration becomes. Accordingly, it is useful to dispose the ACC at a position of the capture lens 6801 closest to the object.

In the present exemplary embodiment, the parallel vibration is corrected by correcting the output of the gyro based on a latest updated value of the correction values of the output of the gyro of the output correction unit 309, which is updated before the capture starts. Accordingly, the parallel vibration can be corrected with high accuracy.

More specifically, the comparison units 3905 and 3906 calculate the rotational radius (correction value) at intervals of a predetermined period (periods L01 through L10 (FIG. 40)) before the capture starts and update the average of the rotational radius L. Furthermore, the comparison units 3905 and 3906 output the updated rotational radius at the start of capture to the output correction unit 309 in step S4402 (FIG. 44).

To paraphrase this, the comparison units 3905 and 3906 update the average value of the rotational radiuses, which is calculated in each period before the start of capture. Furthermore, the comparison units 3905 and 3906 output the average value of the rotational radius updated at the start of capture to the output correction unit 309. Thus, the parallel vibration is corrected. It is also useful if a value acquired by updating the average value calculated by the moving average method in each period is used as the rotational radius.

Figure 48:
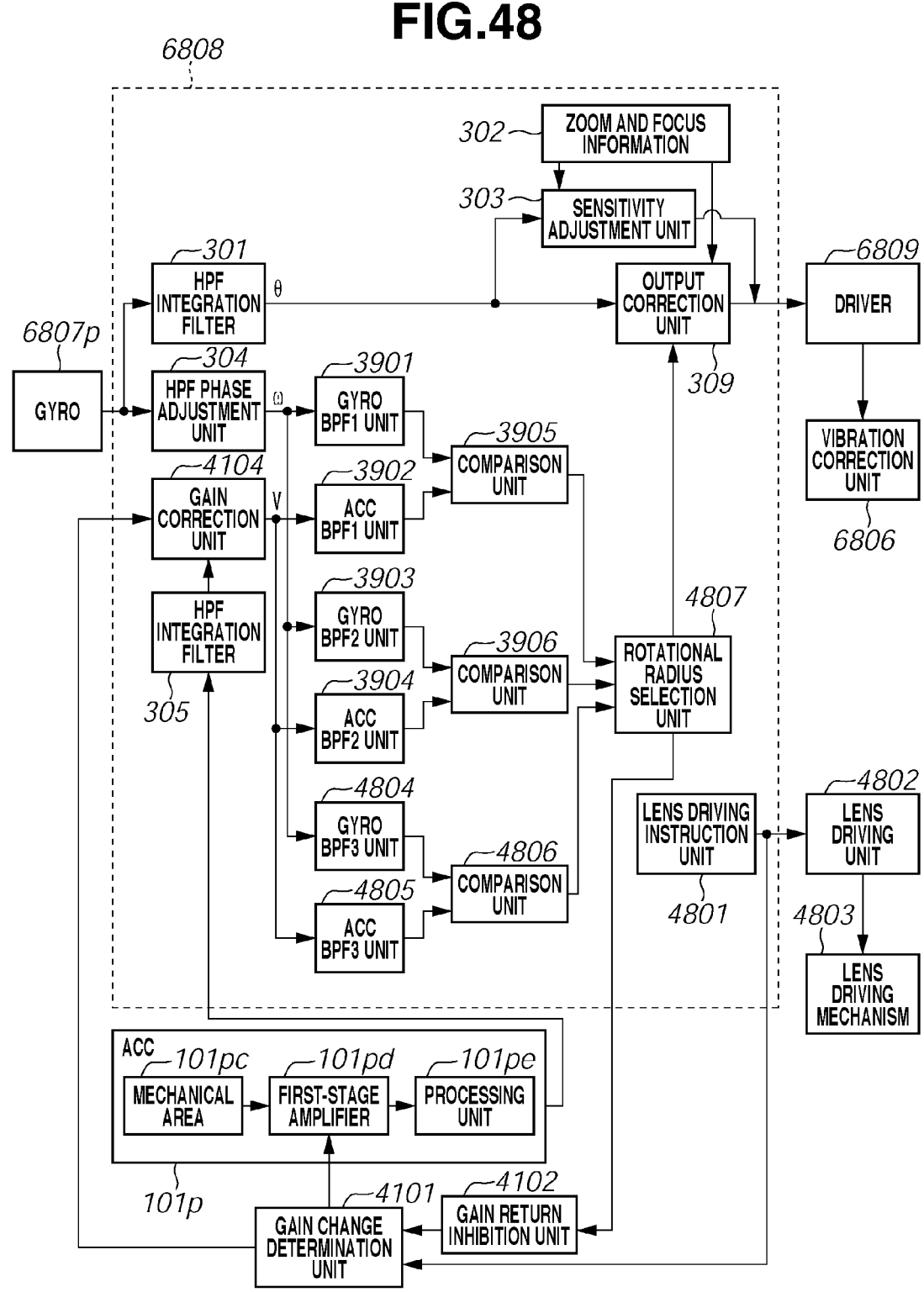
FIG. 48 illustrates an exemplary configuration of an image stabilization control apparatus according to a third exemplary embodiment of the present invention.

A third exemplary embodiment of the present invention is described below. FIG. 48 illustrates an exemplary configuration of the image stabilization control apparatus included in a single-lens reflex camera according to the present exemplary embodiment. The appearance of the camera is similar to those in the first and second exemplary embodiments illustrated in FIGS. 1 and 2.

The present exemplary embodiment is different from the above-described first and second exemplary embodiments in the following points.

The gain of the first-stage amplifier 101pd of the ACC 101p is changed based on a camera actuator driving timing signal instead of a result of the determination by the window comparator 4103 described above with reference to FIG. 41.

The correction of the parallel vibration is executed by using an optimum rotational radius L among a plurality of frequency levels instead of optimizing the rotational radius L with respect to each frequency by adjusting the gain of the integral signal of the gyro 6807p described above with reference to FIG. 3.

Accordingly, the configuration of the present exemplary embodiment (FIG. 48) is different from the configuration described above with reference to FIG. 41 in the following points.

1) The configuration according to the present exemplary embodiment additionally includes a lens driving instruction unit 4801, a lens driving unit 4802, and a lens driving mechanism 4803, which are not illustrated in the above-described block diagrams.

2) A gyro BPF 3 unit 4804, an ACC BPF 3 unit 4805, a comparison unit 4806, and a rotational radius selection unit 4807 are included in the configuration of the present exemplary embodiment.

3) The HPF integration filter 310, the gain adjustment unit 311, and the input switching unit 3908 are omitted in the configuration of the present exemplary embodiment.

In this regard, to begin with, the switching (changing) of the gain of the ACC 101p according to the present exemplary embodiment is described in detail below. In the above-described second exemplary embodiment, the gain of the first-stage amplifier 101pd is changed according to the magnitude of the output of the ACC itself. In the present exemplary embodiment, the gain of the first-stage amplifier 101pd is changed according to a lens driving instruction signal for focusing.

Referring to FIG. 48, information about operation of the release button 6804a and a lens driving signal are input to the lens CPU 6808. After receiving the information and the signal, the lens driving instruction unit 4801 drives the lens (focusing lens) for focusing. More specifically, the lens driving instruction unit 4801 outputs a lens driving instruction signal to the lens driving unit 4802. The lens driving unit 4802 drives the lens driving mechanism 4803 based on the lens driving instruction signal to move the lens for focusing.

The lens driving instruction signal from the lens driving instruction unit 4801 is also input to the gain change determination unit 4101. The gain change determination unit 4101 changes the gain of the first-stage amplifier 101pd based on the lens driving instruction signal. More specifically, when the lens driving instruction is input, the gain change determination unit 4101 reduces the gain of the first-stage amplifier 101pd for an instructed time period. Furthermore, the gain change determination unit 4101 increases the gain of the gain correction unit 4104 during the time period in which the gain of the first-stage amplifier 101pd is reduced. Thus, the gain change determination unit 4101 prevents variation of the entire gain.

Figure 49:
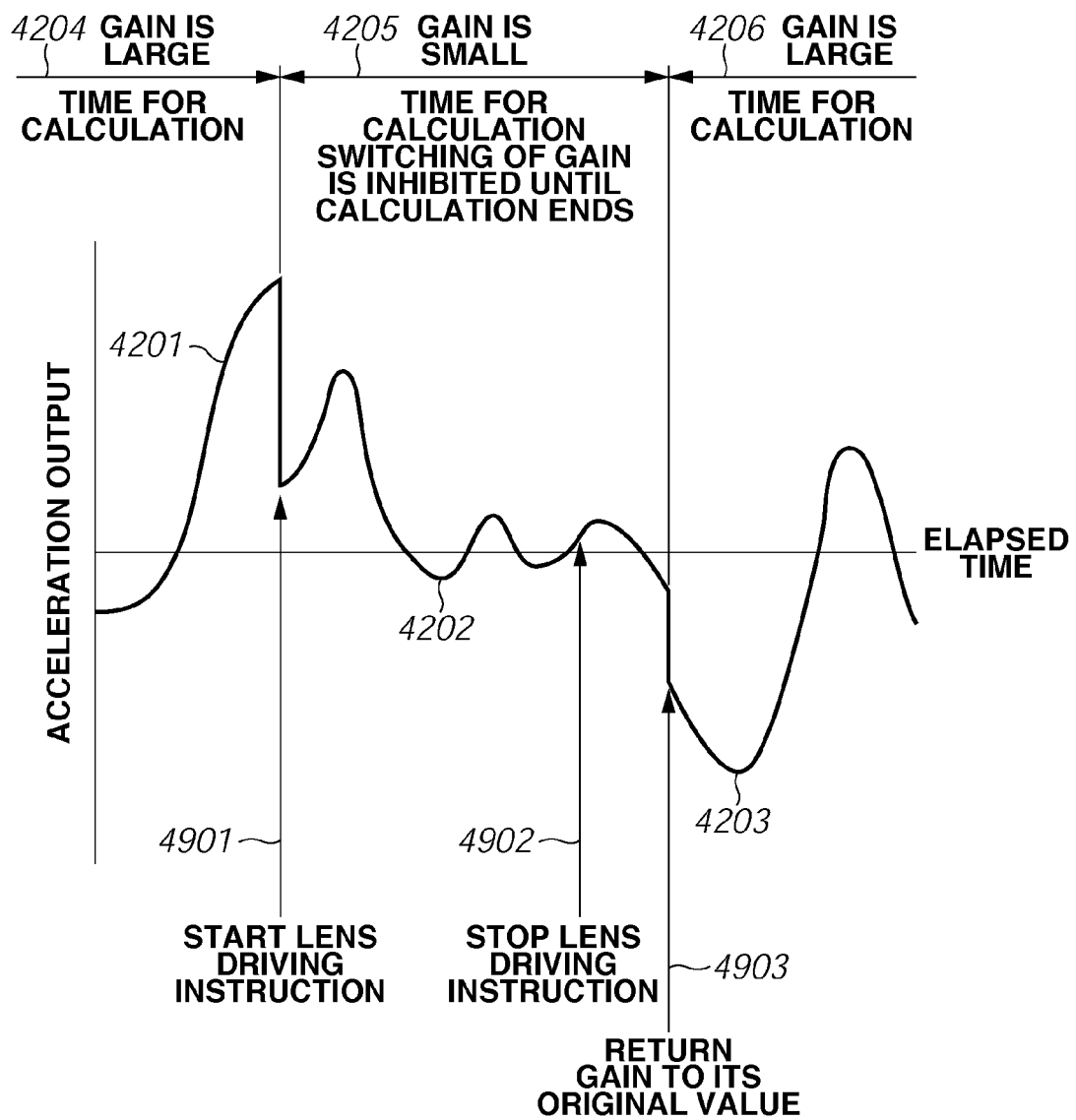
FIG. 49 illustrates an exemplary waveform of an output of acceleration according to the third exemplary embodiment of the present invention.

FIG. 49 illustrates the above-described operation with a waveform of the ACC 101p. In the example illustrated in FIG. 49, the elapsed time is shown on the horizontal axis. The ACC output is shown on the vertical axis.

The waveforms 4201 and 4203 indicate the outputs of the ACC 101p during the time periods 4204 and 4206 when the gain of the first-stage amplifier 101pd is normal. The waveform 4202 indicates the output of the ACC 101p in the time period 4205 when the gain of the first-stage amplifier is reduced to one-third of the original level.

With respect to the waveform 4201, the gain of the first-stage amplifier 101pd is reduced at a timing of starting an instruction for driving the lens from the lens driving instruction unit 4801, which is indicated by an arrow 4901 in FIG. 49. Thus, the waveform 4202 is acquired.

Then, at the timing of suspension of the lens driving instruction, which is indicated by an arrow 4902, the occurrence of vibration from driving of the lens ends. The gain of the first-stage amplifier 101pd can be returned to its original value at this timing. However, in the present exemplary embodiment, the gain of the first-stage amplifier 101pd is returned to its original value after waiting for a separation of timing of calculating a rotational radius L, which is indicated by an arrow 4903. The gain return inhibition unit 4102 operates as described above with reference to FIG. 42.

The gain return inhibition unit 4102 inhibits the gain change determination unit 4101 from returning the gain to its original value before a rotational radius selection signal is input from the rotational radius selection unit 4807. The lens CPU 6808 calculates a next rotational radius L after returning the gain of the first-stage amplifier 101pd to the original value.

If the lens driving timing is utilized as described above, it is beneficial to set a long time period of reducing the gain considering the displacement between the driving instruction timing and the timing of occurrence of vibration from the actual driving. In this case, the timing for returning the gain to its original value can be securely acquired although it is necessary to reduce the gain at a driving instruction timing before the lens is actually driven.

In the above-described second exemplary embodiment, the lens CPU 6808 returns the gain to its original value if the output detected by the ACC 101p is reduced for a predetermined time period so as not to return the gain to its original value when an impact is momentarily lost during a time period in which the camera is subjected to continuous impacts.

In the present exemplary embodiment, the lens CPU 6808 detects a driving instruction timing. Accordingly, because a driving end timing is input, the lens CPU 6808 can recognize that a great vibration is not applied to the camera after the driving end timing is input. Therefore, it is not necessary in the present exemplary embodiment to monitor the ACC output for a predetermined time period and return the gain to its original value based on a result of the monitoring of the ACC output as in the second exemplary embodiment.

Furthermore, a method for correcting the parallel vibration using an optimum rotational radius L among the rotational radiuses L for a plurality of frequency levels is described in detail below.

In the present exemplary embodiment, three pairs of BPFs are used to calculate the rotational radius L as illustrated in FIG. 48. The gyro BPF 1 unit 3901 extracts an angular velocity signal (the output of the HPF phase adjustment unit 304) at 2 Hz. The ACC BPF 1 unit 3902 extracts an ACC signal (the output of the gain correction unit 4104) at 2 Hz. The comparison unit 3905 compares the angular velocity signal and the ACC signal to calculate a rotational radius L as in the first exemplary embodiment.

Similarly, the gyro BPF 2 unit 3903 extracts an angular velocity signal (the output of the HPF phase adjustment unit 304) at 5 Hz, while the ACC BPF 2 unit 3904 extracts an ACC signal (the output of the gain correction unit 4104) at 5 Hz. The comparison unit 3906 compares the angular velocity signal and the ACC signal to calculate a rotational radius L as in the first exemplary embodiment.

The gyro BPF 3 unit 4804 extracts an angular velocity signal (the output of the HPF phase adjustment unit 304) at 8 Hz, while the ACC BPF 3 unit 4805 extracts an ACC signal (the output of the gain correction unit 4104) at 8 Hz. The comparison unit 4806 compares the angular velocity signal and the ACC signal to calculate a rotational radius L as in the first exemplary embodiment.

The rotational radius selection unit 4807 selects an optimum rotational radius among the rotational radiuses L calculated by the comparison units 3905, 3906, and 4806 and outputs the selected optimum rotational radius L to the output correction unit 309. Accordingly, the present exemplary embodiment can correct the parallel vibration using the rotational radius L at the frequency selected by the rotational radius selection unit 4807 (the output of the rotational radius selection unit 4807) among the extraction frequency levels (2 Hz, 5 Hz, or 8 Hz).

In the present exemplary embodiment, the gain adjustment unit 311 illustrated in FIG. 3 is not used. Accordingly, the HPF integration filter 310 for correcting the phase displacement of the gain adjustment unit 311 is not necessary in the present exemplary embodiment. Therefore, the present exemplary embodiment calculates the angular vibration correction target value and the parallel vibration correction target value based on the output of the HPF integration filter 301.

A method for calculating an optimum rotational radius L with the rotational radius selection unit 4807 is described in detail below.

Figure 50:
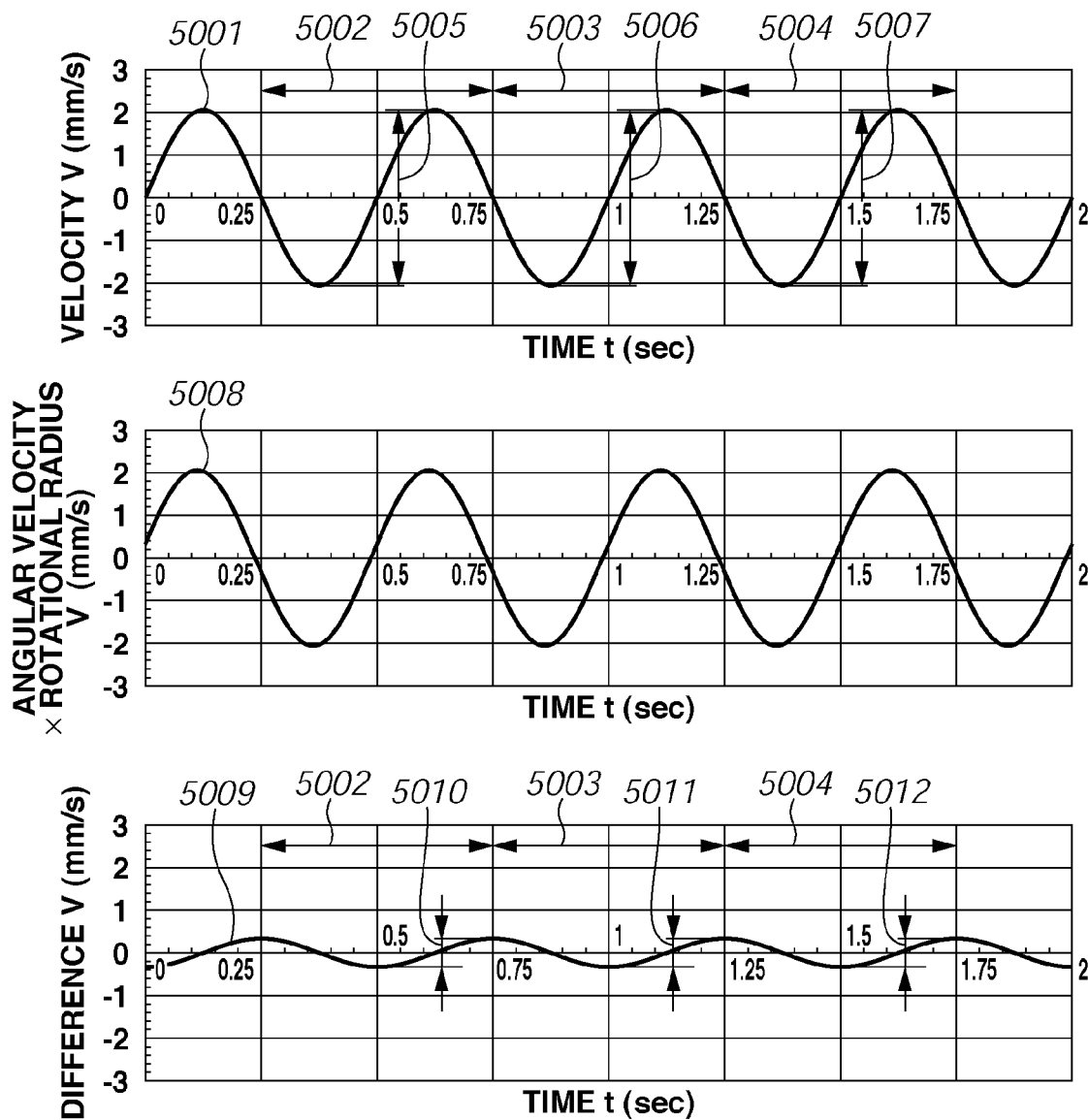
FIG. 50 illustrates exemplary waveforms for vibration used in the image stabilization control apparatus according to the third exemplary embodiment of the present invention.

FIG. 50 illustrates exemplary waveforms of vibration in the image stabilization control apparatus according to the present exemplary embodiment. Referring to FIG. 50, a waveform 5001 indicates an output of the ACC BPF 1 unit 3902. The waveform 5008 is a signal waveform acquired by multiplying the output of the gyro BPF 1 unit 3901 by a rotational radius L calculated by the comparison unit 3905. That is, the waveform 5008 indicates the velocity calculated based on the output of the gyro 6807$p$. The dimension of the waveform 5008 is similar to that of the waveform 5001. The positional relationship between the waveforms 5001 and 5008 may be offset from each other.

If the rotational center is fixed at one position, the waveforms 5001 and 5008 positionally match. However, if a plurality of rotational centers exists and the ACC 101$p$ has detected a combined vibration from the plurality of rotational centers, then the phase against the angular velocity signal may vary according to the magnitude of the vibration at each rotational center at a specific moment. Accordingly, in this case, the positional offset between the waveforms 5001 and 5008 may occur.

In this regard, if the parallel vibration is corrected using a rotational radius L at a frequency at which the waveform of the output of the ACC BPF 1 unit 3902 and the waveform of the output acquired by multiplying the output of the gyro BPF 1 unit 3901 by the rotational radius L match each other and also at which the phase of the output of the ACC BPF 1 unit 3902 and the phase of the output calculated by multiplying the output of the gyro BPF 1 unit 3901 by the rotational radius L match each other, then the accuracy of correcting the parallel vibration can become very high.

In this regard, the rotational radius selection unit 4807 calculates a waveform 5009, which is a difference between the waveforms 5001 and 5008, in order to determine the matching status (matching degree) between the two waveforms 5001 and 5008. The rotational radius selection unit 4807 periodically executes sampling on the waveforms 5001 and 5009 and compares the result of the sampling.

In the example illustrated in FIG. 50, arrows 5002 through 5004 each indicate a sampling period. Arrows 5005 through 5007 and 5010 through 5012 each indicate a maximum amplitude (difference between maximum and minimum values) of the waveforms 5001 and 5009 during the sampling periods.

As the sampling period, the present exemplary embodiment sets a period of the extraction frequency. In this regard, if the extraction frequency is set at 2 Hz, the sampling period is 0.5 seconds.

The lens CPU 6808 averages the maximum amplitudes of the waveforms 5001 and 5009 for each period calculated, in the above-described manner, to prevent degradation of the accuracy of determination that may occur due to a sudden change, if any, of the maximum amplitude.

In synchronization with the start of the detection of the rotational radius L, the rotational radius selection unit 4807 starts calculating the maximum amplitudes of the waveforms 5001 and 5009 and calculates the averages thereof until immediately before the capture starts. Furthermore, the lens CPU 6808 calculates the ratio of the average values to calculate a matching status determination value, which is to be used for determining the degree of matching of the waveforms 5001 and 5008.

The matching degree between the waveforms 5001 and 5008 becomes higher as the matching status determination value decreases. With respect to the average of the maximum amplitudes of the waveforms 5001 and 5009, it is also useful if the method for updating moving averages for each predetermined time period described above with reference to FIG. 2 is used instead of using the average of the maximum amplitudes during the time period from the start of detection of the rotational radius to the start of capture. In this case, the lens CPU 6808 can calculate the matching status determination value by using the latest updated value at the time period immediately before the start of capture.

Figure 51:
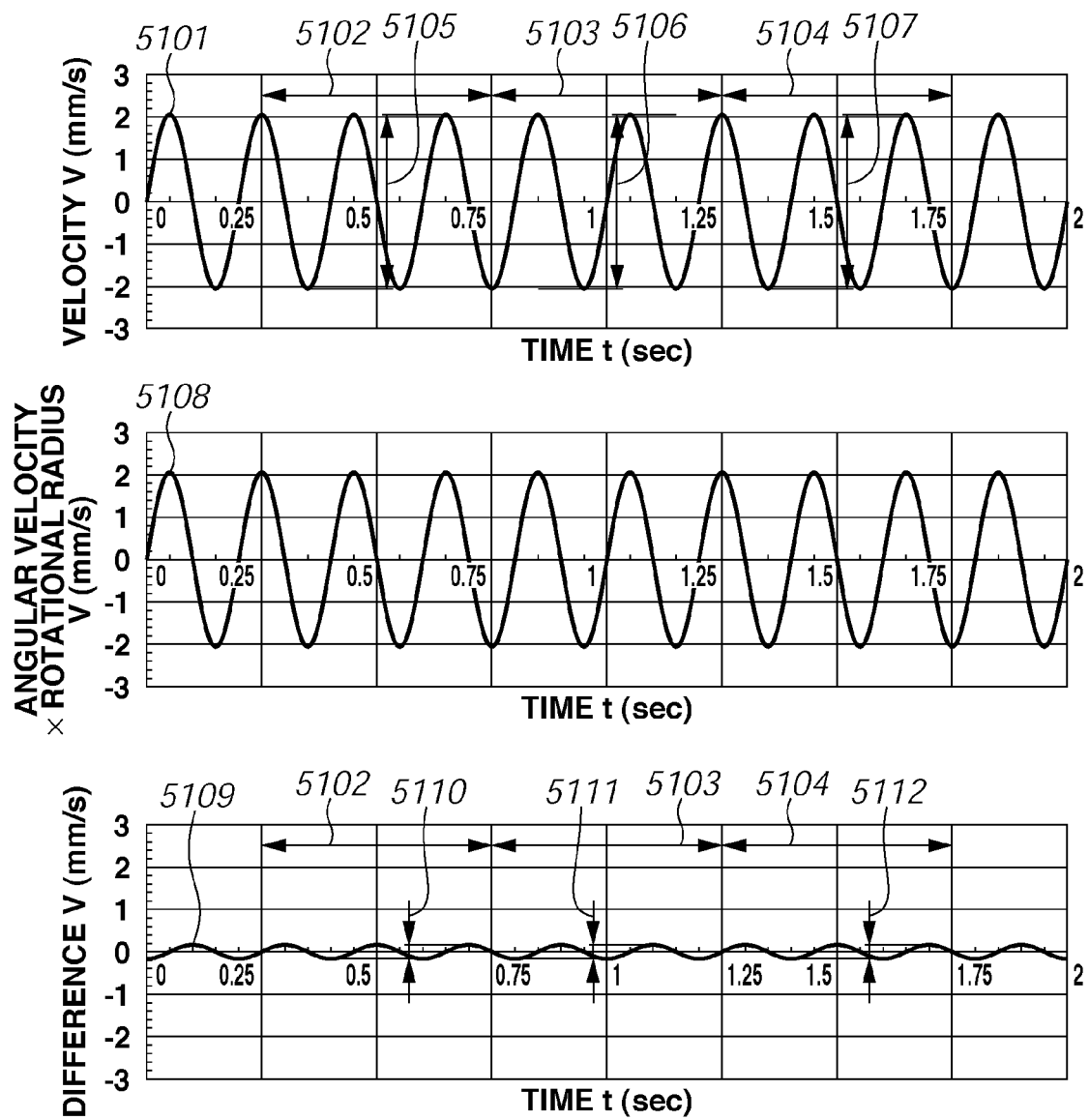
FIG. 51 illustrates exemplary waveforms for vibration in the image stabilization control apparatus according to the third exemplary embodiment of the present invention.

FIG. 51 illustrates exemplary waveforms of vibration in the image stabilization control apparatus according to the present exemplary embodiment. Referring to FIG. 51, a waveform 5101 indicates the output of the ACC BPF 2 unit 3904. A waveform 5108 is a signal waveform acquired by multiplying the output of the ACC BPF 2 unit 3904 by the rotational radius L calculated by the comparison unit 3906.

In this regard, the rotational radius selection unit 4807 calculates a waveform 5109, which is a difference between the waveforms 5101 and 5108, in order to determine the matching status (matching degree) between the two waveforms 5101 and 5108. The rotational radius selection unit 4807 periodically executes sampling on the waveforms 5101 and 5109 and compares the result of the sampling.

In the example illustrated in FIG. 51, arrows 5102 through 5104 each indicate a sampling period. Arrows 5105 through 5107 and 5110 through 5112 each indicate a maximum amplitude (difference between maximum and minimum values) of the waveforms 5101 and 5109 during the sampling periods.

With respect to the sampling period, the same sampling period as that described above with reference to FIG. 50 is used. Accordingly, the same condition for calculating the matching status determination value calculated by the method described above with reference to FIG. 50 can be used in the method described with reference to FIG. 51. The lens CPU 6808 averages the maximum amplitudes of the waveforms 5101 and 5109 for each frequency calculated in the above-described manner.

In synchronization with the start of the detection of the rotational radius L, the rotational radius selection unit 4807 starts calculating the maximum amplitudes of the waveforms 5101 and 5109 and calculates the averages thereof until immediately before the capture starts. Furthermore, the lens CPU 6808 calculates the ratio of the average values to calculate a matching status determination value, which is to be used for determining the degree of matching of the waveforms 5101 and 5108.

Figure 52:
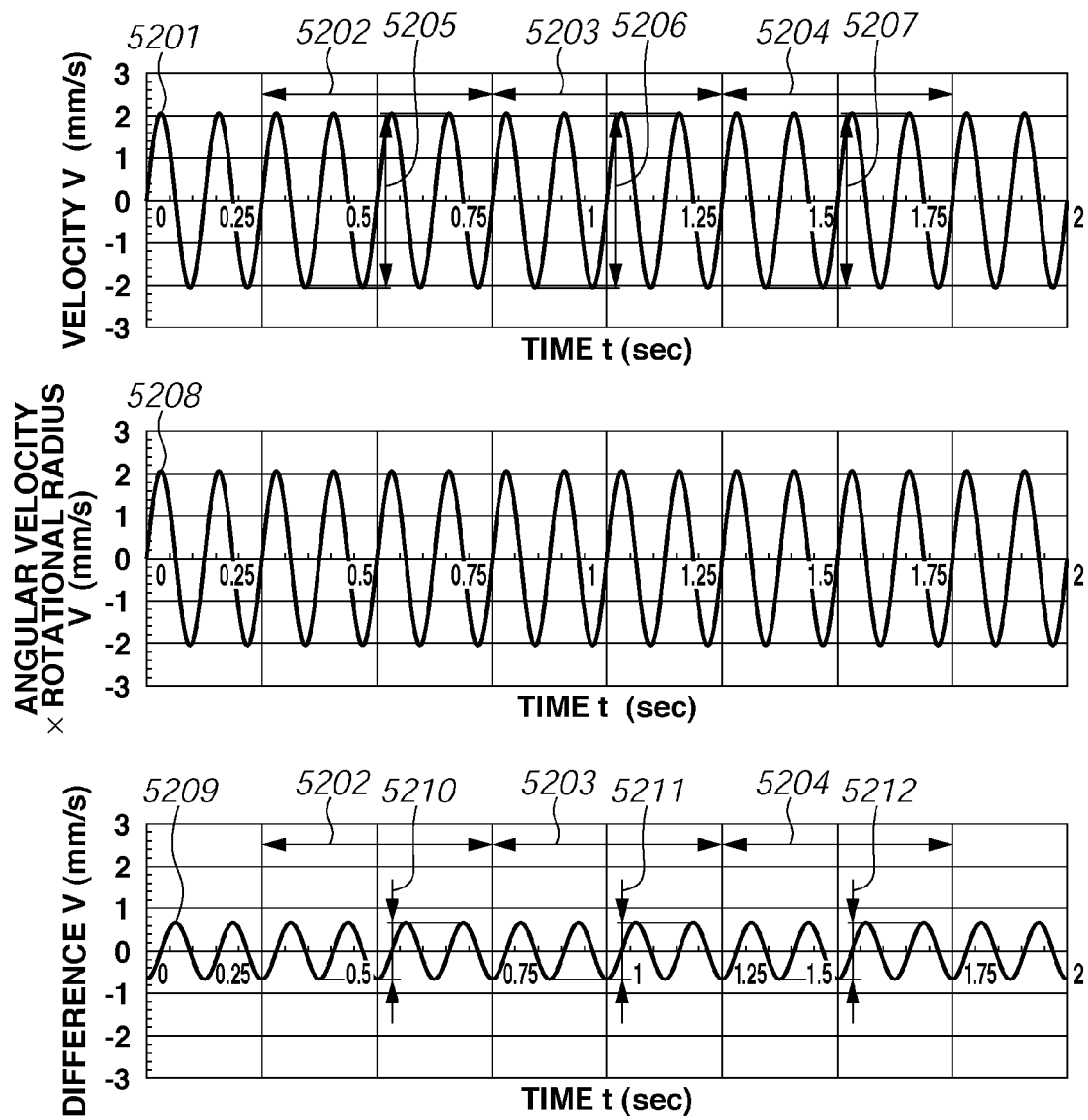
FIG. 52 illustrates exemplary waveforms for vibration in the image stabilization control apparatus according to the third exemplary embodiment of the present invention.

FIG. 52 illustrates exemplary waveforms of vibration in the image stabilization control apparatus according to the present exemplary embodiment. Referring to FIG. 52, a waveform 5201 indicates an output of the ACC BPF 3 unit 4805. A waveform 5208 is a signal waveform calculated by multiplying the output of the gyro BPF 3 unit 4804 by the rotational radius L calculated by the comparison unit 4806.

In this regard, the rotational radius selection unit 4807 calculates a waveform 5209, which is a difference between the waveforms 5201 and 5208, in order to determine the matching status (matching degree) between the two waveforms 5201 and 5208. The rotational radius selection unit 4807 periodically executes sampling on the waveforms 5201 and 5209 and compares the result of the sampling.

In the example illustrated in FIG. 52, arrows 5202 through 5204 each indicate a sampling period. Arrows 5205 through 5207 and 5210 through 5212 each indicate a maximum amplitude (difference between maximum and minimum values) of the waveforms 5201 and 5209 during the sampling periods.

With respect to the sampling period, the same sampling period as that described above with reference to FIG. 50 is used. Accordingly, the same condition for calculating the matching status determination value calculated by the method described above with reference to FIG. 50 can be used in the method described with reference to FIG. 52. The lens CPU 6808 averages the maximum amplitudes of the waveforms 5201 and 5209 for each frequency calculated in the above-described manner.

In synchronization with the start of the detection of the rotational radius L, the rotational radius selection unit 4807 starts calculating the maximum amplitudes of the waveforms 5201 and 5209 and calculates the averages thereof until immediately before the capture starts. Furthermore, the lens CPU 6808 calculates the ratio of the average values to calculate a matching status determination value, which is to be used for determining the degree of matching of the waveforms 5201 and 5208.

As described above, the rotational radius selection unit 4807 calculates the matching status determination value at each frequency level of 2 Hz, 5 Hz, and 8 Hz. Furthermore, the rotational radius selection unit 4807 outputs a rotational radius L at a frequency at which the matching status determination value becomes lowest (at which the matching degree of the waveforms becomes highest) to the output correction unit 309.

The output correction unit 309 calculates a parallel vibration correction target value by multiplying the output (vibration angle) of the HPF integration filter 301 of the gyro 6807p by the input rotational radius L and the imaging magnification, which is calculated based on the and the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

With the above-described configuration, the present exemplary embodiment can calculate a rotational radius L having the highest effect of correcting the parallel vibration of all calculated rotational radiuses L. Accordingly, the present exemplary embodiment can correct the parallel vibration with high accuracy.

In the example illustrated in FIG. 48, a plurality of BPFs is used. However, the present exemplary embodiment is not limited to this. For example, it is also useful if Fourier transform is used to calculate the rotational radius L at each frequency and select an optimum rotational radius L at an appropriate frequency among the frequency levels, as described above with reference to FIG. 26.

In this case, the lens CPU 6808 can calculate the matching status determination value according to the difference between the velocity and a value calculated by multiplying the angular velocity by the rotational radius L as described above with reference to FIGS. 50 through 52. Alternatively, it is also useful if the lens CPU 6808 selects a rotational radius L at a frequency at which the offset against the phase of the velocity (angular velocity×rotational radius) at each frequency calculated by Fourier transform is smallest of all rotational radiuses L.

Figure 53:
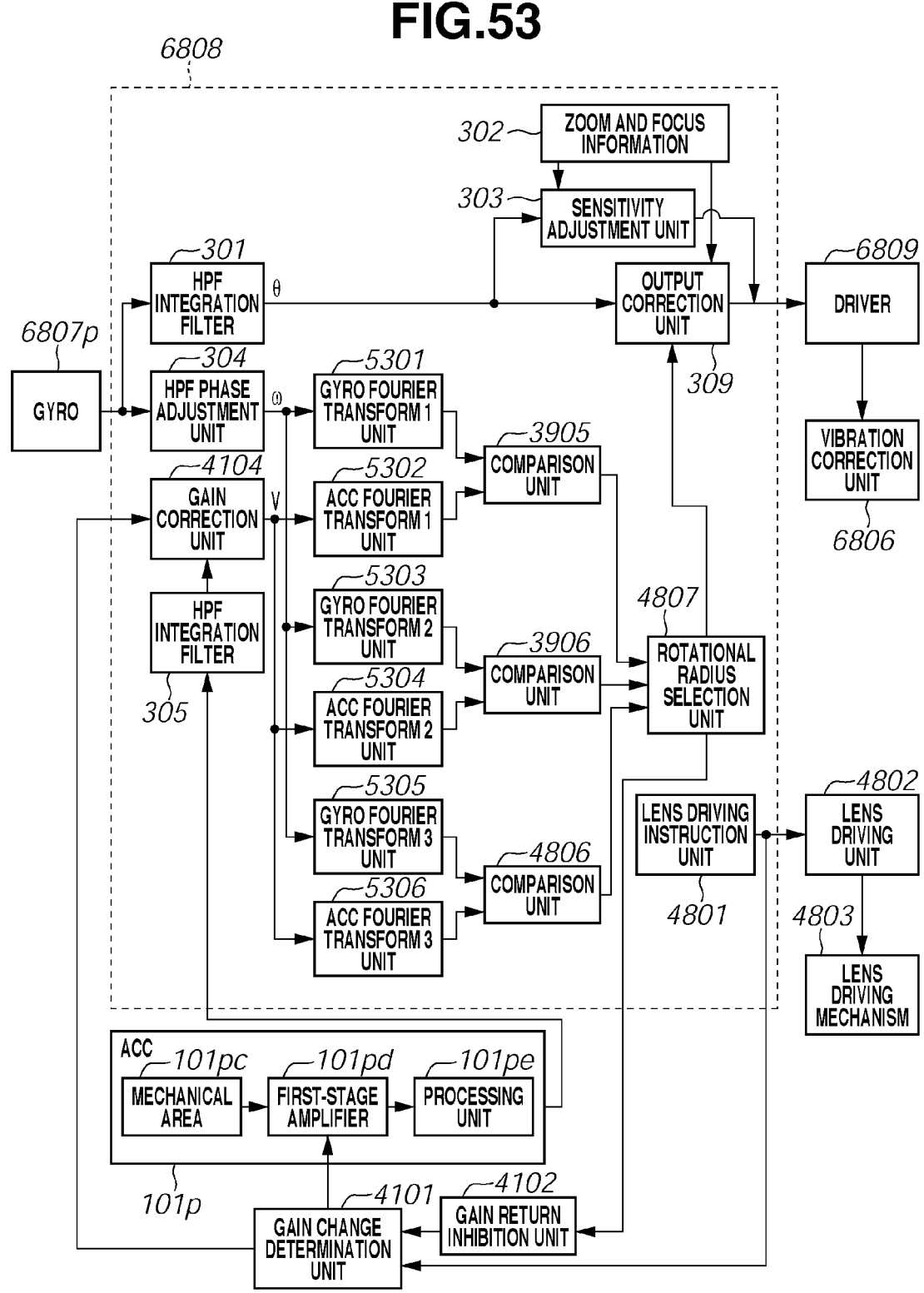
FIG. 53 illustrates another exemplary configuration of the image stabilization control apparatus according to the third exemplary embodiment of the present invention.

FIG. 53 illustrates an exemplary configuration employed in this case according to the present exemplary embodiment.

The configuration illustrated in FIG. 53 is different from the configuration illustrated in FIG. 48 in the following point. That is, the configuration illustrated in FIG. 53 includes a gyro Fourier transform 1 unit 5301, an ACC Fourier transform 1 unit 5302, a gyro Fourier transform 2 unit 5303, an ACC Fourier transform 2 unit 5304, a gyro Fourier transform 3 unit 5305, and an ACC Fourier transform 3 unit 5306 instead of components illustrated in FIG. 48, namely, the gyro BPF 1 unit 3901, the ACC BPF 1 unit 3902, the gyro BPF 2 unit 3903, the ACC BPF 2 unit 3904, the gyro BPF 3 unit 4804, and the ACC BPF 3 unit 4805.

The angular velocity and the spectrum of the velocity at each frequency calculated by each Fourier transform unit can be calculated by the above-described expressions (9) and (10). The rotational radius selection unit 4807 calculates the phase of the velocity and the phase of the angular velocity at each frequency by using the following expressions (17) and (18):

$$\varphi_{V_F} = \frac{\sum_{t=0}^{\frac{n}{f}} G(t)\sin 2\pi f}{\sum_{t=0}^{\frac{n}{f}} G(t)\cos 2\pi f} \tag{17}$$

$$\varphi_{\omega_F} = \frac{\sum_{i=0}^{\frac{n}{f}} H(t)\sin 2\pi f}{\sum_{i=0}^{\frac{n}{f}} H(t)\cos 2\pi f}. \tag{18}$$

In an ideal case where only one rotational center exists, the phase of the velocity calculated by the expression (17) and the phase of the angular velocity calculated by the expression (18) should match each other. However, if a plurality of rotational centers exists and the ACC has detected a combined vibration from the rotational centers, then the phase of the velocity against the phase of the angular velocity may vary due to the magnitude of the vibration at each rotational center at a specific time.

In the present exemplary embodiment, the rotational radius selection unit 4807 calculates the difference between the phases resulting from the calculation by the expressions (17) and (18) (the expressions for calculating the velocity and the angular velocity) by using the expressions (17) and (18). Furthermore, the rotational radius selection unit 4807 outputs the rotational radius L at a frequency at which the difference between the phases resulting from the calculation by the expressions (17) and (18) is smallest to the output correction unit 309.

The output correction unit 309 calculates a parallel vibration correction target value by multiplying the output (vibration angle) of the HPF integration filter 301 of the gyro 6807p by the input rotational radius L and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

With the above-described configuration, the present exemplary embodiment can calculate a rotational radius L having the highest effect of correcting the parallel vibration of all calculated rotational radiuses L. Accordingly, the present exemplary embodiment can correct the parallel vibration with high accuracy.

Figure 54:
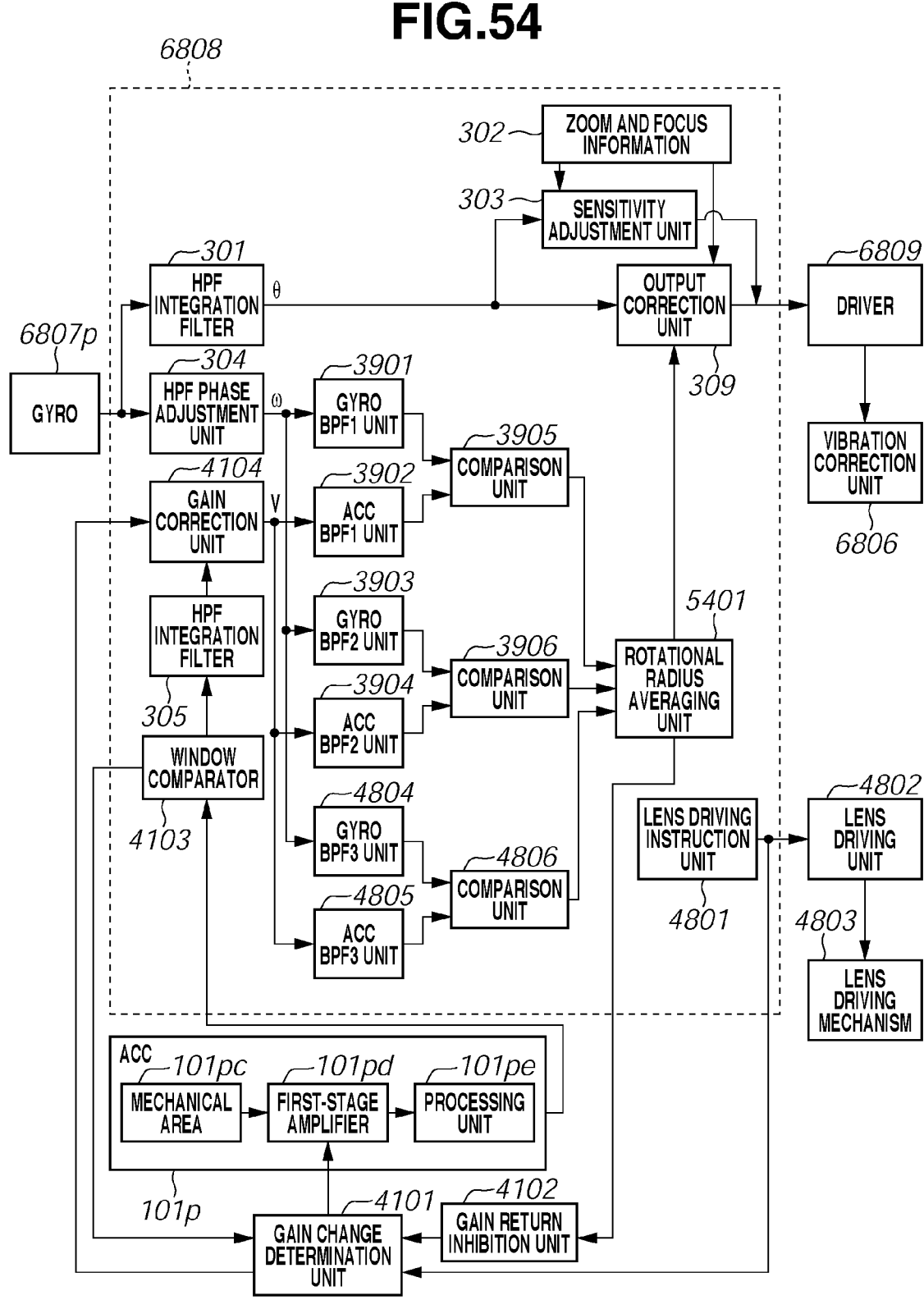
FIG. 54 illustrates an exemplary configuration of an image stabilization control apparatus according to a fourth exemplary embodiment of the present invention.

A fourth exemplary embodiment of the present invention is described below. FIG. 54 illustrates an exemplary configuration of the image stabilization control apparatus included in a single-lens reflex camera according to the present exemplary embodiment.

The present exemplary embodiment is different from the above-described third exemplary embodiment in the following points.

The gain of the first-stage amplifier 101pd of the ACC 101p is reduced based on a result of the determination by the window comparator 4103 described above with reference to FIG. 41 but whether to return the reduced gain to its original value is switched based on a camera actuator driving timing signal.

The rotational radius L is used as the average value of the rotational radiuses L at a plurality of frequency levels.

Accordingly, the configuration of the present exemplary embodiment (FIG. 54) is different from the configuration described above with reference to FIG. 48 in the following points.

1) The configuration according to the present exemplary embodiment includes the window comparator 4103.

2) The rotational radius averaging unit 5401 is included instead of the rotational radius selection unit 4807.

To begin with, a method for changing the gain of the ACC 101p is described in detail below. In the above-described third exemplary embodiment, the reduction and the returning of the gain of the first-stage amplifier 101pd are executed based on a lens driving instruction signal for focusing. In this regard, in the present exemplary embodiment, the lens CPU 6808 reduces the gain of the first-stage amplifier 101pd according to the magnitude of the output of the ACC 101p as in the second exemplary embodiment. Furthermore, in the present exemplary embodiment, the lens CPU 6808 returns the gain to its original value according to a lens driving instruction signal for focusing as in the third exemplary embodiment.

Figure 55:
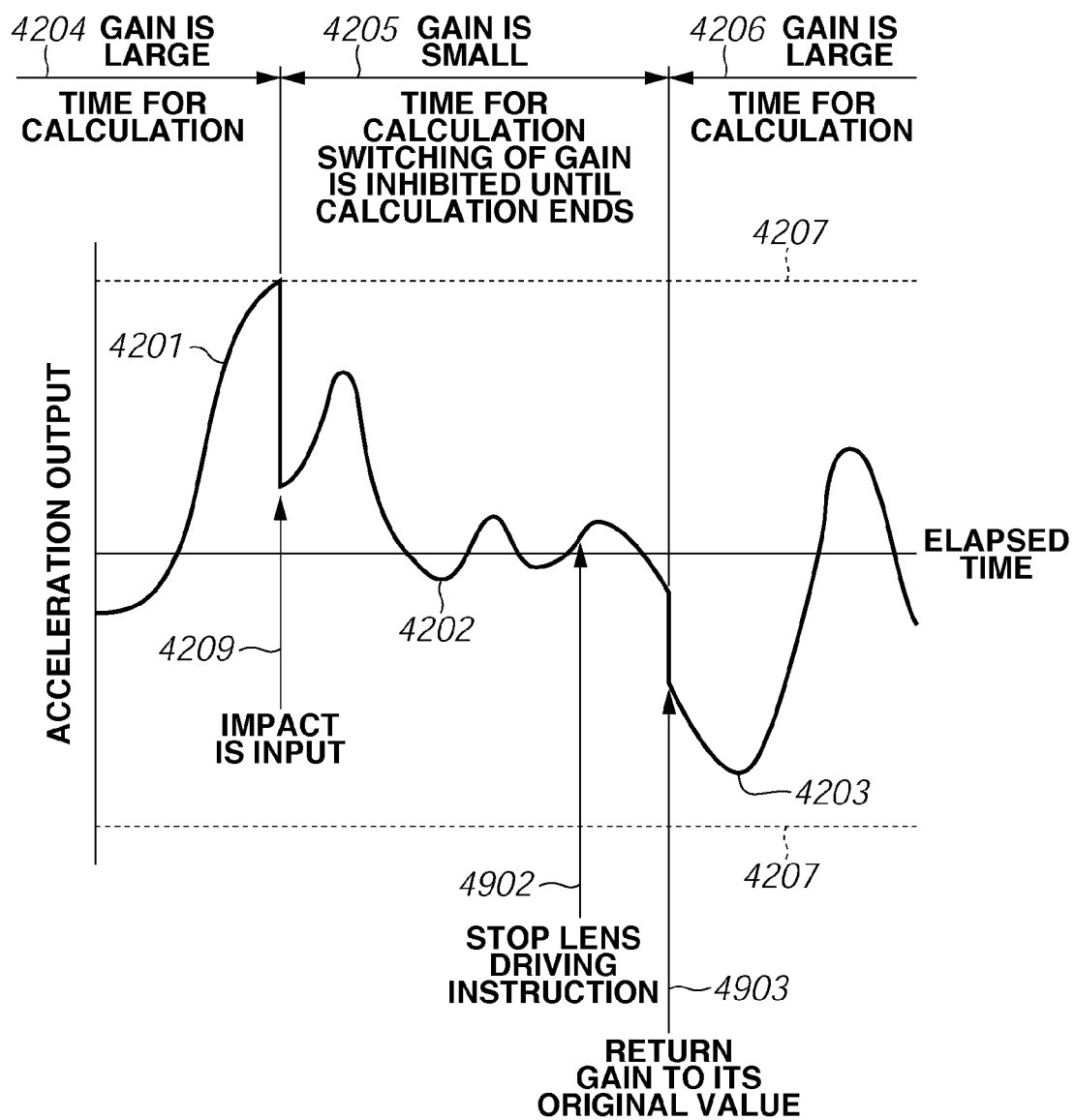
FIG. 55 illustrates an exemplary waveform of an output from the accelerometer according to the fourth exemplary embodiment of the present invention.

FIG. 55 illustrates the above-described processing with an waveform of the ACC 101p. In the example illustrated in FIG. 55, the elapsed time is shown on the horizontal axis. The ACC output is shown on the vertical axis.

The waveforms 4201 and 4203 indicate the outputs of the ACC 101p during the time periods 4204 and 4206 when the gain of the first-stage amplifier 101pd is normal. The waveform 4202 indicates the output of the ACC 101p in the time period 4205 when the gain of the first-stage amplifier is reduced to one-third of the original level.

In the example illustrated in FIG. 55, with respect to the waveform 4201, when an impact indicated by an arrow 4209 is input, the output of the impact has exceeded the determination level (first area) 4207. Accordingly, the window comparator 4103 outputs a gain reducing signal to reduce the gain of the first-stage amplifier 101pd and acquire a waveform 4202.

Then, at timing of suspension of the lens driving instruction, which is indicated by an arrow 4902, the occurrence of vibration from driving of the lens ends. The gain of the first-stage amplifier 101pd can be returned to its original value at this timing. However, in the present exemplary embodiment, the gain of the first-stage amplifier 101pd is returned to its original value after waiting for a separation of timing of calculating a rotational radius L, which is indicated by an arrow 4903. The gain return inhibition unit 4102 operates as described above with reference to FIG. 42.

The gain return inhibition unit 4102 inhibits the gain change determination unit 4101 from returning the gain to its original value before a rotational radius averaging signal is input from the rotational radius averaging unit 5401. The lens CPU 6808 calculates a next rotational radius L after returning the gain of the first-stage amplifier 101pd to the original value.

By utilizing the ACC output in reducing the gain, the present exemplary embodiment can reduce the gain of the first-stage amplifier 101pd only when it is useful.

With respect to the timing for returning the gain to its original value, the present exemplary embodiment utilizes a reliable timing at which no actuator is driven instead of determining whether the gain can be returned to its original value by observing the waveform for a predetermined time period after the ACC output is reduced as described above in the second exemplary embodiment.

In the above-described second exemplary embodiment, the lens CPU 6808 returns the gain to its original value if the output detected by the ACC 101p is reduced for a predetermined time period so as not to return the gain to its original value when an impact is momentarily lost during a time period in which the camera is subjected to continuous impacts.

In the present exemplary embodiment, the lens CPU 6808 detects a driving instruction timing. Accordingly, because a driving end timing is input, the lens CPU 6808 can recognize that a great vibration is no applied to the camera after the driving end timing is input.

Now, a method for correcting the parallel vibration by calculating and using an average value of rotational radiuses L at a plurality of frequency levels is described in detail below.

The present exemplary embodiment uses three pairs of BPFs in calculating the rotational radius L as described above with reference to FIG. 48. The rotational radius averaging unit 5401 calculates the average value of the rotational radiuses L calculated by the comparison units 3905, 3906, and 4806. Accordingly, the present exemplary embodiment corrects the parallel vibration by using the rotational radius L averaged by the rotational radius averaging unit 5401 at the extraction frequency levels of 2 Hz, 5 Hz, and 8 Hz, for example.

The rotational radius averaging unit 5401 calculates the average of the rotational radiuses L calculated by the comparison units 3905, 3906, and 4806 for each of the sampling periods 5002 through 5004 illustrated in FIGS. 50 through 52. When the capture starts, the lens CPU 6808 further calculates an average of the average values of the rotational radiuses L calculated for each sampling period to correct the parallel vibration.

With respect to the averaging of the rotational radiuses L for correcting the parallel vibration, it is also useful if the moving average for each predetermined time period is updated as described above in the second exemplary embodiment instead of calculating the average of the time period from the timing at which the detection of the rotational radius starts to the timing of the start of capture. In this case, the lens CPU 6808 calculates the matching status determination value by using a latest updated value in a time period immediately before the capture starts.

The output correction unit 309 calculates a parallel vibration correction target value by multiplying the output (vibration angle) of the HPF integration filter 301 of the gyro 6807p by the rotational radius L, which is input from the rotational radius averaging unit 5401, and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

With the above-described configuration, the present exemplary embodiment can calculate a rotational radius L by using the average value of the rotational radiuses L calculated for each frequency. Accordingly, the present exemplary embodiment can stably execute the correction of the parallel vibration.

In the example illustrated in FIG. 54, a plurality of BPFs is used. However, the present exemplary embodiment is not limited to this. For example, it is also useful if Fourier transform is used to calculate the rotational radius L at each frequency and calculate a rotational radius L by using the average of the rotational radiuses L, as described above with reference to FIG. 53.

Figure 56:
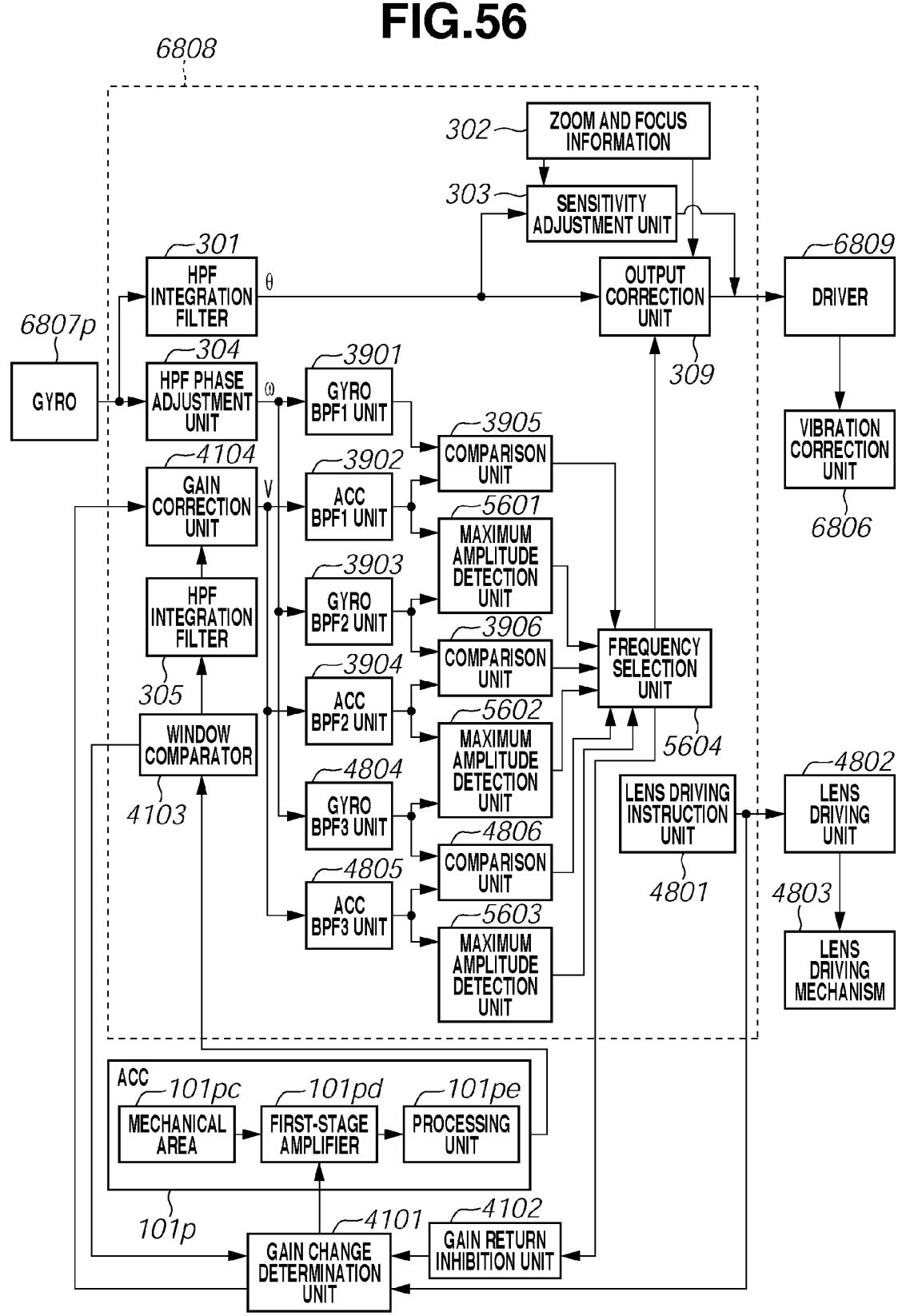
FIG. 56 illustrates an exemplary configuration of an image stabilization control apparatus according to a fifth exemplary embodiment of the present invention.

A fifth exemplary embodiment of the present invention is described below. FIG. 56 illustrates an exemplary configuration of the image stabilization control apparatus included in a single-lens reflex camera according to the present exemplary embodiment.

With respect to the rotational radius L, the present exemplary embodiment calculates a rotational radius L at a frequency at which the vibration velocity becomes highest instead of calculating the average value of the rotational radiuses L at a plurality of frequency levels.

Accordingly, the configuration of the present exemplary embodiment illustrated in FIG. 56 is different from the above-described configuration of the fourth exemplary embodiment illustrated in FIG. 54 in the following points.

The present exemplary embodiment includes maximum amplitude detection units 5601 through 5603.

The present exemplary embodiment includes a frequency selection unit 5604 instead of the rotational radius averaging unit 5401.

The present exemplary embodiment uses three pairs of BPFs in calculating the rotational radius L as described above with reference to FIG. 48.

An output signal from each of the maximum amplitude detection units 5601 through 5603 is input to the frequency selection unit 5604. The frequency selection unit 5604 selects a frequency at which the vibration velocity becomes highest. In addition, the frequency selection unit 5604 outputs the rotational radius L (a signal output from either one of the comparison units 3905, 3906, and 4806) at the selected frequency to the output correction unit 309.

The output signals from the maximum amplitude detection units 5601 through 5603 are described in detail below.

The maximum amplitude detection units 5602 and 5603 each calculate maximum and minimum values of the velocity within the period for each of the sampling periods 5102 through 5104 (FIG. 51) and 5202 through 5204 (FIG. 52). Furthermore, the maximum amplitude detection units 5602 and 5603 each calculate the maximum amplitudes 5105 through 5107 (FIG. 51) and 5205 through 5207 (FIG. 52) based on the difference between the maximum and minimum values of the velocity.

Similarly, the maximum amplitude detection unit 5601 calculates maximum and minimum values of the velocity within the period of the sampling periods 5002 through 5004 (FIG. 50). Furthermore, the maximum amplitude detection unit 5601 calculates the maximum amplitudes 5005 through 5007 based on the difference between the maximum and minimum values of the velocity.

When the capture starts, the maximum amplitude detection unit 5601 further calculates an average of the maximum amplitudes calculated for each sampling period. In addition, the maximum amplitude detection unit 5601 outputs a signal of the average value to the frequency selection unit 5604.

With respect to the maximum amplitude signal, it is also useful if the moving average for each predetermined time period is updated as described above in the second exemplary embodiment instead of using the average of the time periods from the detection of the rotational radius to the start of capture.

The frequency selection unit 5604 selects a frequency at which the vibration velocity is highest among the maximum amplitudes for each frequency level calculated immediately before the start of capture, and outputs the output of the comparison unit 3905, 3906, or 4806 corresponding the selected frequency to the output correction unit 309. The comparison units 3905, 3906, and 4806 each calculate the rotational radius L for each sampling period. When the capture starts, the comparison units 3905, 3906, and 4806 each further calculate an average of the rotational radiuses L calculated for each sampling period. With respect to the signal indicating the rotational radius L, it is also useful if the moving average for each predetermined time period is updated as described above in the second exemplary embodiment instead of using the average of the time periods from the detection of the rotational radius to the start of capture.

As described above, in the present exemplary embodiment, the detection of the rotational radius L for each frequency is continued to a timing immediately before the start of capture and the frequency selection unit 5604 selects a rotational radius L at a frequency at which the vibration velocity becomes highest.

The output correction unit 309 calculates a parallel vibration correction target value by multiplying the output (vibration angle) of the HPF integration filter 301 of the gyro 6807p by the rotational radius L, which is input from the frequency selection unit 5604, and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

With the above-described configuration, the present exemplary embodiment can calculate a rotational radius L at a frequency at which the vibration velocity becomes highest. Accordingly, the present exemplary embodiment can prevent degradation of the accuracy of correcting the parallel vibration when a great vibration occurs at a specific frequency.

In the example illustrated in FIG. 56, a plurality of BPFs is used. However, the present exemplary embodiment is not limited to this. For example, it is also useful if Fourier transform is used to calculate the rotational radius L at each frequency and calculate a rotational radius L by using the average of the rotational radiuses L, as described above with reference to FIG. 53.

The present exemplary embodiment uses the maximum amplitude of the velocity output calculated by integrating the output of the ACC 101p in selecting the frequency. However, the present exemplary embodiment is not limited to this. For example, it is also useful if the displacement of vibration, which is calculated by second-order integrating the output of the ACC 101p, the output of the gyro 6807p, or an angle output calculated by integrating the output of the gyro 6807p is used.

Figure 57:
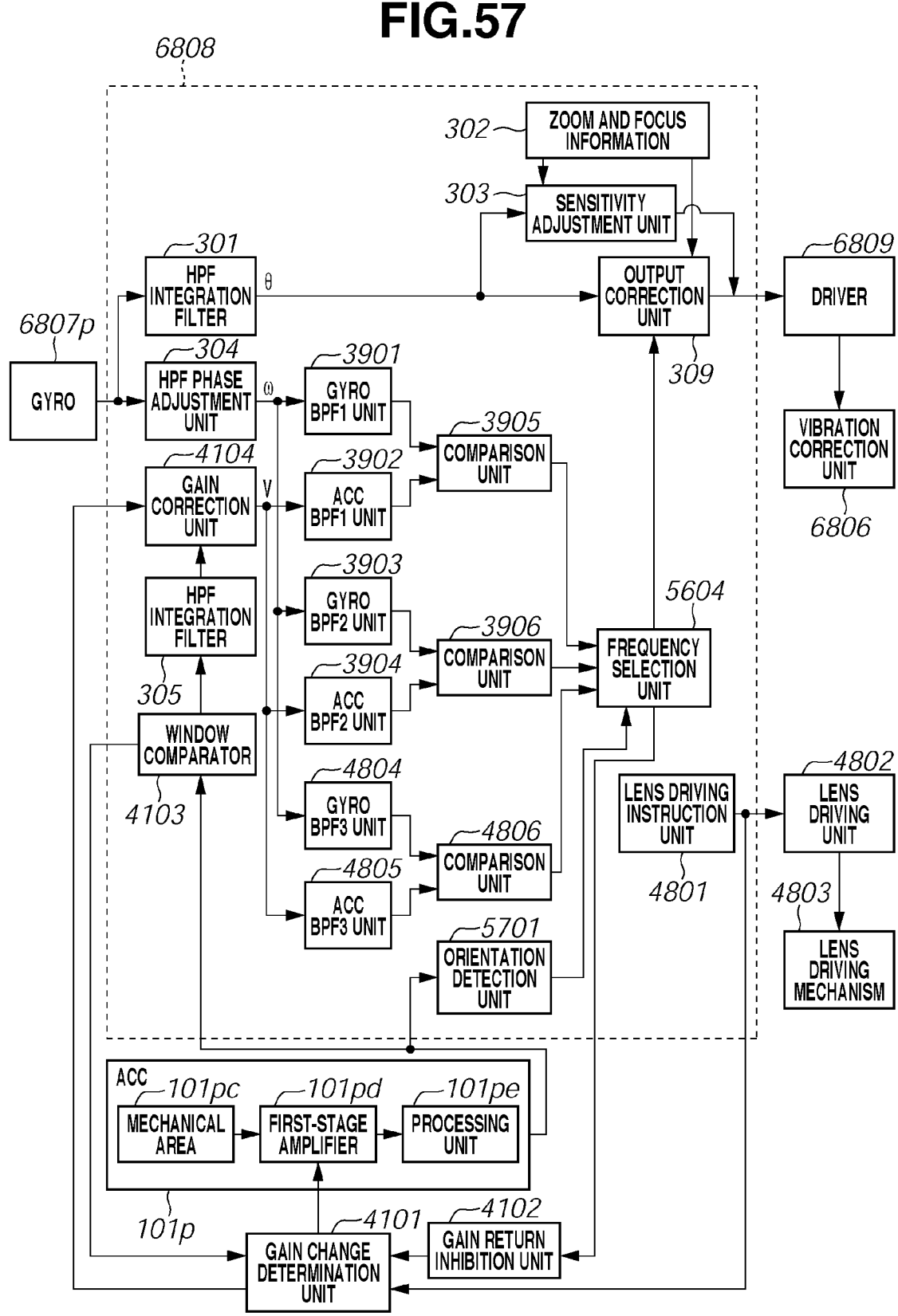
FIG. 57 illustrates an exemplary configuration of an image stabilization control apparatus according to a sixth exemplary embodiment of the present invention.
Figure 58A:
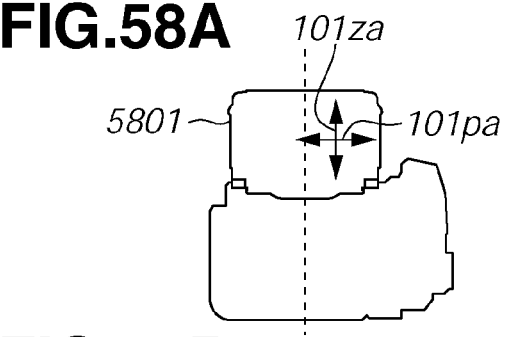
FIGS. 58A through 58H each illustrate an orientation of a camera according to the sixth exemplary embodiment of the present invention.
Figure 58B:
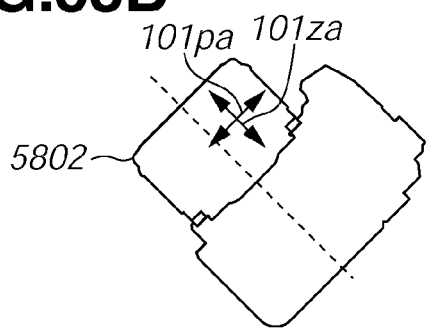
Figure 58C:
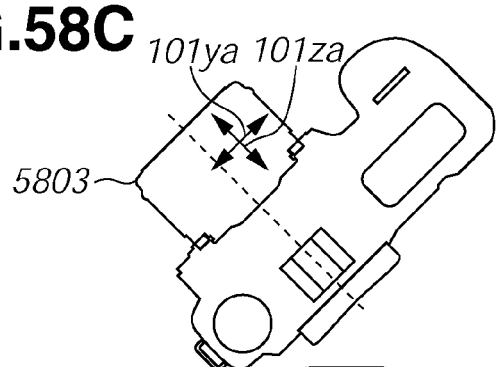
Figure 58D:
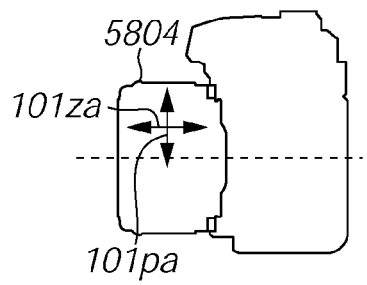
Figure 58E:
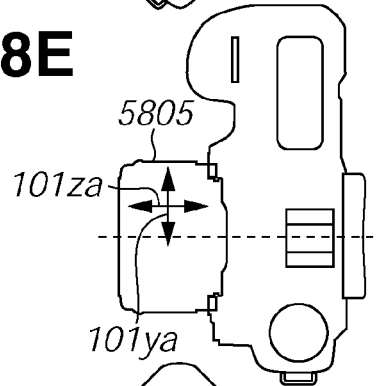
Figure 58F:
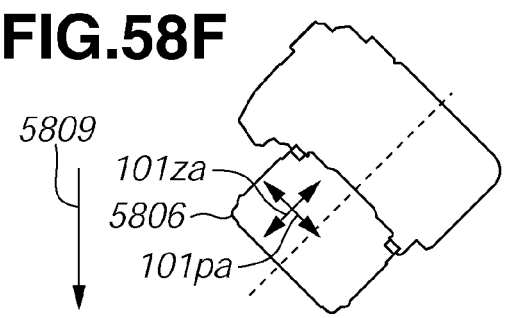
Figure 58G:
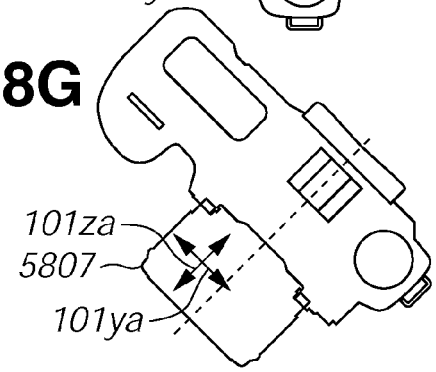
Figure 58H:
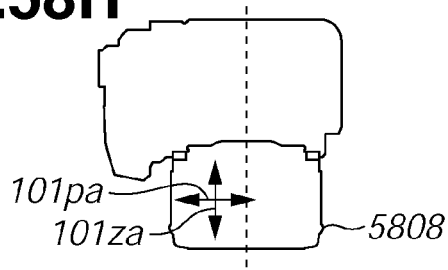

A sixth exemplary embodiment of the present invention is described in detail below. FIG. 57 illustrates an exemplary configuration of the image stabilization control apparatus included in a single-lens reflex camera according to the present exemplary embodiment.

The configuration of the present exemplary embodiment illustrated in FIG. 57 is different from the above-described configuration of the fifth exemplary embodiment illustrated in FIG. 56 in the following point.

With respect to the rotational radius L, the present exemplary embodiment selects a frequency that utilizes the rotational radius L according to the orientation of the camera instead of the rotational radius L at a frequency at which the vibration velocity becomes highest.

Accordingly, the configuration illustrated in FIG. 57 is different from the configuration illustrated in FIG. 56 in the following point. The present exemplary embodiment includes an orientation detection unit 5701 instead of the maximum amplitude detection units 5601 through 5603.

A signal of the output of the ACC 101p is input to the orientation detection unit 5701. Furthermore, although not illustrated in FIG. 57, a signal from the ACC 101y, which executes detection in a direction orthogonal to the detection direction of the ACC 101p, and a signal from the ACC 101z, which executes detection in a direction orthogonal to the detection directions of the ACC 101p and the ACC 101y, are input to the orientation detection unit 5701. The orientation detection unit 5701 uses the signals from the ACCs 101p, 101y, and 101z to detect the orientation of the camera.

FIGS. 58A through 58H each illustrate an orientation of the camera to be detected and the detection direction of the ACC in each camera orientation.

In the example illustrated in FIGS. 58A through 58H, an arrow 101pa indicates the direction of detection of the acceleration of the ACC 101p. An arrow 101ya indicates the direction of detection of the acceleration of the ACC 101y. An arrow 101za indicates the direction of detection of the acceleration of the ACC 101z. An arrow 5809 indicates the direction of gravity.

An orientation 5801 (FIG. 58A) indicates that the camera is oriented upward. An orientation 5802 (FIG. 58B) indicates that the camera is horizontally held (in a landscape-capture orientation) and is oriented in a skewed orientation by 45 degrees upward. An orientation 5803 (FIG. 58C) indicates that the camera is vertically held (in a portrait-capture orientation) and is oriented in a skewed orientation by 45 degrees upward.

An orientation 5804 (FIG. 58D) indicates that the camera is horizontally held in a landscape-capture orientation. An orientation 5805 (FIG. 58E) indicates that the camera is vertically held in a portrait-capture orientation.

An orientation 5806 (FIG. 58F) indicates that the camera is horizontally held (in a landscape-capture orientation) and is oriented in a skewed orientation by 45 degrees downward. An orientation 5807 (FIG. 58G) indicates that the camera is vertically held (in a portrait-capture orientation) and is oriented in a skewed orientation by 45 degrees downward. An orientation 5808 (FIG. 58H) indicates that the camera is oriented downward.

A rotational radius L may change according to the orientation of holding the camera. In this regard, the rotational radius L becomes smaller as the frequency becomes higher in the orientation 5804, for example. In the orientations 5801 and 5808, a low-frequency parallel vibration becomes dominant.

When the photographer vertically holds the camera in a portrait-capture orientation as in the orientation 5805, a high-frequency great parallel vibration occurs in the direction illustrated with the arrow 101ya. Accordingly, in the orientation 5804, it is useful if the parallel vibration is corrected by using an average value of the rotational radiuses L calculated based on the outputs of the ACC and the gyro at each frequency of 2 Hz, 5 Hz, and 8 Hz.

In the orientations 5801 and 5808, it is useful if the parallel vibration is corrected by using the rotational radius L calculated based on the outputs of the ACC and the gyro at 2 Hz. In the orientations 5805, it is useful if the parallel vibration is corrected by using the rotational radius L calculated based on the outputs of the ACC and the gyro at 8 Hz.

The frequency selection unit 5604 calculates an average of the signals from the comparison units 3905, 3906, and 4806 according to the signal from the orientation detection unit 5701. Alternatively, the frequency selection unit 5604 selects the signal from the comparison unit 3905 or the signal from the comparison unit 4806. The frequency selection unit 5604 outputs the rotational radius L included in the signal to the output correction unit 309.

The output correction unit 309 calculates a parallel vibration correction target value by multiplying the output (vibration angle) of the HPF integration filter 301 of the gyro 6807p by the rotational radius L, which is input from the frequency selection unit 5604, and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

With the above-described configuration, the present exemplary embodiment can calculate a rotational radius L at a frequency at which the vibration is most dominantly caused to occur according to the capture orientation of the camera. Accordingly, the present exemplary embodiment can stably and constantly correct the parallel vibration before starting capture.

Figure 59:
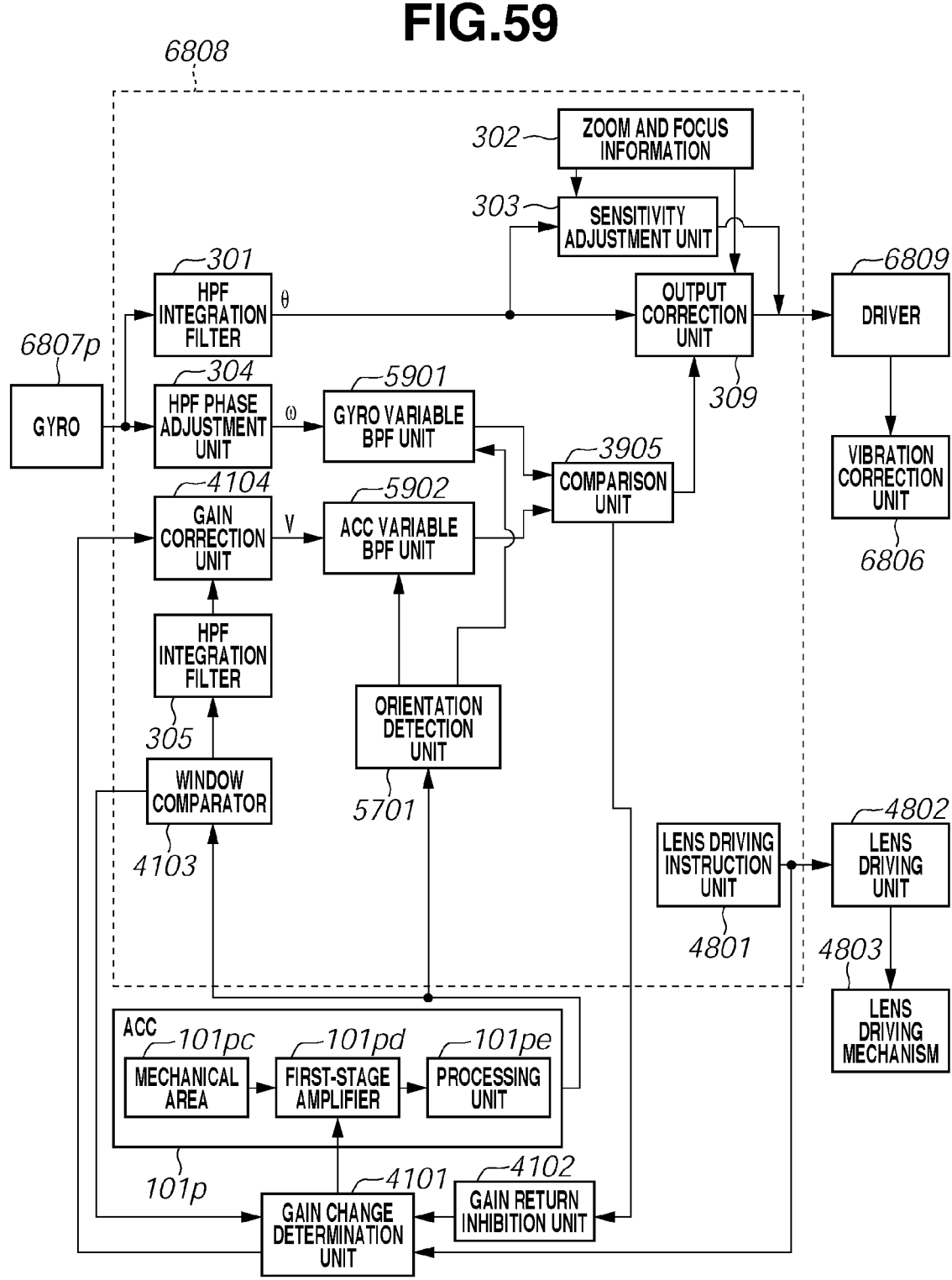
FIG. 59 illustrates an exemplary configuration of an image stabilization control apparatus according to a seventh exemplary embodiment of the present invention.

A seventh exemplary embodiment of the present invention is described below. FIG. 59 illustrates an exemplary configuration of the image stabilization control apparatus included in a single-lens reflex camera according to the present exemplary embodiment.

The configuration of the present exemplary embodiment illustrated in FIG. 59 is different from the above-described configuration of the sixth exemplary embodiment illustrated in FIG. 57 in the following point. The present exemplary embodiment uses only one BPF instead of using a plurality of BPFs and varies an extraction frequency of the BPF according to the orientation of the camera.

Accordingly, the configuration illustrated in FIG. 59 is different from the configuration illustrated in FIG. 57 in the following points.

1) The present exemplary embodiment does not include the gyro BPF 1 unit 3901, the ACC BPF 1 unit 3902, the gyro BPF 2 unit 3903, the ACC BPF 2 unit 3904, the gyro BPF 3 unit 4804, the ACC BPF 3 unit 4805, and the frequency selection unit 5604. In addition, in the present exemplary embodiment, the output of the gyro 6807p and the output of the ACC 101p (the output of the HPF phase adjustment unit 304 and the output of the gain correction unit 4104) are input to a gyro variable BPF unit 5901 and an ACC variable BPF unit 5902, respectively.

2) In the present exemplary embodiment, the output of the orientation detection unit 5701 is input to the gyro variable BPF unit 5901 and the ACC variable BPF unit 5902.

3) A rotational radius calculation in-process signal from the comparison unit 3905 is input to the gain return inhibition unit 4102.

If the camera is oriented in the orientation 5804, the orientation detection unit 5701 sets a BPF extraction frequency of the gyro variable BPF unit 5901 and the ACC variable BPF unit 5902 at 5 Hz. If the camera is oriented in the orientation 5805, the orientation detection unit 5701 sets a BPF extraction frequency of the gyro variable BPF unit 5901 and the ACC variable BPF unit 5902 at 8 Hz. If the camera is oriented in the orientation 5801 or 5808, the orientation detection unit 5701 sets a BPF extraction frequency of the gyro variable BPF unit 5901 and the ACC variable BPF unit 5902 at 2 Hz.

The frequency for extracting the rotational radiuses L can be determined by previously detecting the orientation of the camera. Accordingly, in this case, it is not necessary to provide a plurality of BPFs to the camera. Furthermore, in this case, the operation load can be reduced. Accordingly, the present exemplary embodiment can implement a parallel vibration correction system useful in applying to a consumer product.

The comparison unit 3905 calculates a rotational radius L based on the outputs of the gyro variable BPF unit 5901 and the ACC variable BPF unit 5902. Furthermore, the comparison unit 3905 outputs the calculated rotational radius L to the output correction unit 309.

The output correction unit 309 calculates a parallel vibration correction target value by multiplying the output (vibration angle) of the HPF integration filter 301 of the gyro 6807p by the rotational radius L, which is input from the comparison unit 3905, and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804a has been half-pressed to correct the angular vibration.

When the release button 6804a is fully pressed (during the exposure time period), the driving unit 6809 drives the vibration correction unit 6806 based on the angular vibration correction target value and the parallel vibration correction target value from the output correction unit 309.

As described above, the present exemplary embodiment sets a BPFs for extracting a frequency that is most dominant in causing the vibration according to the orientation of the camera during capture. Accordingly, it is not necessary to provide a plurality of BPFs to the camera. Furthermore, the operation load can be reduced. Accordingly, the present exemplary embodiment can implement a parallel vibration correction system useful in applying to a consumer product.

Figure 60:
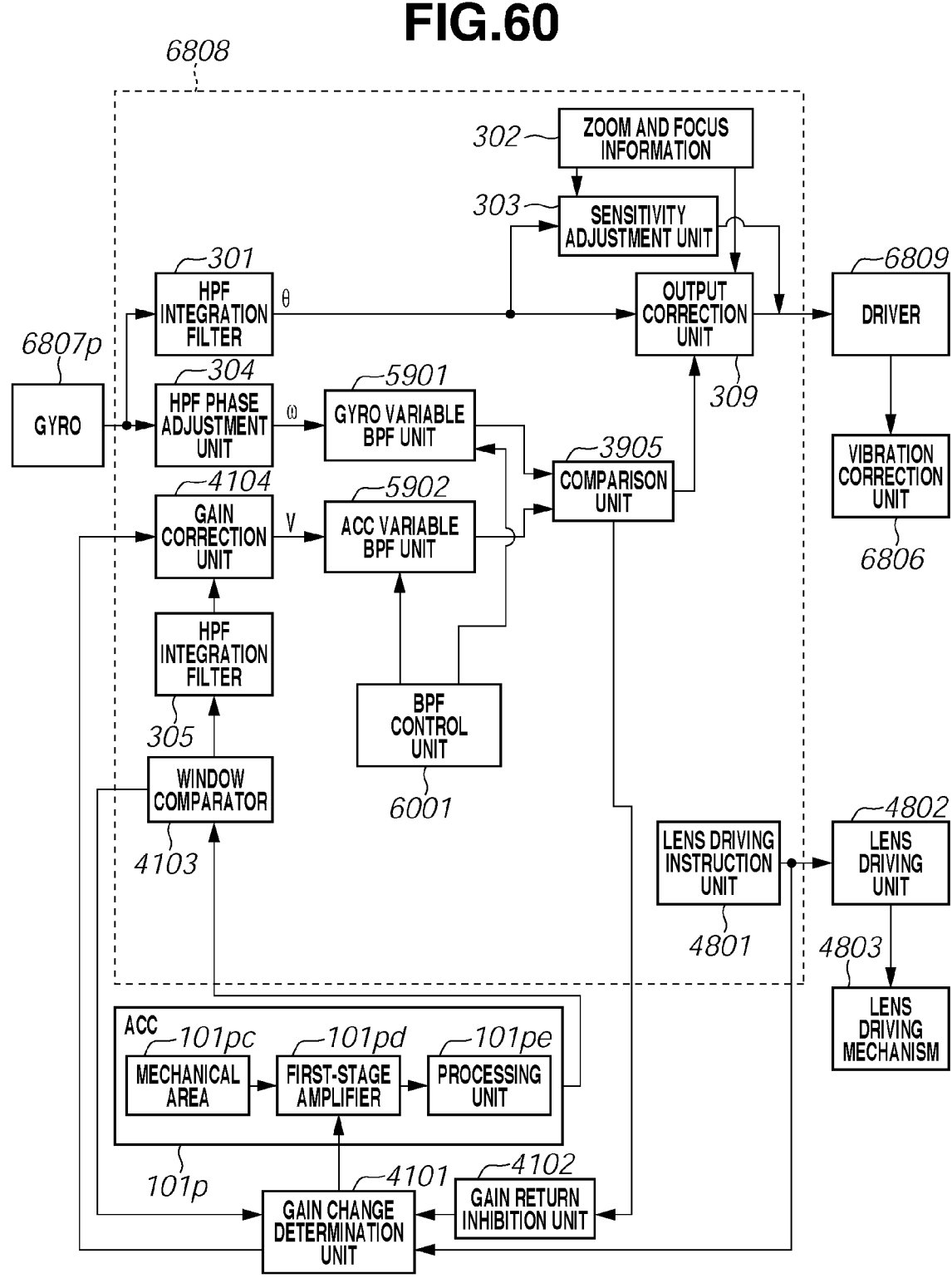
FIG. 60 is a block diagram illustrating an exemplary configuration of an image stabilization control apparatus according to an eighth exemplary embodiment of the present invention.

An eighth exemplary embodiment of the present invention is described below. FIG. 60 illustrates an exemplary configuration of the image stabilization control apparatus included in a single-lens reflex camera according to the present exemplary embodiment.

The configuration of the present exemplary embodiment illustrated in FIG. 60 is different from the above-described configuration of the seventh exemplary embodiment illustrated in FIG. 59 in the following point. The present exemplary embodiment, uses a variable frequency for one BPF as in the seventh exemplary embodiment.

However, in the present exemplary embodiment, the extraction frequency changes with the lapse of time. That is, the present exemplary embodiment changes the break frequency of the BPF at intervals of a predetermined period (e.g., a period twice longer than the period 2801 (FIG. 28)).

More specifically, the present exemplary embodiment takes one second at the break frequency of 2 Hz. Then, the present exemplary embodiment calculates the rotational radius L based on the maximum amplitudes of the velocity signal and the angular velocity signal during the one-second time period.

Furthermore, the present exemplary embodiment takes 0.4 seconds at the break frequency of 5 Hz. Then, the present exemplary embodiment calculates the rotational radius L based on the maximum amplitudes of the velocity signal and the angular velocity signal during the 0.4-second time period. In addition, the present exemplary embodiment takes 0.25 seconds at the break frequency of 8 Hz. Then, the present exemplary embodiment calculates the rotational radius L based on the maximum amplitudes of the velocity signal and the angular velocity signal during the 0.25-second time period.

To paraphrase this, the rotational radius (correction value) L is calculated based on a first signal and a second signal in a plurality of different frequency bands chronologically extracted as a first frequency band. Accordingly, the configuration illustrated in FIG. 60 is different from the configuration illustrated in FIG. 59 in the following point.

The present exemplary embodiment includes a BPF control unit 6001 instead of the orientation detection unit 5701. An output signal from the BPF control unit 6001 is input to the gyro variable BPF unit 5901 and the ACC variable BPF unit 5902. The BPF control unit 6001 sets the BPF break frequency at 2 Hz, 5 Hz, and 8 Hz for the gyro variable BPF unit 5901 and the ACC variable BPF unit 5902 from the start of detection of rotational radius (i.e., from the time t2 (FIG. 30)) and uses the BPF break frequency in a circulating manner.

The BPF break frequency can be circulatingly used in such a descending or ascending numeric order as "2 Hz→5 Hz→8 Hz→5 Hz→2 Hz→5 Hz" in order to prevent a rapid frequency change (e.g., 8 Hz→2 Hz) during the circulation. This is because if the frequency is rapidly changed, it takes time to stabilize the BPF after the break frequency is changed.

The comparison unit 3905 calculates the rotational radiuses L at the BPF break frequency of each of the gyro variable BPF unit 5901 and the ACC variable BPF unit 5902. When capture starts, the comparison unit 3905 calculates an average of the rotational radiuses L and outputs the average to the output correction unit 309. Alternatively, the comparison unit 3905 can update a moving average of the rotational radiuses L (e.g., an average of three rotational radiuses L) at each break frequency. In this case, when capture starts, the comparison unit 3905 outputs a latest rotational radius L to the output correction unit 309.

The output correction unit 309 calculates a parallel vibration correction target value by multiplying the output (vibration angle) of the HPF integration filter 301 of the gyro 6807*p* by the rotational radius L, which is input from the comparison unit 3905, and the imaging magnification, which is calculated based on the zoom and focus information 302.

The driving unit 6809 drives the vibration correction unit 6806 based on the angular vibration correction target value from the sensitivity adjustment unit 303 during the time period in which the release button 6804*a* has been half-pressed to correct the angular vibration.

When the release button 6804*a* is fully pressed (during the exposure time period), the driving unit 6809 drives the vibration correction unit 6806 based on the angular vibration correction target value and the parallel vibration correction target value from the output correction unit 309.

In the present exemplary embodiment, a chronologically variable BPF extraction frequency is used. Accordingly, it is not necessary to provide a plurality of BPFs to the camera. Furthermore, the present exemplary embodiment can reduce the operation load. Accordingly, the present exemplary embodiment can implement a parallel vibration correction system useful in applying to a consumer product.

A ninth exemplary embodiment of the present invention is described below. In the above-described exemplary embodiments 1 through 8, an image stabilization control apparatus is applied to a single-lens reflex camera having an exchangeable lens. However, the present invention is not limited to this. For example, the present invention can be applied to a compact camera and a video camera in which the lens is integrally mounted on the apparatus body or to a camera system assembled in a portable device.

In the above-described first through eighth exemplary embodiments, the ACCs 101*p* and 101*y* are used for detecting parallel vibration. The present exemplary embodiment uses a sensor other than an ACC to detect parallel vibration.

Figure 61:
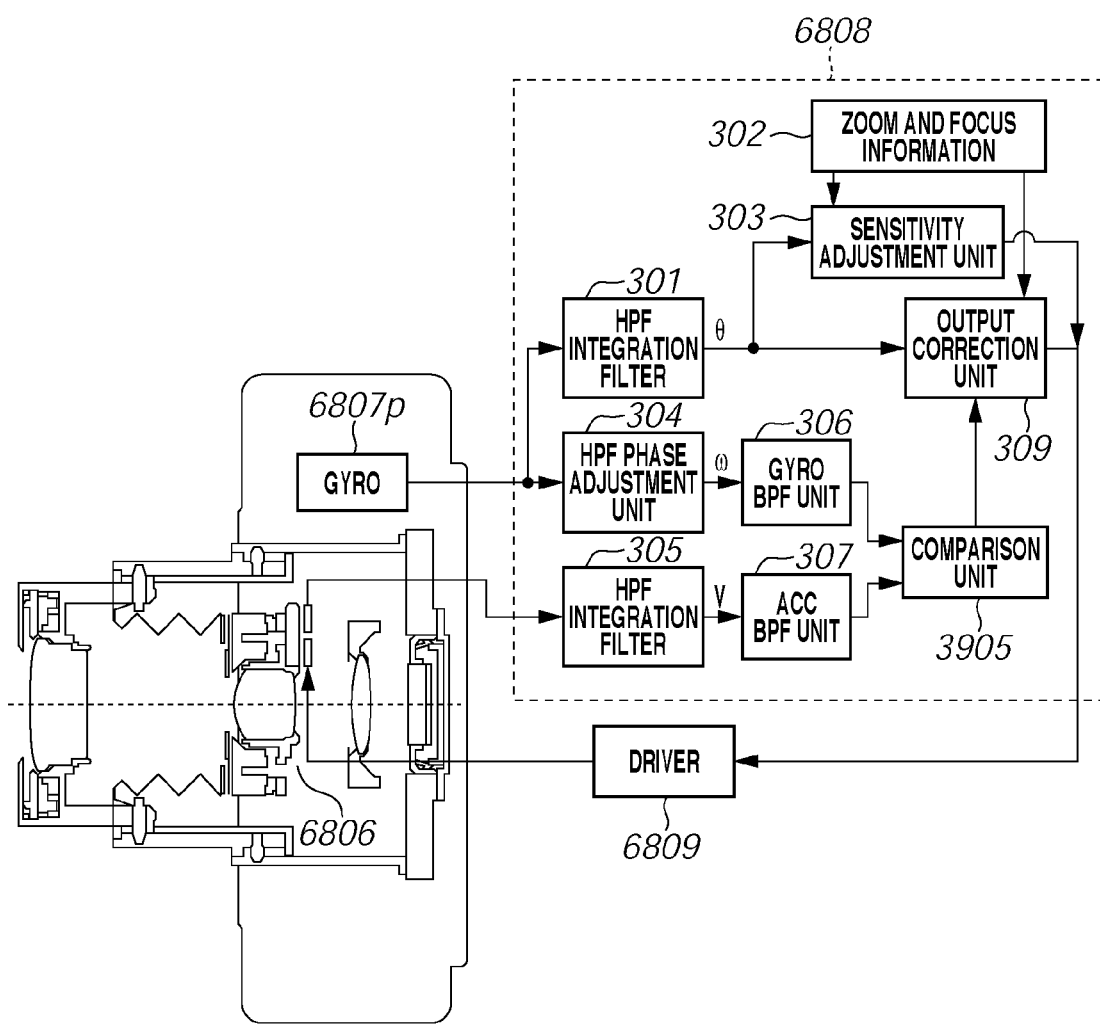
FIG. 61 illustrates an exemplary configuration of a camera and an image stabilization control apparatus according to a ninth exemplary embodiment of the present invention.

FIG. 61 illustrates an exemplary configuration of a camera and an image stabilization control apparatus included in the camera according to the present exemplary embodiment. A digital compact camera is illustrated in FIG. 61. However, a single-lens reflex camera can be used.

As a characteristic feature of the present exemplary embodiment, the present exemplary embodiment uses the vibration correction unit 6806 to detect parallel vibration occurring around the principal point of the imaging optical system.

A method for detecting an angular velocity by using a vibration correction unit can be executed by observing and detecting the amount of current flowing through a driving coil of the vibration correction unit. Driven components of the vibration correction unit includes a correction lens, a supporting frame of the correction lens, and a driving coil (or a driving magnet). Accordingly, the mass of the vibration correction unit is sufficiently larger than the angular velocity detection mass of the ACC. The accuracy of detecting the angular velocity increases if the angular velocity detection mass becomes greater. Accordingly, in this case, the angular velocity can be detected with high accuracy by using the vibration correction unit.

However, in this regard, the driven components of the vibration correction unit are generally in contact with the fixed components thereof by sliding contact. The frictional force from the sliding contact may degrade the angular velocity detection accuracy.

In this regard, in calculating a rotational radius L by comparison with the angular velocity signal, the present invention executes the comparison by extracting a specific frequency component only. Accordingly, the present invention can suppress or reduce the influence from the slide friction.

Figure 62A:
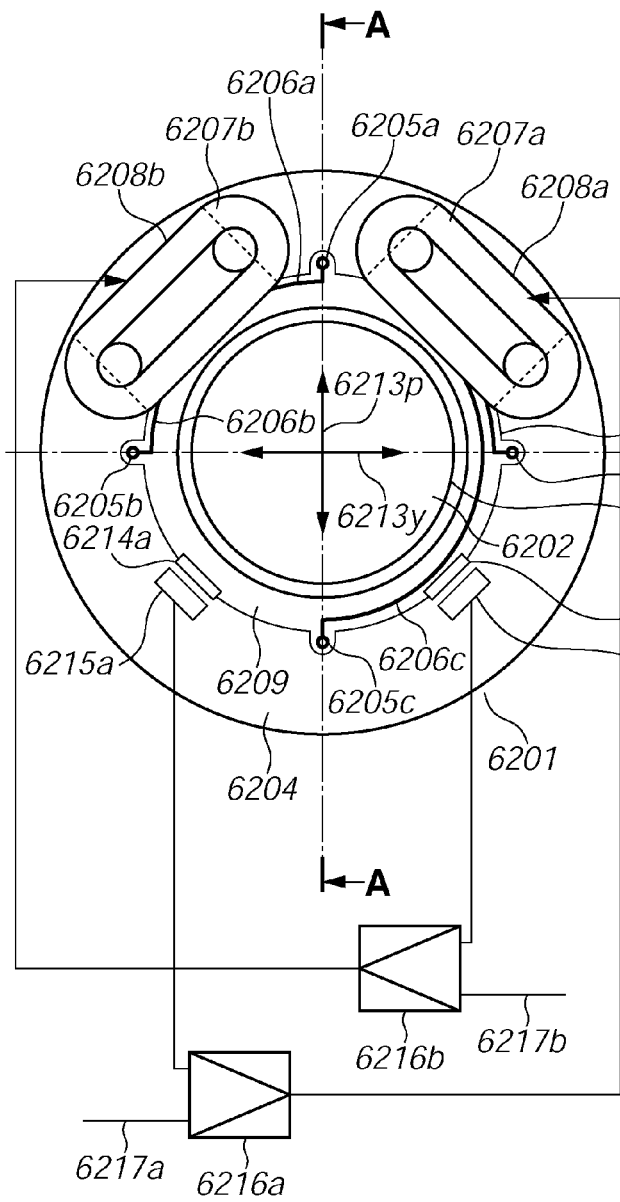
FIGS. 62A and 62B each illustrate an exemplary configuration of a vibration correction unit according to the ninth exemplary embodiment of the present invention.
Figure 62B:
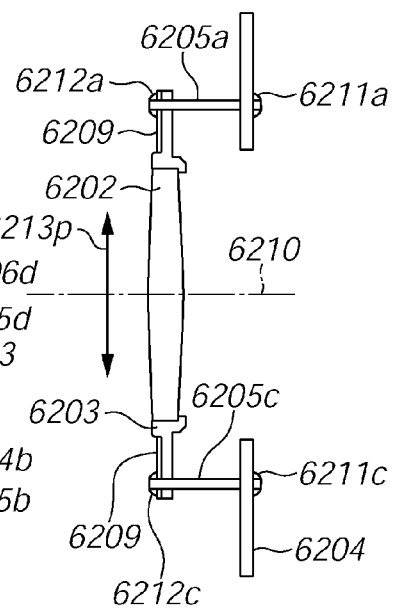

The slide friction can be prevented if a vibration correction unit illustrated in FIGS. 62A and 62B is used. FIGS. 62A and 62B are a plan view and a cross section, respectively, of an example of a vibration correction unit 6201 (equivalent to the vibration correction unit 6806 in FIG. 61), which is elastically supported with wires.

Referring to FIGS. 62A and 62B, a correction lens 6202 is supported by a supporting frame 6203. The supporting frame 6203 includes driving coils 6207*a* and 6207*b* and a supporting and wiring board 6209 for connecting the driving coils 6207*a* and 6207*b* to wires.

Wires 6205*a* through 6205*d* are provided between a base substrate 6204 and the supporting and wiring board 6209, which are fixed units.

The wires 6205*a* through 6205*d* are soldered on the base substrate 6204 and the supporting and wiring board 6209 at solder portions 6211*a* through 6211*d* and 6212*a* through 6212*d*, although the solder portions 6211*b*, 6211*d*, 6212*b*, and 6212*d* are not illustrated in FIGS. 62A and 62B.

In soldering the wires 6205*a* through 6205*d* on the base substrate 6204 and the supporting and wiring board 6209, a dedicated tool is used to regulate the clearance and a tilt between the correction lens 6202 and the base substrate 6204. Accordingly, the accuracy of mounting the correction lens 6202 onto the base substrate 6204 can be increased.

Power is supplied to the driving coils 6207*a* and 6207*b* from the base substrate 6204 via the wires 6205*a* through 6205*d* and patterns 6206*a* through 6206*d* on the supporting and wiring board 6209. On the base substrate 6204, which faces the driving coils 6207*a* and 6207*b*, includes permanent magnets 6208*a* and 6208*b*, which are mounted thereon. The permanent magnets 6208*a* and 6208*b* are illustrated with broken-line rectangles in FIG. 62A.

Accordingly, if current is fed through the driving coils 6207*a* and 6207*b*, the correction lens 6202 is driven relative to the optical axis 6210 in directions 6213*p* and 6213*y* due to the balance of current passing through the driving coils 6207*a* and 6207*b* while warping the wires 6205*a* through 6205*d*.

Magnetic, optical, or eddy current (EC) type position detection sensors 6215*a* and 6215*b* are assembled on the base substrate 6204. The position detection sensors 6215*a* and 6215*b* detect the distance between targets 6214*a* and 6214*b*, which are mounted on the supporting and wiring board 6209. Outputs from the position detection sensors 6215*a* and 6215*b* are amplified by differential amplifiers 6216*a* and 6216*b*, respectively, to a sufficient level. Current is fed through the driving coils 6207*a* and 6207*b* based on the amplified signal.

If the outputs of the position detection sensors 6215*a* and 6215*b* are negatively fed back into the driving coils 6207*a* and 6207*b*, the publicly known positional feedback is implemented. The correction lens 6202 is electrically fixed at a point at which the output of each of the position detection sensors 6215*a* and 6215*b* is "0".

The present exemplary embodiment adjusts the bias voltage and the gain of the position detection sensors 6215*a* and 6215*b* so that the output of the position detection sensors 6215*a* and 6215*b* becomes "0" when the correction lens 6202 is set on an optical axis of another imaging optical system (not illustrated). In this case, the correction lens 6202 is stably supported at this position.

In this state, if vibration correction target values 6217*a* and 6217*b*, such as angular vibration or parallel vibration, are input, then the correction lens 6202 is driven with high accuracy in a tracking manner according to the target value.

Even when no vibration correction target value is input, driven components of the vibration correction unit 6201 are subjected to gravity and the acceleration of the parallel vibration. Accordingly, the position of the correction lens 6202 is changed against the elastic force of the wires 6205*a* through 6205*d*.

The position detection sensors 6215*a* and 6215*b* detect the positional change of the correction lens 6202. Furthermore, the wires 6205*a* through 6205*d* feeds the driving coils 6207*a* and 6207*b* with current that sets off the positional change. Accordingly, the correction lens 6202 can constantly stay at its initial position.

Accordingly, by observing and detecting the current passing through the driving coils 6207*a* and 6207*b*, the input gravity and the parallel vibration acceleration can be detected. The present exemplary embodiment utilizes the detected acceleration output to calculate the rotational radius L in relation to the output from the gyro in the above-described manner and to further correct the parallel vibration. If the above-described supporting method that utilizes the wire is used, the acceleration can be detected with high accuracy because of the absence of slide friction.

During a time period in which the vibration correction unit is executing the correction of vibration such as angular vibration, the change in the current may cause a great degradation of the accuracy of detecting the acceleration. In this regard, the present exemplary embodiment executes control for electrically feeding back the vibration correction unit 6201 to its initial position (the position at which the capture optical axis and the optical axis of the correction lens match) until immediately before the start of capture.

Furthermore, the present exemplary embodiment drives the correction lens only when the exposure is being executed based on the angular vibration correction target value and the parallel vibration correction target value. Thus, the present exemplary embodiment corrects the image shake. More specifically, the present exemplary embodiment uses the vibration correction unit 6201 as the ACC before the exposure starts and uses the vibration correction unit 6201 as the vibration correction unit after the exposure is started.

Accordingly, angular vibration cannot be optically corrected in the manner described above in the first to eighth exemplary embodiments during preparation for capture (in which the release button 6804*a* is being half-pressed).

In this regard, a digital camera can utilize an electronic image stabilization function. The electronic image stabilization function is a function for reducing the vibration between taken frames output by the image sensor by changing the capturing position of the frames according to vibration.

If the electronic image stabilization function is used, the capturing position can be controlled according to the change in motion vectors between frames output by the image sensor or based on the output of the gyros 6807*p* and 6807*y*. More specifically, in this case, it is also useful if the present exemplary embodiment uses the electronic image stabilization function before the start of capture while when the capture starts, the present exemplary embodiment drives the correction lens to execute optical image stabilization.

Figure 63:
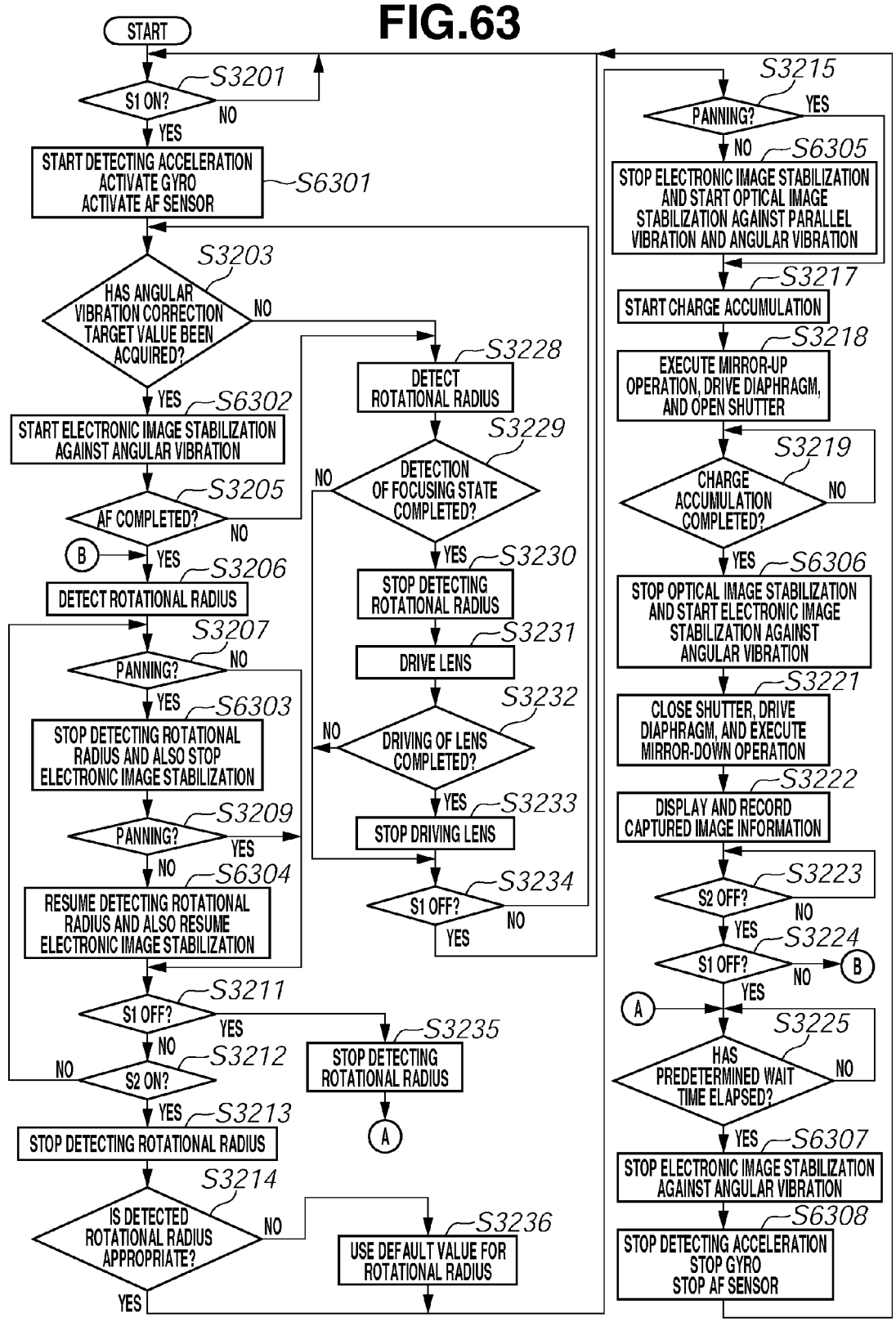
FIG. 63 is a flow chart illustrating an exemplary operation of the image stabilization control apparatus according to the ninth exemplary embodiment of the present invention.

FIG. 63 is a flow chart illustrating an exemplary flow of the above-described processing according to the present exemplary embodiment. In the example illustrated in FIG. 63, steps similar to those in FIG. 32 are provided with the same step reference number. Accordingly, the description thereof will not be repeated here. The processing according to the flow illustrated in FIG. 63 starts when the camera is powered on. In synchronization with the powering on of the camera, the vibration correction unit is electrically held at the initial position.

Referring to FIG. 63, in step S6301, the lens CPU 6808 detects the acceleration applied on the vibration correction unit 6201 by detecting the current fed through the driving coil of the vibration correction unit 6201. At this time, the correction lens of the vibration correction unit 6201 is positioned almost at the principal point of the entire imaging optical system. Accordingly, the parallel vibration acceleration at the principal point of the imaging optical system is detected in step S6301. As in step S3202 (FIG. 32), the lens CPU 6808 activates the gyro and drives the AF sensor in step S6301.

In step S6302, the lens CPU 6808 starts electronic image stabilization against the angular vibration. More specifically, the lens CPU 6808 changes the capturing position of image signals output from the image sensor, which are chronologically output based on the output of the gyro (the angular vibration correction target value (the output of the sensitivity adjustment unit 303)) to thereby reduce composition deviation occurring due to inter-picture vibration. Then, the lens CPU 6808 outputs the image signals on a back LCD monitor (not illustrated). It is also useful if the motion vector between image signals that are chronologically output is calculated and the capturing position of the image signals is changed based on the calculated value of the motion vector instead of using the signal from the gyro.

In step S6303, the lens CPU 6808 suspends the electronic image stabilization because the panning of the camera has been detected in step S3207. The processing for suspending the detection of the rotational radius is similar to that executed in step S3208 (FIG. 32). In step S6304, the lens CPU 6808 resumes the electronic image stabilization because the panning of the camera has ended in step S3209. The processing for resuming the detection of the rotational radius is similar to that executed in step S3210 (FIG. 32).

In step S6305, the lens CPU 6808 suspends the electronic image stabilization and drives the vibration correction unit 6201 based on the parallel vibration and the angular vibration correction target value. Thus, the lens CPU 6808 starts optical image stabilization. In step S6306, the lens CPU 6808 suspends the optical image stabilization because the output from the image sensor has been completely accumulated (the exposure has ended) in step S3219. Then, the lens CPU 6808 starts the electronic image stabilization to correct the angular vibration.

Although the optical image stabilization has been suspended, the detection of the acceleration is continued by the vibration correction unit, which has been returned to its initial position and electrically held there. When the main power switch is pressed in this state, the holding of the vibration correction unit at its initial position can be cancelled.

In step S6307, because a predetermined time period has elapsed since the half-press of the release button 6804a, the lens CPU 6808 suspends the electronic image stabilization and the correction of the angular vibration. In step S6308, the lens CPU 6808 suspends the detection of acceleration with the vibration correction unit.

The principal point of the photographic lens and the position of the vibration correction unit change according to the zoom position and the focusing position. The present exemplary embodiment corrects the change of the principal point of the photographic lens and the position of the vibration correction unit in the manner described above with reference to FIG. 38.

As described above, the present exemplary embodiment utilizes the vibration correction unit as the gyro. More specifically, the second vibration detection unit is used as a unit for detecting the vibration based on the current passing through the driving unit of the vibration correction unit, which current is generated due to the vibration, during the time period in which the vibration correction and driving unit does not operate.

Furthermore, the present exemplary embodiment uses the vibration correction unit as the second vibration detection unit before the capture starts. Accordingly, it becomes unnecessary to provide a dedicated gyro. Accordingly, a small and light-weight camera can be implemented.

The present exemplary embodiment uses the vibration correction driving unit to drive the vibration correction unit when the capture operation is being performed. The present exemplary embodiment corrects image shake in this manner.

Furthermore, the parallel vibration can be detected with high accuracy by using the vibration correction unit described above with reference to FIGS. 62A and 62B. In addition, in the present exemplary embodiment, the electronic image stabilization is executed during the time period in which the vibration correction unit is being used as the ACC. Accordingly, the present exemplary embodiment can execute the correction of the angular vibration and the detection of the acceleration in parallel to each other.

In addition, the lens CPU 6808 corrects the image shake with the driving unit, which is a vibration correction driving unit in controlling clipping of images from the imaging unit (image sensor) until the capture operation starts. When the capture operation is being performed, the lens CPU 6808 drives the vibration correction unit with the vibration correction driving unit to correct the image shake with the vibration correction unit.

Figure 64:
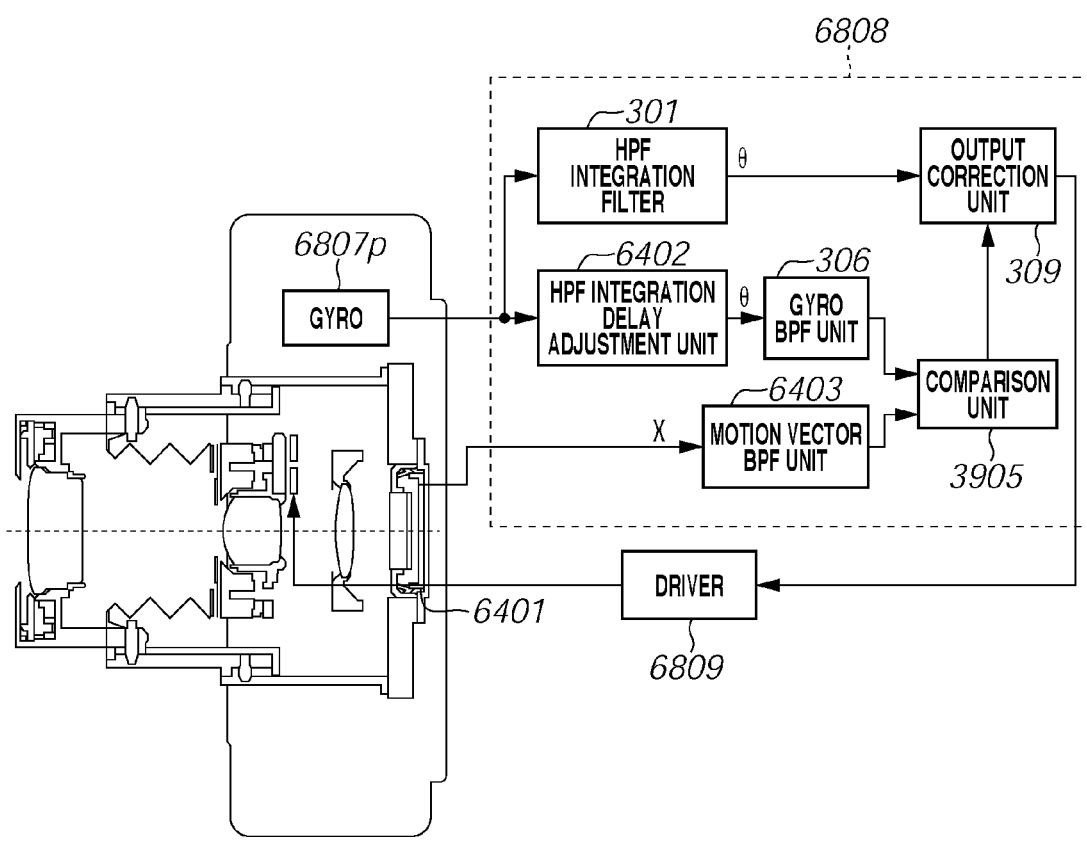
FIG. 64 illustrates an exemplary configuration of a camera and an image stabilization control apparatus according to a tenth exemplary embodiment of the present invention.

A tenth exemplary embodiment of the present invention is described below. FIG. 64 illustrates an exemplary configuration of a camera and an image stabilization control apparatus included in the camera according to the present exemplary embodiment. A digital compact camera is illustrated in FIG. 64. It is also useful if a single-lens reflex camera is used.

In the present exemplary embodiment also, parallel vibration is detected by using a sensor different from the ACC.

As characteristic of the present exemplary embodiment, the present exemplary embodiment includes a second vibration detection unit, which is used as a unit for detecting vibration based on the output of the imaging unit (hereinafter may also be referred to as an "image sensor 6401"). More specifically, the present exemplary embodiment detects the parallel vibration occurring around the principal point of the imaging optical system by using an image output of the image sensor 6401.

The method for detecting the vibration and the composition deviation by comparing the images chronologically output from the image sensor 6401 is known as "electronic image stabilization" or "image combination". However, the electronic image stabilization and the image combination cannot be applied to still images unless the output from the image sensor can be nondestructively read.

However, if the above-described method for correcting the angular velocity output by using a previously calculated rotational radius L as a correction value is used, the output of the image sensor can be used.

More specifically, if a method is used that calculates the rotational radius L by detecting the vibration based on the image output and comparing the detection result with the angle based on the angular velocity output, the angular velocity output can be corrected even when a still image is shot by utilizing a capture preparing state (moving picture taking state) before capture a still image.

With the above-described configuration, the present exemplary embodiment can correct the angular velocity output before starting capture of a still image. Accordingly, the image output, which has been conventionally utilized only in the case of capture moving images, can be used in the case of capture a still image.

Figure 65:
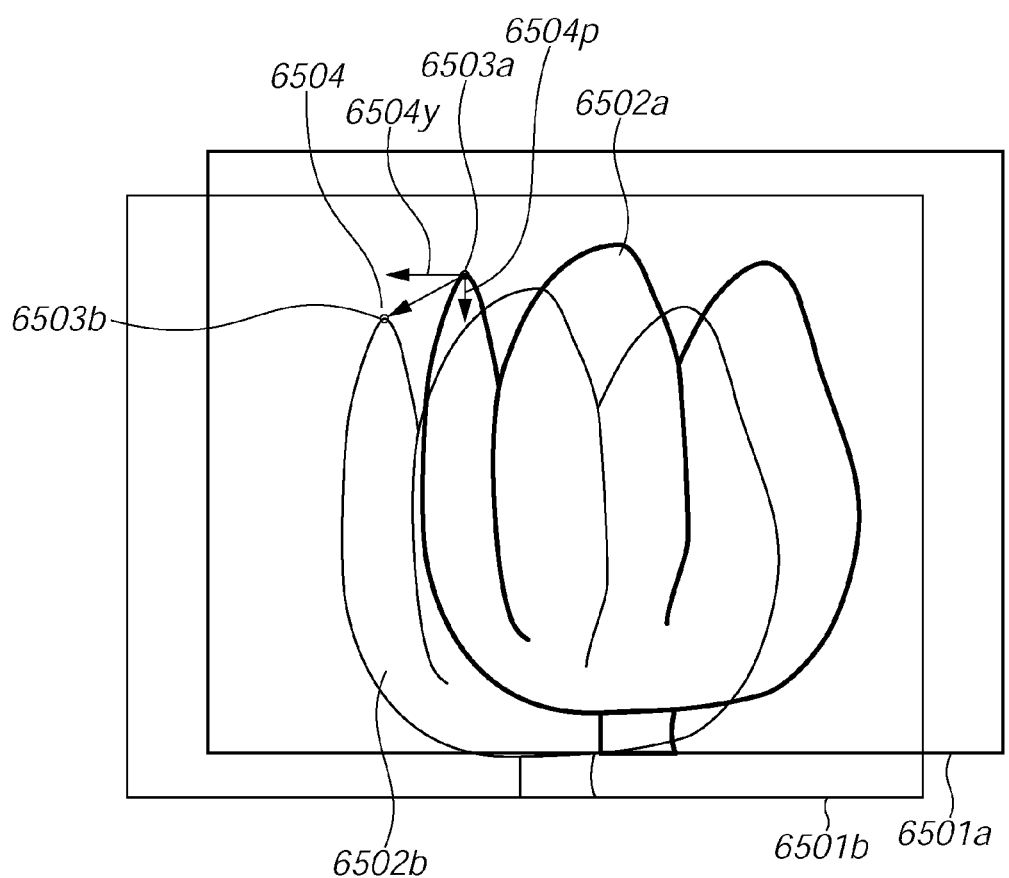
FIG. 65 illustrates an example of motion vectors according to the tenth exemplary embodiment of the present invention.

FIG. 65 illustrates exemplary motion vectors according to the present exemplary embodiment. Referring to FIG. 65, an image 6501a includes an image of a flower at a specific time. An image 6501b, which is illustrated with thin lines in FIG. 65, includes an image of the flower after a predetermined time period has elapsed (e.g., after 1/30 seconds has elapsed).

The two images have different compositions due to the angular vibration and the parallel vibration.

The present exemplary embodiment sets a characteristic point at a portion having a high contrast, such as an edge 6503a of a flower 6502a, which is a main object of the image 6501a. The present exemplary embodiment calculates a characteristic point 6503b, which corresponds to the characteristic point 6503a, based on positional information about the characteristic point 6503a and information about an edge image of a flower 6502b of the image 6501b.

Arrows 6504y and 6504p indicate horizontal and vertical components of a motion vector 6504, which connects the two characteristic points. Displacement of vibration on the image can be acquired by combining the motion vector, which has been separated into components in two directions, for each image.

In this regard, the vertical motion vector 6504p is described. If the motion vectors between images at specific timings are accumulated, then a waveform 6602 (FIG. 66), which is to be input to a motion vector BPF unit 6403 (FIG. 64), can be acquired.

The motion vector BPF unit 6403 passes only a first frequency band component (2 Hz, for example) of the waveform 6602. Accordingly, the present exemplary embodiment can suppress the noise superposed on the motion vector and the low-frequency deviation that may occur due to movement of the object. Thus, the present exemplary embodiment can detect only the vibration component with high accuracy.

With respect to the output from the gyro, the present exemplary embodiment uses an HPF integration delay adjustment unit 6402 to convert the angular velocity into an angle. Thus, the same dimension as that of the motion vector can be set (delay adjustment). The delay adjustment, by which the displacement of the deviation detected based on the output of the imaging unit and the vibration angle detected by the ACC are compared to be adjusted, will be described in detail below.

Then, the gyro BPF unit 306 passes only the first frequency band component of the angle waveform. Accordingly, a low-frequency drift component that may be superposed on the angle waveform can be removed.

Figure 66:
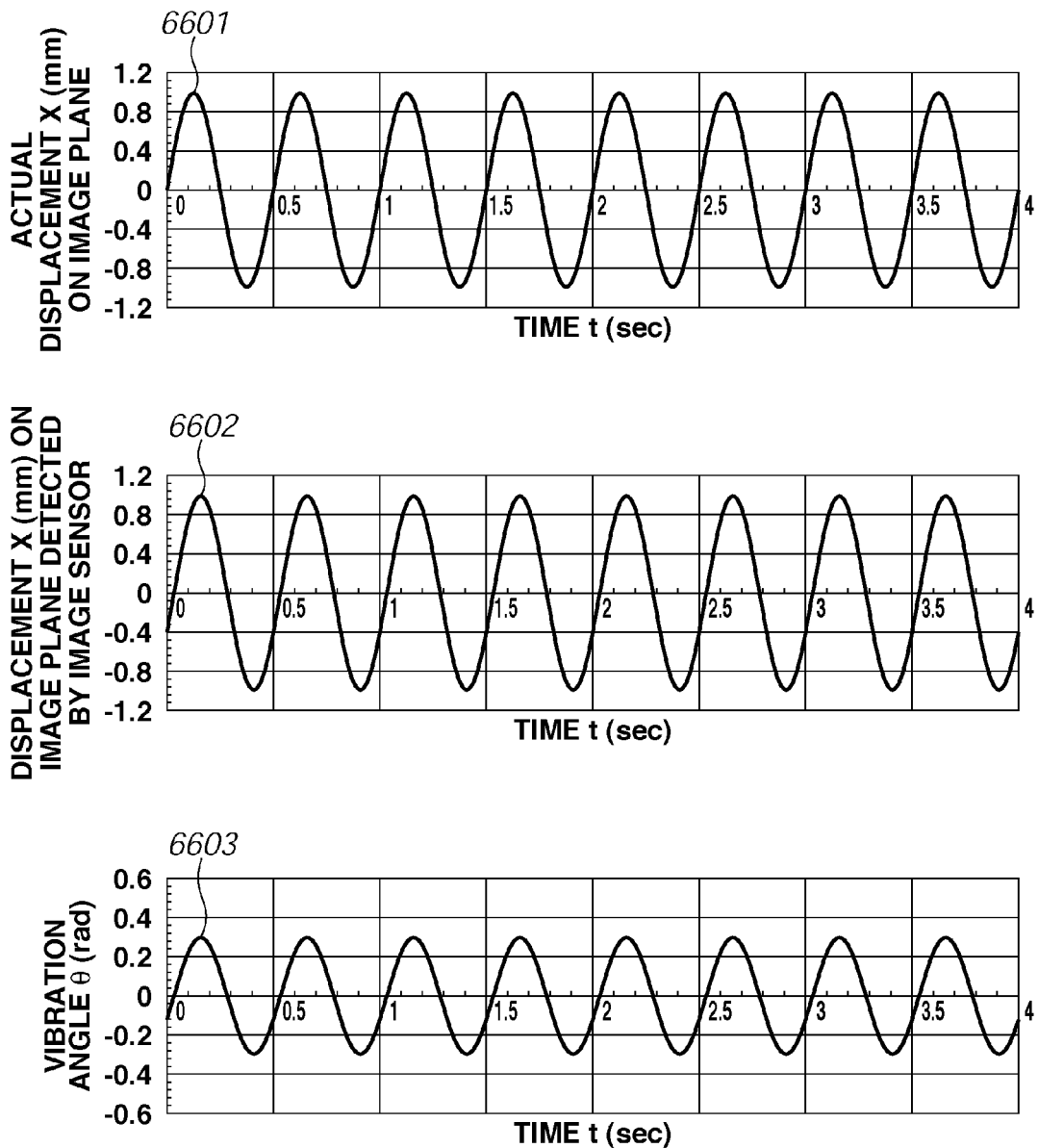
FIG. 66 illustrates exemplary waveforms for vibration in the image stabilization control apparatus according to the tenth exemplary embodiment of the present invention.

In the example illustrated in FIG. 66, a sine wave vibration is applied to the camera. In the example illustrated in FIG. 66, the time is shown on the horizontal axis. A locus of image deviation X, which is acquired by accumulating vertical motion vectors between images, is shown on the vertical axis.

The phase of the waveform 6602 is offset from that of a waveform 6601, which is a waveform of the deviation of image occurring due to actual vibration. The deviation of the phase is caused by the delay due to the time for reading the images with the image sensor 6401.

In this regard, in the present exemplary embodiment, the output from the gyro 6807$p$ is input to the HPF integration delay adjustment unit 6402. Then, the angular velocity is integrated to be converted into an angle. Then, the delay equivalent to the delay in the image sensor 6401 is added. Thus, the phase of an output waveform 6603 of the gyro BPF unit 306 can be made the same as the phase of the waveform 6602.

In the present exemplary embodiment, if the output signal from the image sensor 6401 is delayed, the output signal and the angular velocity signal can be compared with each other by also delaying the angular velocity signal. This is because a rotational radius L is necessary only during capture and it is not necessary to calculate a rotational radius L in real time.

In the present exemplary embodiment, the extraction frequency of the motion vector BPF unit 6403 and the gyro BPF unit 306 is set at 2 Hz. This is because only a small amount of high-frequency vibration occurs on a digital compact camera.

The comparison unit 3905 calculates a rotational radius L by comparing the waveforms 6602 and 6603 (X/θ) and outputs a result of the calculation to the output correction unit 309. The output of the gyro 6807$p$ is converted into a vibration angle by the HPF integration filter 301. Then, the output correction unit 309 multiplies the vibration angle by the rotational radius L. Thus, a vibration correction target value is acquired.

In the present exemplary embodiment, the sensitivity adjustment unit 303 and the zoom and focus information 302, which are illustrated in FIG. 61, are not included in the configuration illustrated in FIG. 64 due to the following reasons.

The deviation of image detected by the image sensor 6401 already includes the deviation of image occurring due to the sensitivity, the imaging magnification, which are determined based on the state of zoom and focus, and the angular vibration. Accordingly, if the rotational radius L is calculated based on the output of the image sensor 6401 in this case, the image deviation due to the sensitivity, the imaging magnification, and the angular vibration in the calculated rotational radius L has already been corrected.

As described above, the present exemplary embodiment calculates the rotational radius L based on the image captured by the image sensor 6401. Accordingly, it becomes unnecessary to correct the sensitivity and the imaging magnification. Furthermore, in this case, it becomes unnecessary to individually correct the angular vibration and the parallel vibration. Thus, the present exemplary embodiment can correct the parallel vibration regardless of the principal point of the photographic lens.

Before the capture starts, the present exemplary embodiment executes the electronic image stabilization until the capture starts, but does not drive the vibration correction unit, as in the ninth exemplary embodiment, in order to increase the accuracy of detecting the motion vector between the images output by the image sensor 6401 by causing the vibration correction unit to stay at its initial position.

If a motion vector of the image sensor is calculated in a state in which the vibration correction unit is driven and the angular vibration is corrected, the motion vector between the images output by the image sensor is the image deviation occurring due to the parallel vibration component.

Figure 67:
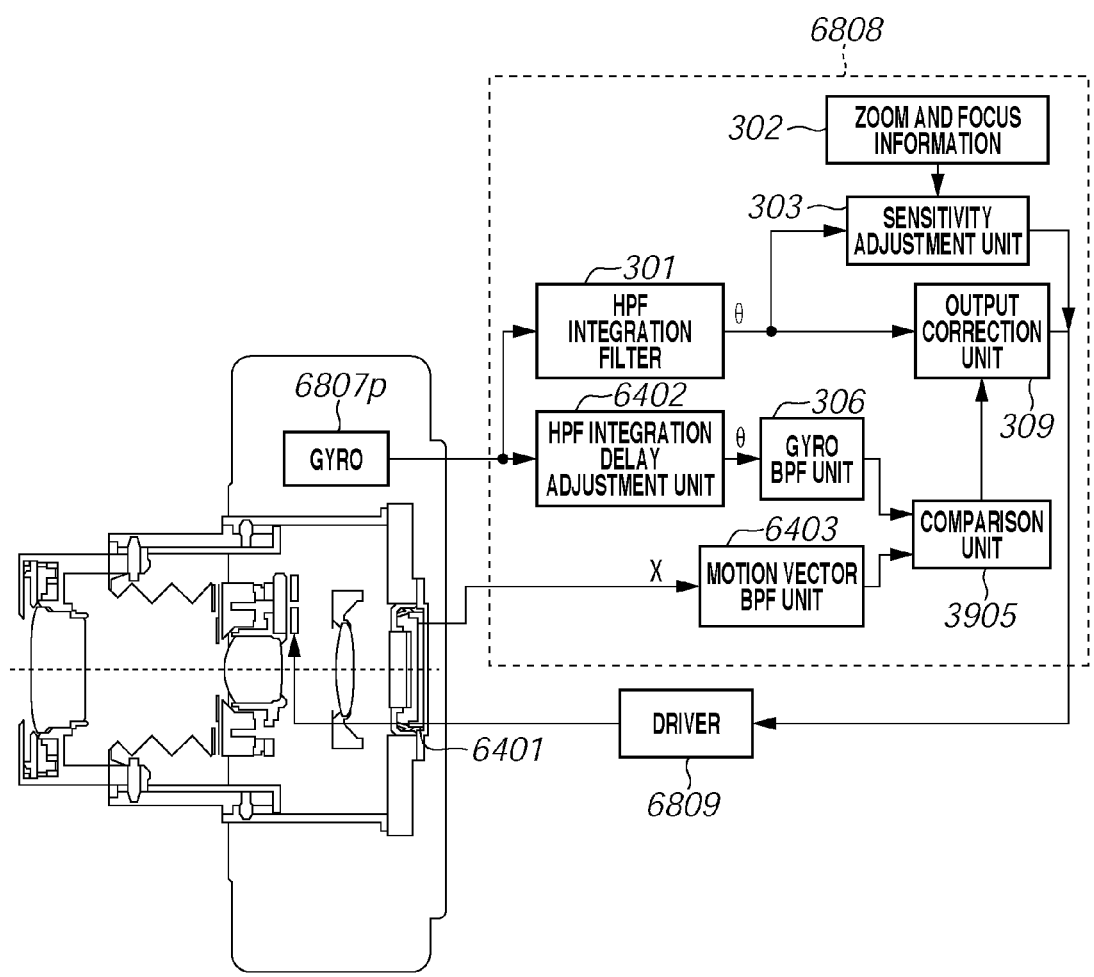
FIG. 67 illustrates another exemplary configuration of the camera and the image stabilization control apparatus according to the tenth exemplary embodiment of the present invention.

In this case, it is useful if the angular vibration correction target value is calculated by using the sensitivity adjustment unit 303 and the zoom and focus information 302, the parallel vibration correction target value is added to the calculated angular vibration correction target value, and the vibration is corrected during capture, as illustrated in FIG. 67. Even in this case, it is not necessary to correct the principal point of the photographic lens and the imaging magnification in calculating the parallel vibration correction target value.

According to the above-described exemplary embodiments the present invention, the output of the angular velocity detection unit is corrected with the output of the acceleration detection unit in a specific frequency band, or alternatively, the output of the angular velocity detection unit is corrected with a motion vector signal from the imaging unit in a specific frequency band.

With the above-described configuration, the present exemplary embodiment can implement a small-sized image stabilization system with a high mobility and stability even in macro capture. More specifically, the present exemplary embodiment having the above-described configuration can correct image shake occurring due to parallel vibration with high accuracy.

In the first through tenth exemplary embodiments of the present invention, parallel vibration is corrected by an exemplary image stabilization control apparatus included in a digital single-lens reflex camera or a digital compact camera. However, because the image stabilization control apparatus according to an exemplary embodiment of the present invention can be implemented in a small-sized system having a high performance, the present invention is not limited to this. For example, the present invention can be implemented in capture a still image with a video camera or in capture a still image with a monitoring camera, a web camera, or a mobile phone.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2008-183426, filed Jul. 15, 2008, which is hereby incorporated by reference herein in its entirety.

The invention claimed is:

1. An image stabilization control apparatus comprising:
an imaging optical system;
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the outputs of the first and second vibration detection units; and a correction control unit configured to control the movement of the vibration correction unit based on the correction value, wherein, during image capture operations, the correction control unit controls the vibration correction unit based on the correction value calculated before the image capture operations, wherein the first vibration detection unit is an angular velocity meter, wherein the second vibration detection unit is an accelerometer, and wherein the correction value is equivalent to a distance from a position in proximity to a principal point of the imaging optical system to a rotational center of the vibration, the distance being calculated according to a signal based on an output of the angular velocity meter and a signal based on an output of the accelerometer.

2. An image stabilization control apparatus comprising:
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the outputs of the first and second vibration detection units; and
a correction control unit configured to control the movement of the vibration correction unit based on the correction value,
wherein, during image capture operations, the correction control unit controls the vibration correction unit based on the correction value calculated before the image capture operations, and
wherein the correction control unit controls the correction value using a pre-stored correction value if the correction value is greater than a predetermined value.

3. An image stabilization control apparatus comprising:
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the outputs of the first and second vibration detection units; and
a correction control unit configured to control the movement of the vibration correction unit based on the correction value,
wherein, during image capture operations, the correction control unit controls the vibration correction unit based on the correction value calculated before the image capture operations, and
wherein the correction control unit controls the correction value using a pre-stored correction value if the output of the first vibration detection unit is smaller than a predetermined value.

4. An image stabilization control apparatus comprising:
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the outputs of the first and second vibration detection units;
a reliability determination unit configured to determine the reliability of the correction value; and
a correction control unit configured to control the movement of the vibration correction unit based on the correction value,
wherein, during image capture operations, the correction control unit controls the vibration correction unit based on the correction value calculated before the image capture operations, and
wherein the reliability determination unit determines that the reliability is low during a time when a mechanism of the image stabilization control apparatus is moving.

5. An image stabilization control apparatus comprising:
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the outputs of the first and second vibration detection units;
a reliability determination unit configured to determine the reliability of the correction value; and
a correction control unit configured to control the movement of the vibration correction unit based on the correction value,
wherein, during image capture operations, the correction control unit controls the vibration correction unit based on the correction value calculated before the image capture operations, and
wherein if it is determined by the reliability determination unit that the reliability is low, the correction control unit uses a previously stored correction value to correct the correction value.

6. An image stabilization control apparatus comprising a mechanism which causes a vibration when the mechanism moves, the image stabilization control apparatus comprising:
a vibration correction unit configured to correct image shake occurring due to vibration applied to the image stabilization control apparatus;
a first vibration detection unit configured to detect the vibration;
a second vibration detection unit configured to detect the vibration in a different way from that used by the first vibration detection unit;
a calculation unit configured to calculate a correction value based on the output from the first vibration detection unit and the output from the second vibration detection unit; and
a correction control unit configured to control the movement of the vibration correction unit based on the correction value,
wherein, during image capture operations, the correction control unit controls the vibration correction unit based on the correction value calculated when the mechanism does not move, wherein the mechanism is at least one of a mirror unit, a shutter mechanism, a diaphragm unit, and an auto-focusing unit, and wherein the calculation unit calculates plural correction values and an average value of the plural correction values calculated until the vibration of the mechanism occurs.

7. The image stabilization control apparatus according to claim 6, wherein the calculation unit calculates the average value of the correction values calculated in each predetermined period and outputs the latest average value of the correction value, when the vibration of the mechanism occurs.

8. The image stabilization control apparatus according to claim 7, wherein the calculation unit calculates and updates the average value of the correction values by a moving average method.

9. An image stabilization control apparatus comprising a mechanism which causes a vibration when the mechanism moves, the image stabilization control apparatus comprising:
   an imaging optical system;
   a vibration correction unit configured to correct image shake occurring due to vibration applied to the image stabilization control apparatus;
   a first vibration detection unit configured to detect the vibration;
   a second vibration detection unit configured to detect the vibration in a different way from that used by the first vibration detection unit;
   a calculation unit configured to calculate a correction value based on the output from the first vibration detection unit and the output from the second vibration detection unit; and
   a correction control unit configured to control the movement of the vibration correction unit based on the correction value,
   wherein, during image capture operations, the correction control unit controls the vibration correction unit based on the correction value calculated when the mechanism does not move,
   wherein the first vibration detection unit is an angular velocity meter,
   wherein the second vibration detection unit is an accelerometer, and
   wherein the correction value is equivalent to a distance from a position in proximity to a principal point of the imaging optical system to a rotational center of the vibration, the distance being calculated according to a signal based on an output of the angular velocity meter and a signal based on an output of the accelerometer.

10. An image stabilization control apparatus comprising a mechanism which causes a vibration when the mechanism moves, the image stabilization control apparatus comprising:
    a vibration correction unit configured to correct image shake occurring due to vibration applied to the image stabilization control apparatus;
    a first vibration detection unit configured to detect the vibration;
    a second vibration detection unit configured to detect the vibration in a different way from that used by the first vibration detection unit;
    a calculation unit configured to calculate a correction value based on the output from the first vibration detection unit and the output from the second vibration detection unit;
    a correction control unit configured to control the movement of the vibration correction unit based on the correction value; and
    a reliability determination unit configured to determine the reliability of the correction value,
    wherein, during image capture operations, the correction control unit controls the vibration correction unit based on the correction value calculated when the mechanism does not move,
    wherein the mechanism is at least one of a mirror unit, a shutter mechanism, a diaphragm unit, and an auto-focusing unit, and
    wherein the reliability determination unit determines that the reliability is low during a time when the mechanism is moving.

11. An image stabilization control apparatus comprising a mechanism which causes a vibration when the mechanism moves, the image stabilization control apparatus comprising:
    a vibration correction unit configured to correct image shake occurring due to vibration applied to the image stabilization control apparatus;
    a first vibration detection unit configured to detect the vibration;
    a second vibration detection unit configured to detect the vibration in a different way from that used by the first vibration detection unit;
    a calculation unit configured to calculate a correction value based on the output from the first vibration detection unit and the output from the second vibration detection unit;
    a correction control unit configured to control the movement of the vibration correction unit based on the correction value; and
    a reliability determination unit configured to determine the reliability of the correction value,
    wherein, during image capture operations, the correction control unit controls the vibration correction unit based on the correction value calculated when the mechanism does not move, and
    wherein if it is determined by the reliability determination unit that the reliability is low, the correction control unit uses a previously stored correction value to correct the correction value.

12. An image stabilization control apparatus comprising:
    a vibration correction unit configured to correct image shake occurring due to vibration applied to the image stabilization control apparatus;
    a first vibration detection unit configured to detect the vibration;
    a second vibration detection unit configured to detect the vibration in a different way from that used by the first vibration detection unit;
    a calculation unit configured to calculate a correction value based on the outputs of the first and second vibration detection units; and
    a correction control unit configured to control the movement of the vibration correction unit based on the correction value,
    wherein the correction control unit controls the movement of the vibration correction unit using a pre-stored correction value, which is obtained before a user's instruction to start image capture is input, if the correction value is greater than a predetermined value.

13. An image stabilization control apparatus comprising:
    a vibration correction unit configured to correct image shake occurring due to vibration applied to the image stabilization control apparatus;
    a first vibration detection unit configured to detect the vibration;

a second vibration detection unit configured to detect the vibration in a different way from that used by the first vibration detection unit;

a calculation unit configured to calculate a correction value based on the outputs of the first and second vibration detection units; and a correction control unit configured to control the movement of the vibration correction unit based on the correction value, wherein the correction control unit controls the movement of the vibration correction unit using a pre-stored correction value, which is obtained before a user's instruction to start image capture is input, if the output of the first vibration detection unit is smaller than a predetermined value.

14. An image stabilization control apparatus comprising:

a vibration correction unit configured to correct image shake occurring due to vibration applied to the image stabilization control apparatus;

a first vibration detection unit configured to detect the vibration;

a second vibration detection unit configured to detect the vibration in a different way from that used by the first vibration detection unit;

a calculation unit configured to calculate a correction value based on the outputs of the first and second vibration detection units;

a reliability determination unit configured to determine the reliability of the correction value; and a correction control unit configured to control the movement of the vibration correction unit based on the correction value, wherein if it is determined by the reliability determination unit that the reliability is lower than a predetermined value, the correction control unit controls the movement of the vibration correction unit using a pre-stored correction value, which is obtained before a user's instruction to start image capture is input.

15. A control method of an image stabilization control apparatus that comprises a vibration correction unit configured to correct image shake occurring due to vibration applied to the image stabilization control apparatus, the control method comprising:

a first vibration detection step of detecting the vibration;

a second vibration detection step of detecting the vibration in a different way from that used in the first vibration detection step;

a calculation step of calculating a correction value based on the outputs of the first and second vibration detection steps; and a correction control step of controlling the movement of the vibration correction unit based on the correction value, wherein the correction control step controls the movement of the vibration correction unit using a pre-stored correction value, which is obtained before a user's instruction to start image capture is input, if the correction value is greater than a predetermined value.

16. A control method of an image stabilization control apparatus that comprises a vibration correction unit configured to correct image shake occurring due to vibration applied to the image stabilization control apparatus, the control method comprising:

a first vibration detection step of detecting the vibration;

a second vibration detection step of detecting the vibration in a different way from that used in the first vibration detection step;

a calculation step of calculating a correction value based on the outputs of the first and second vibration detection steps; and a correction control step of controlling the movement of the vibration correction unit based on the correction value, wherein the correction control step controls the movement of the vibration correction unit using a pre-stored correction value, which is obtained before a user's instruction to start image capture is input, if the output of the first vibration detection unit is smaller than a predetermined value.

17. A control method of an image stabilization control apparatus that comprises a vibration correction unit configured to correct image shake occurring due to vibration applied to the image stabilization control apparatus, the control method comprising:

a first vibration detection step of detecting the vibration;

a second vibration detection step of detecting the vibration in a different way from that used in the first vibration detection step;

a calculation step of calculating a correction value based on the outputs of the first and second vibration detection steps;

a reliability determination step of determining the reliability of the correction value; and a correction control step of controlling the movement of the vibration correction unit based on the correction value, wherein if it is determined in the reliability determination step that the reliability is lower than a predetermined value, the correction control step controls the movement of the vibration correction unit using a pre-stored correction value, which is obtained before a user's instruction to start image capture is input.

* * * * *